(12) United States Patent
Lovett et al.

(10) Patent No.: US 9,700,101 B2
(45) Date of Patent: Jul. 11, 2017

(54) GUIDES AND COMPONENTS FOR CLOSURE SYSTEMS AND METHODS THEREFOR

(71) Applicant: Boa Technology, Inc., Denver, CO (US)

(72) Inventors: Kristopher Lovett, Denver, CO (US); Andrea Cavanagh, Denver, CO (US); Robert Burns, Denver, CO (US); Mark Soderberg, Conifer, CO (US); Mark Kerns, Golden, CO (US); Michael Nickel, Golden, CO (US); James Capra, Steamboat Springs, CO (US); Ilya Minkin, Denver, CO (US); Brett Vladika, Golden, CO (US); Sean Cavanagh, Denver, CO (US); David Dickensheets, Denver, CO (US)

(73) Assignee: Boa Technology Inc., Denver, CO (US)

( * ) Notice: Subject to any disclaimer, the term of this patent is extended or adjusted under 35 U.S.C. 154(b) by 260 days.

(21) Appl. No.: 14/479,173

(22) Filed: Sep. 5, 2014

(65) Prior Publication Data
US 2015/0059206 A1 Mar. 5, 2015

Related U.S. Application Data

(60) Provisional application No. 61/976,369, filed on Apr. 7, 2014, provisional application No. 61/880,753, filed
(Continued)

(51) Int. Cl.
*A43C 11/20* (2006.01)
*A43C 1/00* (2006.01)
(Continued)

(52) U.S. Cl.
CPC .................. *A43C 1/06* (2013.01); *A43C 3/00* (2013.01); *A43C 3/02* (2013.01); *A43C 5/00* (2013.01);
(Continued)

(58) Field of Classification Search
CPC .... A43C 1/06; A43C 3/00; A43C 5/00; A43C 11/004; A43C 11/008; A43C 11/165; F16G 11/12
(Continued)

(56) References Cited

U.S. PATENT DOCUMENTS 59,332 A 10/1866 White et al.
80,834 A 8/1868 Prussia
(Continued)

FOREIGN PATENT DOCUMENTS

AT 127075 2/1932
AT 244804 1/1966
(Continued)

OTHER PUBLICATIONS

ASOLO® Boot Brochure Catalog upon information and belief date is as early as Aug. 22, 1997.
(Continued)

*Primary Examiner* — Jack W Lavinder
(74) *Attorney, Agent, or Firm* — Kilpatrick Townsend & Stockton LLP

(57) ABSTRACT

According to an embodiment, a component for attachment to an article includes an upper component that is made of a thermoplastic material having a first melting temperature and a flange member that is molded onto the upper component and made of a thermoplastic elastomer material having a second melting temperature that is lower than the first melting temperature of the upper component. The flange member extends laterally from a bottom end of the upper
(Continued)

component so that a bottom surface of the flange member is flush with or positioned axially below a bottom surface of the upper component. The melting temperature of the thermoplastic elastomer material enables the flange member to be directly coupled to the article via heat welding and the like without substantially affecting the upper component.

14 Claims, 76 Drawing Sheets

Related U.S. Application Data on Sep. 20, 2013, provisional application No. 61/879,569, filed on Sep. 18, 2013, provisional application No. 61/874,134, filed on Sep. 5, 2013.

(51) Int. Cl.

| | | |
|---|---|---|
| A43C 1/06 | (2006.01) | |
| A43C 11/16 | (2006.01) | |
| F16G 11/12 | (2006.01) | |
| A43C 3/00 | (2006.01) | |
| A43C 3/02 | (2006.01) | |
| A43C 5/00 | (2006.01) | |
| A43C 11/00 | (2006.01) | |

(52) U.S. Cl.
CPC .......... *A43C 11/004* (2013.01); *A43C 11/008* (2013.01); *A43C 11/165* (2013.01); *F16G 11/12* (2013.01)

(58) Field of Classification Search
USPC .... 24/440, 439, 437, 438, 441, 712; 36/50.1
See application file for complete search history.

(56) References Cited

U.S. PATENT DOCUMENTS

| | | | |
|---|---|---|---|
| 117,530 A | 8/1871 | Foote | |
| 228,946 A | 6/1880 | Schulz | |
| 230,759 A | 8/1880 | Drummond | |
| 379,113 A | 3/1888 | Hibberd | |
| 746,563 A | 12/1903 | McMahon | |
| 819,993 A | 5/1906 | Haws et al. | |
| 908,704 A | 1/1909 | Sprinkle | |
| 1,060,422 A | 4/1913 | Bowdish | |
| 1,062,511 A | 5/1913 | Short | |
| 1,083,775 A | 1/1914 | Thomas | |
| 1,090,438 A | 3/1914 | Worth et al. | |
| 1,170,472 A | 2/1916 | Barber | |
| 1,288,859 A | 12/1918 | Feller et al. | |
| 1,390,991 A | 9/1921 | Fotchuk | |
| 1,393,188 A | 10/1921 | Whiteman | |
| 1,469,661 A | 2/1922 | Migita | |
| 1,412,486 A | 4/1922 | Paine | |
| 1,416,203 A | 5/1922 | Hobson | |
| 1,429,657 A | 9/1922 | Trawinski | |
| 1,481,903 A | 4/1923 | Hart | |
| 1,466,673 A | 9/1923 | Solomon et al. | |
| 1,530,713 A | 2/1924 | Clark | |
| 1,502,919 A | 7/1924 | Seib | |
| 1,862,047 A | 6/1932 | Boulet et al. | |
| 1,995,243 A | 6/1934 | Clarke | |
| 2,088,851 A | 8/1937 | Gantenbein | |
| 2,109,751 A | 3/1938 | Matthias et al. | |
| 2,124,310 A | 9/1938 | Murr, Jr. | |
| 2,316,102 A | 4/1943 | Preston | |
| 2,539,026 A | 1/1951 | Mangold | |
| 2,611,940 A | 9/1952 | Cairns | |
| 2,673,381 A | 3/1954 | Dueker | |
| 2,743,761 A | 5/1956 | Snyder et al. | |
| 2,745,160 A | 5/1956 | Jones | |
| 2,907,086 A | 10/1959 | Ord | |
| 2,991,523 A | 7/1961 | Del Conte | |
| 3,028,602 A | 4/1962 | Miller | |
| 3,035,319 A | 5/1962 | Wolff | |
| 3,106,003 A | 10/1963 | Herdman | |
| 3,112,545 A | 12/1963 | Williams | |
| 3,122,810 A | 3/1964 | Lawrence et al. | |
| 3,163,900 A | 1/1965 | Martin | |
| D200,394 S | 2/1965 | Hakim | |
| 3,169,325 A | 2/1965 | Fesl | |
| 3,193,950 A | 7/1965 | Shu-Lien Liou | |
| 3,197,155 A | 7/1965 | Chow | |
| 3,221,384 A | 12/1965 | Aufenacker | |
| 3,276,090 A | 10/1966 | Nigon | |
| D206,146 S | 11/1966 | Hendershot | |
| 3,345,707 A | 10/1967 | Rita | |
| D210,649 S | 4/1968 | Getgay | |
| 3,401,437 A | 9/1968 | Christpohersen | |
| 3,430,303 A | 3/1969 | Perrin et al. | |
| 3,491,465 A | 1/1970 | Martin | |
| 3,545,106 A | 12/1970 | Martin | |
| 3,618,232 A | 11/1971 | Shnuriwsky | |
| 3,620,402 A | 11/1971 | Wentland | |
| 3,668,791 A | 6/1972 | Salzman et al. | |
| 3,678,539 A | 7/1972 | Graup | |
| 3,703,775 A | 11/1972 | Gatti | |
| 3,729,779 A | 5/1973 | Porth | |
| 3,738,027 A | 6/1973 | Schoch | |
| 3,751,176 A | 8/1973 | Von Hollen | |
| 3,793,749 A | 2/1974 | Gertsch et al. | |
| 3,808,644 A | 5/1974 | Schoch | |
| 3,816,211 A | 6/1974 | Haigh | |
| 3,890,679 A | 6/1975 | Simon | |
| 3,934,346 A | 1/1976 | Sasaki et al. | |
| 3,975,838 A | 8/1976 | Martin | |
| 4,012,277 A | 3/1977 | Lundskow et al. | |
| 4,084,267 A | 4/1978 | Zadina | |
| 4,130,949 A | 12/1978 | Seidel | |
| 4,142,307 A | 3/1979 | Martin | |
| 4,227,322 A | 10/1980 | Annovi | |
| 4,261,081 A | 4/1981 | Lott | |
| 4,267,622 A | 5/1981 | Burnett-Johnston | |
| 4,327,470 A | 5/1982 | Lawrence | |
| 4,394,803 A * | 7/1983 | Goldstein ............... | A43C 7/02 36/50.1 |
| 4,408,403 A | 10/1983 | Martin | |
| 4,417,703 A | 11/1983 | Weinhold | |
| 4,433,456 A | 2/1984 | Baggio | |
| 4,463,761 A | 8/1984 | Pols et al. | |
| 4,480,395 A | 11/1984 | Schoch | |
| 4,507,878 A | 4/1985 | Semouha | |
| 4,516,576 A | 5/1985 | Kirchner | |
| 4,539,735 A | 9/1985 | Kasai | |
| 4,551,932 A | 11/1985 | Schoch | |
| 4,553,342 A * | 11/1985 | Derderian ............... | A43C 1/00 24/712 |
| 4,555,830 A | 12/1985 | Petrini et al. | |
| 4,574,500 A | 3/1986 | Aldinio et al. | |
| 4,616,432 A | 10/1986 | Bunch et al. | |
| 4,616,524 A | 10/1986 | Bidoia | |
| 4,619,057 A | 10/1986 | Sartor et al. | |
| 4,620,378 A | 11/1986 | Sartor | |
| 4,631,839 A | 12/1986 | Bonetti et al. | |
| 4,631,840 A | 12/1986 | Gamm | |
| 4,633,599 A | 1/1987 | Morell et al. | |
| 4,644,938 A | 2/1987 | Yates et al. | |
| 4,654,985 A | 4/1987 | Chalmers | |
| 4,660,300 A | 4/1987 | Morell et al. | |
| 4,660,302 A | 4/1987 | Arieh et al. | |
| 4,680,878 A | 7/1987 | Pozzobon et al. | |
| 4,719,670 A | 1/1988 | Kurt | |
| 4,719,709 A | 1/1988 | Vaccari | |
| 4,719,710 A | 1/1988 | Pozzobon | |
| 4,722,477 A | 2/1988 | Floyd | |
| 4,741,115 A | 5/1988 | Pozzobon | |
| 4,748,726 A | 6/1988 | Schoch | |
| 4,760,653 A | 8/1988 | Baggio | |
| 4,780,969 A | 11/1988 | White, Jr. | |
| 4,787,124 A | 11/1988 | Pozzobon et al. | |
| 4,790,081 A | 12/1988 | Benoit et al. | |
| 4,796,829 A | 1/1989 | Pozzobon et al. | |

(56) References Cited

U.S. PATENT DOCUMENTS

| | | |
|---|---|---|
| 4,799,297 A | 1/1989 | Baggio et al. |
| 4,802,291 A | 2/1989 | Sartor |
| 4,811,503 A | 3/1989 | Iwama |
| 4,826,098 A | 5/1989 | Pozzobon et al. |
| 4,841,649 A | 6/1989 | Baggio et al. |
| 4,856,207 A | 8/1989 | Datson |
| 4,862,878 A | 9/1989 | Davison |
| 4,870,723 A | 10/1989 | Pozzobon et al. |
| 4,870,761 A | 10/1989 | Tracy |
| 4,884,760 A | 12/1989 | Baggio et al. |
| 4,901,938 A | 2/1990 | Cantley et al. |
| 4,924,605 A | 5/1990 | Spademan |
| D308,282 S | 6/1990 | Bergman et al. |
| 4,937,953 A | 7/1990 | Walkhoff |
| 4,961,544 A | 10/1990 | Bidoia |
| 4,962,875 A | 10/1990 | Sodeno |
| 4,979,953 A | 12/1990 | Spence |
| 4,989,805 A | 2/1991 | Burke |
| 5,001,817 A | 3/1991 | De Bortoli et al. |
| 5,016,327 A | 5/1991 | Klausner |
| 5,042,177 A | 8/1991 | Schoch |
| 5,062,225 A | 11/1991 | Gorza |
| 5,065,480 A | 11/1991 | De Bortoli |
| 5,065,481 A | 11/1991 | Walkhoff |
| 5,079,809 A | 1/1992 | Teich et al. |
| 5,108,216 A | 4/1992 | Geyer et al. |
| 5,117,567 A | 6/1992 | Berger |
| 5,152,038 A | 10/1992 | Schoch |
| 5,157,813 A | 10/1992 | Carroll |
| 5,158,428 A | 10/1992 | Gessner et al. |
| 5,177,882 A | 1/1993 | Berger |
| 5,181,331 A | 1/1993 | Berger |
| 5,184,378 A | 2/1993 | Batra |
| D333,552 S | 3/1993 | Berger et al. |
| 5,205,055 A | 4/1993 | Harrell |
| 5,233,767 A | 8/1993 | Kramer |
| 5,249,377 A | 10/1993 | Walkhoff |
| 5,259,094 A | 11/1993 | Zepeda |
| 5,261,997 A | 11/1993 | Inselmann |
| 5,315,741 A | 5/1994 | Dubberke |
| 5,319,868 A | 6/1994 | Hallenbeck |
| 5,319,869 A | 6/1994 | McDonald et al. |
| 5,325,613 A | 7/1994 | Sussmann |
| 5,326,632 A | 7/1994 | Zenda et al. |
| 5,327,662 A | 7/1994 | Hallenbeck |
| 5,335,401 A | 8/1994 | Hanson |
| 5,341,583 A | 8/1994 | Hallenbeck |
| 5,345,697 A | 9/1994 | Quellais |
| 5,355,596 A | 10/1994 | Sussmann |
| 5,357,654 A | 10/1994 | Hsing-Chi |
| 5,371,957 A | 12/1994 | Gaudio |
| 5,381,609 A | 1/1995 | Hieblinger |
| 5,392,535 A | 2/1995 | Van Noy et al. |
| D357,576 S | 4/1995 | Steinweis |
| 5,425,161 A | 6/1995 | Schoch |
| 5,425,185 A | 6/1995 | Gansler |
| 5,430,960 A | 7/1995 | Richardson |
| 5,433,648 A | 7/1995 | Frydman |
| 5,463,822 A | 11/1995 | Miller |
| 5,477,593 A | 12/1995 | Leick |
| D367,755 S | 3/1996 | Jones |
| D367,954 S | 3/1996 | Dion |
| 5,502,902 A | 4/1996 | Sussmann |
| 5,511,325 A | 4/1996 | Hieblinger |
| 5,526,585 A | 6/1996 | Brown et al. |
| 5,535,531 A | 7/1996 | Karabed et al. |
| 5,537,763 A | 7/1996 | Donnadieu et al. |
| 5,557,864 A | 9/1996 | Marks |
| 5,566,474 A | 10/1996 | Leick et al. |
| D375,831 S | 11/1996 | Perry |
| 5,596,820 A | 1/1997 | Edauw et al. |
| 5,599,000 A | 2/1997 | Bennett |
| 5,599,288 A | 2/1997 | Shirley et al. |
| 5,600,874 A | 2/1997 | Jungkind |
| 5,606,778 A | 3/1997 | Jungkind |
| 5,607,448 A | 3/1997 | Stahl et al. |
| D379,113 S | 5/1997 | McDonald et al. |
| 5,638,588 A | 6/1997 | Jungkind |
| 5,640,785 A | 6/1997 | Egelja |
| 5,647,104 A | 7/1997 | James |
| 5,651,198 A | 7/1997 | Sussmann |
| 5,669,116 A | 9/1997 | Jungkind |
| 5,692,319 A | 12/1997 | Parker et al. |
| 5,718,021 A | 2/1998 | Tatum |
| 5,718,065 A | 2/1998 | Locker |
| 5,720,084 A | 2/1998 | Chen |
| 5,732,483 A | 3/1998 | Cagliari |
| 5,732,648 A | 3/1998 | Aragon |
| 5,736,696 A | 4/1998 | Del Rosso |
| 5,737,854 A | 4/1998 | Sussmann |
| 5,755,044 A | 5/1998 | Veylupek |
| 5,756,298 A | 5/1998 | Burczak et al. |
| 5,761,777 A | 6/1998 | Leick |
| 5,772,146 A | 6/1998 | Kawamoto et al. |
| 5,784,809 A | 7/1998 | McDonald |
| 5,791,068 A | 8/1998 | Bernier et al. |
| 5,819,378 A | 10/1998 | Doyle |
| 5,833,640 A | 11/1998 | Vazquez, Jr. et al. |
| 5,839,210 A | 11/1998 | Bernier et al. |
| 5,845,371 A | 12/1998 | Chen |
| 5,909,946 A | 6/1999 | Okajima |
| D413,197 S | 8/1999 | Faye |
| 5,934,599 A | 8/1999 | Hammerslag |
| 5,937,542 A | 8/1999 | Bourdeau |
| 5,956,823 A | 9/1999 | Borel |
| 5,971,946 A | 10/1999 | Quinn et al. |
| 6,015,110 A | 1/2000 | Lai |
| 6,038,791 A | 3/2000 | Cornelius et al. |
| 6,052,921 A | 4/2000 | Oreck |
| 6,070,886 A | 6/2000 | Cornelius et al. |
| 6,070,887 A | 6/2000 | Cornelius et al. |
| 6,083,857 A | 7/2000 | Bottger |
| 6,088,936 A | 7/2000 | Bahl |
| 6,102,412 A | 8/2000 | Staffaroni |
| D430,724 S | 9/2000 | Matis et al. |
| 6,119,318 A | 9/2000 | Maurer |
| 6,119,372 A | 9/2000 | Okajima |
| 6,128,835 A | 10/2000 | Ritter et al. |
| 6,128,836 A | 10/2000 | Barret |
| 6,148,489 A | 11/2000 | Dickie et al. |
| 6,202,953 B1 | 3/2001 | Hammerslag |
| 6,219,891 B1 | 4/2001 | Maurer et al. |
| 6,240,657 B1 | 6/2001 | Weber et al. |
| 6,256,798 B1 | 7/2001 | Egolf et al. |
| 6,267,390 B1 | 7/2001 | Maravetz et al. |
| 6,286,233 B1 | 9/2001 | Gaither |
| 6,289,558 B1 | 9/2001 | Hammerslag |
| 6,311,633 B1 | 11/2001 | Keire |
| D456,130 S | 4/2002 | Towns |
| 6,370,743 B2 | 4/2002 | Choe |
| 6,401,364 B1 | 6/2002 | Burt |
| 6,416,074 B1 | 7/2002 | Maravetz et al. |
| 6,467,195 B2 | 10/2002 | Pierre et al. |
| 6,477,793 B1 | 11/2002 | Pruitt et al. |
| 6,502,286 B1 | 1/2003 | Dubberke |
| 6,543,159 B1 | 4/2003 | Carpenter et al. |
| 6,568,103 B2 | 5/2003 | Durocher |
| 6,606,804 B2 | 8/2003 | Kaneko et al. |
| 6,694,643 B1 | 2/2004 | Hsu |
| 6,708,376 B1 | 3/2004 | Landry |
| 6,711,787 B2 | 3/2004 | Jungkind et al. |
| 6,735,829 B2 | 5/2004 | Hsu |
| 6,757,991 B2 | 7/2004 | Sussmann |
| 6,775,928 B2 | 8/2004 | Grande et al. |
| 6,792,702 B2 | 9/2004 | Borsoi et al. |
| 6,802,439 B2 | 10/2004 | Azam et al. |
| 6,823,610 B1 | 11/2004 | Ashley |
| 6,871,812 B1 | 3/2005 | Chang |
| 6,877,256 B2 | 4/2005 | Martin et al. |
| 6,899,720 B1 | 5/2005 | McMillan |
| 6,922,917 B2 | 8/2005 | Kerns et al. |
| 6,938,913 B2 | 9/2005 | Elkington |
| 6,945,543 B2 | 9/2005 | De Bortoli et al. |
| D510,183 S | 10/2005 | Tresser |

(56) References Cited

U.S. PATENT DOCUMENTS

| | | |
|---|---|---|
| 6,976,972 B2 | 12/2005 | Bradshaw |
| 6,993,859 B2 | 2/2006 | Martin et al. |
| D521,226 S | 5/2006 | Douglas et al. |
| 7,073,279 B2 | 7/2006 | Min |
| 7,076,843 B2 | 7/2006 | Sakabayashi |
| 7,082,701 B2 | 8/2006 | Dalgaard et al. |
| 7,096,559 B2 | 8/2006 | Johnson et al. |
| 7,134,224 B2 | 11/2006 | Elkington et al. |
| 7,266,911 B2 | 9/2007 | Holzer et al. |
| 7,281,341 B2 | 10/2007 | Reagan et al. |
| 7,293,373 B2 | 11/2007 | Reagan et al. |
| 7,331,126 B2 | 2/2008 | Johnson |
| 7,343,701 B2 | 3/2008 | Pare et al. |
| 7,367,522 B2 | 5/2008 | Chen |
| 7,386,947 B2 | 6/2008 | Martin et al. |
| 7,392,602 B2 | 7/2008 | Reagan et al. |
| 7,401,423 B2 | 7/2008 | Reagan et al. |
| 7,490,458 B2 | 2/2009 | Ford |
| 7,568,298 B2 | 8/2009 | Kerns |
| 7,582,102 B2 | 9/2009 | Heinz et al. |
| 7,584,528 B2 | 9/2009 | Hu |
| 7,591,050 B2 | 9/2009 | Hammerslag |
| 7,597,675 B2 | 10/2009 | Ingimundarson et al. |
| 7,600,660 B2 | 10/2009 | Kasper et al. |
| 7,617,573 B2 | 11/2009 | Chen |
| 7,624,517 B2 | 12/2009 | Smith |
| 7,648,404 B1 | 1/2010 | Martin |
| 7,650,705 B2 | 1/2010 | Donnadieu et al. |
| 7,694,354 B2 | 4/2010 | Philpott et al. |
| 7,752,774 B2 | 7/2010 | Ussher |
| 7,757,412 B2 | 7/2010 | Farys |
| 7,774,956 B2 | 8/2010 | Dua et al. |
| D626,322 S | 11/2010 | Servettaz |
| 7,841,106 B2 | 11/2010 | Farys |
| 7,871,334 B2 | 1/2011 | Young et al. |
| 7,877,845 B2 | 2/2011 | Signori |
| 7,900,378 B1 | 3/2011 | Busse |
| 7,908,769 B2 | 3/2011 | Pellegrini |
| 7,947,061 B1 | 5/2011 | Reis |
| 7,950,112 B2 | 5/2011 | Hammerslag et al. |
| 7,954,204 B2 | 6/2011 | Hammerslag et al. |
| 7,963,049 B2 | 6/2011 | Messmer |
| 7,992,261 B2 | 8/2011 | Hammerslag et al. |
| D646,790 S | 10/2011 | Castillo et al. |
| 8,056,150 B2 | 11/2011 | Stokes et al. |
| 8,074,379 B2 | 12/2011 | Robinson, Jr. et al. |
| 8,091,182 B2 | 1/2012 | Hammerslag et al. |
| 8,109,015 B2 | 2/2012 | Signori |
| D663,850 S | 7/2012 | Joseph |
| D663,851 S | 7/2012 | Joseph |
| 8,215,033 B2 | 7/2012 | Carboy et al. |
| 8,231,074 B2 | 7/2012 | Hu et al. |
| D665,088 S | 8/2012 | Joseph |
| 8,235,321 B2 | 8/2012 | Chen |
| 8,245,371 B2 | 8/2012 | Chen |
| 8,257,293 B2 | 9/2012 | Ingimundarson et al. |
| 8,266,827 B2 | 9/2012 | Dojan et al. |
| 8,277,401 B2 | 10/2012 | Hammerslag et al. |
| 8,302,329 B2 | 11/2012 | Hurd et al. |
| 8,303,527 B2 | 11/2012 | Joseph |
| 8,308,098 B2 | 11/2012 | Chen |
| 8,353,087 B2 | 1/2013 | Chen |
| 8,353,088 B2 | 1/2013 | Ha |
| D677,045 S | 3/2013 | Voskuil |
| D679,019 S | 3/2013 | Siddle et al. |
| 8,434,200 B2 | 5/2013 | Chen |
| 8,490,299 B2 | 7/2013 | Dua et al. |
| 8,516,662 B2 | 8/2013 | Goodman et al. |
| 8,578,632 B2 | 11/2013 | Bell et al. |
| 8,652,164 B1 | 2/2014 | Aston |
| 8,713,820 B2 | 5/2014 | Kerns et al. |
| 8,984,719 B2 | 3/2015 | Soderberg et al. |
| 9,072,341 B2 | 7/2015 | Jungkind |
| D735,987 S | 8/2015 | Hsu |
| 9,101,181 B2 | 8/2015 | Soderberg et al. |
| 9,125,455 B2 | 9/2015 | Kerns et al. |
| 9,138,030 B2 | 9/2015 | Soderberg et al. |
| 2002/0050076 A1 | 5/2002 | Borsoi et al. |
| 2002/0062579 A1 | 5/2002 | Caeran |
| 2002/0095750 A1 | 7/2002 | Hammerslag |
| 2002/0129518 A1 | 9/2002 | Borsoi et al. |
| 2002/0148142 A1 | 10/2002 | Oorei et al. |
| 2002/0166260 A1 | 11/2002 | Borsoi |
| 2002/0178548 A1 | 12/2002 | Freed |
| 2003/0079376 A1 | 5/2003 | Oorei et al. |
| 2003/0144620 A1 | 7/2003 | Sieller |
| 2003/0150135 A1 | 8/2003 | Liu |
| 2003/0177662 A1 | 9/2003 | Elkington et al. |
| 2003/0204938 A1 | 11/2003 | Hammerslag |
| 2004/0041452 A1 | 3/2004 | Williams |
| 2004/0211039 A1 | 10/2004 | Livingston |
| 2005/0054962 A1 | 3/2005 | Bradshaw |
| 2005/0060912 A1 | 3/2005 | Holzer et al. |
| 2005/0081339 A1 | 4/2005 | Sakabayashi |
| 2005/0081403 A1 | 4/2005 | Mathieu |
| 2005/0087115 A1 | 4/2005 | Martin |
| 2005/0098673 A1 | 5/2005 | Huang |
| 2005/0102861 A1 | 5/2005 | Martin |
| 2005/0126043 A1 | 6/2005 | Reagan et al. |
| 2005/0172463 A1 | 8/2005 | Rolla |
| 2005/0184186 A1 | 8/2005 | Tsoi et al. |
| 2005/0198866 A1 | 9/2005 | Wiper et al. |
| 2006/0135901 A1 | 6/2006 | Ingimundarson et al. |
| 2006/0148351 A1 | 7/2006 | Tao et al. |
| 2006/0156517 A1 | 7/2006 | Hammerslag et al. |
| 2006/0179685 A1 | 8/2006 | Borel et al. |
| 2006/0185193 A1 | 8/2006 | Pellegrini |
| 2006/0287627 A1 | 12/2006 | Johnson |
| 2007/0006489 A1 | 1/2007 | Case, Jr. et al. |
| 2007/0063459 A1 | 3/2007 | Kavarsky |
| 2007/0068040 A1 | 3/2007 | Farys |
| 2007/0084956 A1 | 4/2007 | Chen |
| 2007/0113524 A1 | 5/2007 | Lander |
| 2007/0128959 A1 | 6/2007 | Cooke |
| 2007/0149657 A1 | 6/2007 | Skuratowicz et al. |
| 2007/0169378 A1 | 7/2007 | Sodeberg et al. |
| 2008/0016717 A1 | 1/2008 | Ruban |
| 2008/0060167 A1 | 3/2008 | Hammerslag et al. |
| 2008/0060168 A1 | 3/2008 | Hammerslag et al. |
| 2008/0066272 A1 | 3/2008 | Hammerslag et al. |
| 2008/0066345 A1 | 3/2008 | Hammerslag et al. |
| 2008/0066346 A1 | 3/2008 | Hammerslag et al. |
| 2008/0068204 A1 | 3/2008 | Carmen et al. |
| 2008/0083135 A1 | 4/2008 | Hammerslag et al. |
| 2008/0092279 A1 | 4/2008 | Chiang |
| 2008/0172848 A1 | 7/2008 | Chen |
| 2008/0196224 A1 | 8/2008 | Hu |
| 2009/0019734 A1 | 1/2009 | Reagan et al. |
| 2009/0071041 A1 | 3/2009 | Hooper |
| 2009/0090029 A1 | 4/2009 | Kishino |
| 2009/0172928 A1 | 7/2009 | Messmer et al. |
| 2009/0184189 A1 | 7/2009 | Soderberg et al. |
| 2009/0272007 A1 | 11/2009 | Beers et al. |
| 2009/0277043 A1 | 11/2009 | Graser et al. |
| 2010/0064547 A1 | 3/2010 | Kaplan |
| 2010/0101061 A1 | 4/2010 | Ha |
| 2010/0139057 A1 | 6/2010 | Soderberg et al. |
| 2010/0154254 A1 | 6/2010 | Fletcher |
| 2010/0175163 A1 | 7/2010 | Litke |
| 2010/0251524 A1 | 10/2010 | Chen |
| 2010/0299959 A1 | 12/2010 | Hammerslag |
| 2010/0319216 A1 | 12/2010 | Grenzke et al. |
| 2011/0000173 A1 | 1/2011 | Lander |
| 2011/0071647 A1 | 3/2011 | Mahon |
| 2011/0162236 A1 | 7/2011 | Voskuil et al. |
| 2011/0167543 A1 | 7/2011 | Kovacevich et al. |
| 2011/0191992 A1 | 8/2011 | Chen |
| 2011/0197362 A1 | 8/2011 | Chella et al. |
| 2011/0225843 A1 | 9/2011 | Kerns et al. |
| 2011/0258876 A1 | 10/2011 | Baker et al. |
| 2011/0266384 A1* | 11/2011 | Goodman ............ A43C 11/165 242/396.4 |
| 2012/0000091 A1 | 1/2012 | Cotterman et al. |
| 2012/0004587 A1 | 1/2012 | Nickel et al. |

(56) References Cited

U.S. PATENT DOCUMENTS

| | | |
|---|---|---|
| 2012/0005995 A1 | 1/2012 | Emery |
| 2012/0023717 A1 | 2/2012 | Chen |
| 2012/0047620 A1 | 3/2012 | Ellis et al. |
| 2012/0101417 A1 | 4/2012 | Joseph |
| 2012/0102783 A1 | 5/2012 | Swigart et al. |
| 2012/0138882 A1 | 6/2012 | Moore et al. |
| 2012/0157902 A1 | 6/2012 | Castillo et al. |
| 2012/0167290 A1 | 7/2012 | Kovacevich et al. |
| 2012/0174437 A1 | 7/2012 | Heard |
| 2012/0228419 A1 | 9/2012 | Chen |
| 2012/0246974 A1 | 10/2012 | Hammerslag et al. |
| 2012/0310273 A1 | 12/2012 | Thorpe |
| 2013/0012856 A1 | 1/2013 | Hammerslag et al. |
| 2013/0014359 A1 | 1/2013 | Chen |
| 2013/0019501 A1 | 1/2013 | Gerber |
| 2013/0025100 A1 | 1/2013 | Ha |
| 2013/0091667 A1 | 4/2013 | Chen |
| 2013/0091674 A1 | 4/2013 | Chen |
| 2013/0092780 A1 | 4/2013 | Soderberg et al. |
| 2013/0269219 A1 | 10/2013 | Burns et al. |
| 2013/0277485 A1 | 10/2013 | Soderberg et al. |
| 2013/0340283 A1 | 12/2013 | Bell et al. |
| 2013/0345612 A1 | 12/2013 | Bannister et al. |
| 2014/0082963 A1 | 3/2014 | Beers |
| 2014/0094728 A1 | 4/2014 | Soderberg et al. |
| 2014/0117140 A1 | 5/2014 | Goodman et al. |
| 2014/0123440 A1 | 5/2014 | Capra et al. |
| 2014/0123449 A1 | 5/2014 | Soderberg et al. |
| 2014/0208550 A1 | 7/2014 | Neiley |
| 2014/0221889 A1 | 8/2014 | Burns et al. |
| 2014/0257156 A1 | 9/2014 | Capra et al. |
| 2014/0290016 A1 | 10/2014 | Lovett et al. |
| 2014/0359981 A1 | 12/2014 | Cotterman et al. |
| 2015/0007422 A1 | 1/2015 | Cavanagh et al. |
| 2015/0014463 A1 | 1/2015 | Converse et al. |
| 2015/0026936 A1 | 1/2015 | Kerns et al. |
| 2015/0033519 A1 | 2/2015 | Hammerslag et al. |
| 2015/0059206 A1 | 3/2015 | Lovett et al. |
| 2015/0076272 A1 | 3/2015 | Trudel et al. |
| 2015/0089779 A1 | 4/2015 | Lawrence et al. |
| 2015/0089835 A1 | 4/2015 | Hammerslag et al. |
| 2015/0101160 A1 | 4/2015 | Soderberg et al. |
| 2015/0150705 A1 | 6/2015 | Capra et al. |
| 2015/0151070 A1 | 6/2015 | Capra et al. |
| 2015/0190262 A1 | 7/2015 | Capra et al. |
| 2015/0223608 A1 | 8/2015 | Capra et al. |
| 2015/0237962 A1 | 8/2015 | Soderberg et al. |
| 2015/0335458 A1 | 11/2015 | Romo |

FOREIGN PATENT DOCUMENTS

| | | |
|---|---|---|
| AT | 361808 | 4/1981 |
| CA | 2114387 | 1/1994 |
| CA | 2112789 | 8/1994 |
| CH | 41765 | 9/1907 |
| CH | 111341 | 11/1925 |
| CH | 199766 | 11/1938 |
| CH | 204 834 A | 8/1939 |
| CH | 523 669 | 7/1972 |
| CH | 562 015 | 5/1975 |
| CH | 577 282 | 7/1976 |
| CH | 612 076 | 7/1979 |
| CH | 537 164 | 7/1981 |
| CH | 624 001 | 7/1981 |
| CH | 471 553 | 12/1984 |
| CN | 2613167 | 4/2004 |
| CN | 201015448 | 2/2008 |
| DE | 555211 | 7/1932 |
| DE | 641976 | 2/1937 |
| DE | 1 661 668 | 8/1953 |
| DE | 7043154.8 | 11/1970 |
| DE | 1 785 220 | 5/1971 |
| DE | 2 062 795 | 6/1972 |
| DE | 23 41 658 | 3/1974 |
| DE | 24 14 439 | 10/1975 |
| DE | 29 00 077 A1 | 7/1980 |
| DE | 2914280 A1 | 10/1980 |
| DE | 31 01 952 A1 | 9/1982 |
| DE | 36 26 837 | 2/1988 |
| DE | 38 13 470 | 11/1989 |
| DE | 3822113 C2 | 1/1990 |
| DE | 9413147 | 6/1994 |
| DE | 43 02 401 A1 | 8/1994 |
| DE | 43 05 671 A1 | 9/1994 |
| DE | 9308037 | 11/1994 |
| DE | 43 26 049 A1 | 2/1995 |
| DE | 9315776 | 2/1995 |
| DE | 29503552.8 | 4/1995 |
| DE | 196 24 553 | 1/1998 |
| DE | 19945045 A1 | 9/1999 |
| DE | 19945045 A1 | 3/2001 |
| DE | 201 16 755 U1 | 1/2002 |
| DE | 20 2010 000 354 U1 | 7/2010 |
| DE | 11 2013 005 273 T5 | 9/2015 |
| EP | 0 056 953 B1 | 6/1969 |
| EP | 0 081 042 B1 | 7/1972 |
| EP | 0 123 050 | 2/1984 |
| EP | 0 201 051 | 11/1986 |
| EP | 0 099 504 | 1/1987 |
| EP | 0 255 869 | 7/1987 |
| EP | 0 155 596 | 1/1988 |
| EP | 0 393 380 | 3/1990 |
| EP | 0 651 954 A1 | 4/1993 |
| EP | 0 474 708 | 9/1993 |
| EP | 0 589 232 A1 | 3/1994 |
| EP | 0 589 233 A1 | 3/1994 |
| EP | 0 614 624 | 9/1994 |
| EP | 0 614 625 A1 | 9/1994 |
| EP | 0 651 954 A1 | 5/1995 |
| EP | 0 679 346 | 11/1995 |
| EP | 0 693 260 B1 | 1/1996 |
| EP | 0 734 662 A1 | 2/1996 |
| EP | 0 717 942 | 6/1996 |
| EP | 0 858 619 | 8/1996 |
| EP | 0 734 662 A1 | 10/1996 |
| EP | 0 858 621 | 8/1998 |
| EP | 0 923 965 | 6/1999 |
| EP | 0 937 467 | 8/1999 |
| EP | 0 848 917 B1 | 4/2000 |
| EP | 1 219 195 | 2/2001 |
| EP | 1163860 | 5/2001 |
| EP | 1163860 | 12/2001 |
| EP | 1 236 412 A | 2/2002 |
| EP | 1 219 195 | 7/2002 |
| EP | 1 236 412 A | 9/2002 |
| EP | 2298107 B1 | 3/2011 |
| EP | 2359708 | 8/2011 |
| FR | 1 349 832 | 3/1963 |
| FR | 1 404 799 | 7/1964 |
| FR | 1 374 110 | 10/1964 |
| FR | 2 019 991 A | 10/1969 |
| FR | 2 019 991 A | 7/1970 |
| FR | 2 108 428 | 9/1971 |
| FR | 2 175 684 | 3/1972 |
| FR | 2108429 | 5/1972 |
| FR | 2 173 451 | 10/1973 |
| FR | 2 399 811 | 3/1979 |
| FR | 2 565 795 | 6/1984 |
| FR | 2 598 292 A1 | 11/1987 |
| FR | 2 726 440 A1 | 5/1996 |
| FR | 2 770 379 A1 | 5/1997 |
| FR | 2 770 379 A1 | 5/1999 |
| FR | 2 814 919 A1 | 4/2002 |
| GB | 189911673 | 0/1899 |
| GB | 216400 | 8/1923 |
| GB | 216400 | 5/1924 |
| GB | 2 449 722 A | 3/2006 |
| GB | 2 449 722 A | 12/2008 |
| IT | 1220811 | 3/1988 |
| IT | 1220811 | 6/1990 |
| IT | PD 2003 A 000197 | 4/2003 |
| IT | PD 2003 A 000197 | 9/2003 |
| IT | PD 2003 A 000198 | 3/2005 |
| JP | 49-28618 | 3/1974 |

(56) References Cited

FOREIGN PATENT DOCUMENTS

| | | |
|---|---|---|
| JP | 51-2776 | 1/1976 |
| JP | 51-121375 | 10/1976 |
| JP | 51-131978 | 10/1976 |
| JP | 53-124987 | 3/1977 |
| JP | 54-108125 | 2/1978 |
| JP | 62-57346 | 4/1987 |
| JP | 63-80736 | 5/1988 |
| JP | H02-236025 | 9/1990 |
| JP | 6-284906 | 10/1994 |
| JP | 6-284906 | 11/1994 |
| JP | 7-000208 | 6/1995 |
| JP | 3031760 | 9/1996 |
| JP | 3030988 | 11/1996 |
| JP | 8308608 | 11/1996 |
| JP | 10-199366 | 7/1998 |
| JP | 2001-197905 | 7/2001 |
| JP | 2004-016732 | 1/2004 |
| JP | 2004-041666 | 2/2004 |
| JP | 2009-504210 | 2/2009 |
| KR | 20-0367882 | 11/2004 |
| KR | 20-0400568 | 8/2005 |
| KR | 20-0400568 | 11/2005 |
| KR | 10-0598627 | 3/2006 |
| KR | 10-0598627 | 7/2006 |
| KR | 10-0953398 | 4/2010 |
| KR | 10-1025134 B1 | 3/2011 |
| KR | 10-1028468 | 4/2011 |
| KR | 10-1053551 | 7/2011 |
| WO | WO 94/27456 | 12/1994 |
| WO | WO 95/03720 | 2/1995 |
| WO | WO 95/11602 | 5/1995 |
| WO | WO 95/03720 | 9/1995 |
| WO | WO 98/33408 | 8/1998 |
| WO | WO 98/37782 | 9/1998 |
| WO | WO 99/09850 | 3/1999 |
| WO | WO 99/15043 | 4/1999 |
| WO | WO 99/43231 | 9/1999 |
| WO | WO 00/53045 | 9/2000 |
| WO | WO 00/76337 A1 | 12/2000 |
| WO | WO 01/08525 | 2/2001 |
| WO | WO 01/15559 | 3/2001 |
| WO | WO 02/051511 | 7/2002 |
| WO | WO 2004/093569 | 11/2004 |
| WO | WO 2005/013748 A1 | 2/2005 |
| WO | WO/2007/016983 | 2/2007 |
| WO | WO 2008/015214 | 2/2008 |
| WO | WO/2008/033963 | 3/2008 |
| WO | WO/2009/134858 | 11/2009 |
| WO | WO 2010/059989 A2 | 5/2010 |
| WO | WO 2012/165803 A2 | 12/2012 |
| WO | WO/2015/035885 | 3/2015 |
| WO | 2015/179332 A1 | 11/2015 |
| WO | 2015/181928 A1 | 12/2015 |

OTHER PUBLICATIONS

La Sportiva, A Technical Lightweight Double Boot for Cold Environments http://www.sportiva.com/products/footwear/mountain/spantik.
U.S. Appl. No. 09/956,601 Including its prosecution history, filed Sep. 18, 2001, Hammerslag.
ASOLO® Boot Brochure Catalog upon information and belief date is as early as Aug. 22, 1997, 12 pages.
La Sportiva, A Technical Lightweight Double Boot for Cold Environments, 1 page. Accessed on May 27, 2015. Retrieved from http://www.sportiva.com/products/footwear/mountain/spantik.
"Strength of materials used to make my Safety Harnesses," Elaine, Inc. Jul. 9, 2012. Retrieved from <https://web.archive.org/web/20120709002720/http://www.childharness.ca/strength_data.html> on Mar. 17, 2014, 2 pages.
International Search Report and Written Opinion for PCT/US2013/032326 mailed Jun. 14, 2013, 27 pages.
International Preliminary Report on Patentability for PCT/US2013/032326 issued Sep. 16, 2014, 6 pages.
International Search Report and Written Opinion for PCT/US2013/057637 mailed Apr. 7, 2014, 34 pages.
International Preliminary Report on Patentability for PCT/US2013/057637 issued Mar. 3, 2015, 9 pages.
International Search Report and Written Opinion for PCT/US2013/068342 mailed Apr. 7, 2014, 29 pages.
International Preliminary Report on Patentability for PCT/US2013/068342 issued May 5, 2015, 9 pages.
International Search Report and Written Opinion for PCT/US2014/014952 mailed Apr. 25, 2014, 17 pages.
International Preliminary Report on Patentability for PCT/US2014/014952 issued Aug. 11, 2015, 9 pages.
International Search Report and Written Opinion for PCT/US2014/066212 mailed Apr. 22, 2015, 16 pages.
International Search Report and Written Opinion for PCT/US2014/032574 mailed Oct. 31, 2014, 19 pages.
International Search Report and Written Opinion for PCT/US2014/045291 mailed Nov. 6, 2014, 12 pages.
International Search Report and Written Opinion for PCT/US2014/013458 mailed May 19, 2014, 12 pages.
International Preliminary Report on Patentability for PCT/US2014/013458 issued Jul. 28, 2015, 7 pages.
International Search Report and Written Opinion for PCT/US2013/068814 mailed Jun. 9, 2014, 18 pages.
International Preliminary Report on Patentability for PCT/US2013/068814 issued May 12, 2015, 12 pages.
Notice of Reasons for Rejection from the Japanese Patent Office dated Feb. 26, 2015 for design application No. 2014-015570, 4 pages.
Receipt of Certificate of Design Registration No. 1529678 from the Japanese Patent Office for design application No. 2014-015570 dated Jun. 26, 2015, 1 page.
International Search Report and Written Opinion for PCT/US2014/055710 mailed Jul. 6, 2015, 19 pages.
International Search Report and Written Opinion for PCT/US2014/054420 mailed Jul. 6, 2015, 21 pages.
The Preliminary Rejections from the Korean Intellectual Property Office for Application No. 30-2014-34959 Aug. 7, 2015, is not translated into English. The document requests a renaming of the application to be in accordance with Korean patent law, 5 pages total.
The Preliminary Rejections from the Korean Intellectual Property Office for Application No. 30-2014-34959 Apr. 7, 2015, is not translated into English. The document requests a revision of the drawings to be in accordance with Korean patent law, 6 pages total.
Certificate of Design Registration No. 30-809409 on Aug. 3, 2015 from the Korean Intellectual Property Office for Appln No. 30-2015-11475, 2 pages.
Certificate of Design Registration No. 30-809410 on Aug. 3, 2015 from the Korean Intellectual Property Office for Appln No. 30-2015-11476, 2 pages.
European Search Report for EP 14168875 mailed Oct. 29, 2014, 9 pages.
International Search Report and Written Opinion for PCT/US2014/020894 mailed Jun. 20, 2014, 12 pages.
International Preliminary Report on Patentability for PCT/US2014/020894 issued Sep. 8, 2015, 7 pages.
International Search Report and Written Opinion for PCT/US2014/041144 mailed Dec. 10, 2014, 13 pages.
International Preliminary Report on Patentability for PCT/US2014/032574 issued Oct. 6, 2015, 12 pages.
International Search Report and Written Opinion for PCT/US2014/046238 mailed Nov. 21, 2014, 17 pages.
Office Action received Oct. 8, 2015 from the German Patent and Trademark Office for Appln No. 402015100191.2, regarding the title of the invention, 2 pages.
Anonymous, "Shore durometer," Wikipedia, the free encyclopedia, Mar. 10, 2012, XP002747470, Retrieved from the Internet: URL: https://en.wikipedia.org/w/index.php?title=Shore_durometer &oldid=481128180 [retrieved on Oct. 20, 2015] * shore A, shore D, durometer, polymer, rubber, gel; the whole document *, 6 pages.

(56) References Cited

OTHER PUBLICATIONS

Notice of Reasons for Rejection from the Japanese Patent Office dated Oct. 5, 2015 for design application No. 2015-004923, 4 pages.
"Save Tourniquet," 3 pages. Copyright 2015. Accessed on Dec. 11, 2015. Retrieved from http://www.savetourniquet.com/.
International Preliminary Report on Patentability for PCT/US2014/041144 issued Dec. 8. 2015. all pages.
Supplementary European Search Report for EP 13761841 dated Oct. 21, 2015, all pages.
International Preliminary Report on Patentability for PCT/US2014/045291 issued Jan. 5, 2016, 5 pages.

* cited by examiner

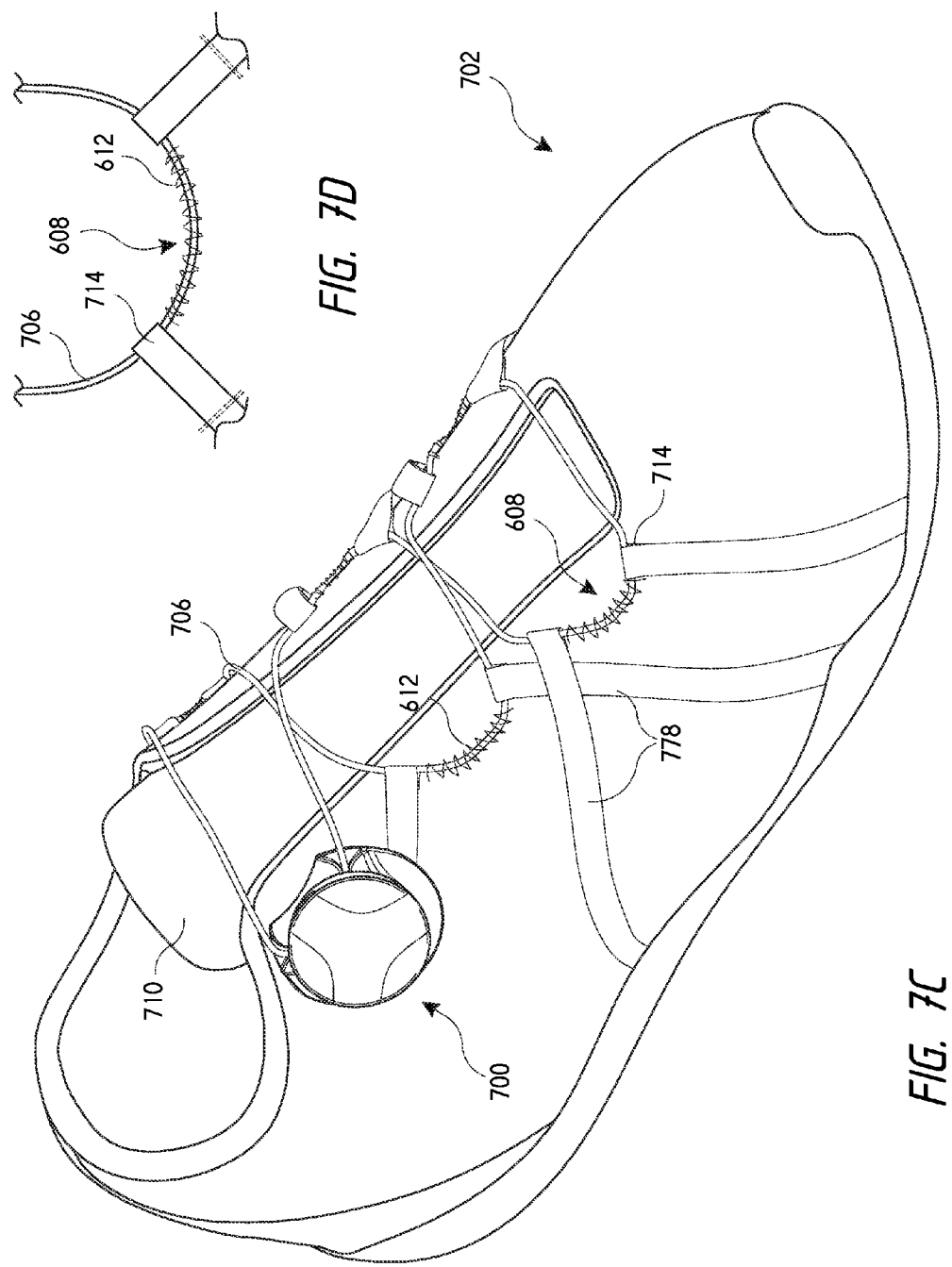

GUIDES AND COMPONENTS FOR CLOSURE SYSTEMS AND METHODS THEREFOR

CROSS-REFERENCE TO RELATED APPLICATIONS

This application claims priority to Provisional U.S. Patent Application No. 61/874,134 filed Sep. 5, 2013, and titled "Alternative Lacing Guides for Tightening Mechanisms and Methods Therefor;" Provisional U.S. Patent Application No. 61/879,569 filed Sep. 18, 2013, and titled "Alternative Lacing Guides for Tightening Mechanisms and Methods Therefor;" Provisional U.S. Patent Application No. 61/976,369 filed Apr. 7, 2014, and titled "Alternative Lacing Guides for Tightening Mechanisms and Methods Therefor;" and Provisional U.S. Patent Application No. 61/880,753 filed Sep. 20, 2013, and titled "Guides for Closure Devices and Methods Therefor." The entire disclosure of all of the aforementioned Provisional U.S. Patent Applications are hereby incorporated by reference, for all purposes, as if fully set forth herein.

BACKGROUND OF THE INVENTION

The embodiments described herein are generally related to closure or tightening systems, devices, and methods for closing and/or tightening an article. The embodiments are specifically related to methods and components for quickly and conveniently attaching tightening systems, or components thereof, to an article.

Closure or tightening systems are commonly used to tighten and close an article. For example, a reel based mechanism may be used to close or tighten footwear. A knob of the reel based mechanism is typically coupled with a spool that includes a channel around which a lace is wound as the knob is rotated by the user. The reel based mechanism may include teeth that engage, or another ratchet type mechanism, that prevent counter-rotation of the spool and/or knob. Manufacturing the footwear to include these or other components of the reel based mechanism may be expensive and/or relatively complicated, thus discouraging some footwear manufacturers from using reel based closure systems. Accordingly, there is a need for facilitating in coupling the components of such systems with footwear and/or other articles.

BRIEF DESCRIPTION OF THE INVENTION

The embodiments described herein provide various tightening mechanism components that may be easily and conveniently coupled with an article, such as a brace or a shoe. The components may include lace guides that guide a lace or tension member about the article and/or may include tightening mechanisms that tension a lace or tension member to close and/or tighten an article. The components may likewise by fastening members or mechanisms that couple the lace guides, tightening mechanisms, or other components with the article. In one embodiment, an insert molded component for attachment to a shoe is provided. The insert molded component includes a housing member of a tightening mechanism that is made of a thermoplastic material having a first melting temperature. The housing member includes a top end and a bottom end with a bottom surface and also includes an interior cavity within which one or more components of the tightening mechanism may be positioned. The housing member also includes entry and exits ports through which a tension member or lace may be disposed so that the tension member passes from an interior portion of the housing member to an exterior portion of the housing member. The tightening mechanism is operable to tension the tension member and thereby tighten the shoe.

The insert molded component also includes a flange member that is insert molded onto the housing member so as to extend laterally from at least a portion of an outer periphery of the bottom end of the housing member. When coupled with the housing member, a bottom surface of the flange member is flush with or positioned axially below the bottom surface of the housing member. The flange member is made of a thermoplastic elastomer having a second melting temperature that is lower than the first melting temperature of the housing member. The lower melting temperature of the flange member enables enable direct coupling of the flange member to an upper of the shoe.

According to another embodiment, a component for attachment to an article is provided. The component includes an upper component of a tightening system that is made of a thermoplastic material having a first melting temperature. The upper component includes a top end and a bottom end with a bottom surface. The upper component is operable with a tension member that is tensionable, via a tightening mechanism, to tighten the article. The component also includes a flange member that is molded onto the upper component so as to extend laterally from at least a portion of an outer periphery of the bottom end of the upper component. When coupled with the upper component, a bottom surface of the flange member is flush with or positioned axially below the bottom surface of the upper component. The flange member is made of a thermoplastic elastomer having a second melting temperature that is lower than the first melting temperature of the upper component. The lower melting temperature of the flange component enables direct coupling of the flange member to the article.

The upper component includes a ridge that extends along an outer periphery. The ridge defines an upper mating surface between the upper component and the flange member. When coupled with the upper component, the flange member extends from the bottom surface of the upper component to the ridge. The upper component also includes a plurality of axially extending teeth that enhance bonding between the upper component and the flange member.

In some embodiments, the upper component is a housing of the tightening mechanism. In such embodiments, the housing includes an interior cavity that is configured for receiving a spool about which the tension member is wound. The housing also includes an entry port and an exit port for the tension member. In another embodiment, the upper component is a guide member having a channel within which the tension member is positioned. In such embodiments, the guide member is configured to route or direct the tension member about the article. In such embodiments, the flange member may extend laterally from a first lateral edge of the guide member to a second lateral edge of the guide member without extending along a front edge of the guide member.

According to another embodiment, a method of forming an insert molded component for attachment to an article includes providing an upper component of a tightening system, positioning the upper component within a mold, and molding a flange member onto the bottom end of the upper component. The upper component is made of a thermoplastic material having a first melting temperature and the upper component includes a top end and a bottom end with a bottom surface. The upper component is operable with a tension member to tension the tension member and thereby tighten the article. The flange member is molded onto the bottom end of the upper component so as to extend laterally from at least a portion of an outer periphery of the bottom end of the upper component. The flange member is also molded onto the bottom end of the upper component so that a bottom surface of the flange member is flush with or positioned axially below the bottom surface of the upper component. The flange member is made of a thermoplastic elastomer having a second melting temperature that is lower than the first melting temperature. The lower melting temperate of the flange member enables direct coupling of the flange member to the article.

In some embodiments, the upper component includes a ridge extending along its outer periphery. The ridge defines an upper limit of a mating surface between the upper component and the flange member. In such embodiments, the method may also include positioning the ridge of the upper component against a surface of a die of the mold to limit exposure of the mating surface to the thermoplastic elastomer during the molding process. The flange member may extend from a base of the mating surface to at or near the ridge. A diameter of the housing that is positioned axially above the ridge may be smaller than a diameter of the housing positioned axially below the ridge. In other embodiments, the upper component may be a guide having an elongate central portion and two transverse end portions.

In some embodiments, the method may further include positioning the bottom surface of the flange member against a surface of the article and bonding the bottom surface of the flange member to the surface of the article. Bonding of the bottom surface of the flange member to the surface of the article may include radio frequency (RF) welding, ultrasonic welding, heat pressing, and the like, the bottom surface of the flange member to the surface of the article. In some embodiments, and the thermoplastic material of the upper component may be polycarbonate and the thermoplastic elastomer of the flange may be polyurethane.

According to another embodiment, a guide for directing a lace about an article is provided. The guide includes a fabric body and an elongate fabric arm that extends from the fabric body. The elongate fabric arm has a distal end and the elongate fabric arm is foldable back on itself so that the distal end is coupleable to the fabric body to form a loop through which a lace may be inserted. The distal end may be coupled to the fabric body simultaneously with the guide being coupled to the article.

According to another embodiment, a method of forming a guide for directing a lace about an article includes providing a fabric body having an elongate arm with a distal end that is coupleable to the fabric body, folding the elongate arm toward the fabric body to form a loop, and coupling the distal end of the elongate arm to the fabric body to secure the loop formed by the elongate arm. The loop may be configured for directing the lace about the article. The fabric body of the guide may be coupled to the article simultaneously with coupling the distal end of the elongate arm to the fabric body.

According to another embodiment, a guide member for routing a tension member along a path of a shoe is provided. The guide member includes a base member and an upper member that is attached to the base member to form a loop for routing the tension member after the tension member is inserted through the loop. The base member is coupleable with an inner surface of an upper of the shoe such that the loop of the upper member is positioned near an eyestay of the shoe for routing the tension member along a lace path about the shoe. The upper member may be a fabric material loop or strip and the base member may be a rectangular fabric material that is heat pressable or stitchable to the inner surface of the upper.

In some embodiments, the upper member is insertable through an opening of the shoe's upper. In such embodiments, the upper member is positioned on an exterior surface of the shoe's upper while the base member is positioned on an opposite side of the upper. In such embodiments, a backing material may be positioned atop the base member after the upper member is positioned through the opening. The backing material may be couplable with the article to conceal the base member thereunder.

In other embodiments, a first end of the upper member may be attached to the base member via a first coupling and a second end of the upper member may be attached to the base member via a second coupling. In such embodiments, the upper member and the base member may both be positioned on the inner surface of the upper with the upper member facing inward toward an outsole of the shoe.

According to another embodiment, a method of forming a guide member on footwear is provided. The guide member is configured for routing a tension member along a path of the footwear. The method includes providing a base member that is a geometrically shaped fabric material. The method also includes attaching an upper member to the base member so as to form a loop for routing the tension member after the tension member is inserted there through and attaching the base member to an inner surface of an upper of the footwear so that the loop of the upper member is positioned near an eyestay of the footwear for routing the tension member along a lace path about the footwear.

In some embodiments, the method also further includes inserting the upper member through an opening of the footwear's upper so that the loop of the upper member is positioned on an exterior surface of the footwear's upper while the base member is positioned on an opposite side of the footwear's upper. In such embodiments, the method may additionally include positioning a backing material atop the base member after the upper member is positioned through the opening and coupling the backing material with the inner surface of the upper to conceal the base member thereunder.

In other embodiments, the method may further include attaching a first end of the upper member to the base member via a first coupling and attaching a second end of the upper member to the base member via a second coupling. In such embodiments, the method may additionally include positioning the upper member and the base member on the inner surface of the upper with the upper member facing inward toward an outsole of the footwear.

BRIEF DESCRIPTION OF THE DRAWINGS

The present invention is described in conjunction with the appended figures:

FIGS. 7A-D illustrate embodiments in which soft guides are formed for a lacing system's lace.

Figure 1:
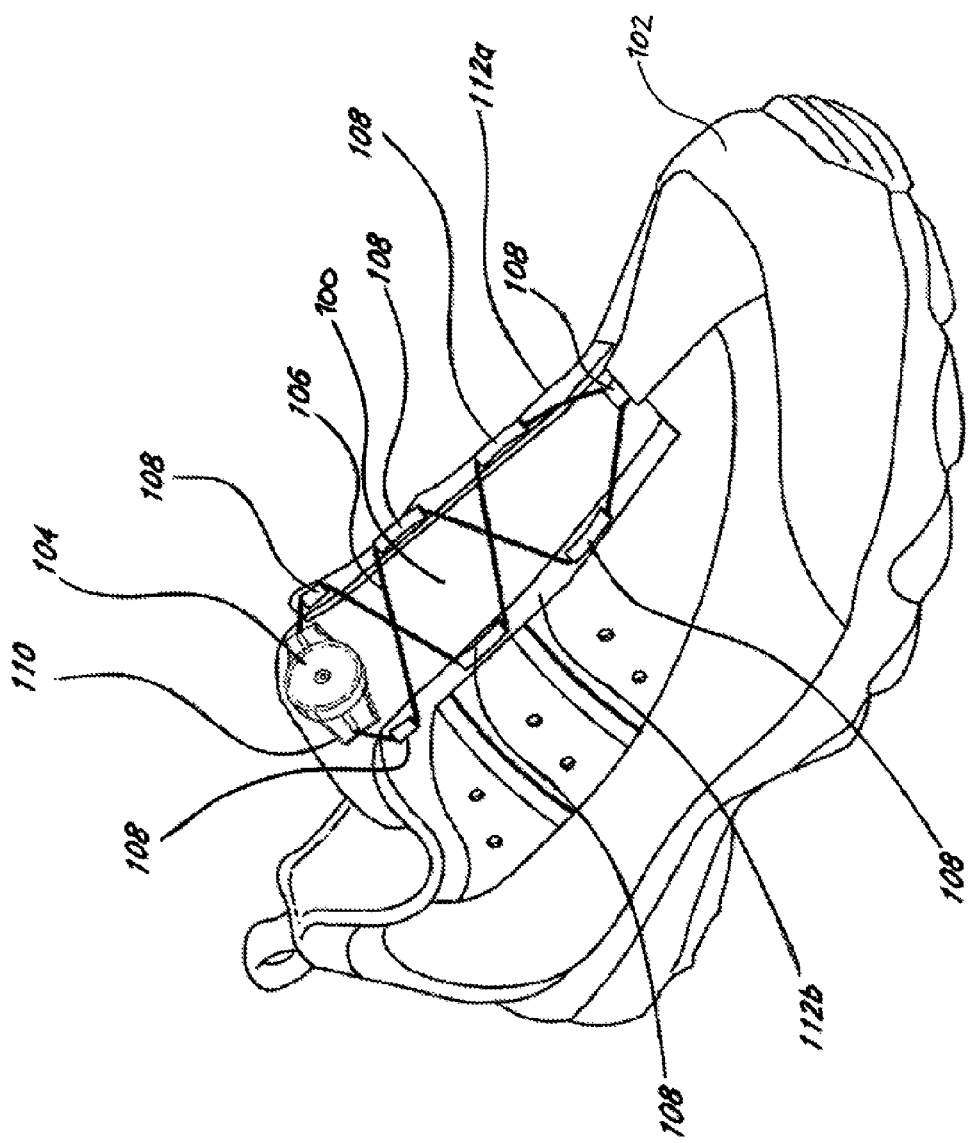
FIGS. 1-4 illustrated general embodiments of lacing system components and lacing system operations that may be employed to close a shoe or other article.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

In some of the embodiments described herein, lacing guides are integrated with a product (e.g., shoe, boot, brace, and the like) to create a lace path having a structure that conforms to the product, thereby hiding the lacing guides. The lacing guides are hidden by minimizing or eliminating raised areas or other visible features that are often formed by the guides when the guides are coupled with a product, such as an eyestay of a shoe. The alternative guides described herein may be referred to hereinbelow as soft guides, lace guides, or generally as guides. In some embodiments, these guides may be formed via stitching, welding, or use of adhesive patterns. Additional forms of guides, such as loops formed by folding and securing a product's material over itself and/or tubes inserted within fabric or other areas of the product can be utilized to achieve a more form fitting feel for the product. The lace guides and/or lace path created by the lace guides may be designed to complement the aesthetic design of the product. In addition, the use of the guides described herein can enhance the fit of the product about an enclosed item (e.g., a foot) when tightened, increase the life of the guide and lace components, and/or reduce friction within the lacing system.

Generally, the lace guides described herein may be used to close a variety of products or items, such as clothing (i.e., hats, gloves, and the like), sports apparel (boots, snowboard boots, ski boots, and the like), standard, athletic, medical footwear, medical braces (i.e., back braces, knee braces, and the like), and various other items or apparel. A specific embodiment in which the closure devices may be used involves shoes, boots, and other footwear. For ease in describing the embodiments herein, the disclosure will be directed mainly to shoes and other forms of footwear although it should be realized that the closure devices may be used for various other items as described above.

In other embodiments, various methods and components for attaching closure devices with a product are described. The products may include braces, footwear, hats, gloves, prosthetics, orthotics, or various other apparel or devices. The closure devices may be used to open and close the apparel or device to allow a user to don and doff the apparel or device. Conventional closure devices often include predetermined closure device locations that provide standard distributions of pressure. The embodiments described herein provide adjustable and/or customizable configurations for closure devices that enhance the closure process to meet a variety of user needs. In some embodiments this is achieved by integrating removable guides into arrays of guide receiving components. This allows a user to insert and remove guides to create a unique configuration that provides customized support and/or conforms to the user's unique needs.

For example, the embodiments described herein allow users and/or doctors to alter the configuration of the lacing system so as to create customized fitting systems, to avoid tensioning or applying pressure to a certain area of the body that may be sensitive to pressure, and/or to create void areas in order to "off-load" or reduce the pressure exerted on a certain area (e.g., reduce pressure in a diabetic walker and the like). For ease in describing these embodiments, the product will be referred to generally as a brace, although it should be realized that the embodiments are equally applicable to other products, and particularly to shoes, boots, and other forms of footwear.

The lacing systems disclosed herein can provide customizable and/or adjustable support for end user products, such as a brace. Such lacing systems may allow a medical professional, patient, or other user to configure a brace to provide a customized level of fit, support, load reduction, and other characteristics to meet the user's particular needs. The lacing systems disclosed herein may be utilized within any type of medical support device, such as rigid supports and braces. A rigid support may include a rigid support structure, such as metal or plastic, which is coupled with plastics and/or textile components that are configured to fit around at least a portion of a person's body. Such rigid support may also include straps that help secure the support against the portion of the body. Such devices may include, for example, post-operative braces, functional ligament knee braces, and neoprene braces with metal hinges and straps. Rigid braces may include a rigid support structure, such as plastic or metal, which may be attached to one or more straps to secure the support structure against at least a portion of a body. Such rigid braces may include, for example, rigid walkers, hip braces with a rigid support panel, and back braces with a rigid back panel. Mounting or coupling lace guides with such rigid support structures is relatively difficult because such structures are not relatively moldable, bendable, or compliant. As such, conventional braces, which include rigid structures, do not allow the brace to be customized, or render such customization very difficult. In contrast, the embodiments described herein allow braces to be quickly, easily, and conveniently customized and modified as desired.

The guide attachment mechanisms described herein offer solutions to many problems associated with lacing systems for medical braces, footwear, and/or other products. In many of the embodiments described herein, guides are easily secured with and/or removed from the brace, allowing for customization of fit for comfort and therapeutic purposes. Additionally, as designed, the guides can solve problems related to materials and designs that hinder coupling components to the brace (e.g., stitching), such as when metal or plastic materials are used for the brace. The utilization of easily securable and removable guide components allows for increased production efficiency as one guide type may be implemented in a variety of products. Further, the guides described herein can speed up design of developing brace products as the guides, and the methods of installing such guides, can be adapted for any number of applications.

Additionally, the use of a reel based lacing system as describe herein, may significantly increase the customization of medical braces and allow the braces to be more tailored or custom fit to a patient. For example, the lace of such lacing systems may be easily wound around custom placed/positioned, custom designed, and/or custom fit lace guides that are coupled with the medical brace in order to create a customized and/or unique lace path about the medical brace, footwear, or other product. The lace path may be tailored or customized to the patient to provide increased and/or decreased zonal tensioning and pressure about the patient's limb that promotes optimal healing and minimizes potential brace fit or pressure issues. The reel assembly of the lacing system may then be operated to quickly and conveniently tension the lace and thereby tighten the brace about the unique or customized lace path so as to apply pressure as desired to the patient's limb. The snap-in or easily coupled lace guides described herein may be utilized to form or create the unique or customized lace path about the medical brace. As such, customization of the brace, which may be an off the shelf brace/component or a specially designed brace/component, is relatively straightforward and easy, and/or development and production of such braces/components is relatively straightforward and easy. These advantages are not provided by conventional medical brace systems.

For convenience in describing the embodiments, the disclosure generally describes the devices, or components thereof, being closed via a reel or dial mechanism. The reel or dial mechanism typically closes the device, or components thereof, by tensioning a lace. As described herein, the dial is typically rotated to wind a lace onto a spool. However, although the disclosure generally describes the closure devices, or components thereof, using a reel or dial mechanism, it should be realized that any tightening mechanism may be used, such as pull cord systems and the like, and the disclosure is not limited to embodiments that only use a reel or dial.

Before describing specific details of the various embodiments, a general description of a reel based closure mechanism and lacing system will be provided. Referring now to FIGS. 1-4, illustrated are various views of an embodiment of lacing system 100 that may be used for tightening a shoe 102. Lacing system 100 provides an overview of the various components of a lacing system 100. Similar components may be used in any of the other lacing system embodiments described herein. Lacing system 100 also shows a conventional assembly of a lacing guide 108, wherein the lacing guide 108 is coupled with an outer surface of the shoe 102, often via stitching or adhesives. In contrast, the soft guides or alternative guides described herein are often integrated with the shoe, or other product, so that the guide is relatively hidden from view.

The shoe 102 can be any suitable footwear that can be tightened around a wearer's foot. The lacing system 100 can be used to close or tighten various other articles as described herein, such as, for example, a belt, a hat, a glove, snowboard bindings, a medical brace, or a bag. The lacing system 100 can include a reel based closure mechanism 104 (hereinafter reel 104), a lace 106, and one or more lace guides 108. In the illustrated embodiment, the reel 104 can be attached to the tongue 110 of the shoe 102. Various other configurations are also possible. For example, the reel 104 can be attached to a side 112a-b of the shoe 102, which can be advantageous for shoes in which the shoe sides 112a-b are designed to be drawn closely together when tightened leaving only a small portion of the tongue 110 exposed. The reel 104 can also be attached to the back of the shoe 102, and a portion of the lace 106 can pass through the shoe 102, sometimes using tubing for the lace 106 to travel through, on either side of the wearer's ankle such that the lace 106 can be engaged with the reel 104 when back-mounted.

Figure 2:
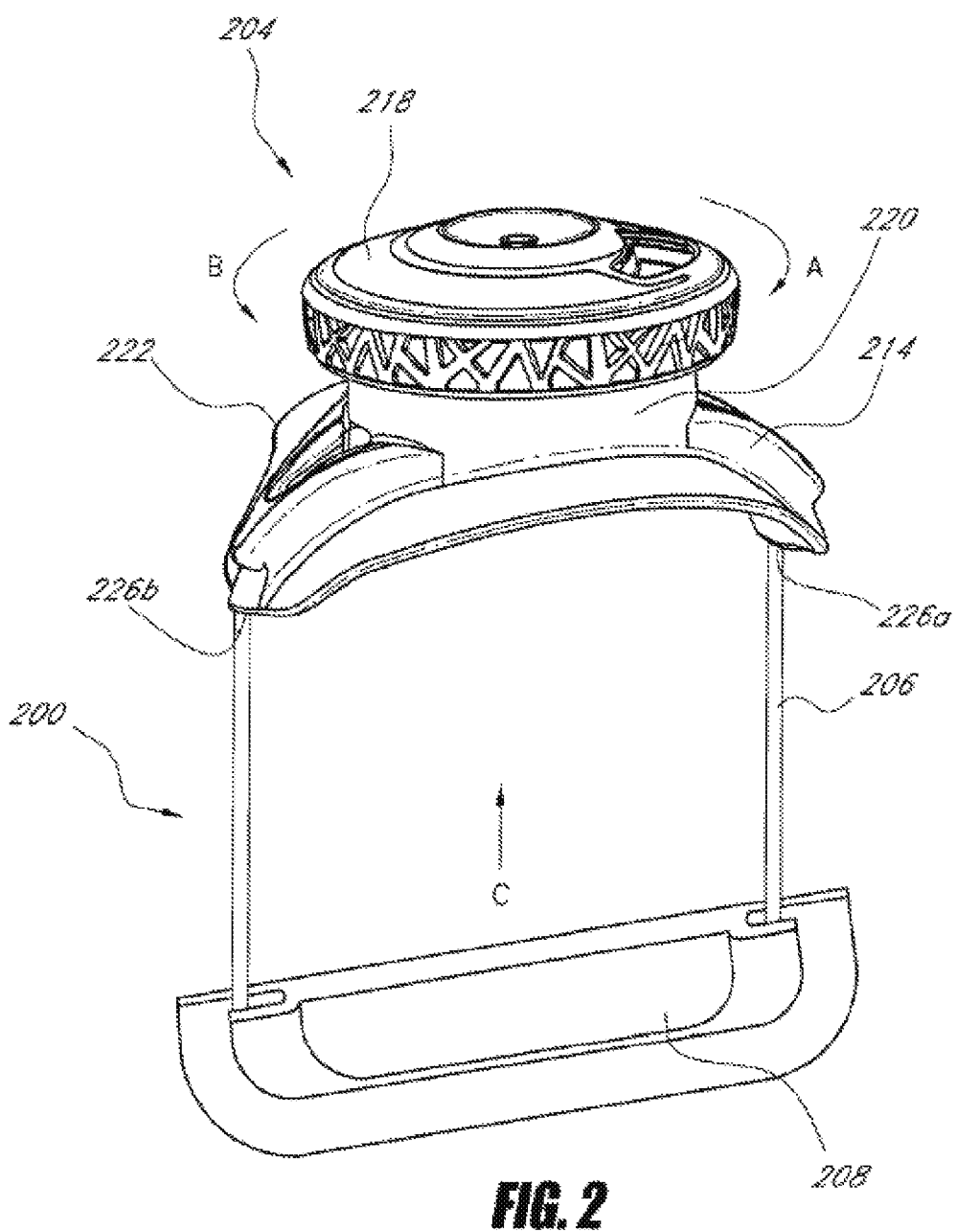
Figure 3:
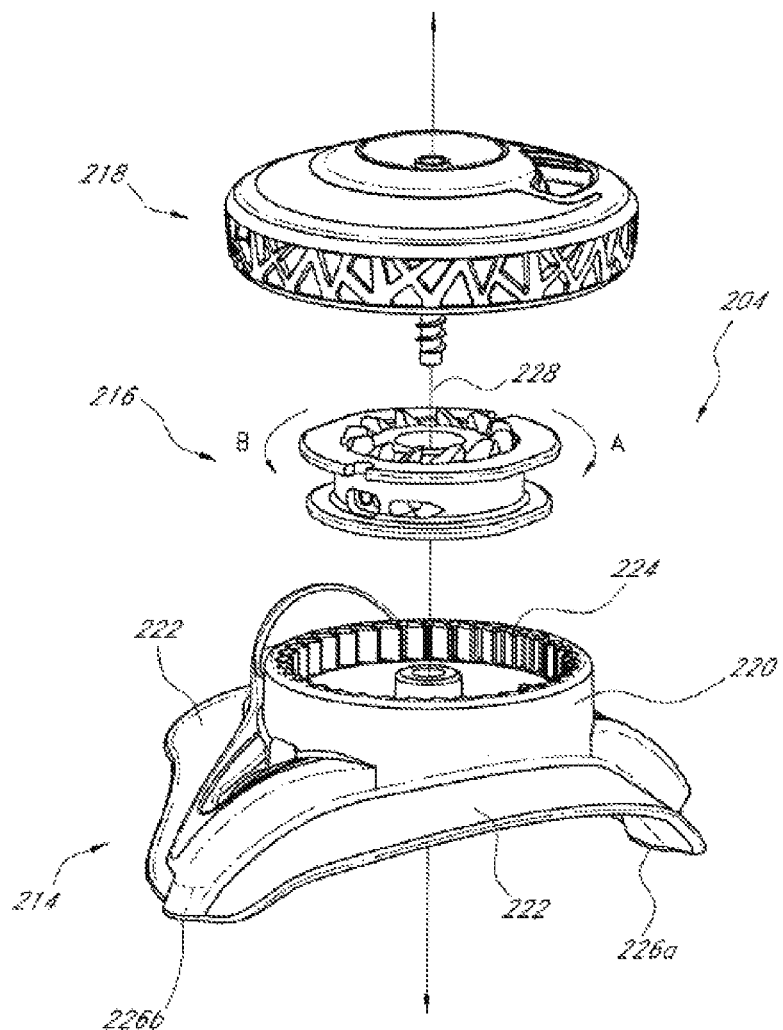
Figure 4:
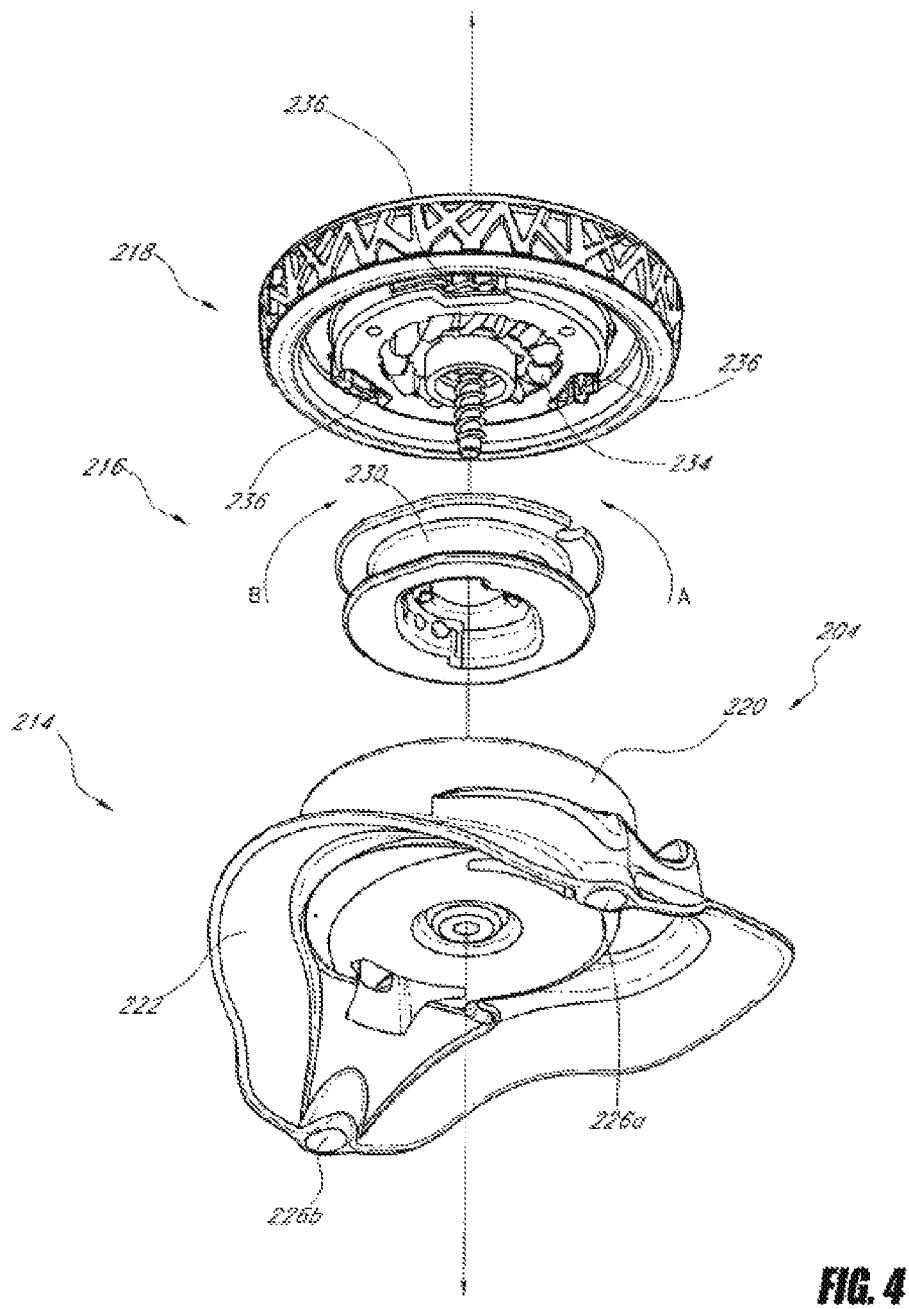

FIG. 2 is a perspective view of an embodiment of lacing system 200 that can be similar to the lacing system 100, or any other lacing system described herein. The lacing system 200 can include a reel based closure mechanism 204 (hereinafter reel 204) which can be similar to the reel 104, or any other reel based mechanism. FIG. 3 is an exploded perspective view of the reel 204. FIG. 4 is another exploded perspective view of the reel 204.

With reference to FIGS. 2 to 4, the reel 204 can include a base member 214, a spool member 216, and a knob 218. The base member can include a spool housing 220 and a mounting flange 222. The spool housing 220 can include a plurality of ratchet teeth 224, which can extend radially inwardly. The base member 214 can include lace holes 226*a-b* that allow the lace 206 to enter the spool housing 220.

The spool member 216 can be disposed within the spool housing 220 such that the spool member 216 is rotatable about an axis 228 with respect to the spool housing 220. The lace 206 can be secured to the spool member 216 such that when the spool member 216 rotates in a tightening direction (shown by arrow A), the lace 206 is drawn into the spool housing 220 and is wound around the channel 230 formed in the spool member 216, and when the spool member 216 rotates in a loosening direction (shown by arrow B), the lace 206 unwinds from the channel 230 of the spool member 216 and exits the spool housing 220 via the lace holes 226*a-b*. The spool member 216 can also include spool teeth 232 formed thereon. It will be understood that the embodiments disclosed herein can be modified such that rotation in the direction shown by arrow B will tighten the lacing. In this particular embodiment, the knob 218 may be raised axially to disengage from spool member 216 to allow the spool member 216 to freewheel in direction B in order to release the lace 206. In other embodiments, rotation of the knob 218 in the direction shown by arrow A may loosen the lacing system 200 and/or the knob 218 may include a button, lever, or other mechanism that allows the lace to be loosened.

The knob 218 can be attached to the spool housing 220 such that the knob 218 can rotate about the axis 228 with respect to the spool housing 220. The knob 218 can include knob teeth 234 that can be configured to mate with the spool teeth 232 to couple the knob 218 to the spool member 216 such that rotation of the knob 218 in the tightening direction causes the spool member 216 to also rotate in the tightening direction. In some embodiments, the rotation of the knob 218 in the loosening direction can also cause the spool member 216 to rotate in the loosening direction. The knob 218 can also include one or more pawl teeth 236 which can be biased radially outwardly so as to mate with the ratchet teeth. The pawl teeth 236 and ratchet teeth 224 can be configured so that the ratchet teeth 224 can displace the pawl teeth 236 radially inwardly when the knob 218 is rotated in the tightening direction, thereby allowing the knob 218 to rotate in the tightening direction. The pawl teeth 236 and the ratchet teeth 224 can also be configured so that they engage one another when a force is applied to twist the knob 218 in the loosening direction, thereby preventing the knob 218 from rotating in the loosening direction.

Thus, the reel 204 can provide a one-way tightening system configured to allow the user to rotate the knob 218 in the tightening direction, which causes the spool member 216 to rotate in the tightening direction, which in turn causes the lace 206 to be drawn into the spool housing 220 via the lace holes 226*a-b*. As the lace 206 is drawn into the spool housing 220 the lacing system 200 can tighten, causing the lace guide 208 to be drawn in the direction toward the reel 204 (shown by arrow C in FIG. 2). Although the lacing system 200 is shown with a single lace guide 208, any other suitable number of lace guides can be used. Other features of the reel and lacing system are described in U.S. Patent Application No. 2011/0266384, filed Apr. 29, 2011, and Titled "Reel Based Lacing System", the entire disclosure of which is incorporated herein by reference.

As described previously, embodiments described herein integrate the lace guides into the product, and specifically into the main body portion of the product. For example, in some embodiments, the lace guides may be integrated within the stay of a shoe, adjacent the shoe's tongue. In this configuration, the lace guides may be hidden from view and the only portion of the lacing system that is visible, besides the reel assembly, would be the lace crisscrossing the shoe's tongue. This configuration may be more aesthetically pleasing to consumers and/or give the product a desired look or appeal. These and other features of the embodiments will be more evident with reference to the description of the various drawings herein below.

Referring now to FIGS. 5A-G, illustrated are embodiments of a shoe 500 having lace guides that are formed into, or otherwise integrated, into the shoe 500. Specifically, shoe 500 may be fitted with a reel assembly 504 that is used to tension a lace 506 as previously described. Reel assembly 504 can be mounted to any portion of the shoe 500, such as on the upper 544, near the tongue 510, on the eyestay 538, and the like. In some embodiments, reel assembly 504 may be positioned on the heel 546 and may utilize tubing (not shown), or a set of tube guides, to route the lace to the tongue of the shoe. The lace 506 may be threaded into tube ends of the tubing, and around a collar portion of the shoe 500, in order to route the lace 506 from a heel-mounted reel assembly to the front of the shoe 500 and/or to the eyestay 538.

The lace 506 can be guided or routed about with the shoe 500 via soft guides. Soft guides include guides of varying structure and are typically configured to remain flat so as not to form visible protrusions or raised portions, which may enhance the overall visual appeal or look of the shoe 500. The relatively flat soft guides also do not press against a user's foot when the reel assembly 504 is operated to tighten the shoe 500, which may increase the comfort of wearing the shoe. In some embodiments, the soft guides can be mounted or formed on the shoe using external components that position the guides so as to eliminate or reduce points of excess pressure against the user's foot. Design considerations, such as lace turn radius, lace wear, friction, and pull strength, may be used to determine the positioning, shape, materials, and other design elements for the soft guides. For example, the radius of the soft guide may be configured to prevent lace fatigue due to excessive bending.

Figure 5A:
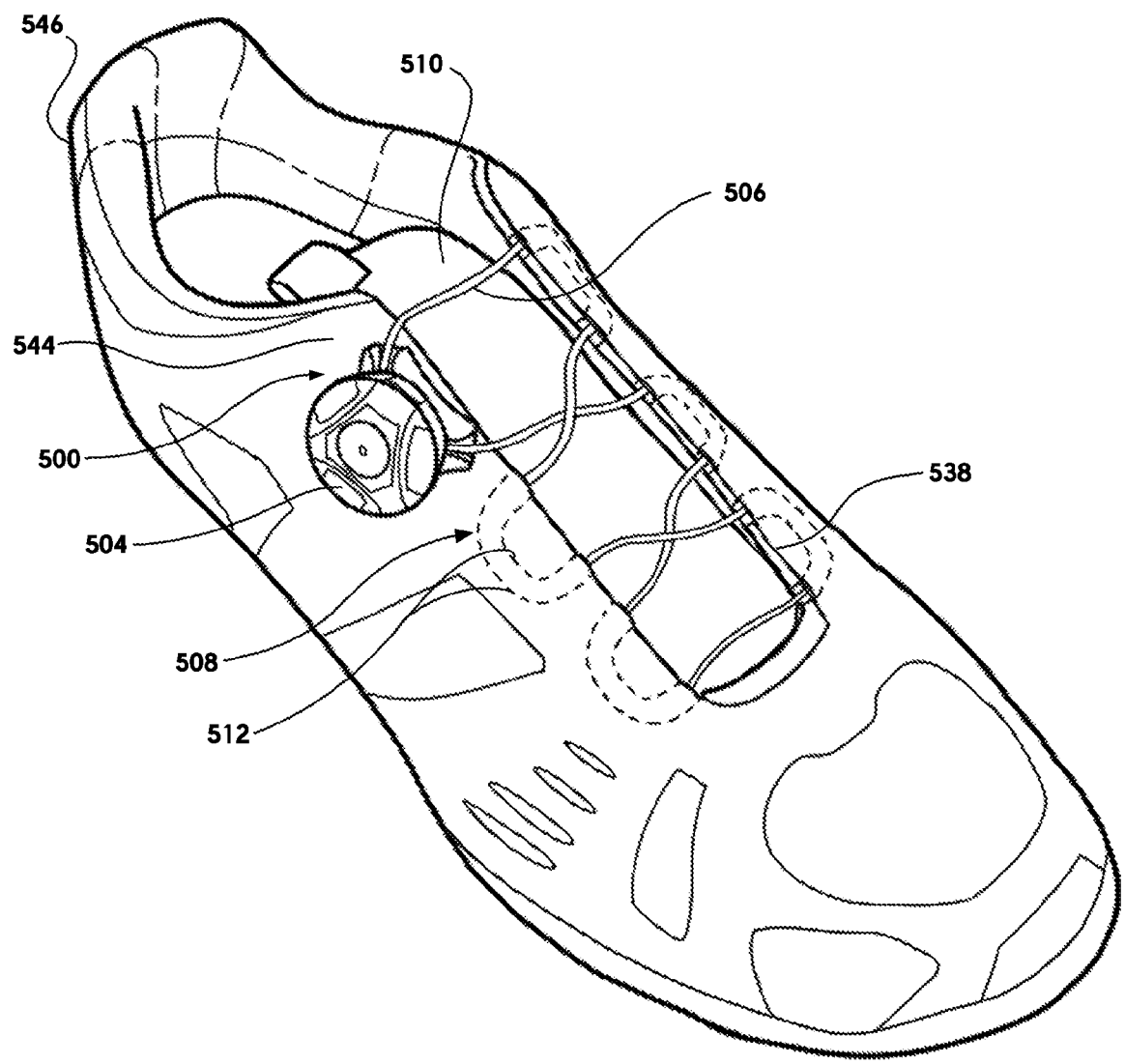
FIGS. 5A-G illustrate embodiments of a shoe having lace guides that are formed into, or otherwise integrated, into the shoe.
Figure 5B:
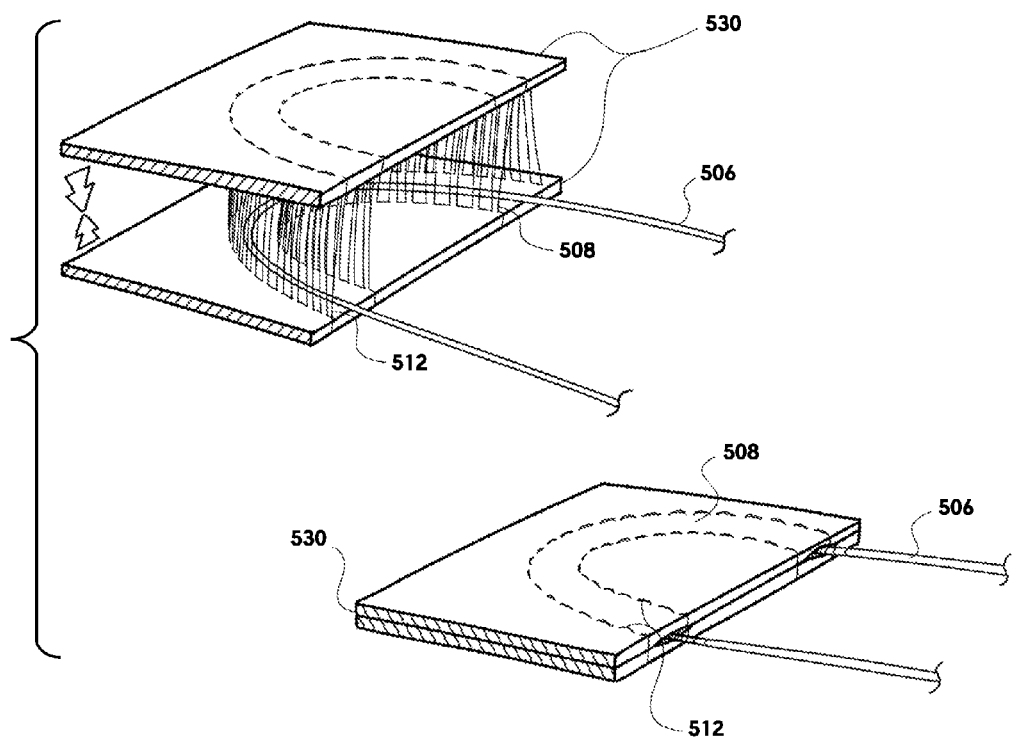
Figure 5C:
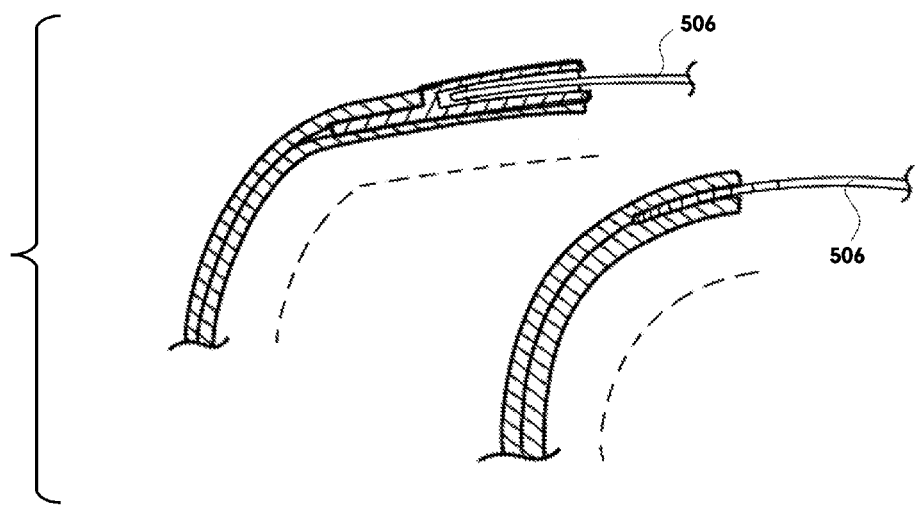

As shown in FIGS. 5A-C, in some embodiments, a lace guide 508 may be formed by stitching 512 an upper and lower material 530 of the shoe 500 together to form a U-shaped channel within which the lace 506 is inserted. Because the upper and lower material layers 530 of the shoe 500 are stitched together to form the lace guide 508, any lace that is inserted within the lace guide 508 will directly contact the upper and lower material layers 530. In this manner, no additional material, such as a plastic or fabric guide, is needed. Further, inner stitching of the U-shaped channel, and more specifically the inner material adjacent the inner stitching, contacts the lace 506 during tensioning and redirects or re-routes the lace 506 about the shoe 500. In some embodiments, a plastic reinforcement may be used to reinforce the U-shaped channel. The plastic reinforcement can be stitched or otherwise coupled with the upper or lower materials to reinforce the channel. The soft guides 508 shown in FIGS. 5A-C allow the lace path to more naturally conform to the upper 544 and/or the eyestay 538, and consequently, the foot of the user. This is due to the flexible upper and lower material layers 530 that form the guides 508. The flexible material allows the guides 508 to flex and conform as the lace 506 is tensioned, thereby reducing lace wear and fatigue. Conventional plastic guides are often not capable of conforming in this manner, which may reduce the overall life of the lace and/or create uncomfortable pressure points.

In some embodiments, the upper and lower material layers 530 can be coupled together via other attachment methods, such as via adhesive bonding, welding, radio frequency (RF) welding, mechanically fastening (e.g., rivets and the like), and/or using any other securing methods. In embodiments using stitching, the thread 512 used for the stitching may be monofilament nylon, compositions of polymer fibers, stainless steel wire, or any other suitable thread. In some embodiments, a diameter of the channel formed may have a cross-section large enough to both accommodate the lace 506 and provide an additional free space to reduce the amount of contact between the lace 506 and the sides of channel and thereby reduce the friction on the lace 506. Stated differently, the formed channel may be sized such that a maximum amount of lace 506 is free from contact with the channel.

Figure 5D:
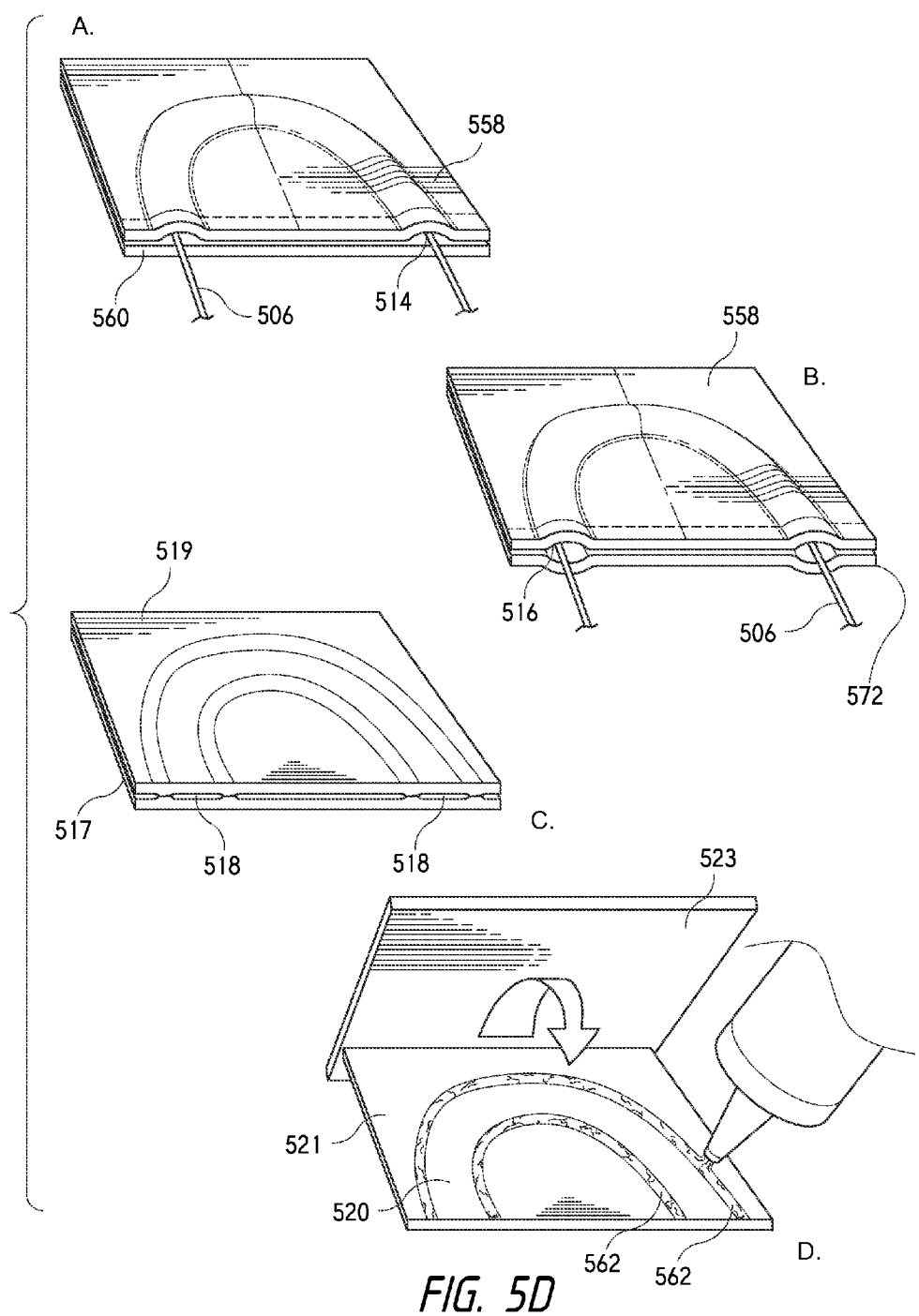

FIGS. 5D-G illustrate alternative methods of forming a soft lace guide. In these embodiments, various synthetics, such as plastics, can be used as the materials in which a guide is formed. For example, as shown in FIG. 5D, a plastic panel 558, or other material, may be thermoformed or vacuum formed to create a lace channel 514. The panel 558 may then be coupled with (e.g., adhered, stitched, and the like) to the surface of another material 560, such as another plastic or fabric. Vacuum forming the panel 558 may involve heating the plastic panel 558 to a forming temperature, stretching the plastic panel onto or into a mold or buck, and applying a vacuum to pull the plastic panel against the mold to create the channel 514. The panel 558 could alternatively be injection molded, or another manufacturing process could be used to create the channel 514. In alternative embodiments, channels can also be formed into a thermoplastic panel by having a programmable hot knife or other heated device heat and seal the thermoplastic in predetermined positions.

Exemplary synthetic materials exhibiting low friction include polyethylene, polytetrafluoroethylene (PTFE), ultra-high molecular weight polyethylene (UHMW), and the like. These materials can be used to form the panel 558 and/or other material 560. In some embodiments, a second thermoformed panel 572 may be used to create a second channel. In such embodiments, the two panels 558 and 572 may be coupled together to form a channel having a larger and/or symmetrical cross-section. When the panel 558 is coupled with another material (e.g., panel 572 or material 560), the coupled channel 542, or channels, forms a lace guide 516.

In yet another embodiment, a channel 518 may be formed by welding two panels, 517 and 519, together to create a lace guide. For example, the two panels, 517 and 519, may be welded along an arcuate path such that the weld forms the channel 518 in the coupled panels, 517 and 519. The welding process may prevent pinch points in channel 518 that may otherwise form using other attachment methods. In still another embodiment, a channel 520 may be created by applying an adhesive 562 to one side of a panel 521 and either allowing the adhesive to dry before coupling the panel 521 with another panel 523, or pressing the other panel 523 atop panel 521 such that a gap exists between the inner surfaces of the panels, 521 and 523. The adhesive 562 may be applied in a variety of ways including, but not limited to, by hand, by a computer numerical control (CNC) machine, by screen printing, by stenciling, by laser printing, and the like. Embodiments using techniques such as RF welding and adhesives 562 to form channels 518 and 520 may be able to remain hidden underneath a vamp of the shoe 500. As such, the resulting lace guide may have no visible appearance due to the flatness that can be achieved with these techniques. Such techniques may also be used to produce a network of continuous channels to provide a variety of lacing path options.

Figure 5E:
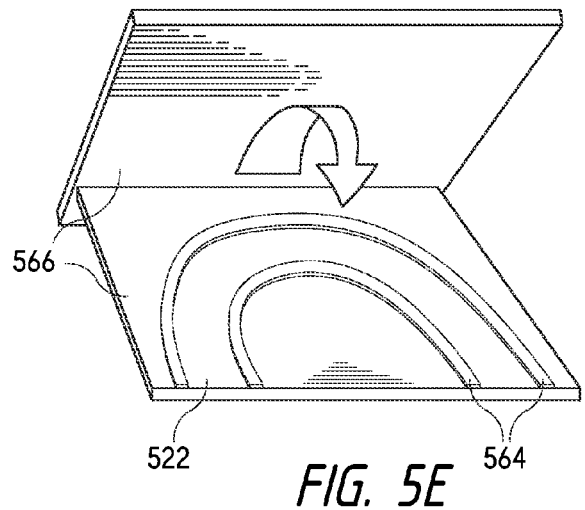
Figure 5F:
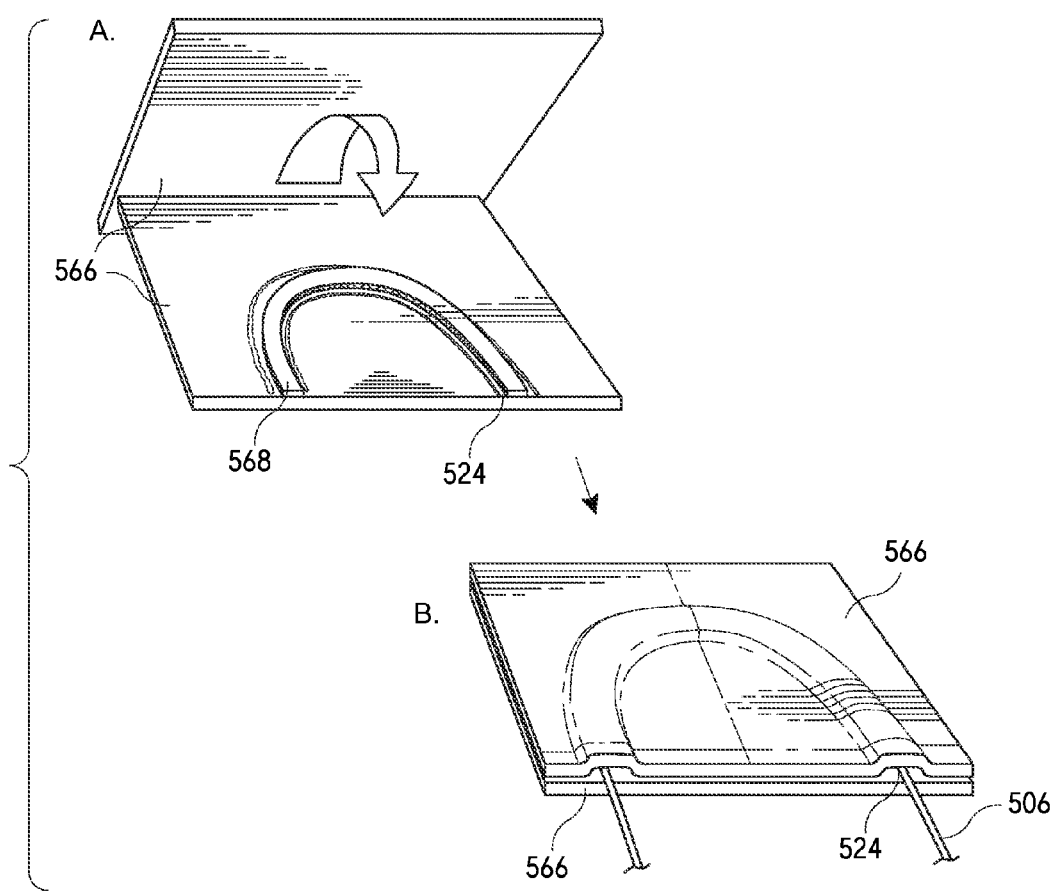

As shown in FIG. 5E, a channel 522 for a lace guide may also be formed between two layers of material 566 by using adhesive or heat activated pre-fabricated strips 564. The strips 564 may have an arcuate configuration and be positioned between the two layers of material 566 to form the channel 522 for the lace 506. The strips 564 may then be heated to fix the strips 564 in position between the material layers 566. As shown in FIG. 5F, a pre-inserted piece 568 may be positioned between the inner and outer strips 564 to form a gap between the material layers 566 when the material layers 566 are coupled together. The piece 568 may then be removed after assembly, leaving the channel 522 for the lace 506. The pre-inserted piece 568 may be small and flexible, such as a piece of cardboard, to allow for the piece to be easily pulled out of openings 524 on the ends of channel 522. Prior to removal, the material layers 566 may be sealed to form the channel 522 around the piece 568 using any known method in the art (e.g., adhesive bonding, stitching, RF welding, and the like). In other embodiments (see FIG. 13D), the pre-inserted piece 568 may have a low melting point such that after assembly of the material layers 566, the piece 568 may be melted and removed, leaving channel 522 formed between the assembled material layer 568. In yet other embodiments, a water soluble piece 568, or other dissolvable material, may be employed. Upon assembly of the material layers 566, water or another solvent may be applied to dissolve the piece 568 and leave the channel 522 for the lace 506.

Figure 5G:
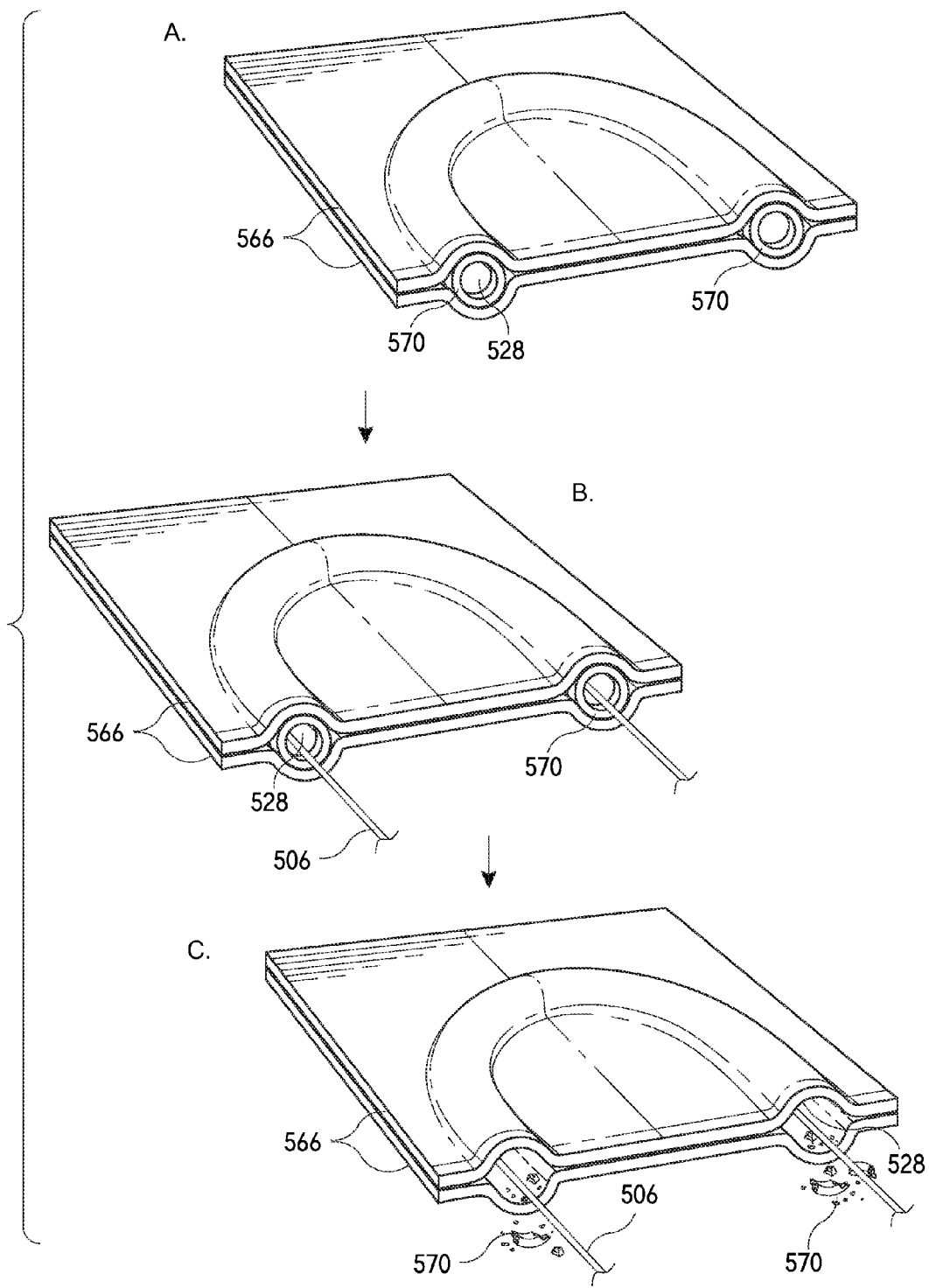

FIG. 5G illustrates yet another embodiment of forming a soft guide. Specifically, a channel 528 is formed by coupling material layers around a tube 570 or other hollow support structure. The tube 570 may be formed of any material. In one embodiment, tube 570 is formed from a brittle material to allow the tube 570 to be removed after the channel 528 is formed. For example, two material layers 566 can be joined around tube 570 to form channel 528. The lace 506 may then be inserted through the tube 570 and channel 528. After the lace 506 has been inserted through the tube 570 and channel 528, the tube 570 may be broken and removed from the between the material layers 566 leaving a relatively flat channel 528 formed between the material layers 566. In other embodiments, the tube 570 may be broken and removed from between the material layers 566 before the lace 506 is inserted through the channel 528.

In another embodiment, a pair of cylindrical rings 570 may be used instead of a tube. The cylindrical rings 570 may be positioned at the openings of the channel 528 to secure the openings in an open configuration and thereby ease insertion of the lace 506 within and through the channel 528. The channel 528 may be formed between the material layers 566 using any of the methods described herein. Once the lace 506 is inserted through the channel 528, the cylindrical rings 570 may be broken and removed thereby leaving the relatively flat channel 528 remaining between the material layers 566.

Figure 6A:
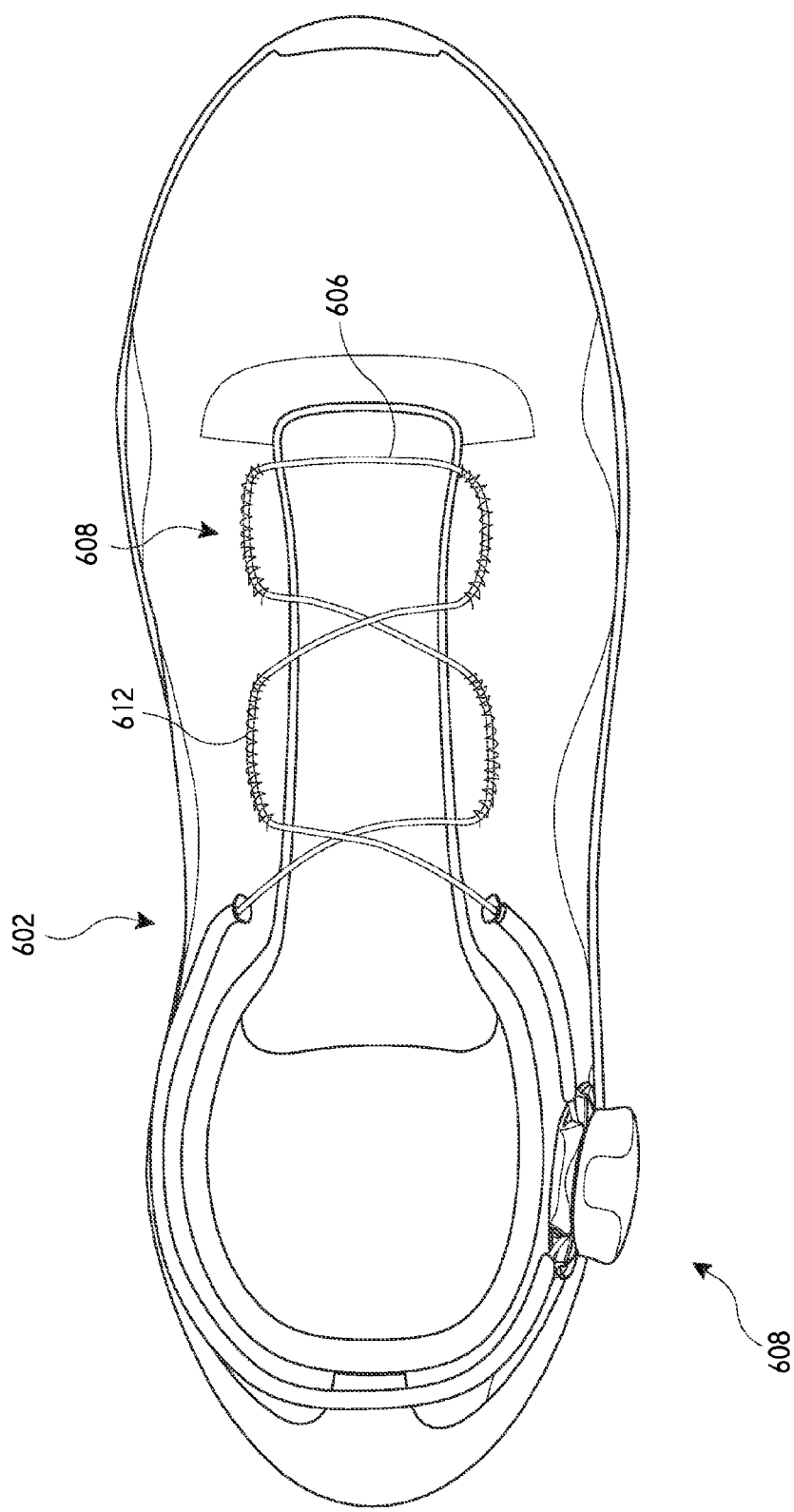
FIGS. 6A-E illustrate embodiments in which a lace guide channel is formed on an exterior surface of a shoe.
Figure 6B:
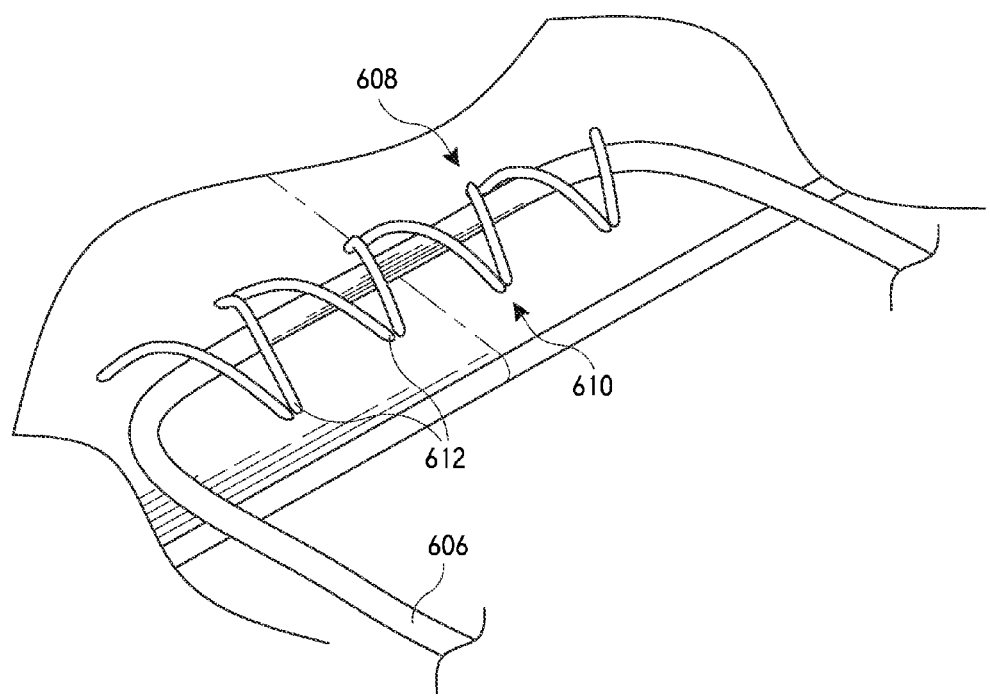
Figure 6C:
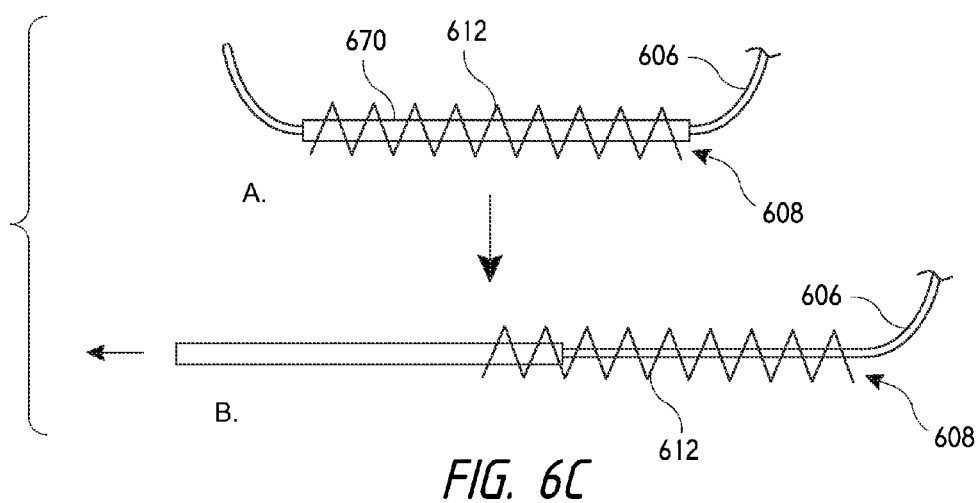
Figure 6D:
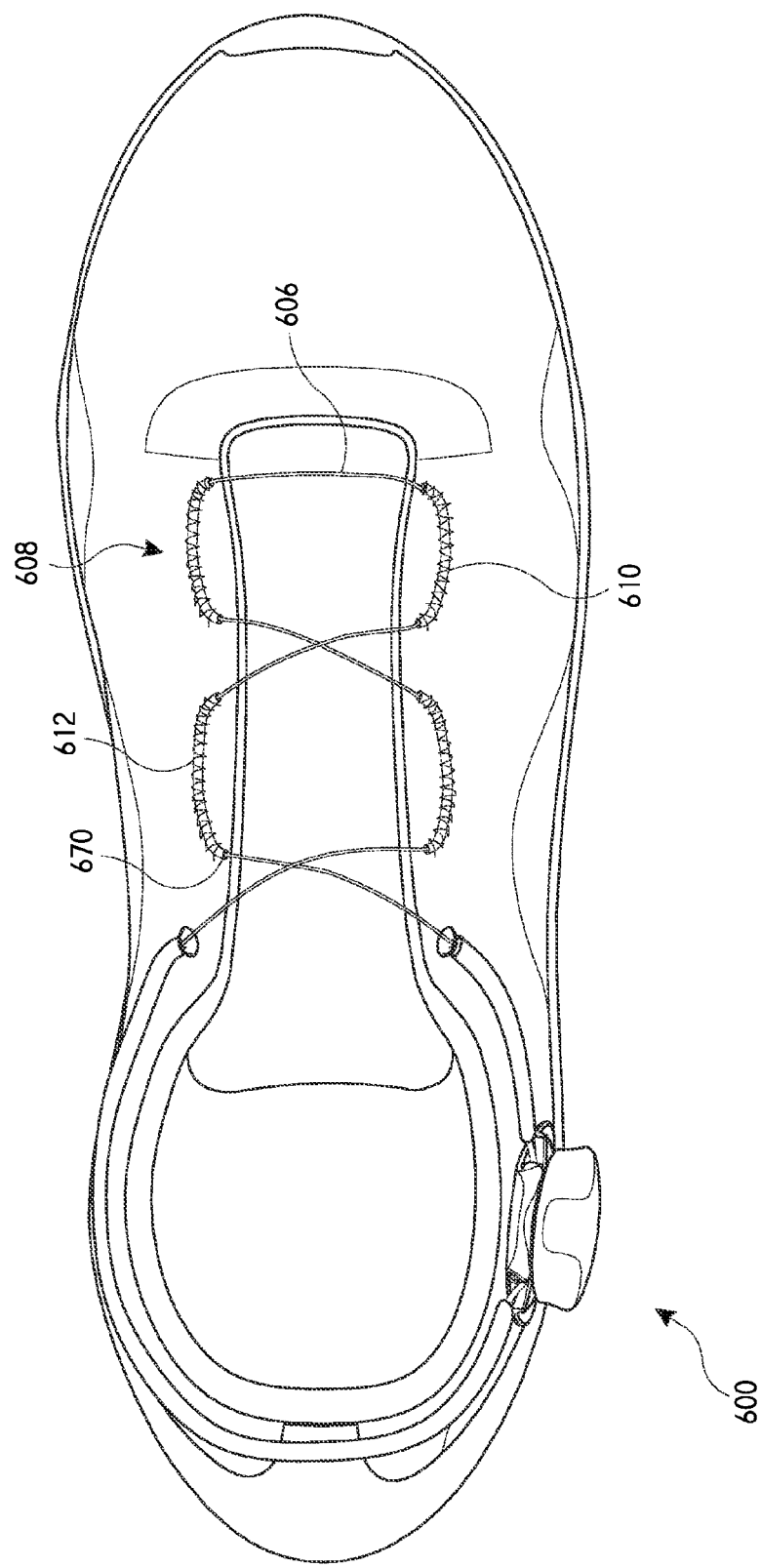

Referring now to FIGS. 6A-E, illustrated are embodiments in which a lace guide channel is formed on an exterior surface of a shoe. For example, the embodiments illustrate guides 608 formed on an exterior surface of a shoe by stitching 612 a lace pathway or channel 610 on the shoe 602's exterior surface. As shown in FIG. 6C, in some embodiments a tube 670 may be placed on the exterior surface of the shoe 602 and stitching 612 can be placed over the tube 670 to form the channel 610 and lace guide 608 on the exterior surface of the shoe 602. For example, the tube 670 may be jump stitched or embroidered over to create the channel 610. The tube 670 may be a flexible material that enables the stitching pattern to have a non-linear shape (e.g., arcuate), helping to ensure a comfortable, form-fitting enclosure or channel 610. In some embodiments, such as that shown in FIG. 6C, the tube 670 may be removed after the stitching is performed to create a channel 610 made solely or mostly of stitching 612.

Figure 6E:
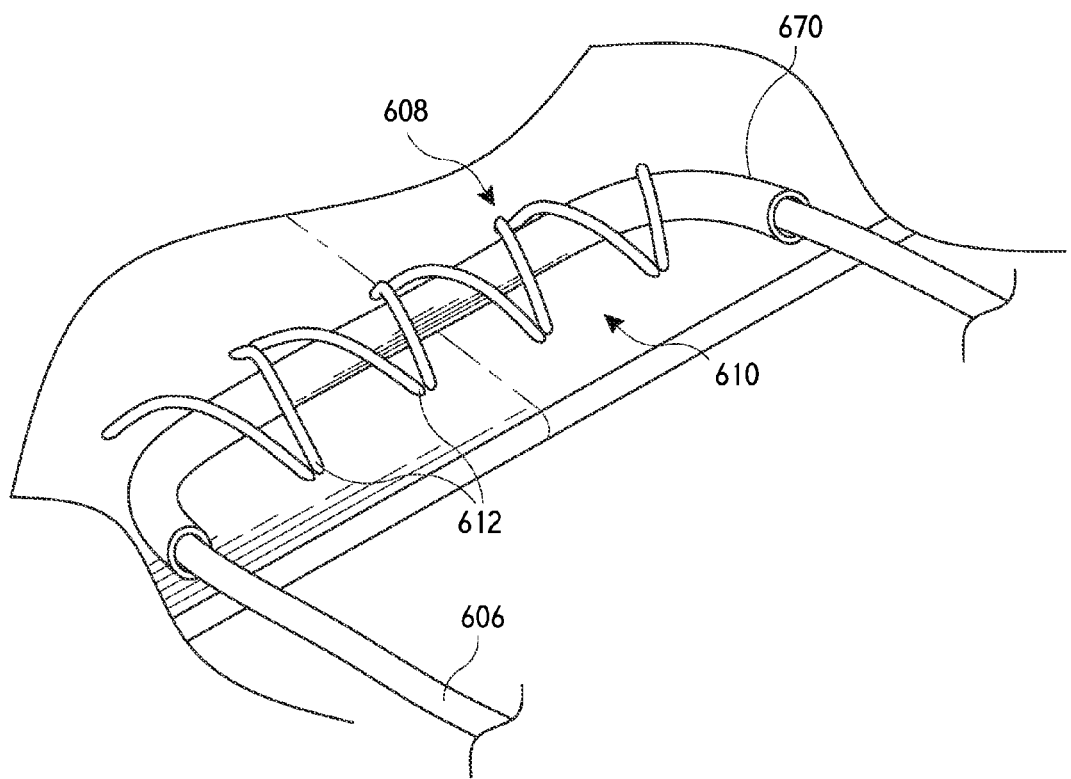

In other embodiments, such as that shown in FIG. 6E, the tube 670 may remain within the stitches 612 after the channel 610 is formed. In such embodiments, the tube 670 may function as the guide 608. The tube 670 may reduce friction that is applied to the lace 606 and/or stitches 612 as reel assembly 600 is operated, and thereby prevent excessive wear of these components. Further, the ends of the tube 670 may extend beyond the ends of the stitched channel 610 and flex to create a smooth transition pathway for the lace 606 and thereby reduce any pinch points or point loads that may otherwise excessively wear the lace. To further reduce friction, and/or to provide increased flexibility, the tube 670 may be formed of flexible materials, such as PTFE and the like. The stitching 612 may be done with threads of various materials, such as monofilament nylon, polymer materials, stainless steel wire, or any other suitable thread. The thread may also be selected based on one or more other properties, such as strength, thickness, friction, weight, aesthetic appeal, and the like.

Figure 7A:
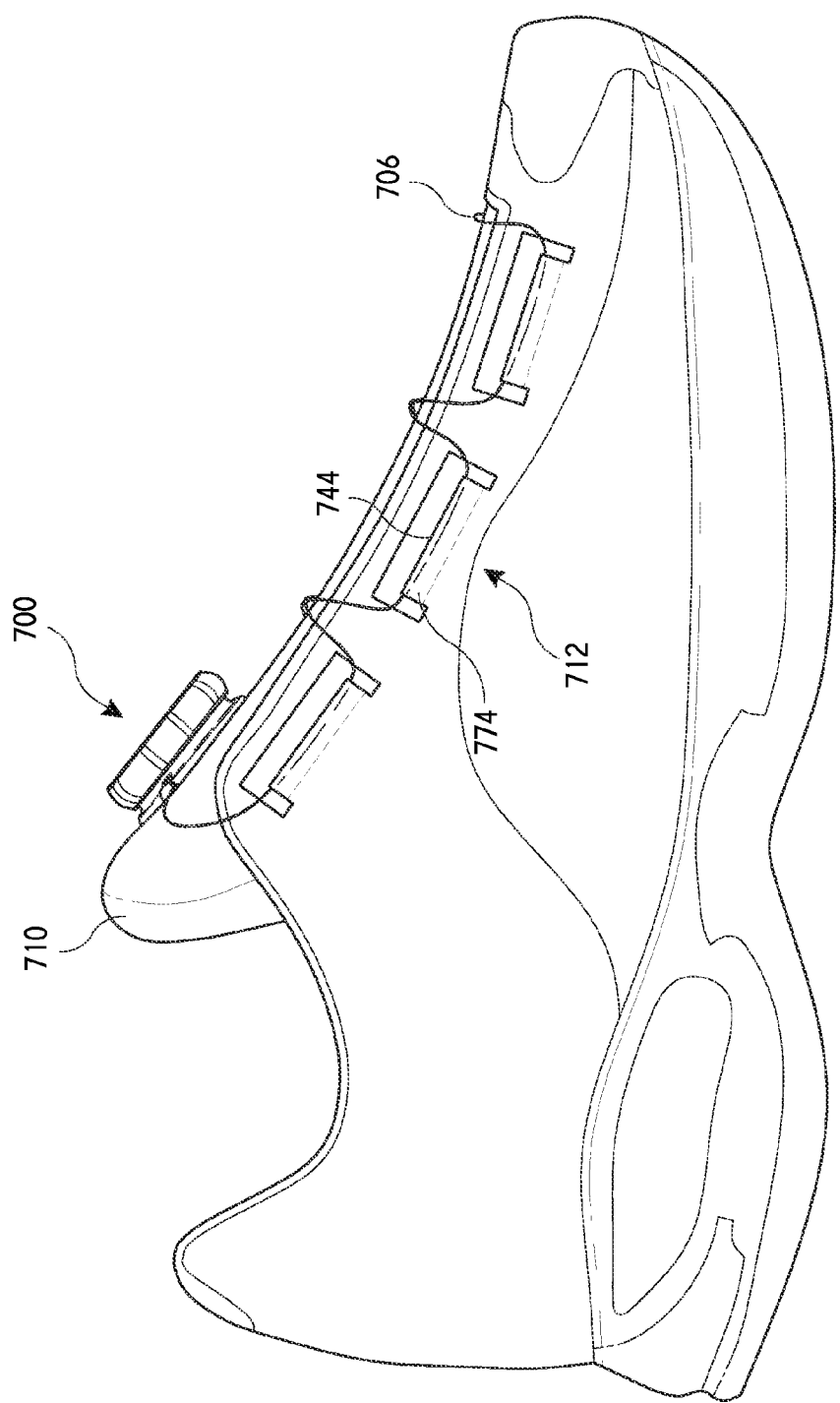

FIGS. 7A-D illustrate other embodiments in which soft guides are formed for a lacing system's lace. These embodiments illustrate sections or portions of a shoe's material being folded over and stitched or coupled together to form the soft guides. In some embodiments, the upper material of the shoe may be folded over to form the soft guides while in other embodiments, an inner layer or strip of material may be folded over to form the guides. As shown in FIG. 7A, in some embodiments, the upper 744 can be cut to form flaps 774. The flaps 774 can be folded back and stitched to form a looped lace guides 712. In some embodiments, the upper 744 may have pre-formed flaps 774 that may be folded back and stitched together. In other embodiments, the upper 744 may have one or more sections that are not adhered to underlying layers of the shoe. In these embodiments, the upper 744 may be cut essentially anywhere in the non-adhered sections to create the flaps 774, which are then folded over and stitched to create the lace guides 712. In this manner, the configuration of the lace guides 712 may be uniquely tailored to the individual and/or for a specific purpose or usage. Such embodiments also allow the distance of the lace guides 712 from the tongue 710 to be adjusted to provide a desired appearance and/or fit of the shoe. The guides 712 may be used singly as shown to route the lace 706 across the tongue, or two guides 712 can be configured to cooperatively function to receive and route a lace across the shoe's tongue, thus allowing the guides 712 to function as pairs.

Figure 7B:
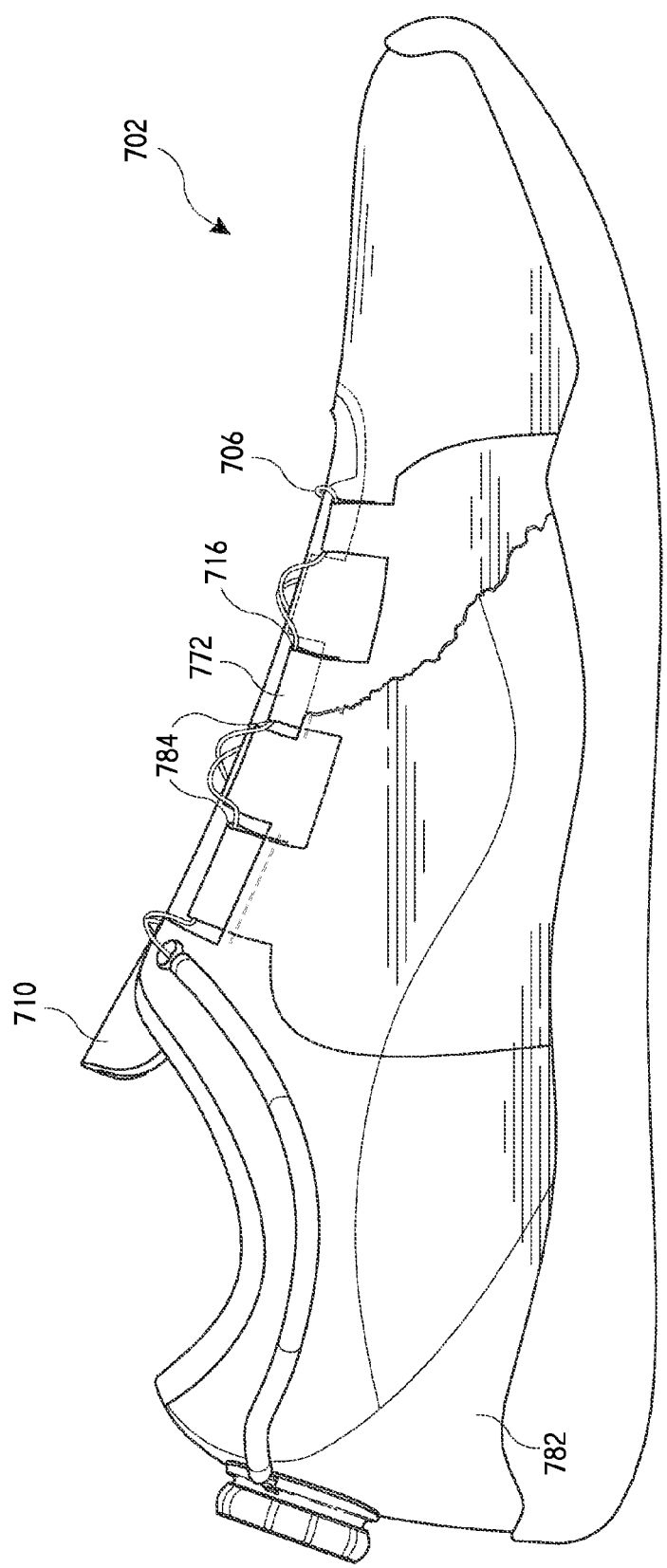

As shown in FIG. 7B, in some embodiments a support material 772 of the shoe 702 may be utilized to form the lace guides 716. Specifically, the support material 772, which is positioned underneath the vamp 782, may have fingerlike projections or flaps 784 which extend beyond cut out portions of the vamp 782. These projections or flaps 784 may be folded over and secured together to form looped lace guide 716 that protrude from the vamp 782.

As shown in FIG. 7C, in some embodiments a plurality of fabric strips 778 may be coupled with the shoe 702 and used to form the lace guides 714. The fabric strips 778 may be folded back on themselves and stitched together to form the lace guides 714. The fabric strips 778 may be positioned under the upper and/or adjacent or under any other layer of the shoe 702. In some embodiments, the upper may have one or more slits within which a fabric strip 778 may be positioned and stitched to form a lace guide 714. The slits of the upper may allow the lace guides 714 to be uniquely configured to a user and/or for a specific purpose.

In some embodiments, several of the techniques described herein may be utilized to produce the lace guides for a shoe. For example, as shown in greater detail in FIG. 7D, one or more fabric guides 714 may be formed on an exterior surface of a shoe by folding over and stitching end portions of fabric strips 778. A stitching processes 612 may also be used to form stitched guides 608 between adjacent fabric guides 714 on the exterior surface of the shoe. Such embodiments may be desirable to provide more robust ends, and/or a smooth transition, for lace guides where stress and friction may be highest. Other embodiments may utilize a guide created by a pre-formed channel, such as those illustrated in FIGS. 5A-G involving thermoforming, injection molding, RF welding, and the like. Beyond the customized functionality of this combination, such a guide may provide additional aesthetic design characteristics that may integrate within the design of the footwear.

The guides described in FIGS. 7A-D may be formed from various materials including: textiles, webbing material, thermoplastics, thermoset plastics, leather, and the like. Additionally, low friction materials such as polyethylene, PTFE, UHMW, and the like can be inserted, melded, or staked into the folded material to help reduce friction in the lacing system 700. These low friction inserts may be inserted and/or formed such that the edges are bell-shaped or otherwise flexible to prevent the lace from rubbing against a sharp or blunt edge. Although the embodiments of FIGS. 7A-D are generally described as involving stitching to create the looped fabric guides, it should be realized that other coupling methods may be used, such as adhesive bonding, RF welding, heat welding, and the like.

Figure 8A:
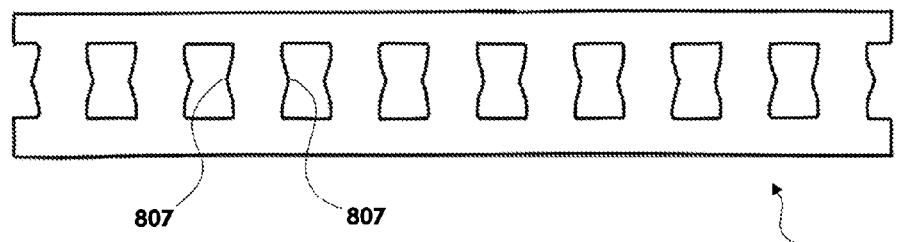
FIGS. 8A-J illustrate the incorporation of additional structural elements into a shoe to form all or part of a soft guide.
Figure 8B:
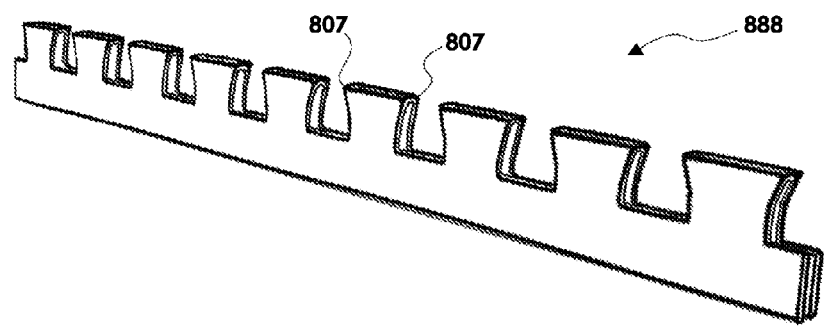
Figure 8C:
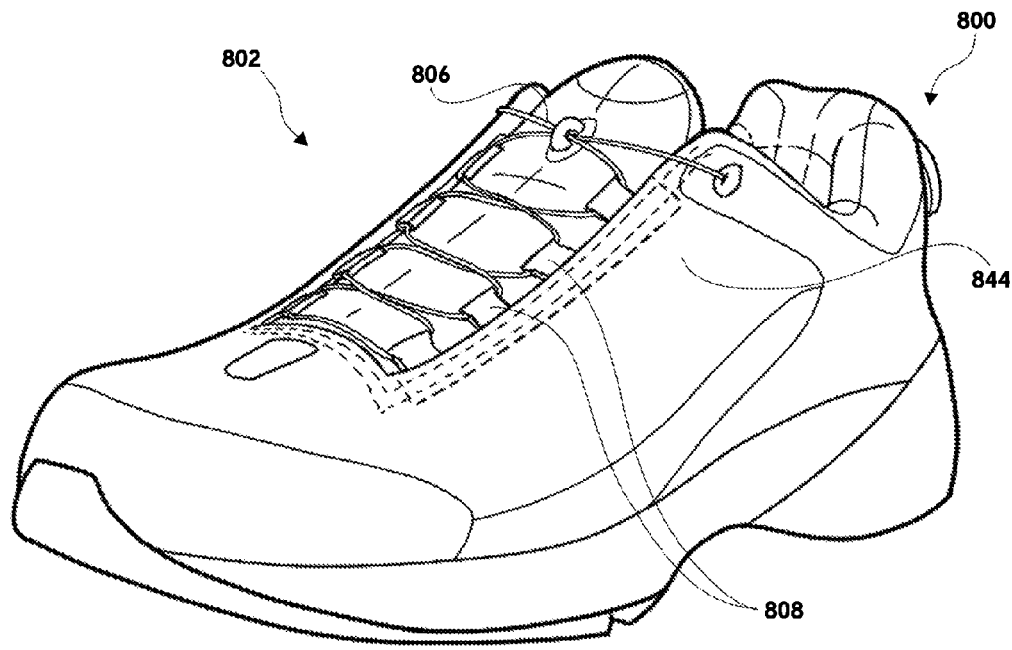

FIGS. 8A-J illustrate the incorporation of additional structural elements into a shoe 802 to form all or part of a soft guide. As shown in FIG. 8A, in one embodiment, an insert, such as a die cut panel 888, may be coupled near the eyestay of the shoe 802. The die cut panel 888 can be made of a material such as Cordura® abrasion resistant fabric, a polyurethane-coated material, and the like. In some embodiments, the die cut panel 888 can be an intermediate liner between the upper 844 and a liner of the shoe. As shown in FIG. 8B, the die cut panel 888 may be folded and coupled with the shoe 802, (e.g., via stitching, adhesive bonding, and the like) to create loop guides 808 through which the lace 806 is inserted. Two guides 808 on each side of the tongue can receive a portion of the lace 806 before the lace 806 crosses the tongue, thus allowing the guides 808 to function as pairs. In some embodiments, a flat and/or uniform portion of the die cut panel 888 may be secured under the upper 844, thus preventing unnecessary pressure points around the shoe 802. The die cut panel 888 used may be tailored to the individual and/or for a specific purpose or usage of the shoe 802. Further, the die cut panel 888 may be formed such that the loop guides 808, or at least the ends thereof, have an arcuate configuration to provide a smooth transition for the lace 806 and reduce frictional wear. In some embodiments, the die cut panel 888 can be cut so that a middle portion 807 of the guide is larger longitudinally or wider than the base portion of the guide. This configuration may be achieved by cutting an hour glass geometry into the die cut panel 888. When the die cut guide 888 is folded in half, the middle portion or ends 807 of the guide may slightly protrude or extend longitudinally. This configuration allows the extending ends 807 to flex upward as tension is placed on the lace, which creates a smooth radius or transition for the lace entering and exiting the guide. This reduces the overall wear on the lace, thus extending the life of the lace and/or die cut panel 888.

The die cut panel 888 can create variable spacing for lace guide links, as the user can choose a pattern for the lace 806 by inserting the lace 806 into the loop guides 808 in different configurations. The die cut panel 888, or any other embodiment illustrated in FIGS. 8A-J can be installed or assembled with the shoe so as to be invisible to a user. The spacing between the die cut panel 888 guides may be varied based on a desired end use and the like in order to allow the die cut panel 888 to be custom fit to a specific user. In other embodiments, the die cut panel 888 can have a single channel (not shown) through which the lace may be fed. The single channel can have weakened or pre-cut regions (not shown) that can be cut and/or removed to allow the lace guide loops to be "trimmed-to-fit" or adjusted as desired before fitting the die cut panel 888 with a shoe.

Figure 8D:
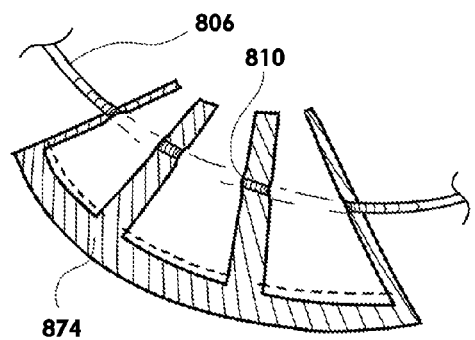
Figure 8E:
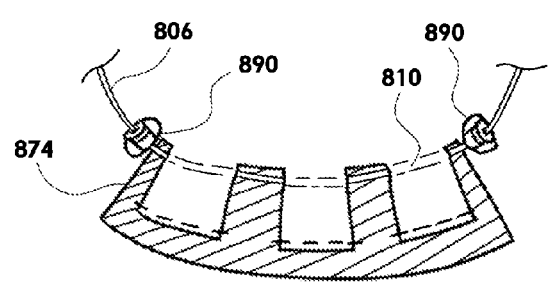
Figure 8F:
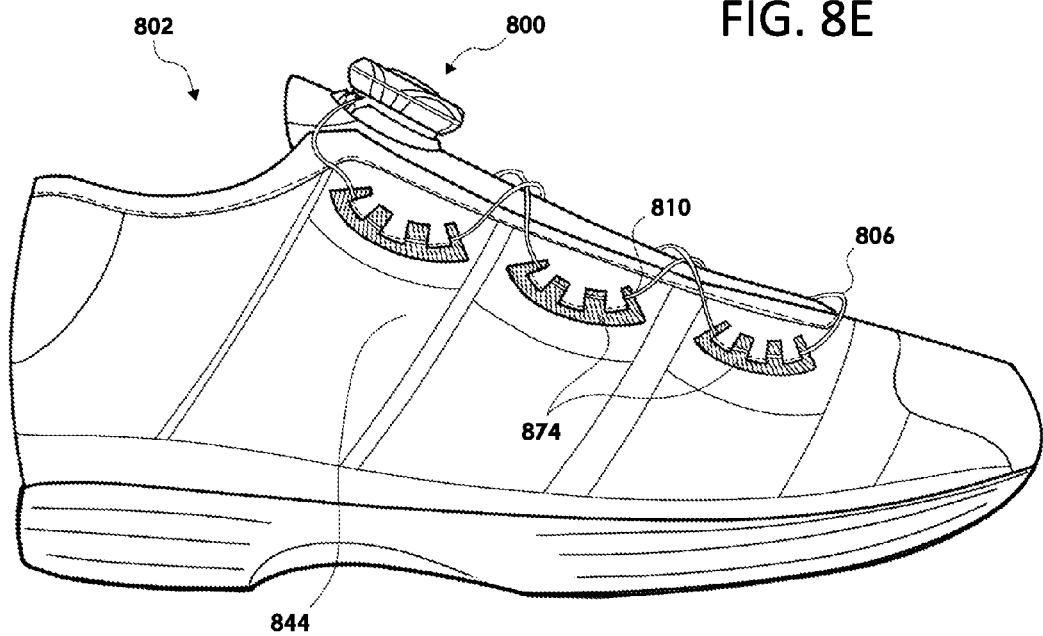
Figure 8G:
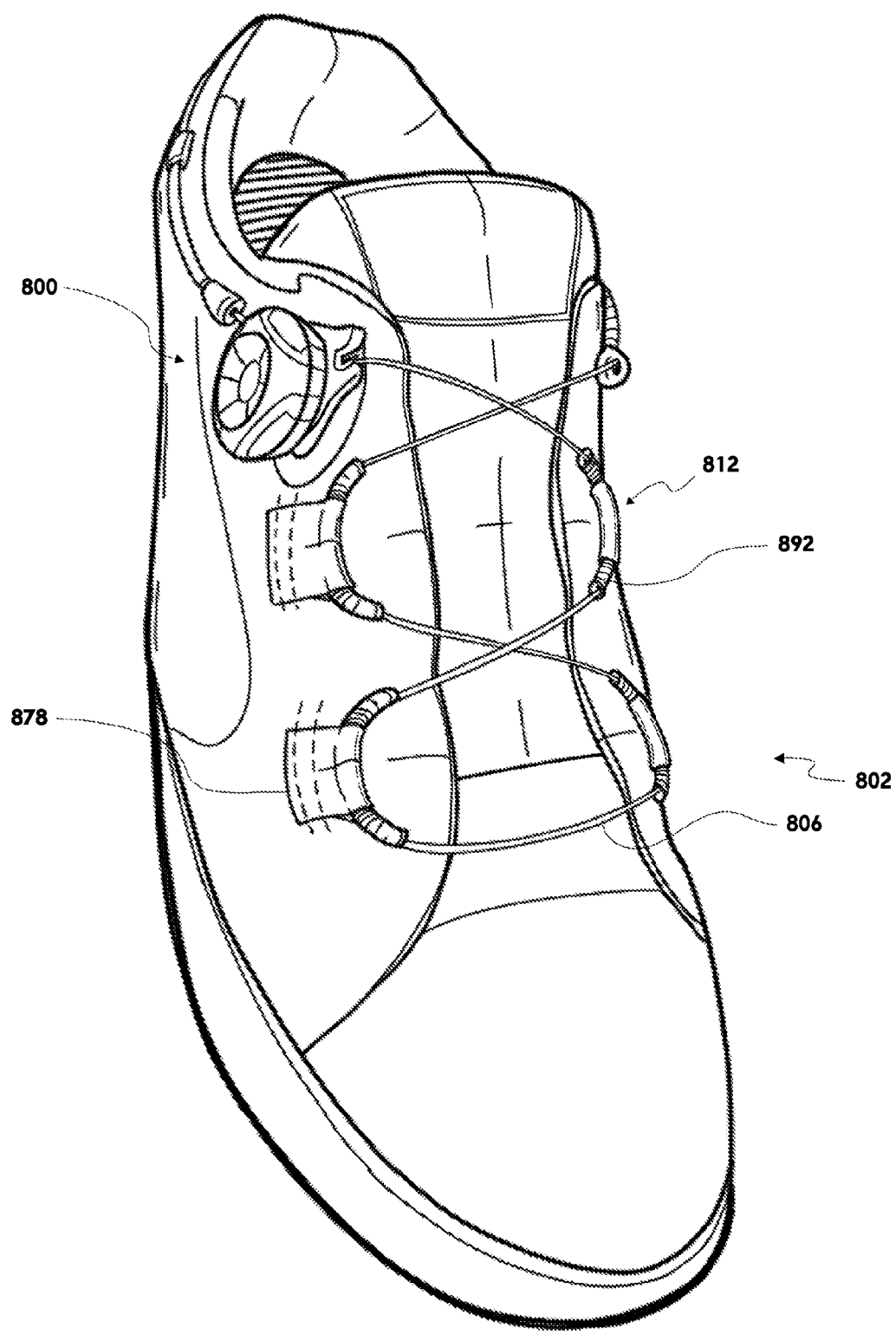
Figure 8H:
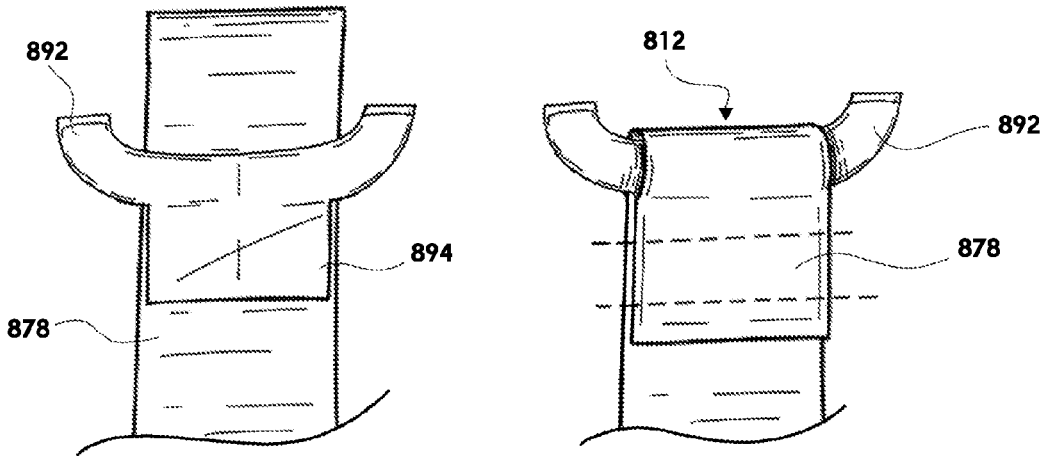
Figure 8I:
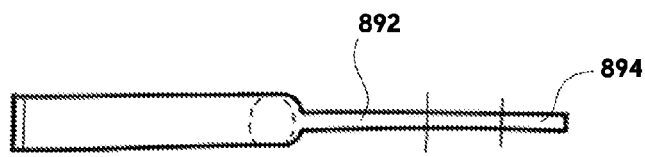

As shown in FIGS. 8D-F, in some embodiments the upper 844 of the shoe 802 may include flaps 874 that are folded over the lace 806. By folding over the lace 806, the flaps 874 can be formed to create a guide 810 that directs and secures the lace 806. Such an embodiment allows the shape and/or size of lace guide structure to be modified as desired. Some embodiments may also include ports 890 that are made of a plastic or other rigid and smooth material that direct the lace 806 into the guides 810 formed by the stitched flaps 874. The ports 890 may reduce the friction in the lacing system 800.

Figure 8J:
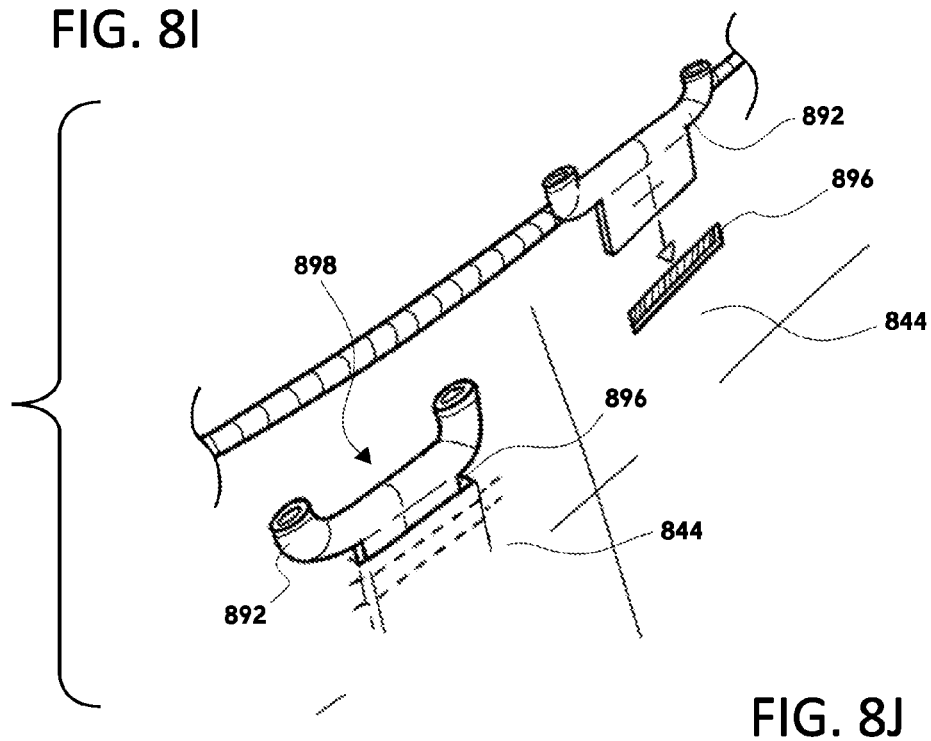

As shown in FIGS. 8G-J, in some embodiments a tube 892 may be sewn into, or otherwise coupled with, fabric strips 878. For example, tube 892 may be inserted into and secured within a looped portion of a fabric strip 878 via stitching, adhesive bonding, and the like to create a lace guide 812. In some embodiments, the tube 892 may be secured within the fabric strip 878 solely by stitching, adhesive bonding, RF welding, and the like. In other embodiments, the tube 892 may include a flange portion 894 that may be secured into the fold of the fabric strip 878 to aid in alignment and/or securing of the tube 892. In still other embodiments, the flange portion 894 of the tube 892 may be inserted into a slot 896 in the upper 844 as shown in FIG. 8J and secured via stitching, bonding, RF welding, and the like, thus eliminating the need for fabric strip 874 and/or other folded components.

The tube 892 may be any shape based on usage and/or need, such as straight, elbow-shaped, arcuate or u-shaped, and the like. In some embodiments, the ends of the tube 892 may be formed into a bell-mouth shape, or other smooth surface, to prevent or reduce frictional wear on the lace 806 due to sharp edges. The tube 892 may be formed from various materials including: fabric, leather, plastic or synthetic material, metal, and the like. The tube 892 may be rigid or flexible as desired.

Figure 9A:
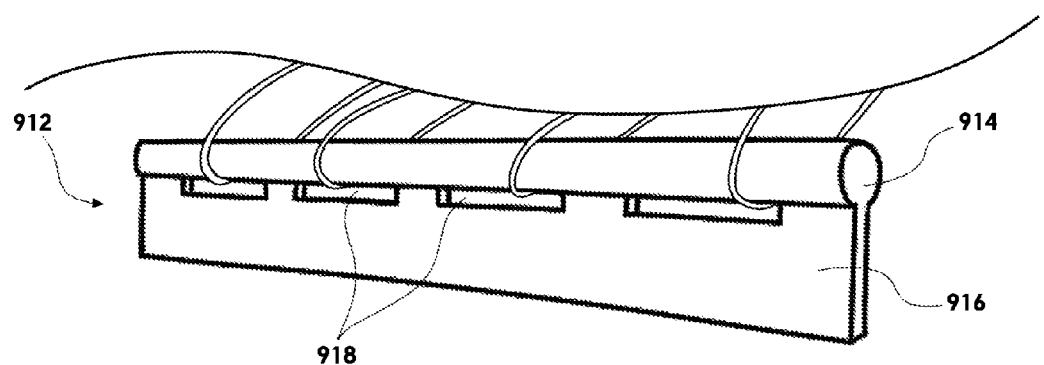
FIGS. 9A-D illustrate embodiments in which various forms of eyestay rollers are used as lace guides.

FIGS. 9A-D illustrate embodiments in which various forms of eyestay rollers are used as lace guides. For example, as shown in FIG. 9A, an eyestay roller 912 having a cylindrical portion 914 and a flat and/or thin flange 916 running longitudinally along an edge of the cylindrical portion 914 may be secured to the eyestay 938 of a shoe 902 (see FIG. 9D) to create a lace guide 908. The flange 916 of eyestay roller 912 may be stitched or otherwise coupled with the shoe's eyestay 938 (e.g., adhesively bonded, RF welded, and the like) to secure the eyestay roller 912 to the shoe. In one embodiment, the eyestay roller 912 may have slots or holes 918 positioned between the cylindrical portion 914 and flange 916 around which the lace can be wrapped. In another embodiment, the eyestay roller 912 may have weakened or pre-cut regions (not shown) that can be cut and/or removed to allow the slots 918 to be "trimmed-to-fit" or adjusted as desired before fitting the eyestay roller 912 with a shoe. The eyestay roller 912 may be a relatively strong and/or rigid thermoplastic material, such as nylon and the like.

Figure 9B:
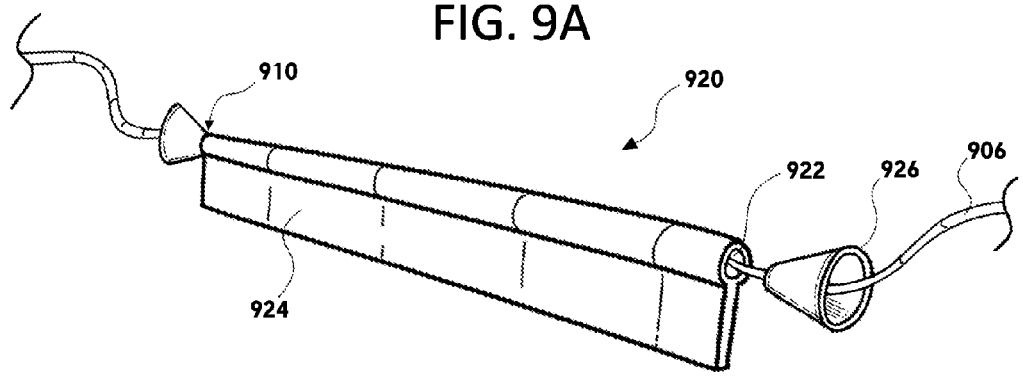

As shown in FIG. 9B, in another embodiment an eyestay roller 920 may have an open hollow tube 922 connected to a flange 924. A cross-sectional profile of the tube 922 may be any shape as desired, but is commonly circular. The lace 906 may be threaded through the tube 922, which forms a guide 910 for the lace 906. Bell-shaped ports 926, or other shaped ports, may be attached to the tube 922 at opposing ends to ensure that the lace 906 does not contact sharp edges. The ports 926 may aid in directing the lace 906 into the guide 910 and/or provide a smooth transition surface for the lace 906, such as by preventing the lace 906 from making sharp bends, reducing friction, and/or preventing or reducing bending or creasing of the lace 906.

Figure 9C:
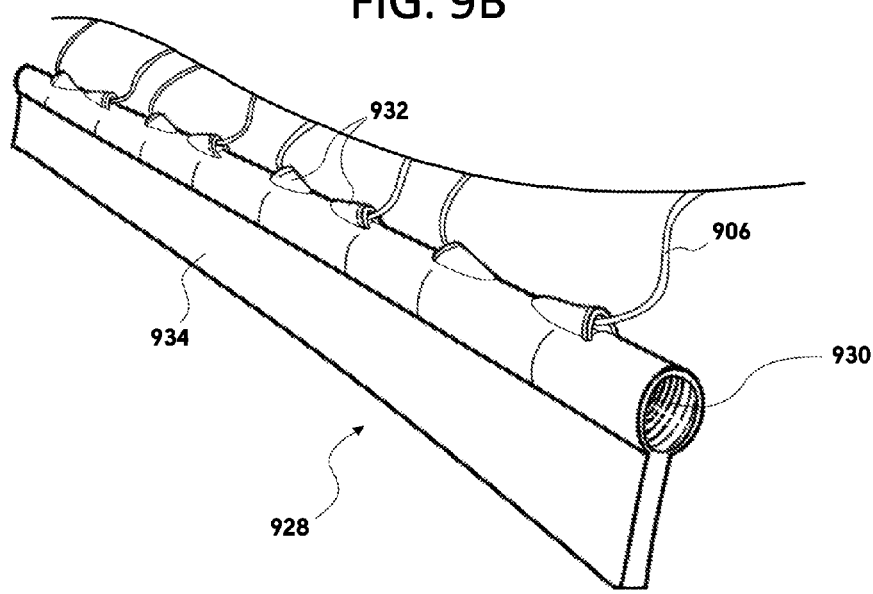
Figure 9D:
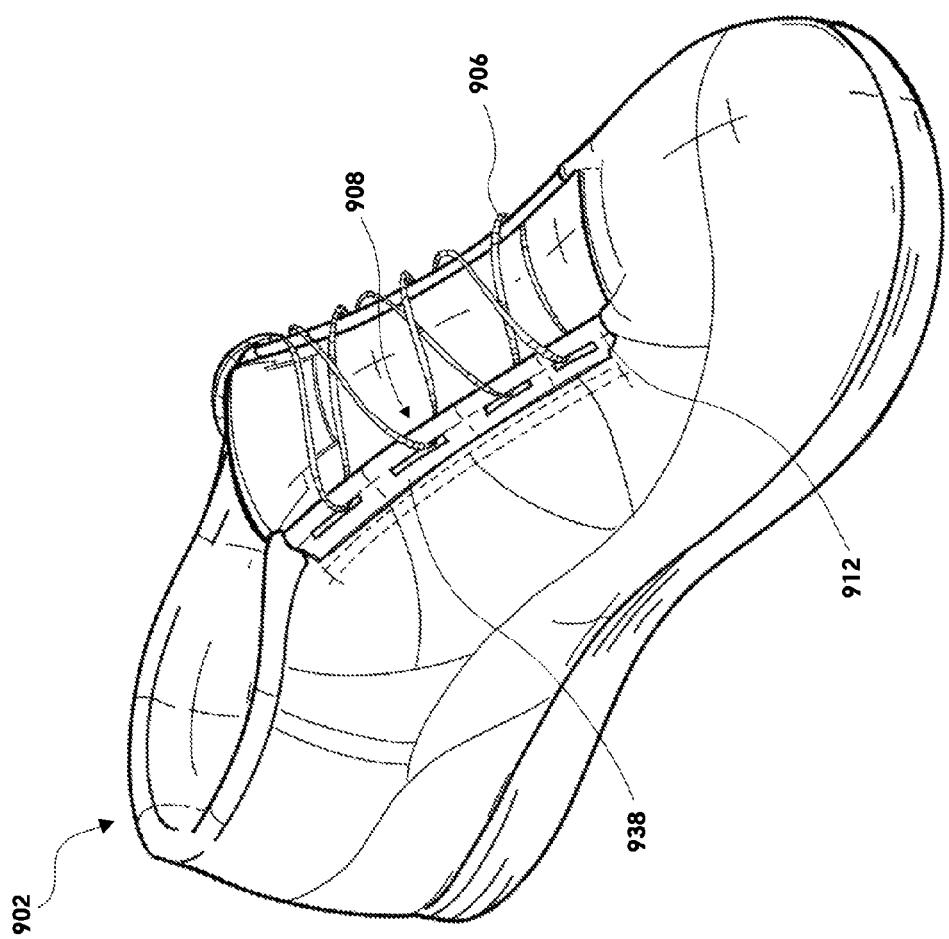

As shown in FIG. 9C, in another embodiment an eyestay roller 928 may have an open hollow tube 930 that includes openings 932, possibly in a fluted pattern, through which the lace 906 is fed. The openings 932 may be positioned on a side opposite a flange 934, or elsewhere, and may form a guide for the lace 906. Specifically, the openings 932 may be holes or could be angled channels for lace 906 to be threaded through. The openings 932 may be designed to include an angled and smooth edge that directs the lace 906 into and out of the tube 930 with minimal friction. The lace 906 may be fed into the tube 930 via a first opening 932 and may exit the tube 930 via a second opening 932 positioned elsewhere on the tube 930 as desired. The length of the resulting guide formed by a pair of openings 932 may be adjusted as desired. The openings 932 may also encourage a properly shaped lace curvature.

Figure 10A:
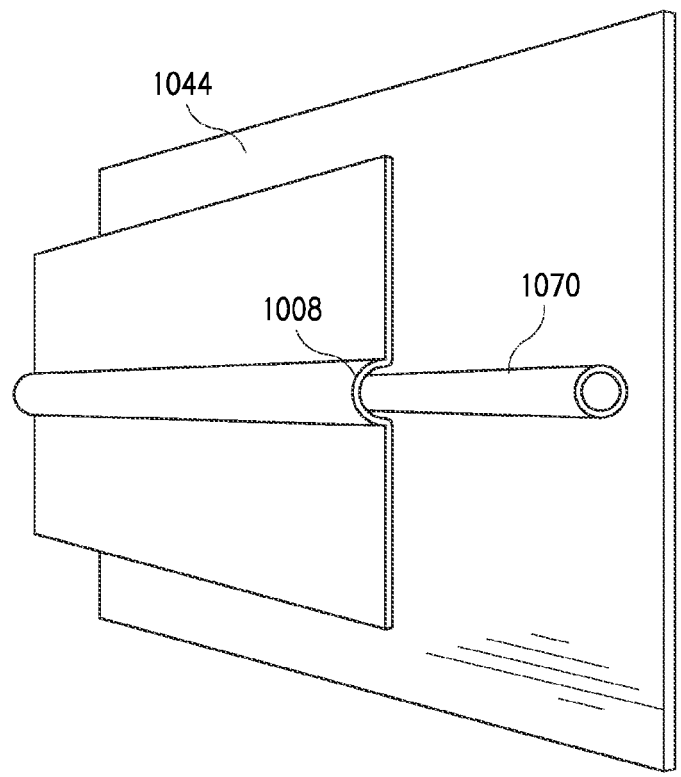
FIGS. 10A-C illustrate methods for forming a lace guide in a shoe.
Figure 10B:
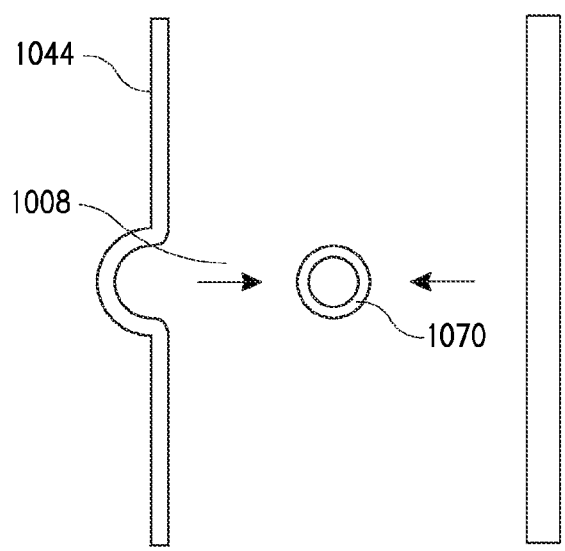
Figure 10C:
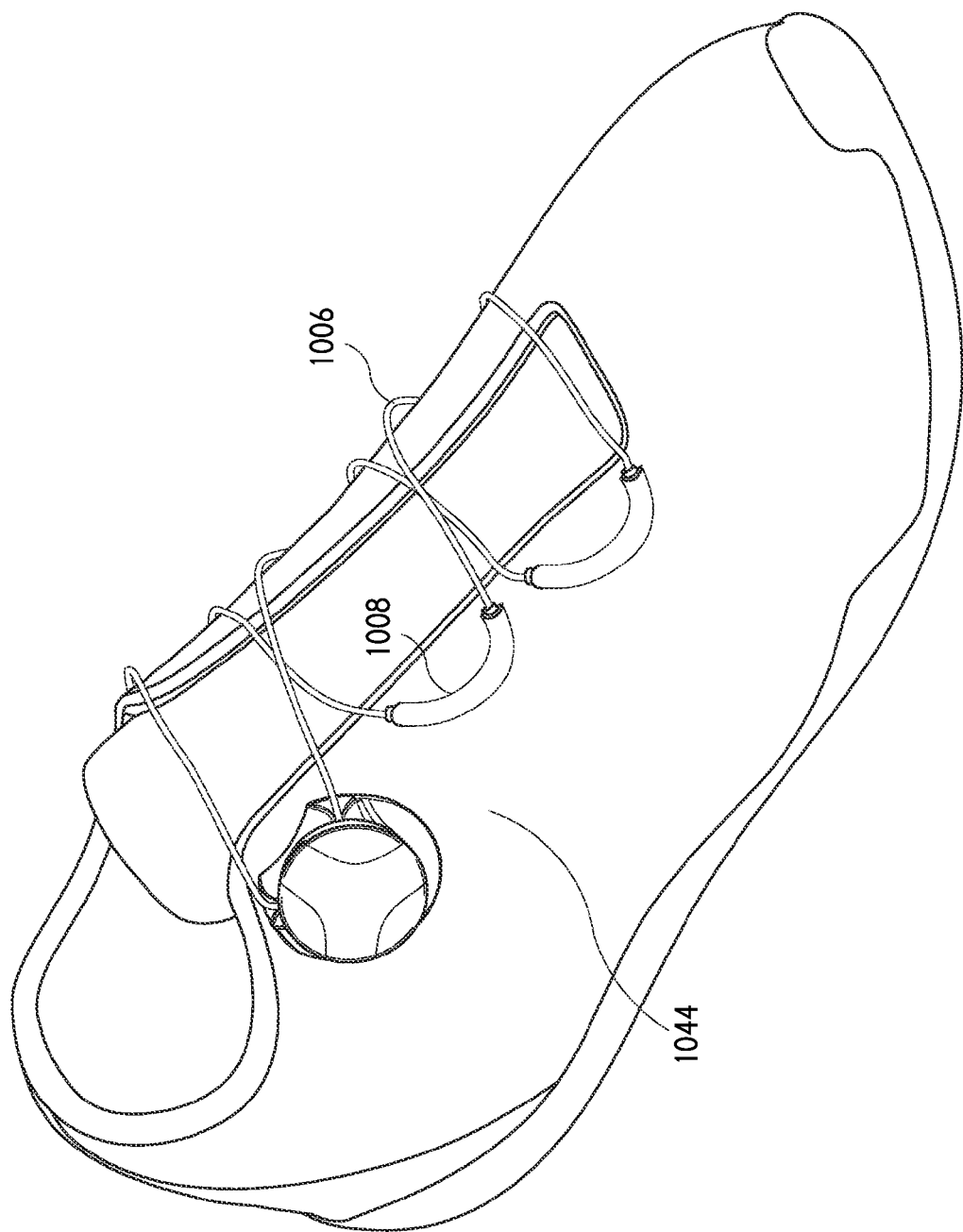

FIGS. 10A-C illustrate another method for forming a lace guide in a shoe. Specifically, FIGS. 10A and 10B illustrate a channel 1008 being formed into an upper material 1044 of a shoe. In one embodiment, the channel 1008 may be thermoformed into the upper material 1044. In thermoforming the channel 1008, tubing 1070 may be positioned between the upper material 1044 and an inner layer of material. The upper material 1044 may then be positioned atop the inner layer of material and heated and pressed onto the tubing 1070 to form the channel 1008. In another embodiment, the upper material 1044 may be formed so as to have the channel 1008 already formed therein. If desired, the tubing 1070 may then be snap fit into the channel 1008 of the upper material 1044, and the upper material 1044 and tubing 1070 may be coupled with the inner material layers. If tubing 1070 is not used, the upper material 1044 may be coupled directly with the inner material layers. Lace 1006 may then be inserted through the channel 1008 and/or tubing 1070.

Figure 11A:
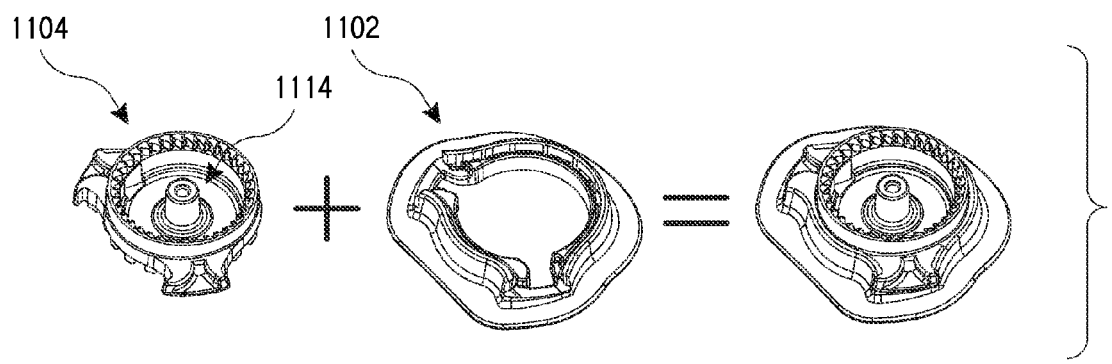
FIGS. 11A-C illustrate a component that may be easily coupled with a shoe or other article.
Figure 11B:
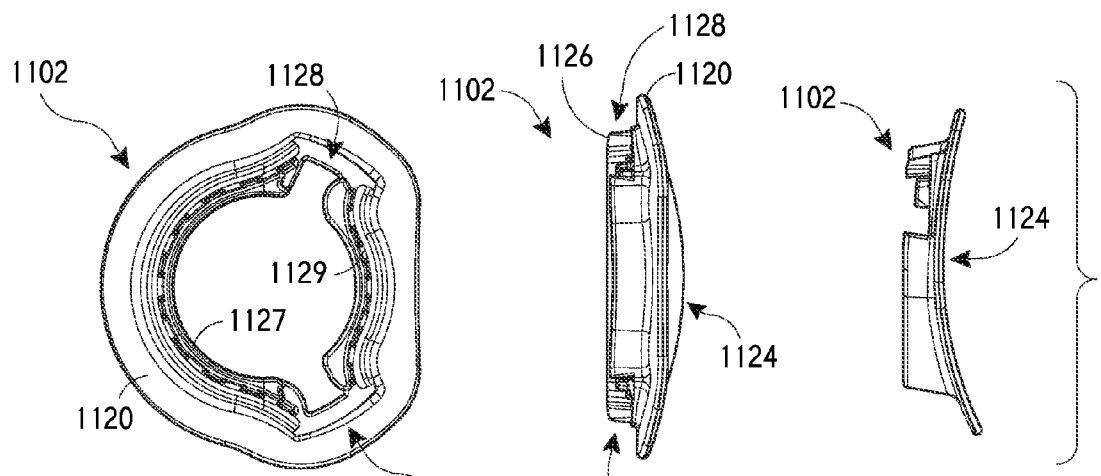
Figure 11C:
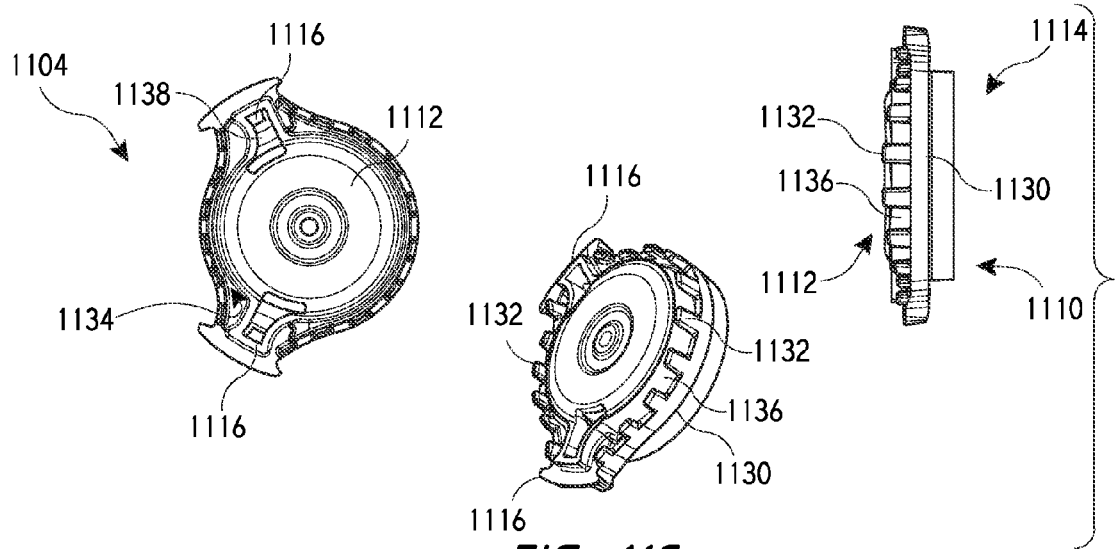

FIGS. 11A-C illustrate a component that may be easily coupled with a shoe or other article. Specifically, the component may be coupled with a shoe or other article by coupling a relatively soft and weldable base component with the shoe or article and then attaching an upper component with the base component. For example, a flange member or weld flange 1102 (hereinafter weld flange 1102) may be made of TPU or another material that may be easily welded to a shoe or article via heat pressing, RF welding, and the like. Heat pressing may be ideal because it is a commonly used manufacturing processes in manufacturing shoes and other articles. To enable heat pressing of the weld flange 1102, a custom die and adhesive film may be used to adhere the flange 1102 to the shoe or article, such as to the shoe's upper. In some embodiments, the weld flange 1102 may be under-mounted on the shoe's upper to obtain a secure bond between the flange 1102 and shoe and to prevent peeling or pulling of the two components. The flange 1102 may be configured to releasably or fixedly couple with a housing component or member 1104 (hereinafter housing 1104) of the tightening system, such as a housing of a reel based closure mechanism.

FIGS. 11B and 11C illustrate the weld flange 1102 and housing 1104 in greater detail. The housing 1104 is commonly made of a thermoplastic material having a relative high melting temperature, such as greater than 200 degrees Celsius, and commonly greater than 250 degrees Celsius. In one embodiment, the housing 1104 is made of a polycarbonate material having a melting temperature of between 270 and 320 degrees Celsius, and more commonly about 290 degrees Celsius. The housing 1104 (e.g., polycarbonate) may also have a modulus of elasticity of about 2400 megapascals (MPa). The housing 1104 has a top end 1110 having an interior cavity 1114 within which one or more components (e.g., a spool, pawls or teeth, and the like) of the reel based tightening mechanism are positioned as described herein above. The housing 1104 also has a bottom end with a bottom surface 1112. The housing 1104 includes entry and exits ports 1116 through which a tension member or lace is disposed. The entry and exit ports 1116 allow the lace to pass from an interior portion of the housing 1104 to access a spool (not shown) to an exterior portion of the housing 1104 to be positioned about a lace path of the shoe or article. As described herein above, the reel based tightening mechanism is operable to tension the lace and thereby tighten a shoe or other article.

FIG. 11B illustrate the weld flange 1102 in greater detail. The weld flange 1102 is illustrated as being removed or separate from the housing 1104, although the weld flange 1102 is typically integrally formed with the housing 1104. For example, the weld flange 1102 is commonly insert molded onto the housing 1104. When formed with the housing 1104, a flange 1120 of the weld flange 1102 extends laterally from at least a portion of an outer periphery of the bottom end 1112 of the housing 1104 and more commonly around the entire outer periphery of the bottom end 1112 of the housing 1104. The weld flange 1102 is also formed with the housing 1104 so that a bottom surface 1122 of the weld flange 1102 is flush with or positioned axially below the bottom surface 1112 of the housing 1104. Positioning the bottom surface 1122 of the weld flange 1102 flush with or axially below the bottom surface 1112 of the housing 1104 prevents or reduces the creation of pressure points by preventing or reducing the bottom surface 1112 of the housing from pressing downward onto the foot or another objected enclosed in an article. In some embodiments, the weld flange 1102 may have an arcuate 1124 configuration on its bottom surface 1122 that corresponds to the shape of a shoe or other article with which the weld flange 1102 is coupled. The arcuate configuration 1124 may aid in coupling of the weld flange 1102 and the article, such as with an eyestay of the shoe. The weld flange 1102 also includes lace entry and exit ports 1128 that correspond to the entry and exit ports 1116 of the housing. The lace entry and exit ports 1128 of the weld flange 1102 allow the lace to access the housing 1104 and a spool positioned therein.

The weld flange 1102 is commonly made of a thermoplastic elastomer material having a relative low melting temperature in comparison to the housing 1104. The lower melting temperature enables direct coupling of the weld flange 1102 to an article, such as an upper of the shoe, without melting or otherwise substantially affecting the housing 1104. For example, the lower melting temperature of the weld flange 1102 allows the weld flange 1102 to be heat welded, heat pressed, sonic or RF welded, and the like to the article. A specific coupling of the weld flange 1102 to an article may involve heat welding the weld flange 1102 to the upper of a shoe since heat welding shoe components is a common manufacturing process. The weld flange 1102 may be coupled with the upper of the shoe during a conventional manufacturing process. The lower melting temperature of the weld flange 1102 also enables the weld flange 1102 to be coupled with the housing 1104 during an insert mold process without melting or substantially affecting the housing 1104.

In a specific embodiment, the weld flange 1102 is may of a polyurethane material having a melting temperature of less than 250 degrees Celsius, and more commonly less than about 200 degrees Celsius. In one embodiment, the polyurethane weld flange 1102 may have a melting temperature of between 170 and 200 degrees Celsius, or about 195 degrees Celsius. The weld flange 1102 may also be made of a softer material in comparison to the housing 1104. For example, the weld flange 1102 may have a durometer of between about 70 and 100 Shore A and more commonly between about 80 and 90 Shore A, or about 85 Shore A. The relatively softer and lower melting temperature properties of the weld flange 1102 enables the weld flange 1102 to be easily coupled with the housing 1104 and subsequently coupled with the article.

As shown in FIG. 11C, the housing 1104 includes a ridge or partition line 1130 that extends along the outer periphery of the housing 1104. A diameter of the housing 1104 axially above the ridge 1130 may be smaller than a diameter of the housing material axially below the ridge 1130. The ridge 1130 defines an upper mating surface between the housing 1104 and the weld flange 1102. When coupled with the housing 1104, the weld flange's material (e.g., polyurethane) extends from the bottom surface 1112 of the housing 1104 up to the ridge 1130 so that a top surface 1126 of the weld flange 1102 is substantially flush with the ridge 1130. Coupling of the housing 1104 and weld flange 1102 so that the top surface 1126 of the weld flange 1102 is substantially flush with the ridge 1130 reduces delamination of the housing 1104 and weld flange 1102 by reducing or preventing peeling of the weld flange's material from the outer surface of the housing 1104. In other embodiment, the shape of the ridge 1130 may be reversed with the housing material axially above the ridge 1130 having a larger diameter than the housing material axially below the ridge 1130. In such embodiments, the weld flange's material may extend up to the ridge 1130 so that the outer diameter of the coupled housing 1104 and weld flange 1102 is substantially the same.

The housing 1104 further includes a plurality of axially extending teeth 1132 that are positioned near the bottom end 1112 of the housing 1104. The axially extending teeth 1132 may extend partially or fully from the bottom periphery of the housing 1104. The axially extending teeth 1132 enhance bonding between the housing 1104 and the weld flange 1102 by increasing the bonding surface area between the two components and/or by increasing a friction fit of the two components. Further, an axial length of the axially extending teeth 1132 may be relative uniform, or may vary as shown in FIG. 11C. In some embodiments, the axial length of the teeth 1132 may vary due to the arcuate shape 1124 of the weld flange 1102. When coupled with the housing 1104, the axially extending teeth 1132 form apertures 1129 in the weld flange 1102, commonly near an inner edge of the flange. The apertures 1129 in the weld flange 1102 may extend partially or fully through the weld flange's material.

In some embodiments, the weld flange's material may entirely cover the bottom surface 1112 of the housing 1104, although the weld flange material more commonly extends radially inward to an inner cylindrically shaped wall 1136 of an inner body portion of the housing 1104. Limiting the weld flange's material to the inner wall 1136 allows access to the bottom surface 1112 and/or prevents the weld flange's material from clogging port channels 1138 that may be formed by die pins during a molding process.

The housing 1104 also includes a channel 1134 formed in the bottom surface 1112 of the housing 1104 between the axially extending teeth 1132 and the inner wall 1136 of the housing 1104. As the weld flange 1102 is integrally formed with the housing 1104, the weld flange's material (e.g., polyurethane) flows upward and into and fills the channel 1134 of the housing. The filling of the weld flange's material within the channel 1134 enhances bonding between the housing 1104 and weld flange 1102 by increasing the bonding surface area and/or increasing a frictional fit between the two components. In some embodiments, the channel 1134 may extend axially up to or adjacent the ridge 1130.

Figure 41A:
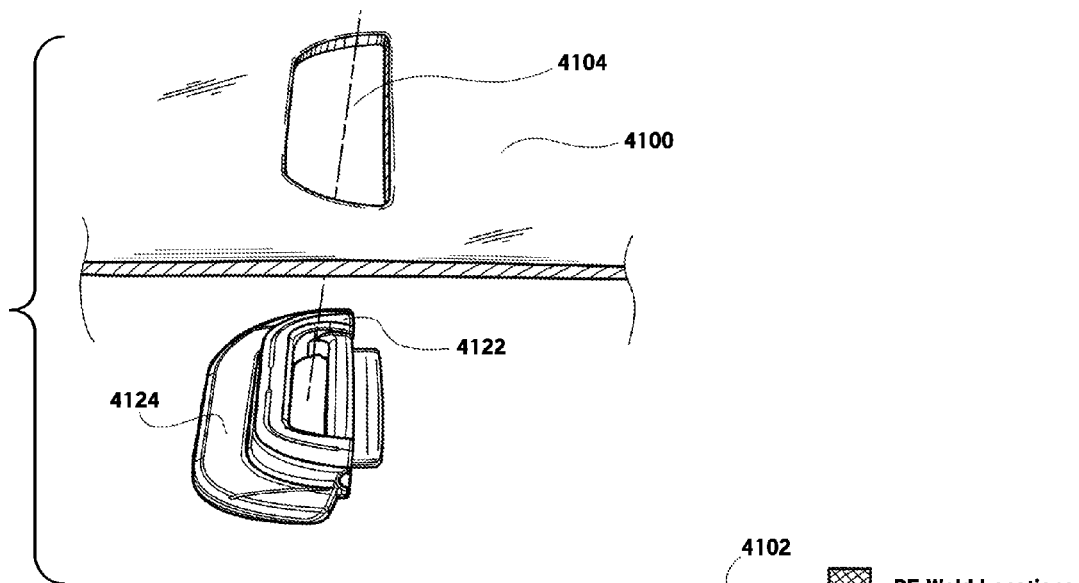
FIGS. 41A-C illustrate another embodiment of a two shot component.
Figure 41B:
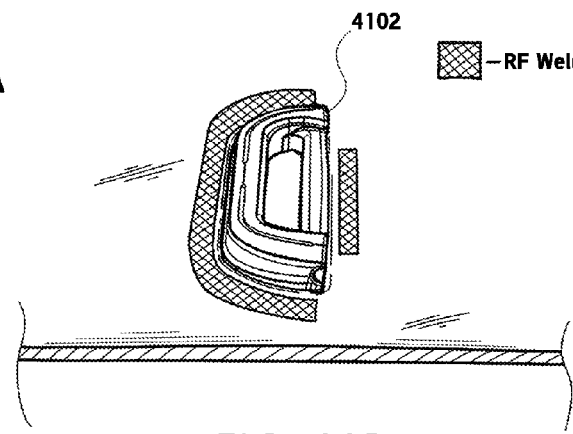
Figure 41C:
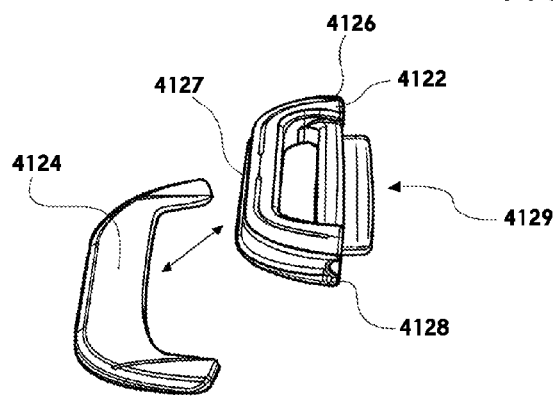

Referring briefly now to FIGS. 41A-C, illustrated is another embodiment of a two shot component. As with the embodiment of FIGS. 11A-C, the embodiment of FIGS. 41A-C includes an upper component that is made of a thermoplastic material having a relatively high melting temperature and a lower component that is made of a thermoplastic elastomer having a relatively low melting temperature in comparison to the upper material. In the illustrated embodiment, the upper material is a lace guide 4122 rather than a housing 1104. As described herein above, the lace guide 4122 is operable to guide or route a lace along a lace path about an article. The lace guide 4122 includes a channel within which the lace is positioned and slides to guide the lace about the lace path. The lace guide 4122 includes a top end and a bottom end with a bottom surface and the lower component extends laterally from the bottom end of the lace guide 4122. The lace guide 4122 may be made of the same material and/or have the same or similar properties to the housing 1104 previously described.

As with the prior embodiment, the lower component is a flange member or weld flange 4124 (hereinafter weld flange 4124) that is integrally formed with the lace guide 4122 via insert molding and the like. The weld flange 4124 is insert molded or otherwise integrally formed with the lace guide 4122 so as to extend laterally from a portion of an outer periphery of the lace guide's bottom end and so as to be flush with or positioned axially below a bottom surface of the lace guide 4122 for similar reasons to those previously described. The weld flange 4124 may be of a similar material and/or have similar properties to the weld flange 1102 previously described to enable direct coupling of the weld flange 4124 to an article, such as a medical brace or shoe. In one embodiment, the weld flange 4124 may extend laterally along a back edge 4127 of the lace guide 4122 between a first lateral edge 4126 and a second lateral edge 4128 of the lace guide 4122 without extending along a front edge 4129 of the lace guide 4122. Extension of the weld flange 4124 about the lace guide 4122 in this manner enables the front edge 4129 of the lace guide 4122 to be positioned close to an edge of the medical brace or footwear (e.g., adjacent an eyestay edge).

As described in the previous embodiments, the lace guide 4122 may include a ridge (not shown) that extends along an outer periphery of the lace guide 4122. The ridge may define an upper mating surface between the lace guide 4122 and the weld flange 4124. In such embodiments, the weld flange's material may extend from a bottom surface of the lace gudie 4122 up to or substantially adjacent the ridge. Similarly, the lace guide 4122 may also include a plurality of axially extending teeth (not shown) that extend axially downward from the bottom end of the lace guide 4122 and that enhance bonding between the lace guide 4122 and the weld flange 4124. The lace guide 4122 may further include a channel (not shown) positioned between the axially extending teeth (or an outer edge of the lace guide) and an inner main body of the lace guide 4122. The channel may be filled with the material of the weld flange 4124 during the forming process to enhance bonding between the two components.

As shown in FIGS. 41A and 41B, the lace guide 4122 and weld flange 4124 may be easily coupled with a brace 4100, footwear, or other article via radio frequency (RF) welding, heat welding, ultrasonic welding, and the like. For example, because the weld flange 4124 is made of an RF or other weld friendly material, such as polyurethane, the weld flange 4124 is easily bondable or couplable with the brace 4100. To attach the lace guide 4122 to the brace 4100, the lace guide 4122 may be inserted through an aperture 4104 formed in the brace 4100 or footwear until the weld flange 4124 contacts an inner surface of the brace 4100. The weld flange 4124 may then be RF welded, heat welded, sonically welded, and the like to the inner surface of the brace 4100. In other embodiment, the weld flange 4124 may be RF welded, heat welded, sonically welded, and the like to an outer surface of the brace 4100, footwear, or other article. The weld flange 4124 may likewise by adhesively bonded, stitched, mechanically fastened, and the like to the brace 4100. The lace guide 4122 is made of an abrasion resistant or low friction material. The configuration of FIGS. 41A-C enables the lace guide 4124 to be easily attached to an article while maximizing the life and usefulness of the lace.

According to one embodiment, a method of forming an insert molded component, such as the above described lace guide 4124 or housing 1104, includes providing an upper component of a tightening system, such as a lace guide 4124 or housing 1140. The upper component is made of a thermoplastic material having a first melting temperature and includes a top end and a bottom end with a bottom surface. The method also includes positioning the upper component within a mold and molding a flange member onto the bottom end of the upper component so that the flange member extends laterally from at least a portion of an outer periphery of the bottom end of the upper component and so that a bottom surface of the flange member is flush with or positioned axially below the bottom surface of the upper component. The flange member is made of a thermoplastic elastomer having a second melting temperature that is lower than the first melting temperature to enable direct coupling of the flange member to an article, such as a brace, footwear, or other article.

In some embodiments, the upper component may include a ridge that extends along its outer periphery and that defines an upper limit of a mating surface between the upper component and the flange member. In such embodiments, the method may include positioning the ridge of the upper component against a surface of a die of a mold to limit exposure of the mating surface to the thermoplastic elastomer during the molding process. Limiting exposure of the mating surface to the thermoplastic elastomer may result in the weld flange extending from near or adjacent the bottom surface of the upper component to or adjacent the ridge.

Figure 12A:
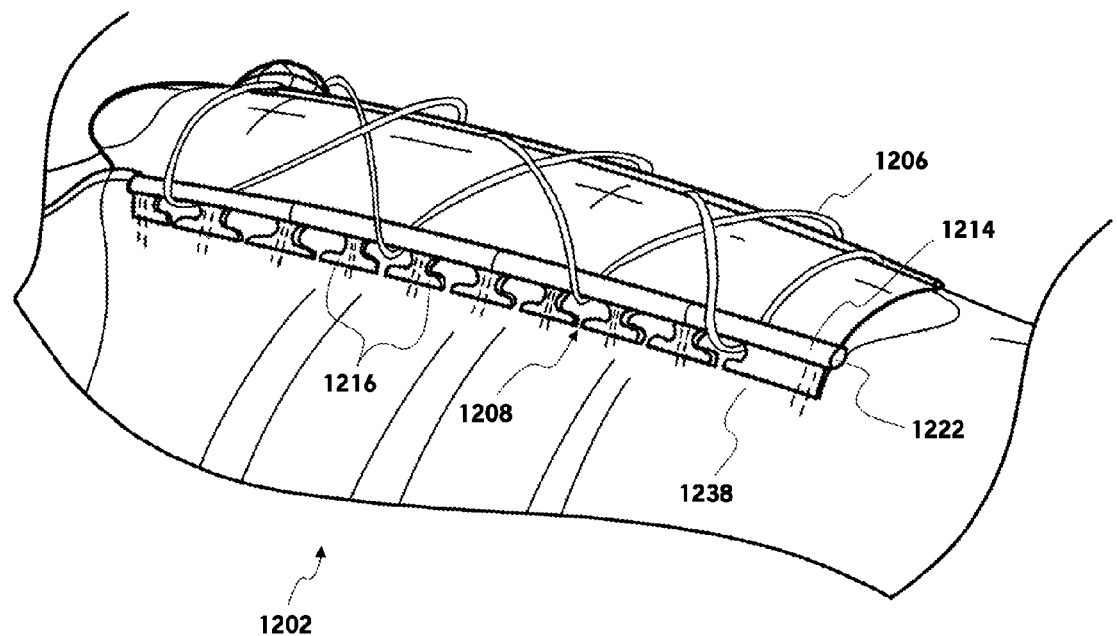
FIGS. 12A and 12B illustrate embodiments wherein lace guides are formed from strips of material that can be coupled to an eyestay of a shoe.
Figure 12B:
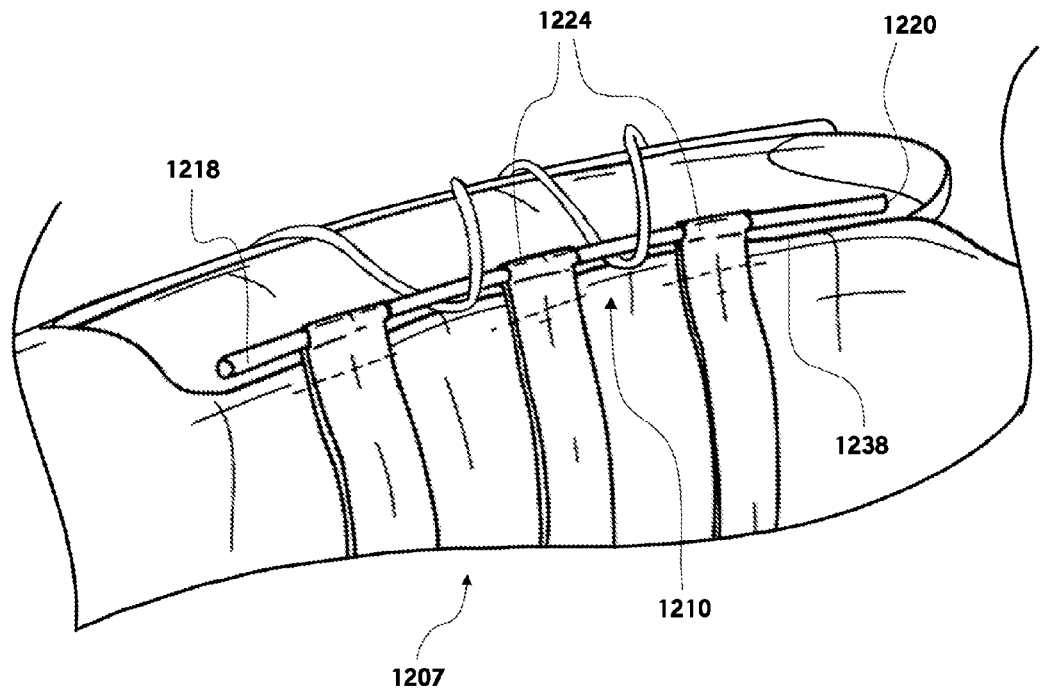

In some embodiments, the method further includes positioning the bottom surface of the flange member against a surface of the article and bonding the bottom surface of the flange member to the surface of the article. In such embodiments, bonding the bottom surface of the flange member to the surface of the article may include radio frequency (RF) welding, ultrasonic welding, heat welding or heat pressing, and the like, the bottom surface of the flange member to the surface of the article. The thermoplastic material of the upper member may have a modulus of elasticity of between about 2200 and 2600 megapascals (MPa), and the thermoplastic elastomer of the weld flange may have a durometer of between about 70 and 100 Shore A FIGS. 12A and 12B illustrate other embodiments wherein lace guides are formed from strips of material that can be coupled to an eyestay 1238 of a shoe 1202. Lace guides 1208 and 1210 can be formed from an extrudable plastic or other material rod or strip. In one embodiment, a rod 1214 having a plurality of die cut flanges 1216 may be fastened to the eyestay 1238. Fastening the rod 1214 to the eyestay 1238 forms channels via the openings of the die cut flanges 1216. Lace 1206 can be threaded through the channels, which enables the rod 1214 to function as a guide 1208. In some embodiments, the rods 1214 can be secured to the eyestay 1238 via stitching along the die cut flange 1216 and/or along a cylindrical portion 1222 of rod 1214.

In another embodiment, the rod 1218 may be cylindrically shaped 1220 and may be coupled with the shoe to form slots 1210 that function as lace guides. In one embodiment, the rod 1218 may be inserted through loops created by folding and securing fabric strips 1224, or similar materials, back on themselves. The loops may couple the rod 1218 to the eyestay 1238 and function as the lace guide. One or more ends of the rod 1218 may be secured to the eyestay 1238, such as by stitching and the like, to secure the rod 1218 and prevent the rod from slipping out of the loops.

Figures 13A, 13B, 13C:
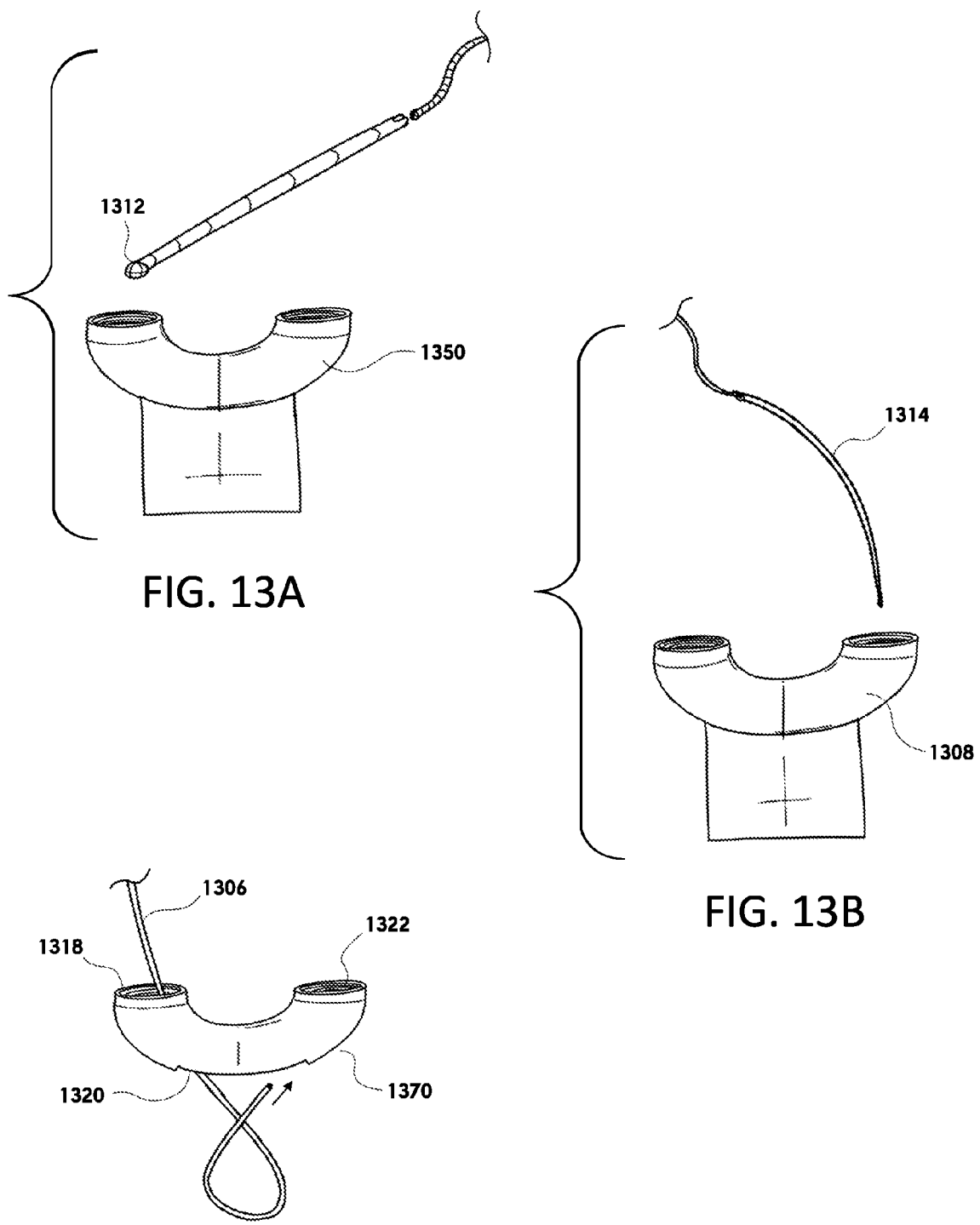
FIGS. 13A-C illustrate an embodiment for feeding a lace through a lace guide.

FIGS. 13A-C illustrate an embodiment for feeding a lace 1306 through a lace guide. As shown in FIG. 13A, a rounded semi-rigid tip 1312 (e.g., an aglet) of a lace insertion tool may be coupled with the lace 1306 to aid the lace 1306 in insertion through a tube 1350. As shown in FIG. 13B, in another embodiment the lace 1306 may be attached to a needle 1314, which is fed through a lace guide, such as tube 1308. The needle 1314 may be curved to accommodate curved lace guides and tubes. Insertion of the needle 1314, or other lace insertion tool, through the tube 1308, or lace guide, may prevent or reduce the lace 1306 from bunching up within the tube 1308, especially at points of curvature of the tube.

As shown in FIG. 13C, a tube 1370 may include one or more openings that aid in inserting the lace 1306 within the tube 1370. For example, the lace 1306 may be inserted through a first opening 1318, through a channel portion of the tube 1370, and out through one or more side openings 1320. The lace 1306 may then be reinserted through side opening 1320, through a second channel portion of the tube 1370, and out a second opening 1322. The use of the side openings 1320 bifurcates the lace insertion process and may make the insertion process easier and more efficient by eliminating or reducing bends. Although the above insertion processes are described with respect tube guides, any of the above techniques may be utilized in the other lace guide embodiments described herein.

Figure 13D:
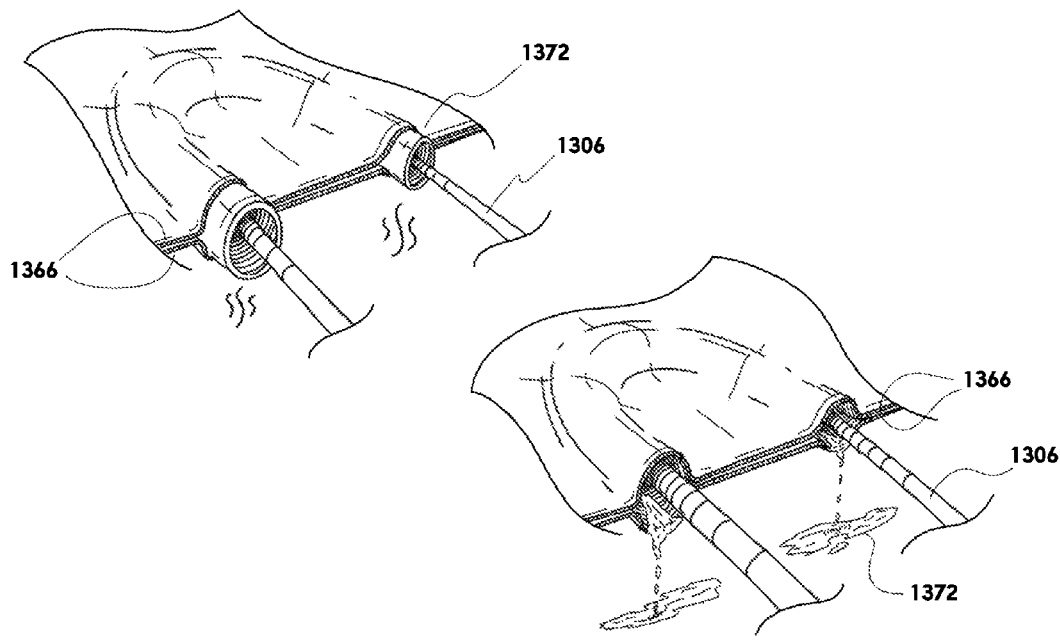
FIGS. 13D and 13E illustrate embodiments of removing a tube or lace guide after a shoe is fully or partially assembled.
Figure 13E:
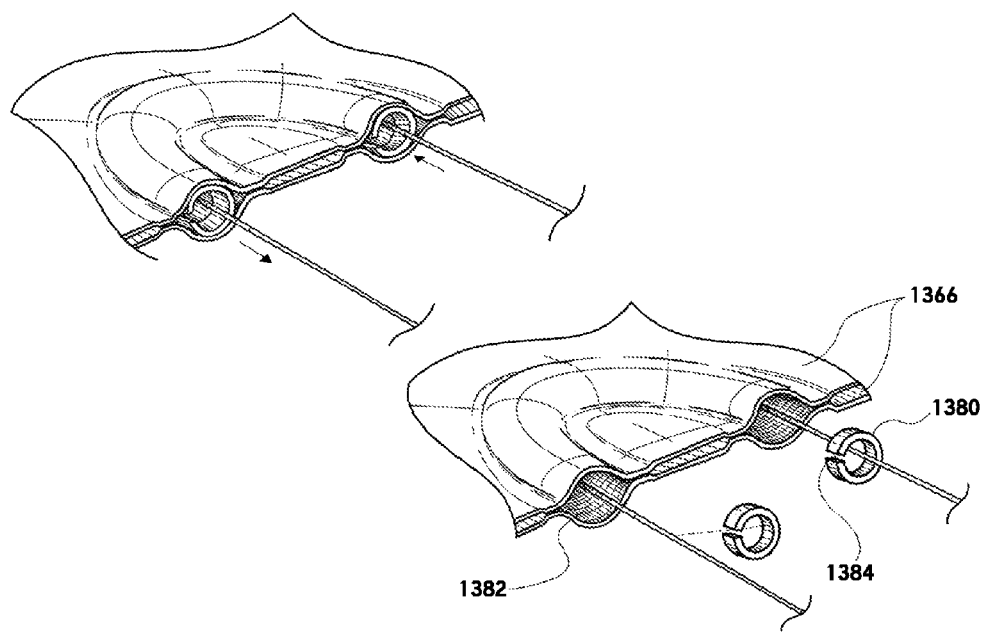

As shown in FIGS. 13D and 13E, in some embodiments it may be desirable to remove a tube or lace guide after the shoe is fully or partially assembled. Removal of the tube may be desired when the tube is merely used as an aid in inserting the lace 1306 within the lace guide. To remove the tube, the tube may be made of a breakable, dissolvable, or meltable material. The removable tube 1372 may be placed between two layers of material 1366 and secured in place, such as by any of the processes described herein (e.g., stitching, adhesive bonding, RF welding, and the like). The lace 1306 may be threaded through the removable tube 1372 in any manner, such as those previously described. Once the lace 1306 has been inserted through the tube 1372, the tube 1372 can be exposed to heat, a solvent, or a force that causes the tube 1372 to melt, dissolve, or break up, respectively.

In the case of heat exposure, a material for the tube 1372 may be selected that has a lower melting point than the lace 1306 and material 1366. In selecting a material for a breakable tube 1372, material for the tube 1372 may be selected that is less resistant to damage by force than the lace material. In some embodiments the tube 1372 could be broken down by exposure to sound waves or light radiation. As shown in FIG. 13E, in other embodiments the lace 1306 may be pushed through a tube or tube ends 1380 that are positioned between the material layers 1366 and/or at an opening 1382 of the material layers 1366. The tube or tube ends 1380 may then be removed from the opening 1380 of the material layers 1366 after the lace 1306 has been inserted through the guide formed by the coupled material layers 1366. The tube or tube ends 1380 may have an opening or slot 1384 that aids in removal of the tube or tube ends 1380 from the lace 1306.

Figure 14A:
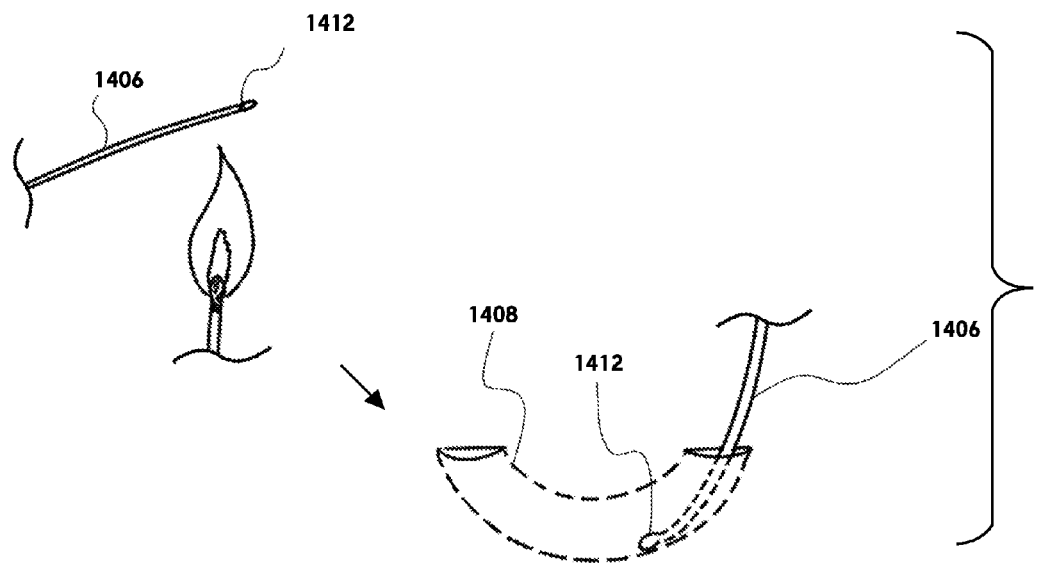
FIGS. 14A and 14B illustrate an embodiment for inserting lace within or through a lace guide.
Figure 14B:
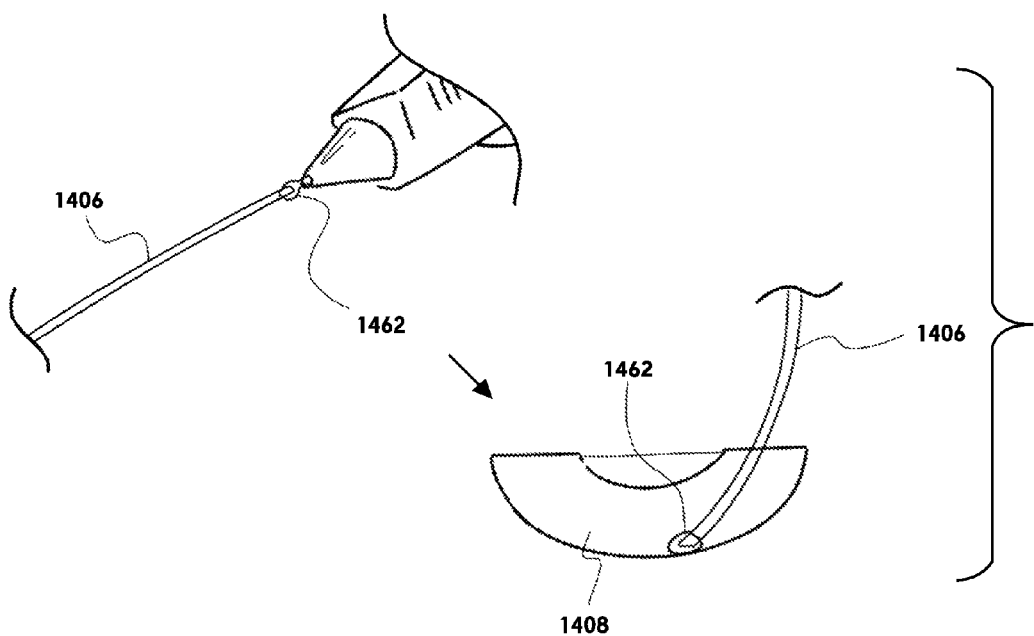

FIGS. 14A and 14B illustrate an embodiment for inserting lace within or through a lace guide. As shown in FIG. 14A, in one embodiment a distal end of a lace 1406 can be melted to form a ball 1412. The distal end of the lace 1406 and ball 1412 can then be pushed through a lace guide 1408. The ball 1412 aids in preventing the lace 1406 from snagging on any edges or material surfaces, especially in applications using stitched guides or folded material guides. Upon insertion through the guide, the end of the lace 1406 may be removed, such as by cutting the distal end. As shown in FIG. 14B, in another embodiment an adhesive, or other material, may be applied to the distal end of the lace 1406 to form a ball of adhesive 1462. For example, a hot adhesive 1462, such as hot glue, may be applied to the tip of the lace 1406 and allowed to set. After the adhesive 1462 has hardened, the lace 1406 can be pushed through the guide in the same manner as the melted ball 1412. After the lace 1406 is pushed through the guide, the adhesive 1462 can be peeled off of the lace 1406 or the distal end of the lace 1406 can be removed by cutting the distal end of the lace 1406.

Figure 15A:
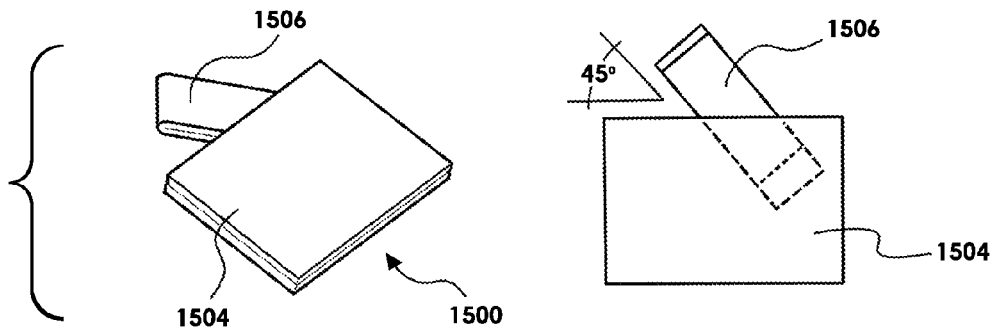
FIGS. 15A-U illustrate various guide panels that may be quickly and conveniently attached to a shoe or other article to create lace guides for a lacing system.
Figure 15B:
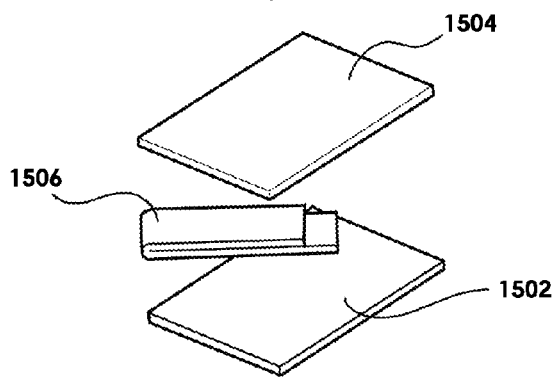
Figure 15C:
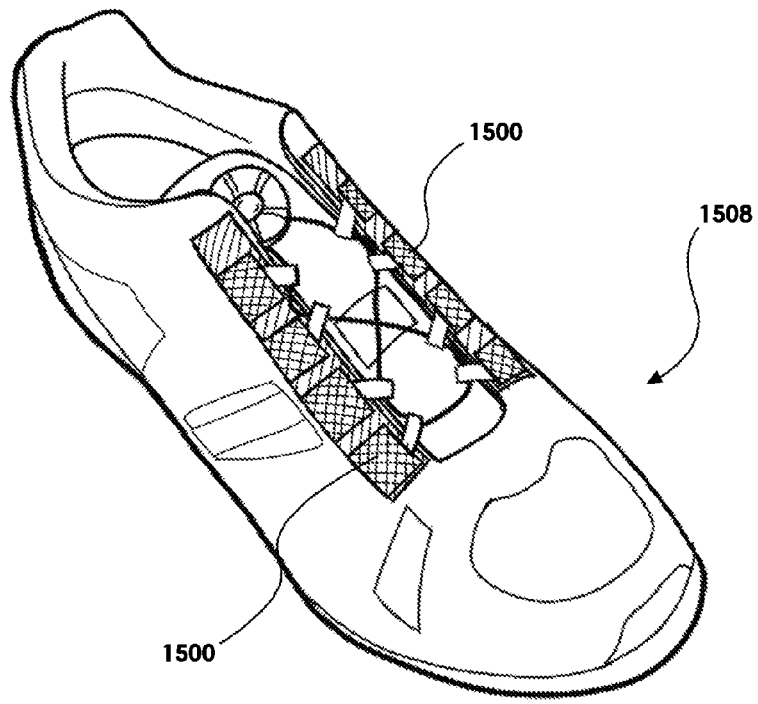
Figure 15D:
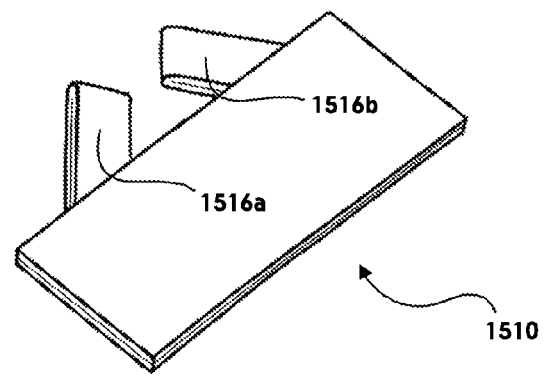
Figure 15E:
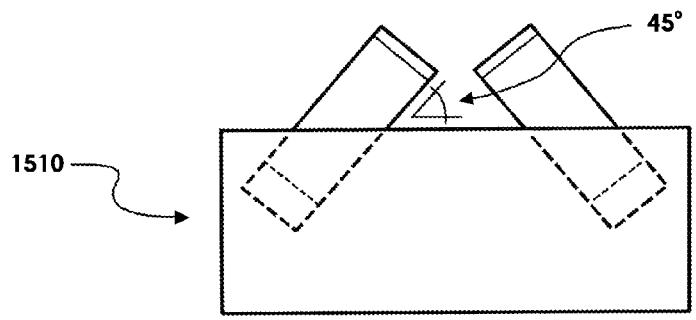
Figure 15F:
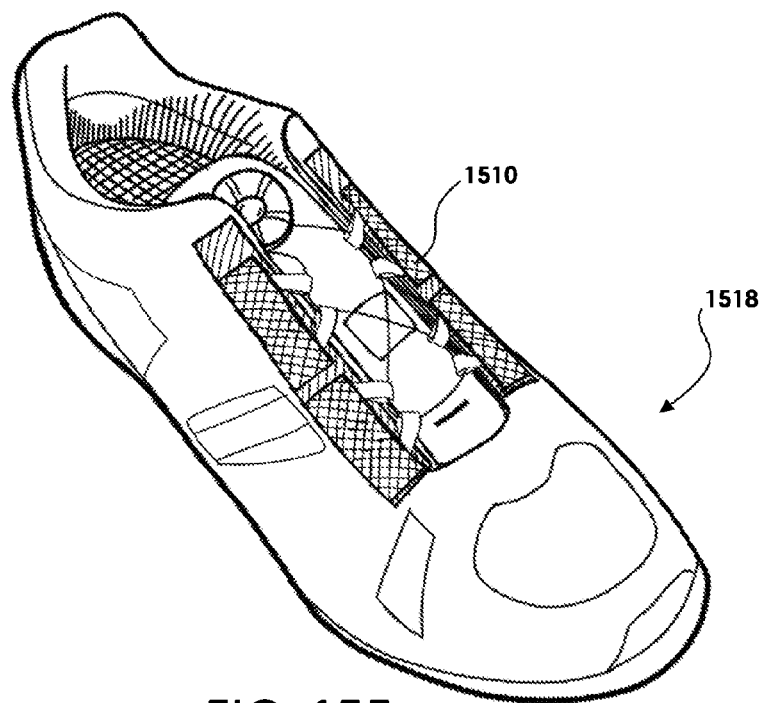
Figure 15G:
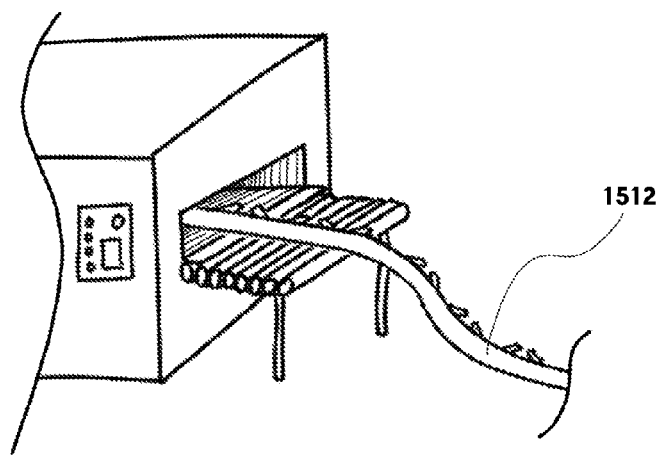
Figure 15H:
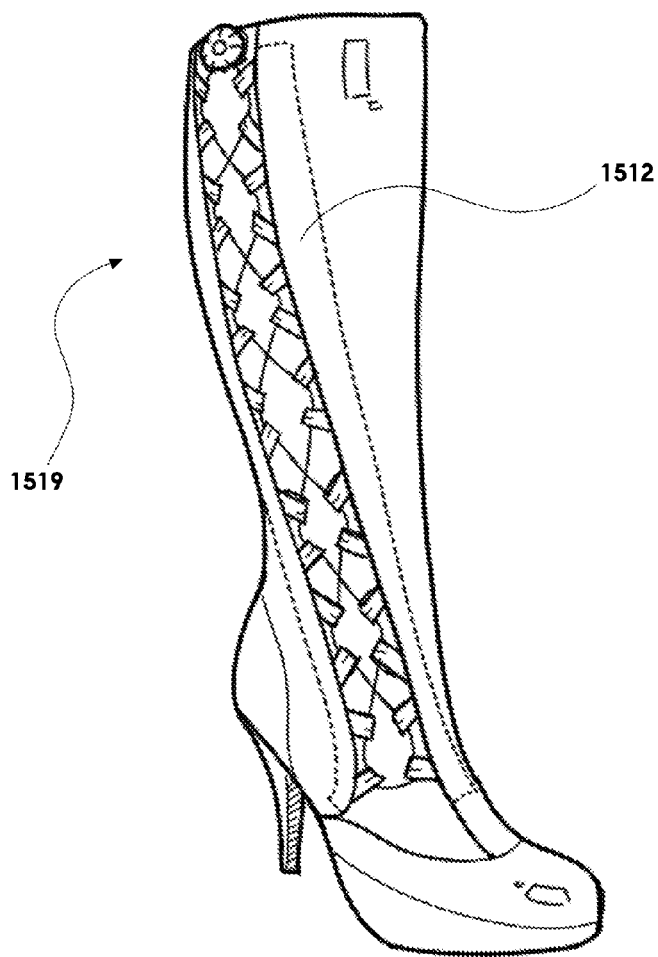
Figure 15I:
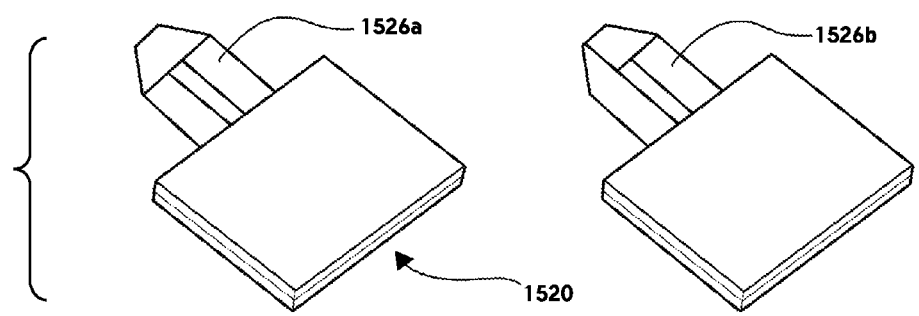
Figure 15J:
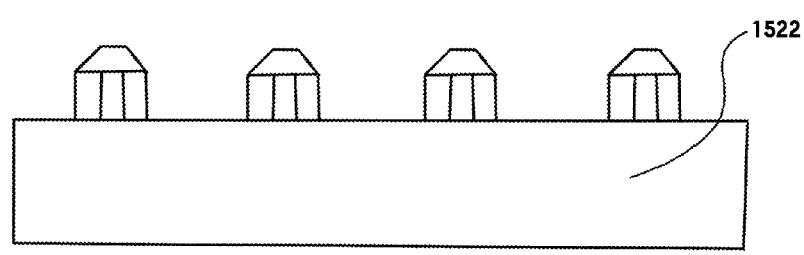
Figure 15K:
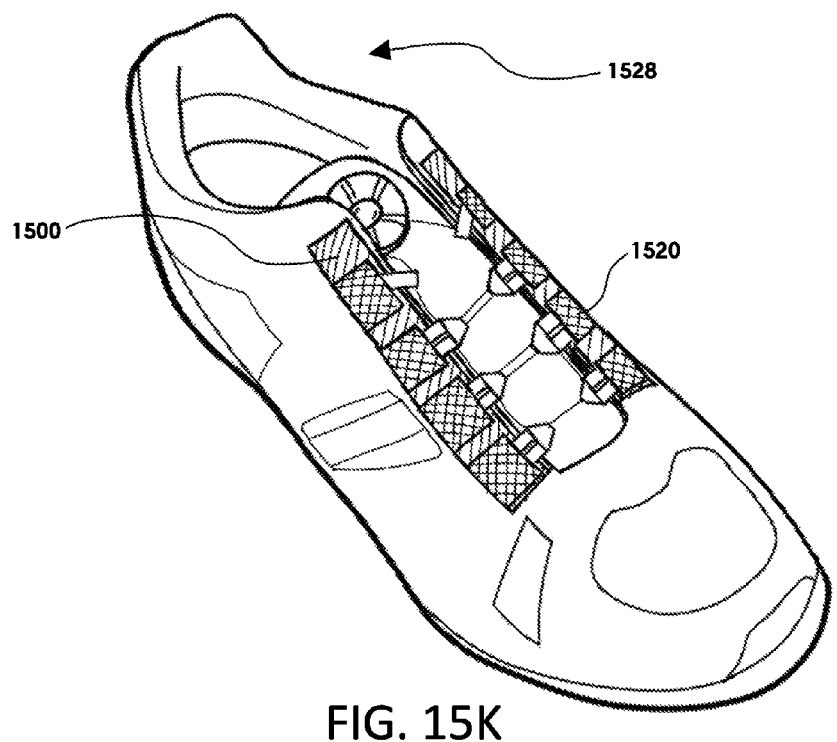
Figure 15L:
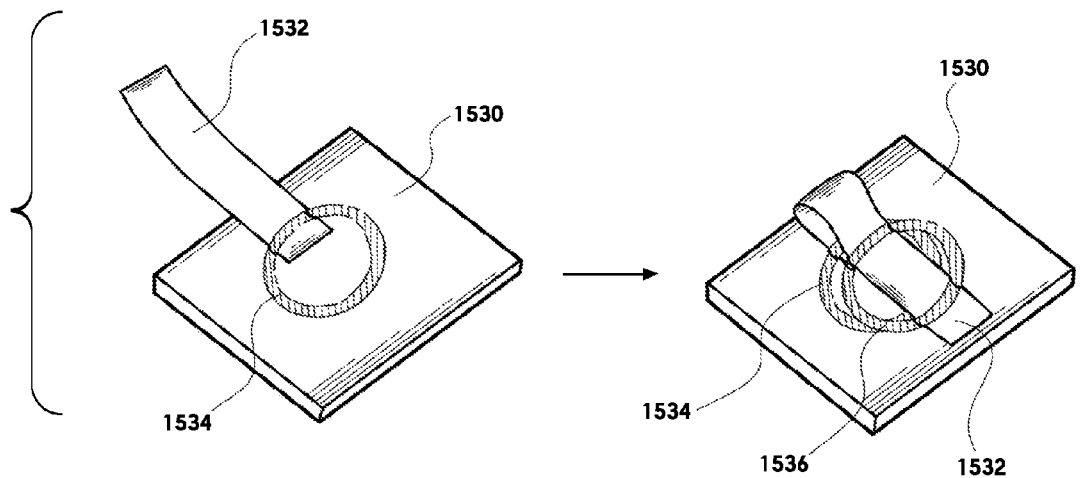
Figure 15M:
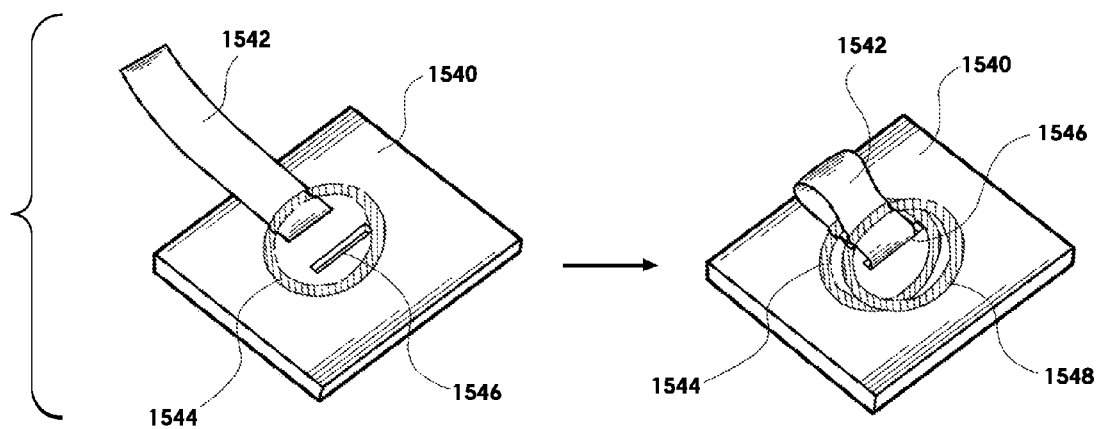
Figure 15N:
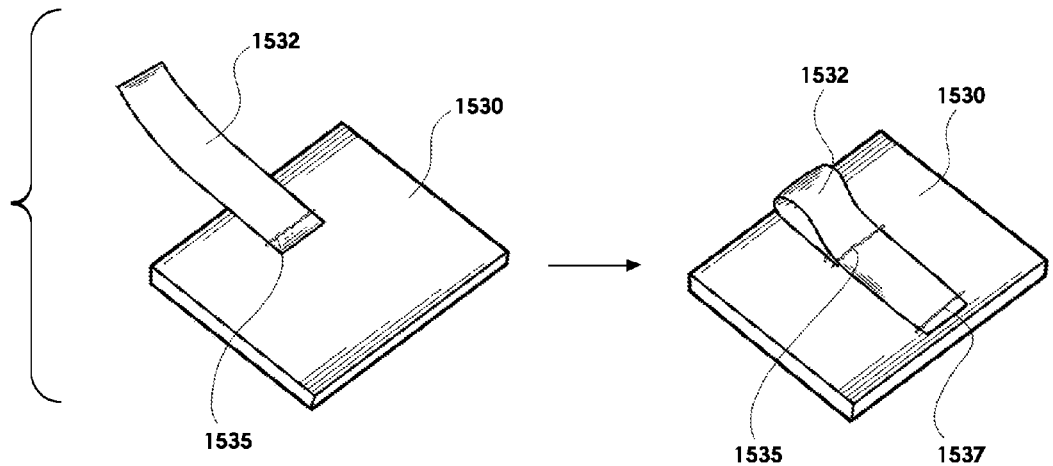
Figure 15O:
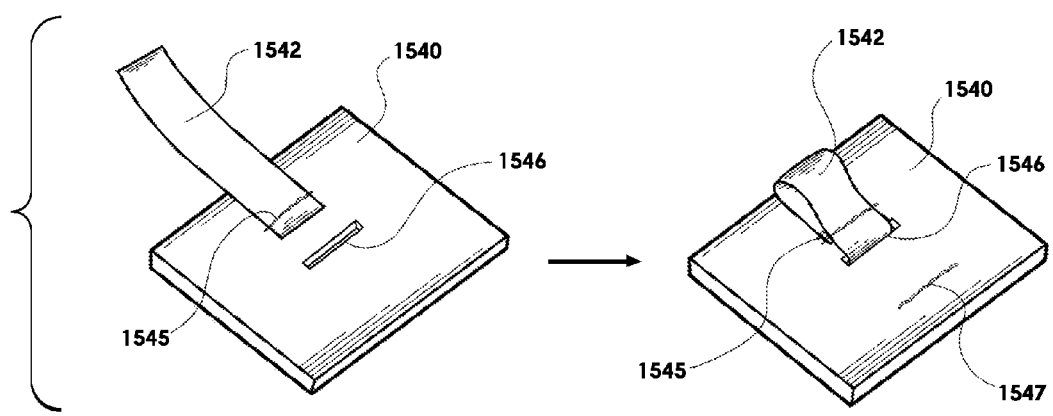
Figure 15P:
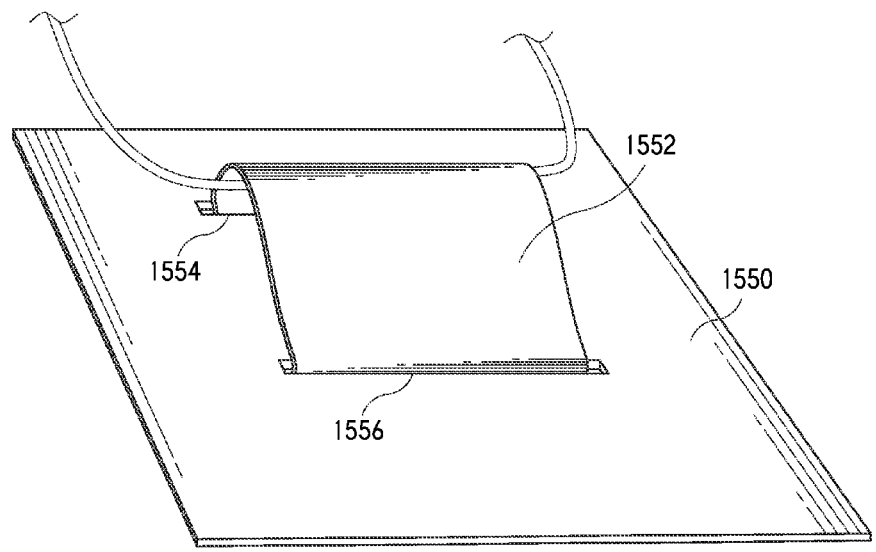
Figure 15Q:
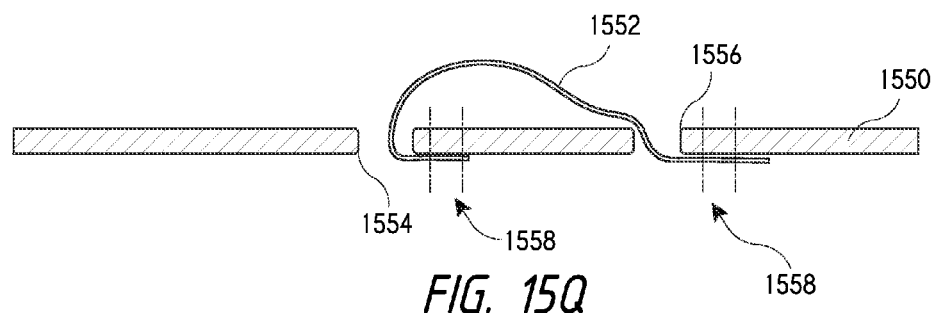
Figure 15R:
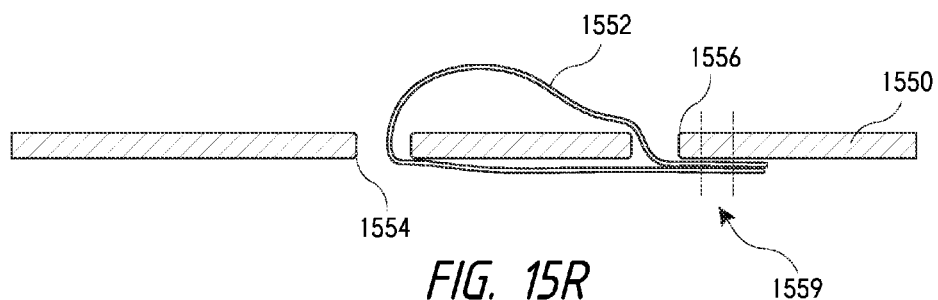
Figure 15S:
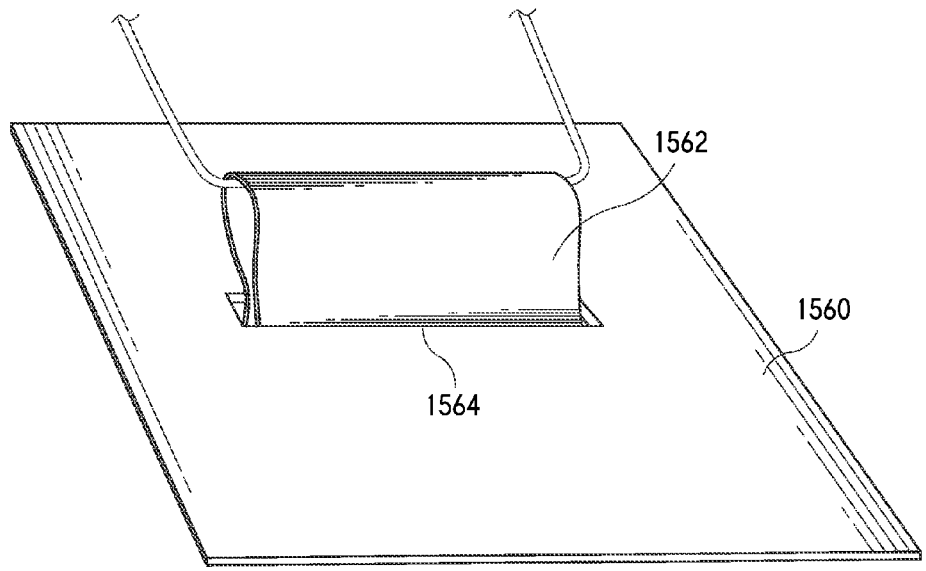
Figure 15T:
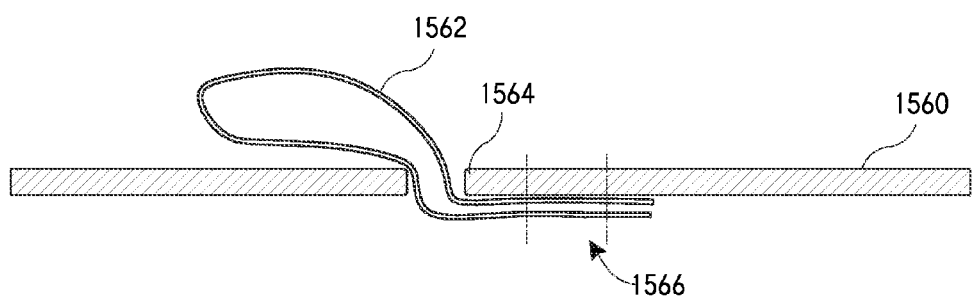
Figure 15U:
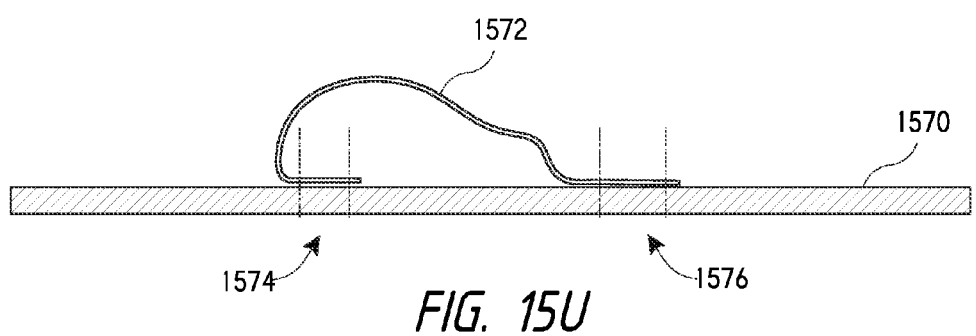

Referring now to FIGS. 15A-U, illustrated are various guide panels that may be quickly and conveniently attached to a shoe or other article to create lace guides for a lacing system. The guide panels are typically made of relatively soft fabric materials although virtually any other type of material may be used. For example, the guide panels may be made of hard or soft plastic, metal, rubber, or any combination of materials. FIGS. 15A-C illustrate a guide panel 1500 that includes a first panel material 1502 and a second panel material 1504. The first and second panel materials, 1502 and 1504, have roughly the same geometry and are typically made of the same material, although the material may be varied between the two panels. Disposed between the first panel material 1502 and second panel material 1504 is a strip of fabric 1506, which is folded back on itself to form a channel or slot between the fold. The first panel material 1502 is bonded or attached to the second panel material 1504 with the strip of fabric 1506 sandwiched therebetween. The first panel material 1502 and second panel material 1504 may be coupled together via adhesive bonding, stitching, heat welding, RF welding, and/or using any other coupling method known in the art. In some embodiments, heat welding or RF welding may reduce the overall thickness of the guide panel 1500 to less than the thickness, or roughly the same thickness, of the combined materials prior to welding. For example, the overall thickness of the guide panel 1500 may be roughly equivalent or less than the thickness of the folded strip of fabric 1506.

The strip of fabric 1506 may be oriented relative to the first panel material 1502 and second panel material 1504 as desired. For example the strip of material 1506 may be angled at roughly 45° relative to a top surface of the first panel material 1502 and second panel material 1504, or be configured to have any other angle desired. The lace of the lacing system may be inserted between the fold of fabric strip 1506 such that the folded fabric strip 1506 forms a lace guide for the lacing system. The resulting product is a guide panel 1500 that may be easily attached to the shoe 1508 or other product. For example, straight edges of the first panel material 1502 and/or second panel material 1504 may facilitate in aligning the guide panel 1500 with the shoe 1508 and/or other product, which may reduce the variation in the spacing and/or orientation of the guides about the shoe. Similarly, the edges of the first panel material 1502 and/or second panel material 1504 and or the thickness of the guide panel 1500 may be used to correctly space adjacent guide panels 1500 about a shoe 1508 or other product. The guide panels 1500 may be arranged about the shoe 1508, such as along the shoe's eyestay, and a single stitch of thread, or several thread strips, may be used to attach the guide panels 1500 to the shoe 1508. Alternatively, the guide panels may be adhesively bonded, heat or RF welded, and the like to the shoe 1508.

With the folded strip of fabric 1506 angled relative to the first and second panel materials, 1502 and 1504, the guide panels 1500 may be attached to the shoe 1508 or other product so that adjacent strips of fabric 1506 of adjacent guide panels 1500 face one another as illustrated in FIG. 15C. In this configuration, a pair of fabric strips 1506 function as a single lace guide in a path of the lace.

Referring now to FIGS. 15D-F, illustrated is another embodiment of a guide panel 1510 that may be quickly and conveniently coupled with a shoe 1518 or other product. Guide panel 1510 is similar to guide panel 1500 in that the guide panel 1510 includes a first panel material (not numbered) and a second panel material (not numbered) that are coupled together via adhesive bonding, stitching, heat or RF welding, and the like. Sandwiched or disposed between the first panel material and the second panel material is a first folded strip of fabric 1516a and a second folded strip of fabric 1516b. The first and second folded strips of fabric, 1516a and 1516b, are angled relative to the guide panel 1510 so as to face one another. In some embodiments the first folded strip of fabric 1516a may be angled at roughly 45° from the top surface of guide panel 1510 while the second folded strip of fabric 1516b is angled at roughly 135° from the top surface of guide panel 1510.

In this configuration, guide panel 1510 is the equivalent of two guide panels 1500 coupled together. As such, each guide panel 1510 may function as a single lace guide, thus eliminating the need for a pair of guide panels 1500 to be used for each lace guide. Guide panel 1510 may be easily coupled with the shoe 1518 or other product to provide any of the advantages previously described. As shown in FIG. 15G, in some embodiments the guide panel 1510 (or panel 1500) may be manufactured as one continuous strip of material 1512. Individual guide panels 1510, or even guide panel 1500, may then be cut from the single strip of material 1512. As shown in FIG. 15H, in some embodiments the single strip of material 1512 may be coupled with a product, such as a boot 1519 or other product, so as to form a single and continuous guide strip along the boot 1519 or other product.

Referring now to FIGS. 15I-K, illustrated is another embodiment of a guide panel 1520 that may be easily and conveniently coupled with a shoe 1528 or other product. Guide panel 1520 is similar to the guide panels previously described in that guide panel 1520 includes a first panel material (not numbered) and a second panel material (not numbered) that are coupled together via stitching, adhesive bonding, heat or RF welding, and the like. One of the differences between guide panel 1520 and the previously described guide panels, 1500 and 1510, is in the configuration of the fold of the fabric strip. As illustrated in FIG. 15I, in one embodiment a distal end of the fabric strip 1526a that extends from a main body of guide panel 1520 may be folded backwards to form a triangular shaped top. Each half of the triangular fold of the fabric strip 1526a may function as a lace guide in a lace guide pair. For example when coupled with shoe 1528, each fabric strip 1526a may guide or direct the lace toward a fabric strip 1526a of an adjacent guide panel 1520 so that the two fabric strips form a lace guide pair.

In another embodiment, the fabric strip 1526b may be folded so as to have a triangular fold at a distal end, but each end or leg of the fabric strip 1526b may be folded in opposite directions in forming the triangular fold. In this configuration the lace entering and exiting each half of the triangular fold would be positioned on opposite sides of a strip of material of the triangular fold. As shown in FIG. 15J, the panel 1520 may be manufactured as a single strip of material 1522 and individual guide panels 1520 could then be cut from the single strip of material 1522.

Referring now to FIGS. 15L-U, illustrated are various embodiment of forming lace guide panels that may be coupled with a shoe or other article to direct or route a lace or tension member about the shoe or other article. The panels described in FIGS. 15L-U may be used or coupled with a shoe or other article as described in FIGS. 27D-G and/or utilized for similar reasons. As shown in FIG. 15L, a first end of a material strip 1532 may be coupled with a panel 1530 via a first coupling 1534. The material strip 1532 may then be folded back on itself (i.e., toward panel 1530) to form a loop of the material strip 1532 and a second end of the material strip 1532 may be coupled with the panel 1530 via a second coupling 1536. The first and/or second coupling, 1534 and 1536, may be achieved via heat welding, RF or sonic welding, heat pressing, adhesive bonding, and the like. In the configuration shown in FIG. 15L, the material strip 1532 and loop formed therein are positioned on a single side of the panel 1530. The panel 1530 may be coupled with a shoe and the loop formed in the material strip 1532 may function as a lace guide by inserting a lace or tension member through the loop.

As shown in FIG. 15M, a first end of a material strip 1542 is coupled with a panel 1540 via a first coupling 1544. The material strip 1542 is then folded back on itself toward panel 1540 to form a loop in the material strip 1542. A second end of the material strip 1542 is then inserted through a slot of aperture 1546 of the panel 1540 and the second end is coupled on an opposite side of the panel via a second coupling 1548. In the configuration of FIG. 15M, the opposing ends of material strip 1542 (i.e., first and second ends) are positioned on opposite sides of the panel 1540. The panel 1540 may be coupled with a shoe and the loop formed in the material strip 1542 may function as a lace guide by inserting a lace or tension member through the loop. The loop formed from either material strip, 1532 and/or 1542, may extend beyond a distal edge of the respective panel or be disposed proximally thereof as desired.

FIG. 15N illustrates an embodiment similar to FIG. 15L except that the first and/or second coupling is achieved via stitching, 1535 and 1537 respectively. Similarly, FIG. 15O illustrates an embodiment similar to FIG. 15M except that the first and/or second coupling is achieved via stitching, 1545 and 1547 respectively.

FIGS. 15P-U illustrate various configuration of lace guide panels. In FIG. 15P opposing ends of a material strip 1552 are disposed under a material panel 1550 with a looped portion of the material strip 1552 extending above the panel 1550. Stated differently, the ends of the material strip 1552 and the loop formed by the material strip 1552 are positioned on opposite sides of the panel 1550. This configuration may be achieved by inserting a first end of the material strip 1552 within a first slot or aperture 1554 of the panel 1550 and inserting a second end of the material strip 1552 within a second slot or aperture 1556. As shown in FIG. 15Q, the opposing ends of the material strip 1552 may be coupled 1558 apart from one another and/or adjacent the respective slots/apertures, 1554 and 1556, or as shown in FIG. 15R, the opposing ends of the material strip 1552 may be coupled 1559 together and/or adjacent one another. Coupling the opposing ends as shown in FIG. 15R forms a complete loop in material strip 1552, but may focus a majority of the stress induced on material strip 1552 at the single coupling point 1559. Coupling the ends of material strip 1552 as shown in FIG. 15Q may distribute the induced stress about the panel 1550 without forming a complete loop in the material strip 1552.

FIGS. 15S and 15T, illustrate another embodiment wherein the opposing ends of a material strip 1562 are positioned on an opposite side of a panel 1560 from a loop formed in the material strip 1562. The embodiment of FIGS. 15S and 15T differs from that of FIGS. 15P-R in that the opposing ends of material strip 1562 are inserted through a single slot or aperture 1564 and coupled via one or more couplings 1566 to an undersurface of the panel 1560. FIG. 15U illustrates an embodiment in which a material strip 1572 is entirely positioned on a single side of a panel 1570 having a first end 1574 and second end 1576 coupled apart from one another. In other embodiments, the first end 1574 and second end 1576 of the material strip 1572 may be coupled together or adjacent one another. Similarly, in some embodiments the opposing ends of the material strip 1572 may be positioned on opposite sides of the panel 1570. The material strips of FIGS. 15P-U may be coupled with the panels via heat welding, RF or sonic welding, heat pressing, adhesive bonding, stitching, and the like.

In any of the embodiments of FIGS. 15A-U, the guide panels may be coupled with a shoe or other product as desired. For example, the guide panels may be stitched, adhesively bonded, heat or RF welded, and the like to the eyestay, or the guide panels may be positioned under the upper of the shoe, or elsewhere, as desired.

Figure 16A:
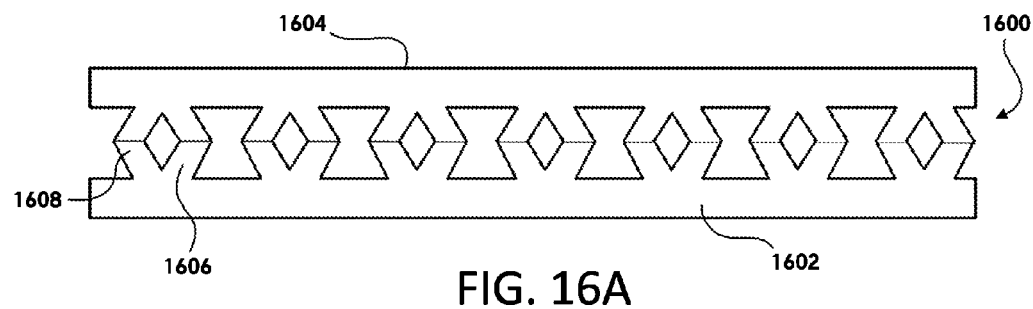
FIGS. 16A-D illustrate embodiments of die cut panels that may function as lace guides for a lacing system.
Figure 16B:
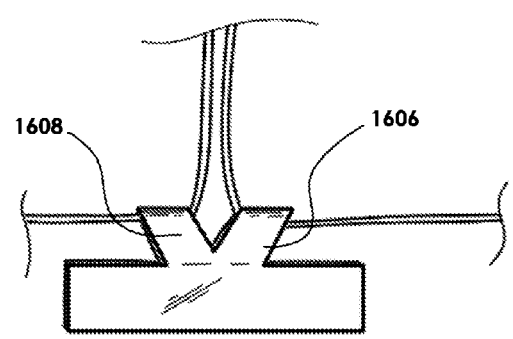

Referring now to FIGS. 16A and 16B, illustrated is another embodiment of the die cut panel 1600. Die cut panel 1600 includes a first longitudinal edge 1602 and a second longitudinal edge 1604 with a plurality of material strips, 1606 and 1608, extending laterally between the longitudinal edges. The material strips, 1606 and 1608, have a sawtooth like pattern with adjacent strips angled in opposite directions. To form the material strips, 1606 and 1608, and longitudinal edges, a plurality of hourglass and diamond shapes are cut into a main body of the die cut panel 1600 as shown in FIG. 16E. As with the previous die cut panels, die cut panel 1600 is folded in half a long a centerline so that the material strips, 1606 and 1608, form lace guides. Because the material strips, 1606 and 1608, are arranged in the sawtooth like pattern, the resulting lace guides, after folding of the die cut panel 1600, are angled relative to the longitudinal edges. For example, the material strips, 1606 and 1608, may be angled at roughly 45° from a top surface of the longitudinal edges and in opposite directions after folding of the die cut panel 1600. In such a configuration, adjacent material strips may function as a lace guide pair.

The folded die cut panel 1600 provides lace guides having a configuration similar to guide panels 1500 and/or 1510, but the folded die cut panel 1600 does not require coupling, welding, or bonding of material panels to form the lace guide. Since coupling of material panels is not required, die cut panel 1600 may provide several advantages over guide panels 1500 and/or 1510. For example, uncoupling of the material panels, such as due to fraying or breakage of stitch threads and the like, is typically not a concern since the die cut panels are formed of a single or very few material pieces. Further, since a pair of material strips, 1606 and 1608, function as the lace guide, the lace guide is less prone to buckling, which may occur when a relatively long single fabric lace guide is used. In some embodiments, the longitudinal ends, 1602 and 1604, may be coupled together after the die cut panel 1600 is folded. Individual guide panels may then be cut from the die cut panel 1600, or the die cut panel strip 1600 may be coupled and used with a shoe or other product.

Figure 16C:
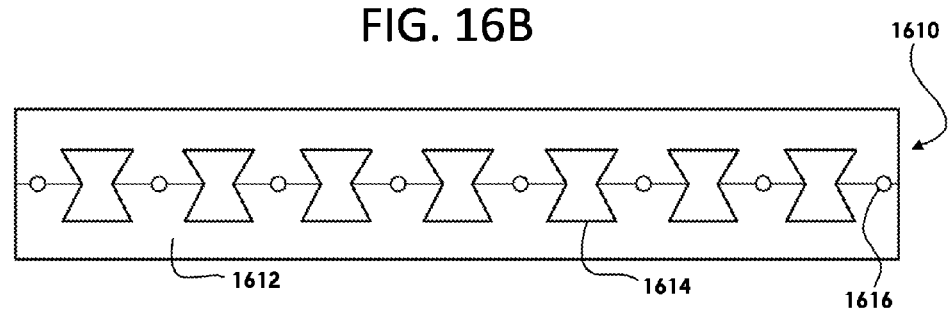
Figure 16D:
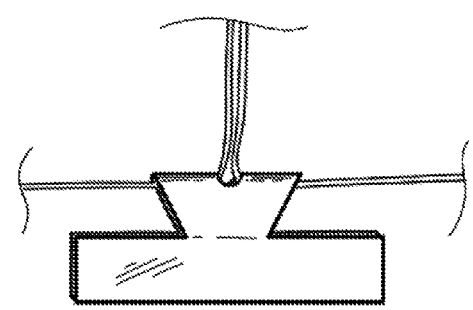
Figure 16E:
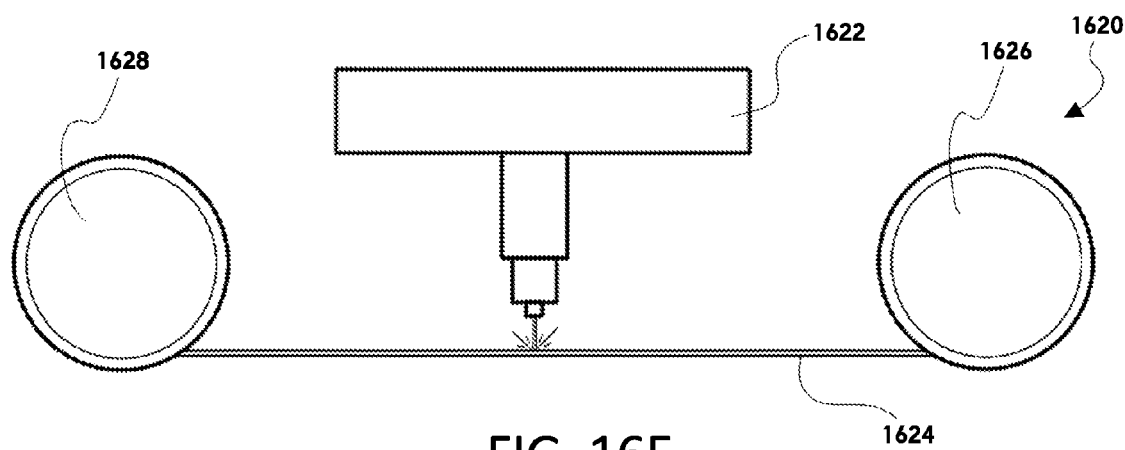
FIG. 16E illustrates a method of manufacturing a die cut panel.
Figure 17A:
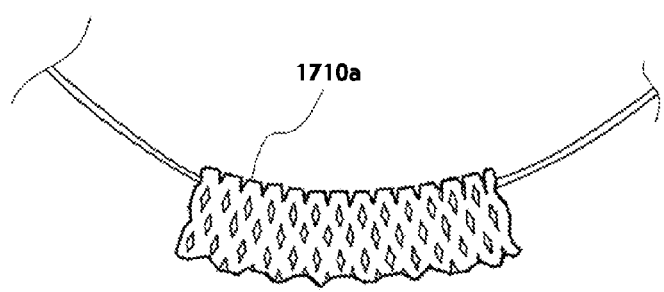
FIGS. 17A-D illustrate embodiments of mesh guides of a shoe that may be used as a guide for a lacing system's lace.
Figure 17B:
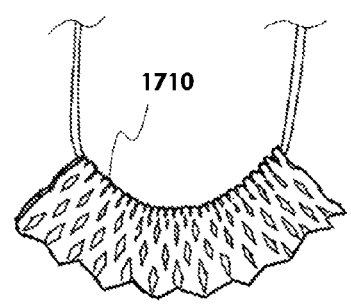
Figure 17C:
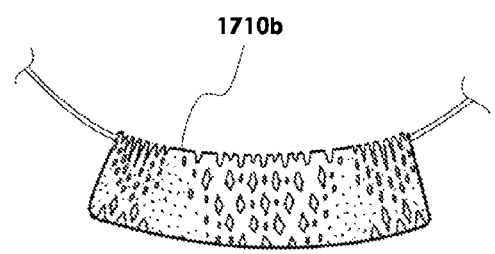
Figure 17D:
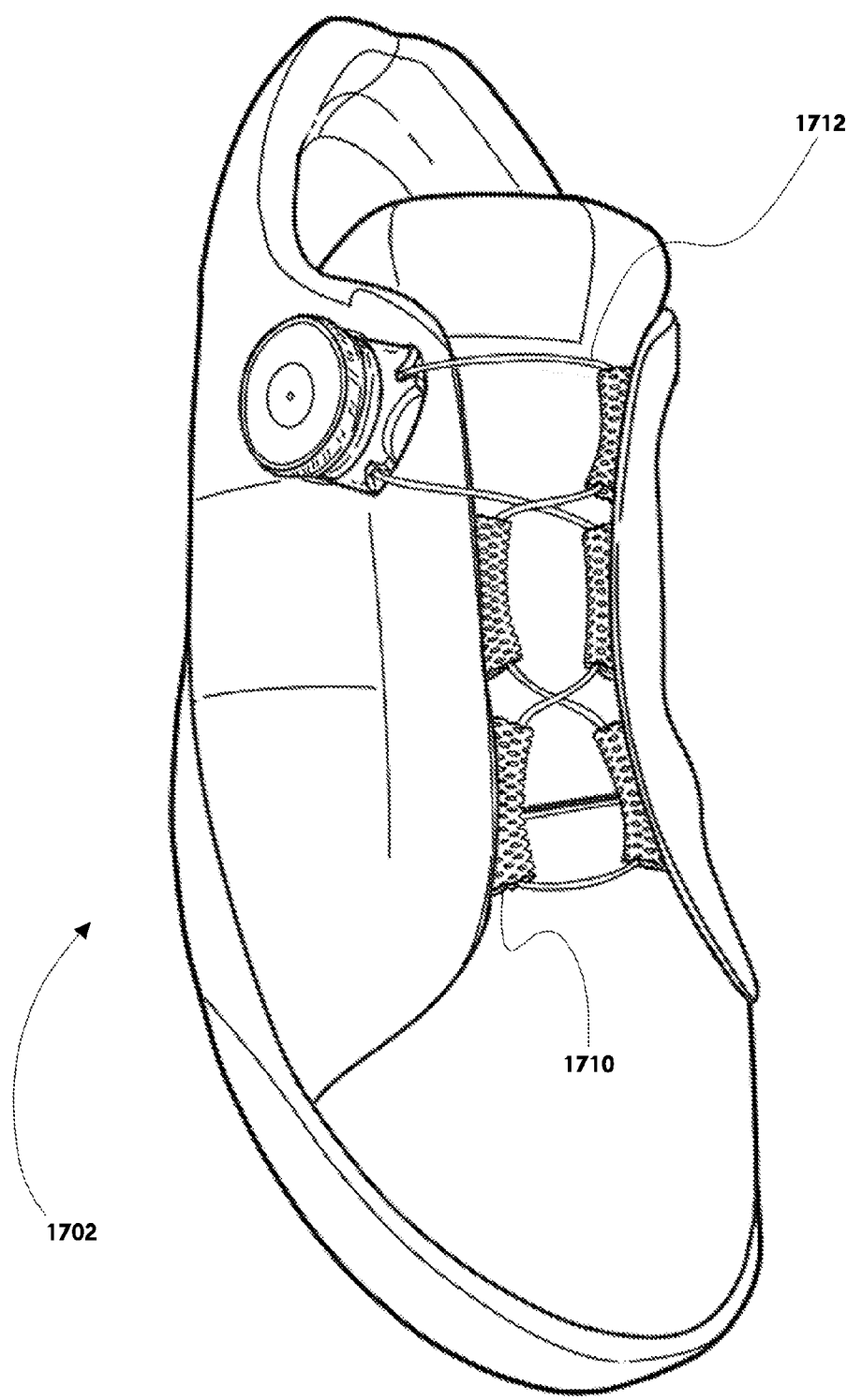

FIGS. 16C and 16D illustrate another embodiment of a die cut panel 1610. Die cut panel 1610 is similar to die cut panel 1600 in that die cut panel 1610 includes a main body 1612 having longitudinal ends and a plurality of material strips extending there between. Hour glass 1614 and circular 1616 geometries are cut into a central portion of the main body 1612 to form the longitudinal ends and material strips. The die cut panel 1610 may then be folded to form the lace guides as shown in FIG. 16D. The circular cut 1616 may allow smaller lace entrance/exits to be formed into die cut panel 1610.

As with some of the previously described embodiments, the edges of material strips of die cut panel 1600 and/or 1610 may flex upward as the lace is tensioned to provide a radius or smooth transition for the lace, thereby reducing lace and/or die cut panel wear. As briefly mentioned above, FIG. 16E illustrates a method 1620 of manufacturing the die cut panels. Specifically, a fabric/material strip 1624 may be rolled between a first roller 1628 and a second roller 1626. A cutting machine or device 1622 is positioned between the first and second rollers, 1628 and 1626, and above and/or below the fabric/material strip 1624. The cutting machine 1622 cuts or forms the above described geometries, or any other desired geometry, into the fabric/material strip 1624 to form the die cut panel. The cutting machine 1622 may be a laser cutter, water jet cutter, die or stamp cutter, and the like.

Referring now to FIGS. 17A-D, illustrated are embodiments in which a mesh guide 1710 of a shoe 1702 is used as a guide for the lacing system's lace 1712. The mesh 1710 may be woven into the eyestay of shoe 1702 or elsewhere relative to the shoe 1702. In other embodiments, a proximal end of the mesh guides 1710 may be attached to the shoe 1702 via stitching, adhesive bonding, heat or RF welding, and the like, or the proximal end of the mesh guides 1710 may be coupled with a component that is in turn coupled with the shoe 1702 (e.g., a fabric strip or panel).

In some embodiments, the entire upper of the shoe 1702 may be a woven material and the mesh guides 1710 may merely be end points of the weave. One advantage of the mesh guides 1710 is the ability of the mesh guides 1710 to deflect and bend under lace tension load. The ability of the mesh guides 1710 to deflect or bend in this manner allows the guides to conform to the lace 1712, thereby reducing lace wear and extending the life of the lace 1712, guides 1710, and/or shoe 1702. In some embodiments, the weave 1710a of the mesh guide may have a uniform pattern, which may provide a relatively even flex or bending of the guide. In other embodiments, the weave 1710b may be customized or varied to provide a desired appearance and/or performance of the mesh guide. For example, opposing ends of the mesh guide 1710b may have a more open weave pattern (i.e., greater spacing between threads) while a central portion has a more close or tight weave pattern (i.e., smaller thread spacing). Such a configuration may allow the opposing ends to flex more than the central portion under lace loads so as to provide a desired radius, transition, or bend for the lace. Various other weaver pattern configurations are possible to provide one or more desired properties and/or guide functions. In addition, the thread materials used for the mesh guides 1710 may be varied or customized to provide one or more desired properties or performances of the guides.

Figure 18A:
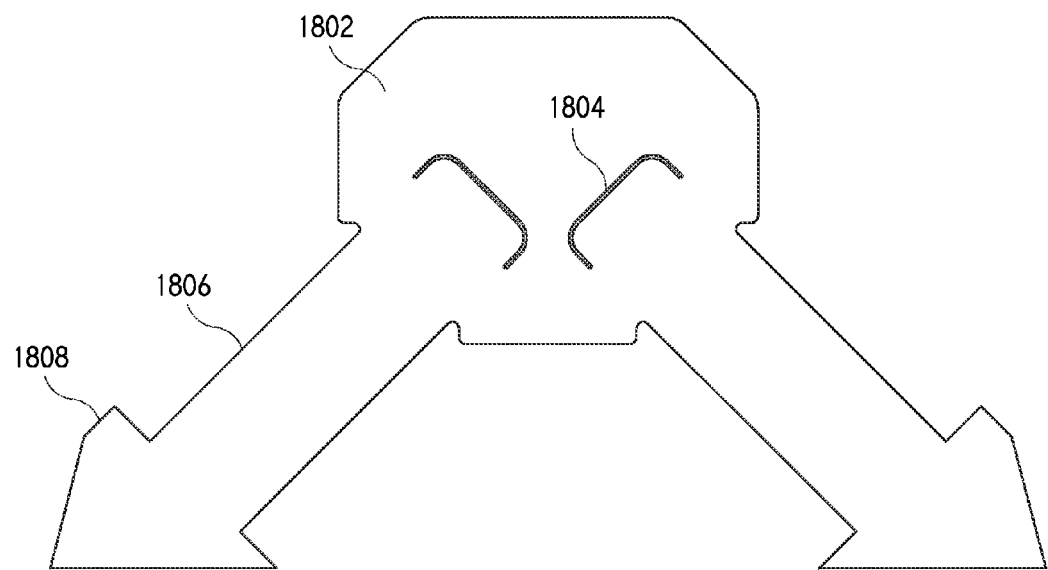
FIGS. 18A and 18B illustrate embodiments of components that may be coupled together and with a shoe to form guide members.
Figure 18B:
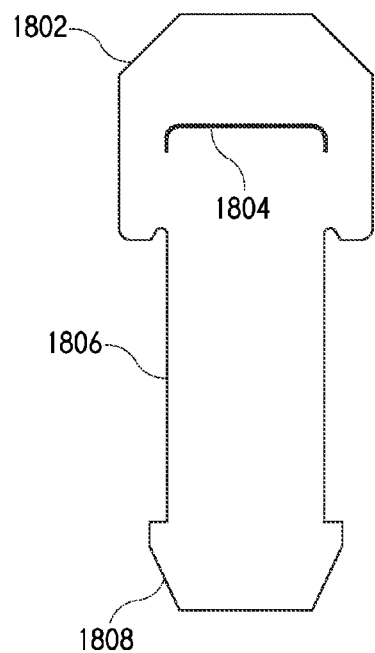
Figure 19:
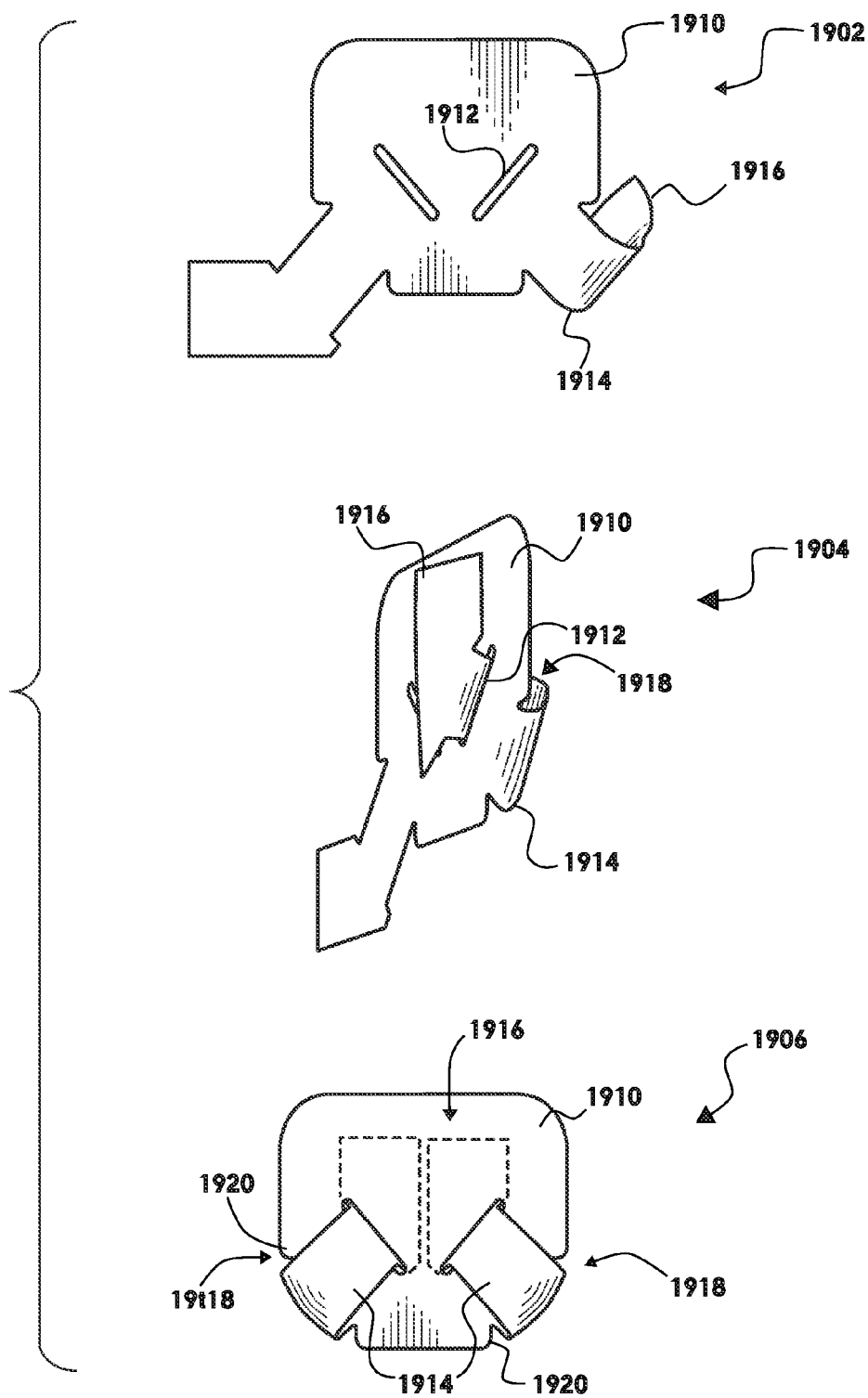
FIG. 19 illustrates a process of assembling a component to form one or more guide members.

Referring now to FIGS. 18A and 18B, illustrated are embodiments of components that may be coupled together and with a shoe to form guide members. As shown in FIG. 18A, in one embodiment the component includes a main body 1802 and a pair of arms 1806 that extend diagonally from the main body 1802. A distal end of each of the arms 1806 includes a flange 1808 that, in some embodiments, may have one or more apertures formed therein (not shown). The flanged end 1808 may have a pointed or triangular configuration oriented relative to main body 1802. The main body 1802 includes a slit or slot 1804 that is positioned roughly orthogonally to a respective arm 1806. The orthogonal orientation of the slit 1804 relative to the arm 1806 aids in insertion of the arm 1806 within the slit 1804. As illustrated in FIG. 19, the slit 1804 of main body 1802 allows the flanged end 1808 of an arm 1806 to be inserted and positioned through the main body 1802 in forming the guide member.

FIG. 18B illustrates a component similar to the component of FIG. 18A except that a single arm 1806 extends from the main body 1802. A trapezoidal shaped end 1808 is positioned at the distal end of arm 1806. The trapezoidal shaped end 1808 is insertable within a slit or slot of the main body 1802 to form a single lace guide. The component of FIGS. 18A and 18B is typically formed as a single piece, although in other embodiments the component may be formed of multiple pieces. In some embodiments, the component may be formed of a relatively soft fabric material that allows the component to be easily handled and adjusted. In other embodiments the component may include various other materials, such as a variety of plastics, rubbers, or combination of materials. In some embodiments, the component includes a thermoplastic elastomer layer (e.g., polyurethane (PU) coating) on one surface and an adhesive layer (e.g., hot melt) formed or applied atop the thermoplastic elastomer layer (hereinafter PU coating). The adhesive layer may aid in coupling the component together and/or to a shoe/article in forming the guide member. In other embodiments, the component may not include an adhesive layer and/or PU coating.

Referring now to FIG. 19, illustrated is a process of assembling component to form one or more guide members. As shown in step 1902, the flanged end 1916 of the component is bent or folded backward along arm 1914. As shown in step 1904, the flanged end 1916 is inserted through a respective slit 1912 of the main body 1910, which forms a looped end 1918 in the arm 1914. As shown in step 1906, the other arm 1914 may be inserted through the other slit 1912 so that the component forms two looped end portions 1918. As shown in step 1906, when the flanged ends 1916 are inserted through the respective slits 1912, the flanged ends 1916 are positioned on an opposite side of the main body 1910 from or relative to arms 1914, which forms the looped ends 1918. After the flanged ends 1916 are positioned through the slits 1912, the component may be coupled together via heat welding, ultrasonic welding, high-frequency welding, adhesive bonding, and the like. For example, when the component includes a hot melt layer, the component may be heated to melt the hot melt and thereby couple the component together and/or to a shoe or article. The PU coating of the component may function as a barrier to prevent the hot melt from seeping through the component (e.g., through the fabric material). If the flanged ends include apertures, the apertures (not shown) of the flanged ends 1916 may prevent or reduce the formation of non-adhered sections when the component is coupled with a shoe or other article. For example, the apertures may allow the main body 1910 to be directly coupled with the shoe or article rather than being coupled with a top surface of the flanged ends 1916. This configuration aids in and/or reinforces the coupling or attachment of the component with the shoe or article.

When assembled, the looped ends 1918 function as guides members to direct or route a tension member or lace about the shoe or article. For example, a lace or cord may be inserted or otherwise positioned through a loop 1918 so that upon tensioning of the lace or cord, the loop 1918 and arm 1914 slidably engage with the lace or cord and thereby direct the lace or cord along a path about the shoe or article.

Step 1906 is not performed in embodiments wherein only a single guide member or loop 1918 is formed, such as in instances where guide members are formed from a component as shown in FIG. 18B. The component may be coupled together so that an edge 1920 is formed adjacent and/or extends from where the arm 1914 contacts the main body 1910. The edges 1920 may aid in fixedly attaching the component with the shoe or article. For example, the edges 1920 reinforce the coupling of the component with the shoe or article by distributing any applied load away from the edge of the component, which may reduce the likelihood of the component peeling or pulling away from the shoe or article.

Figure 20A:
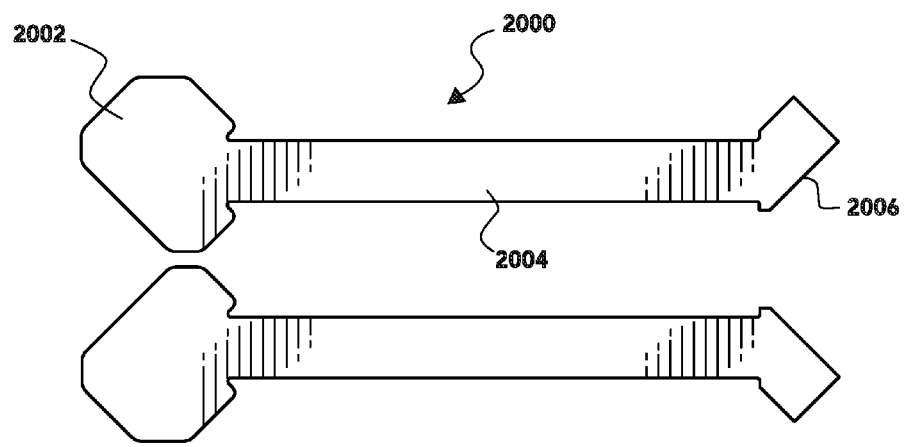
FIGS. 20A-21 illustrate other embodiments of components that may be used to form a guide member about a shoe or article.
Figure 20B:
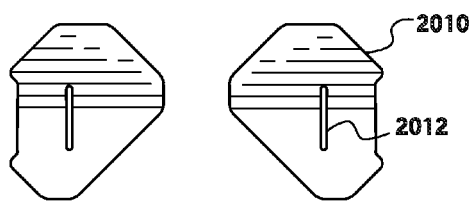
Figure 21:
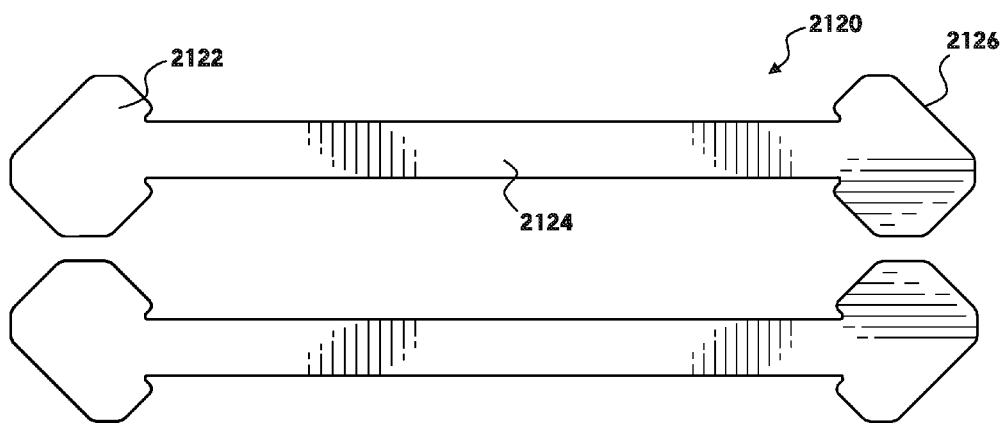

Referring now to FIGS. 20A-21, illustrated are other embodiments of components 2000 that may be used to form a guide member about a shoe or article. As shown in FIG. 20A, component 2000 may include a main body 2002 and arm 2004 that extends roughly diagonally from the main body 2002. A distal end of the arm 2004 includes a flanged end 2006 that may include one or more apertures in a body portion thereof. The arm 2004 of the component 2000 is elongated relative to the arm of the components previously described. In addition, the main body 2002 of the component 2000 does not include a slit or slot through which the flanged end 2006 of the arm 2004 is inserted. Rather, component 2000 includes a second main body 2010 having a slit or slot 2012 through which the flanged end 2006 is inserted. The use of the two components, 2002 and 2010, and the elongated arm 2004 allows the opposing ends of the elongate arm 2004 to be spaced apart and coupled with a shoe or article in a high and low configuration as shown in FIGS. 22 and 23 and further described in U.S. Patent Application No. 61/924,175, the entire disclosure of which is incorporated by reference herein.

As shown in FIG. 21, in some embodiments the component 2120 may include a first main body 2122 and a second main body 2126 that are positioned on opposite sides of the elongate arm 2124. In this configuration the component 2120 may be formed of a single piece of material rather than multiple pieces. The multiple pieces of component 2000 may be preferred when a hot melt layer is applied to the main body 2002 and/or second main body 2010 because the multiple pieces allows the hot melt material to be applied to a single side of a fabric material strip from which the main body 2002 and second main body 2010 are formed. Stated differently, the multiple pieces do not require the hot melt material to be applied to opposing sides of the material strip as a single piece component may require.

Figure 22:
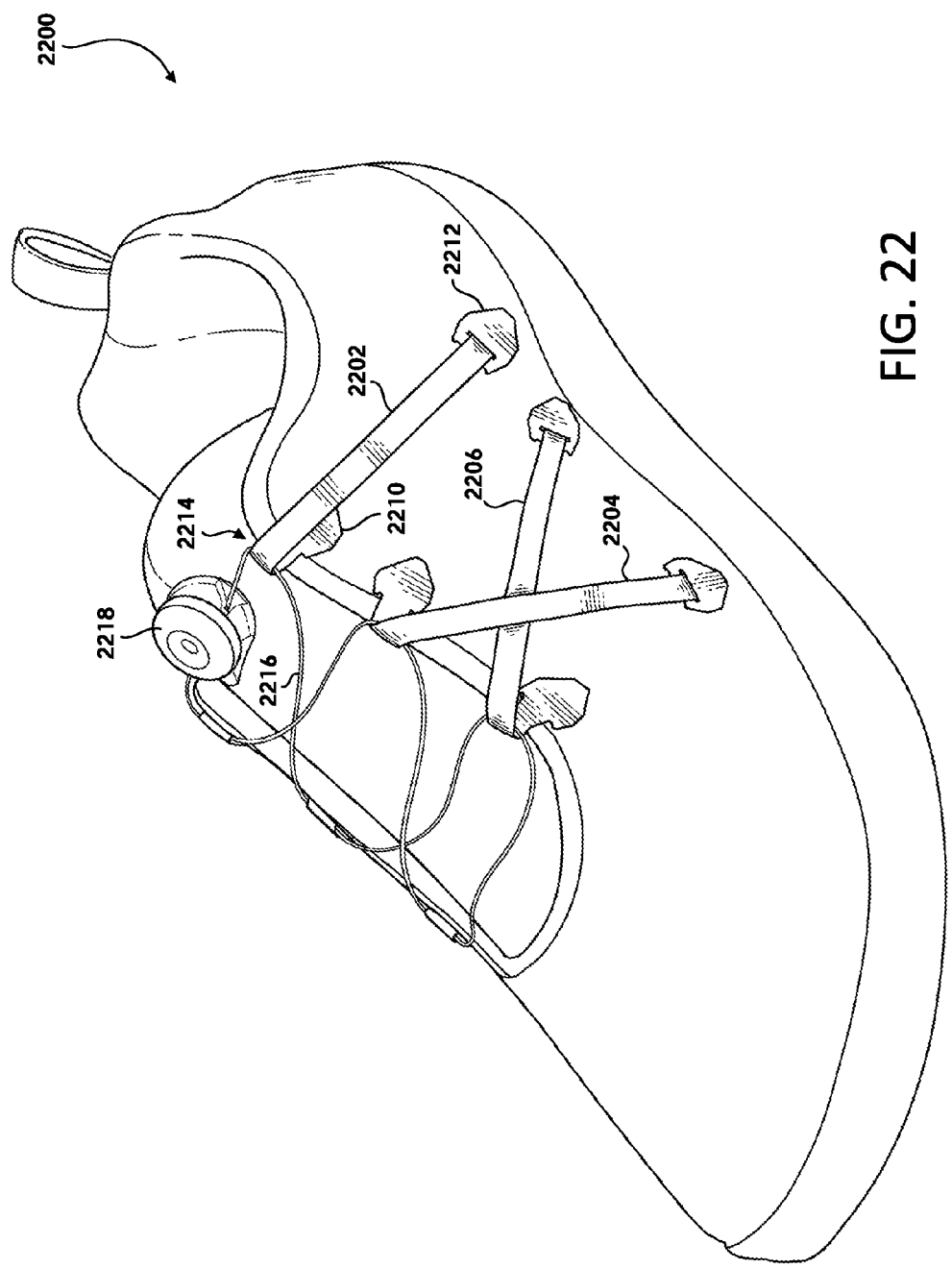
FIGS. 22 and 23 illustrate embodiments of coupling the components of FIGS. 20A-21 with a shoe.
Figure 23:
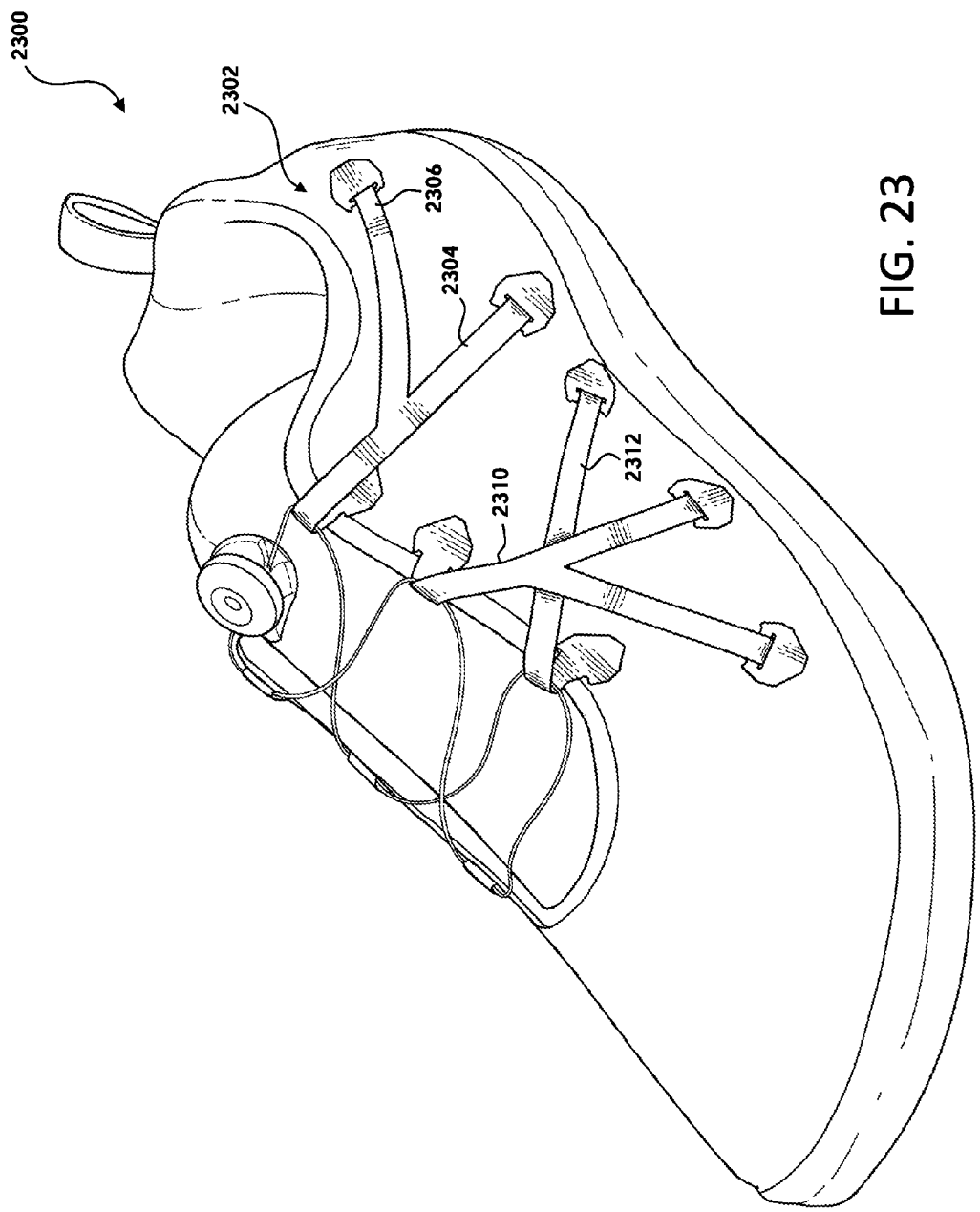

Referring now to FIGS. 22 and 23, illustrated are embodiments of coupling the components of FIGS. 20A-21 with a shoe. As shown in FIG. 22, a component is coupled with a shoe 2200 by positioning and coupling the main body 2210 of the component near the shoe's eyestay. The main body 2210 may be coupled with the shoe 2200 via heat welding, RF welding, adhesive bonding, and the like. The elongate arm 2202 is then bent or folded to form a looped end 2214 near the shoe's eyestay. The second main body 2212 is positioned about the shoe and the flanged end (not shown) of the elongate arm 2202 is inserted through a slit of the second main body 2212. The second main body 2212 is then fixedly attached to the shoe via heat welding, RF welding, adhesive bonding, and the like. As shown in FIG. 22, the second main body 2212 may be positioned and coupled about the shoe 2200 near the shoe's sole to form the high and low configuration described in the '175 application incorporated by reference herein. In some embodiments, the positioning of the main body 2210 and second main body 2212 about the shoe may be reversed.

A tension member 2216 (e.g., lace or cord) may then be inserted through the looped end 2214 and thereby guided or directed about the shoe 2200. Tensioning of the tension member 2216, such as via a reel based mechanism 2218, or other tensioning mechanism, may cause the component to pull or tighten the shoe near both the shoe's eyestay and sole. Tightening of the shoe in this manner may improve the fit and/or feel of the shoe about the foot by both pulling the shoe's tongue closed and simultaneously pulling or pressing the medial and/or lateral sides of the shoe more tightly against the user's foot. The result may be an increased wrap or fit of the shoe about the user's foot. In some embodiments, one or more components may be crisscrossed to reduce rotation of the shoe (e.g., arms 2204 and 2206), aid in pulling the shoe's heel and/or toe portion against the foot, and the like. In embodiments wherein a single component is used (e.g., component 2120 of FIG. 21), the opposing ends, 2122 and 2126, of the elongate arm 2124 may be positioned about the shoe 2200 and coupled therewith.

Referring now to FIG. 23, illustrated is another embodiment of coupling a component with a shoe 2300. Coupling of the component with the shoe 2300 is similar to the process described in FIG. 22, except that one or more of the components 2302 includes multiple elongate arms, 2304 and 2306, rather than a single elongate arm. The multiple elongate arms, 2304 and 2306, may distribute the tensioning or tightening force about the shoe as desired. For example, in one embodiment, an elongate arm 2306 may be positioned closer to the shoe's heel while another elongate arm 2304 is positioned closer to the shoe's sole so that upon tensioning of the components 2302, the shoe's heel and sole are pulled against the user's foot. A second component 2310 may be positioned toward the shoe's toe region to pull the toe region against the user's foot. In some embodiments, a third component 2312, that may or may not include multiple ends, may be crisscrossed with the second component 2310 as desired. Various other configurations of the components about the shoe are possible to achieve a desired fit and/or feel of the shoe about the user's foot.

One advantage of the guides or components described in FIGS. 18A-23 is that the lace guide may be formed essentially simultaneously as the shoe is formed. For example, the distal end of the arm may be folded back on itself and inserted through a slit or slot of a main body as previously described. The lace guide may then be positioned on an upper of the shoe, or between one or more layers of the shoe, and heat pressed, heat welded, RF or sonic welded, or the like as the shoe's upper and/or other layers is heat pressed, heat welded, RF or sonic welded, or the like. In this manner, the lace guide may be coupled together as one or more layers of the shoe are coupled together. Stated differently, the lace guide may be integrally formed with the shoe during the shoe manufacturing process. The integral forming of the lace guides with the shoe may aid in firmly bonding, coupling, or otherwise adhering the lace guide to the shoe.

Figure 24A:
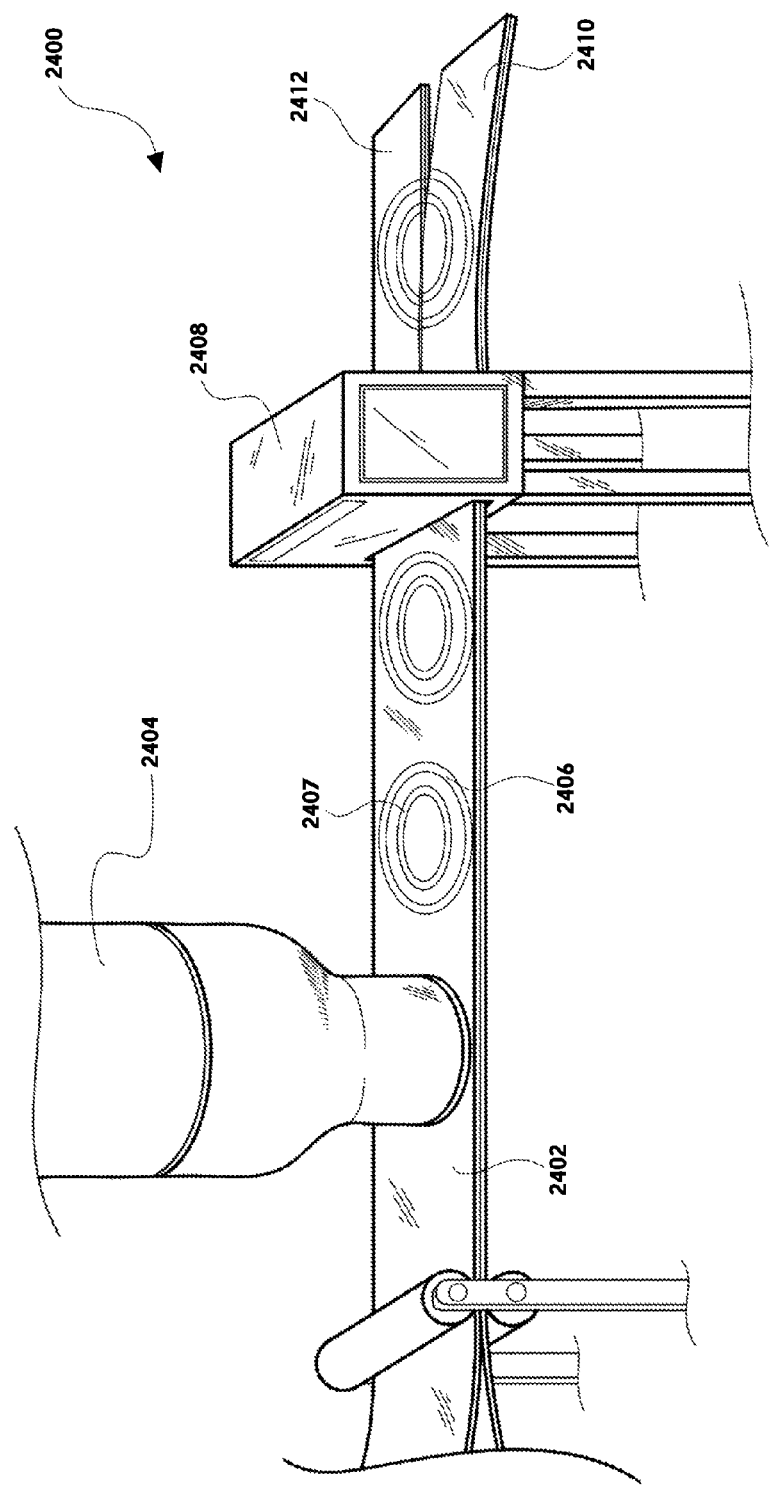
FIGS. 24A-31B illustrate various embodiments of other lace guides and/or methods of forming the lace guides.
Figure 24B:
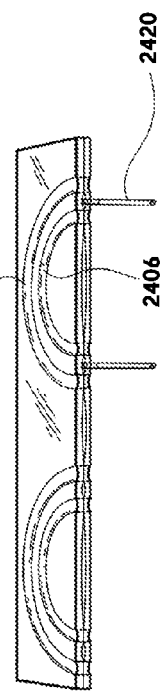

FIGS. 24A-31B illustrate various other lace guides and/or methods of forming lace guides. FIGS. 24A and 24B illustrate a method 2400 of forming lace guides from a strip of material layers 2402. The weld horn 2404 (e.g., sonic or RF weld, heat weld, and the like) may contact the strip of material layers 2402 to couple the material layers along a inner ring 2407 and an outer ring 2406. A central portion between the inner and outer rings, 2407 and 2406, remains uncoupled so that upon cutting of the strip of material layers 2402, the material between the inner and outer rings, 2407 and 2406, forms a lumen for a lace guide as shown in FIG. 24B and described herein above. A cutter device 2408 may be used to separate the strip of material layers 2402 into a first strip 2410 and second strip 2412 that may have a mirror configuration.

Figure 25A:
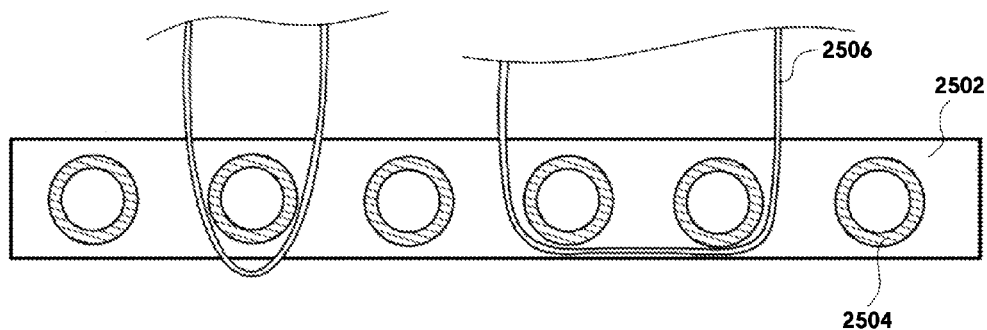
Figure 25B:
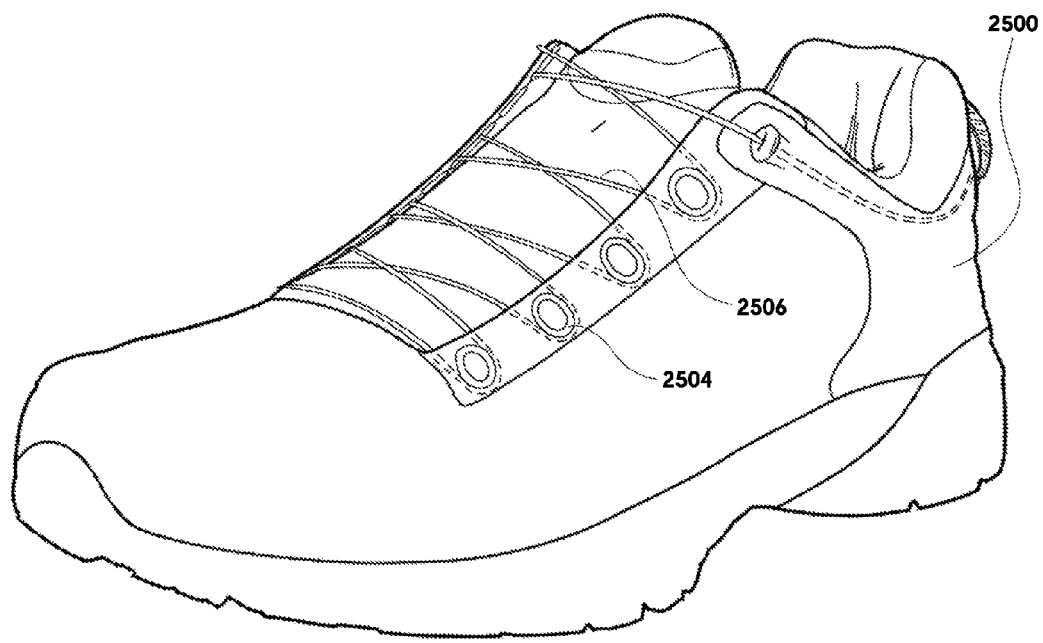

FIGS. 25A and 25B illustrate a strip of material 2502 having a plurality of rings 2504 that function as lace guides. The rings 2504 may be formed by coupling strip of material layers together, such as by using a weld machine illustrated in FIG. 24A. The weld or bonding of the rings 2504 is formed to be a solid bonding layer rather than a first and second ring as described in FIG. 24A. A lace 2506 may be inserted between the material layers and positioned around one or more of the rings 2504 to direct and route the lace 2506 about a shoe 2500 as shown in FIG. 25B. The rings 2504 allow the lace path to be customized by winding the lace 2506 around one or more rings as desired as shown in FIG. 25A. In some embodiments, the rings 2504 and/or lace guide strip 2502 may be formed during the manufacturing of the shoe 2500.

Figure 26A:
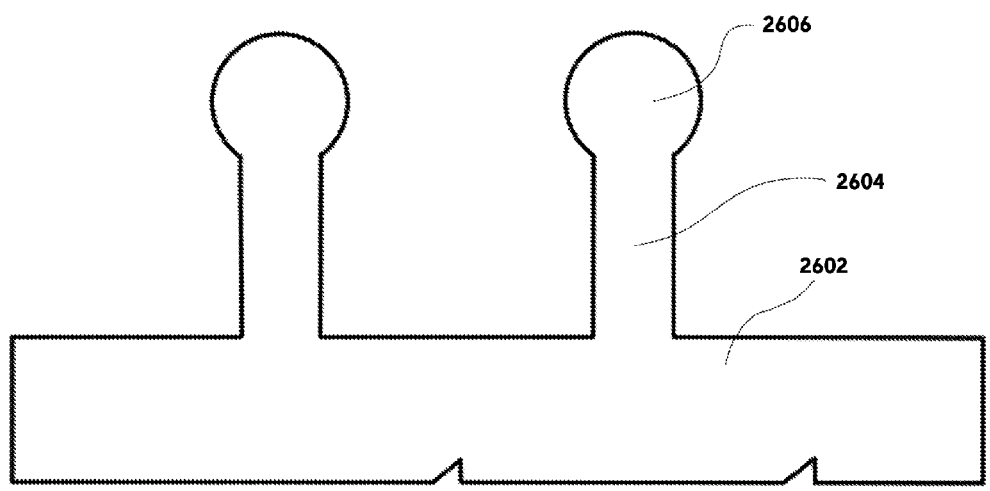
Figure 26B:
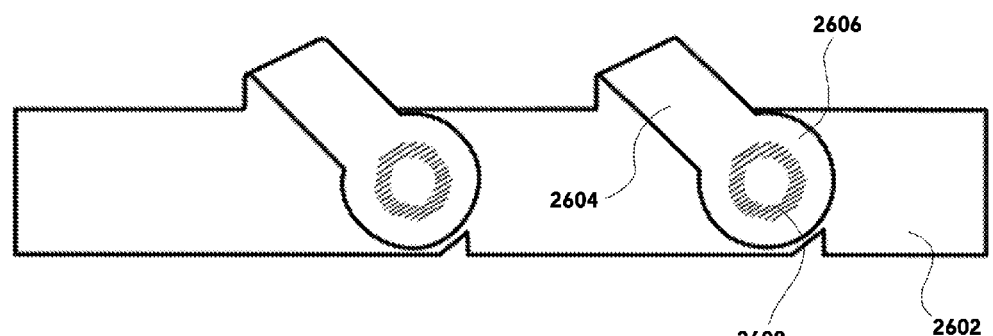
Figure 26C:
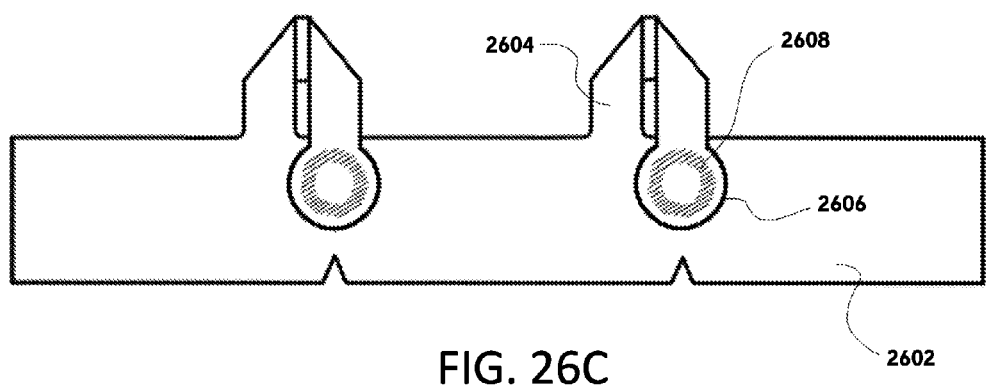
Figure 26D:
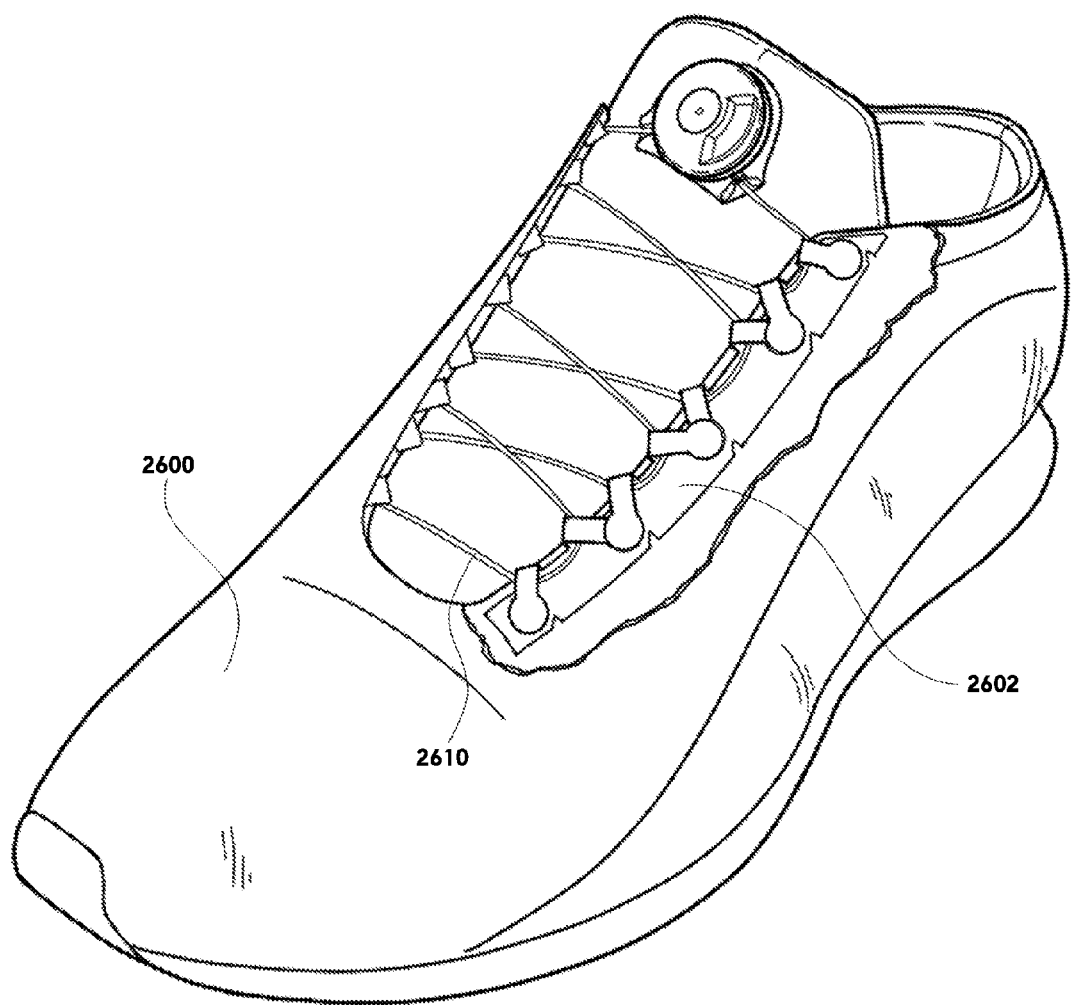

Referring now to FIGS. 26A-D, illustrated is another embodiment of forming a strip of lace guides. To form the lace guides, a strip of material 2602 is provided having a plurality of arms or members 2604 that extend laterally from an edge of the strip of material 2602. A distal end 2606 of the arms 2604 may be enlarged to facilitate in coupling the arms with the strip of material 2602. The arms are folded backward toward the strip of material 2602 and the distal end 2606 of the arms 2604 is coupled 2608 with the strip of material 2602 via heat welding, RF or sonic welding, heat pressing, adhesive bonding, and the like. The folded arms 2604 from loops through which lace 2610 may be inserted to guide or direct the lace 2610 about a lace path of a shoe 2500. As shown in FIG. 26B, the arms 2604 may be folded to have an angled configuration (e.g., 45 degrees). In this configuration, a pair of arms may be used to guide or direct the lace as shown in FIG. 26D. As shown in FIG. 26C, in other embodiments the arms 2604 may be folded two or more times to provide a triangular lace guide configuration. The lace guide strip 2602 may be coupled near an eyestay of the shoe 2500, or elsewhere, and positioned under one or more layers of the upper so as to be hidden from view.

Figure 27A:
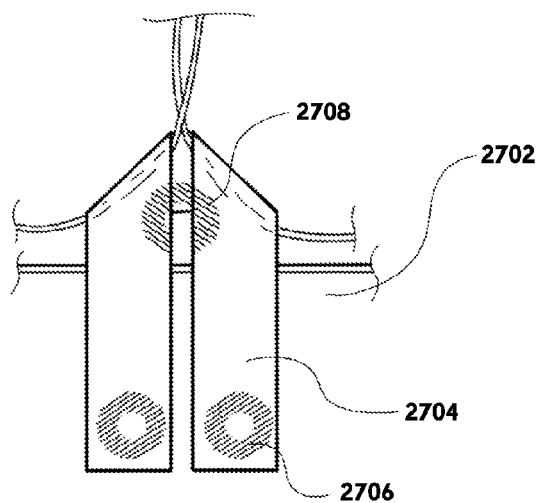
Figure 27B:
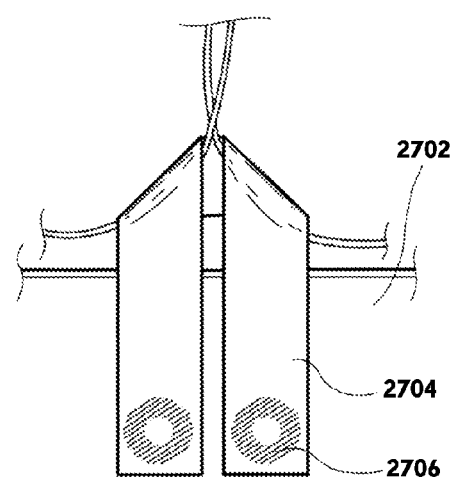
Figure 27C:
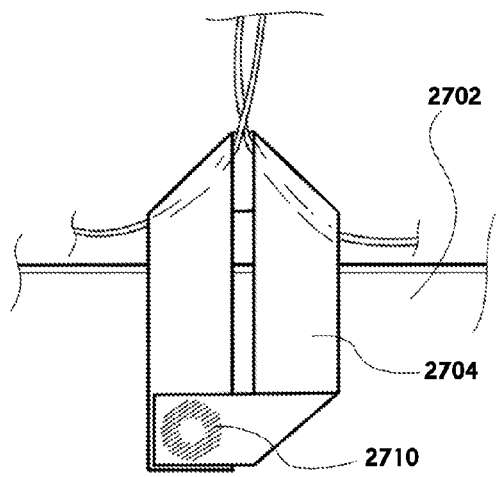
Figure 27D:
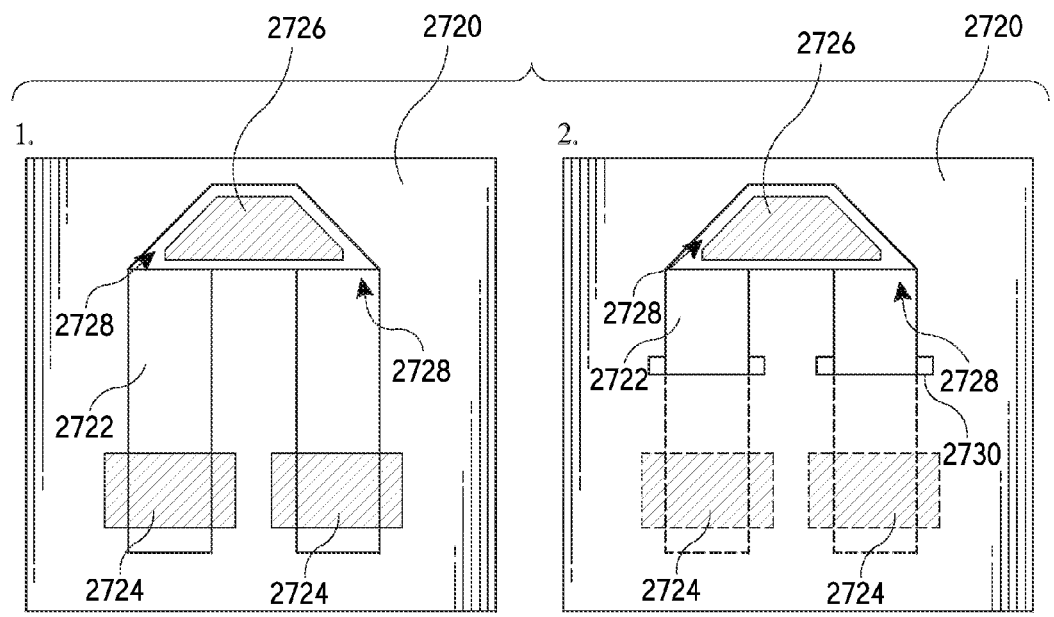
Figure 27E:
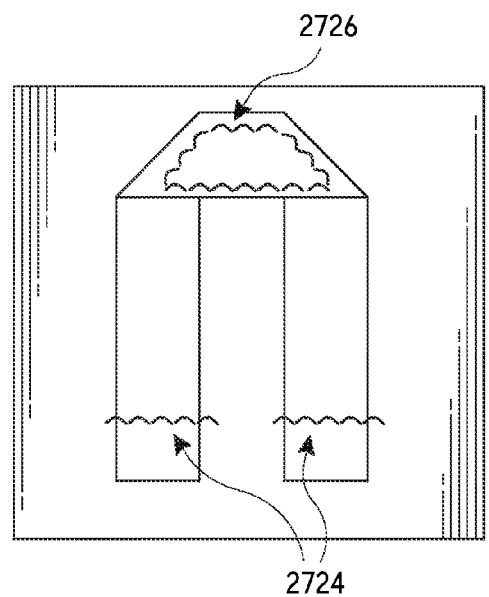

Referring now to FIGS. 27A-G, illustrated are embodiments of forming triangular shaped lace guides. FIGS. 27A-C illustrate that a strip of material 2704, such as a fabric material, may be positioned on a surface of another material 2702, such as the inner surface of a shoe, and coupled therewith to form a triangular shaped lace guide. Specifically, the material strip 2704 maybe folded two or more times to form the triangular shaped lace guide and opposing ends of the material strip 2704 may be coupled 2706 with the additional material 2702. Coupling of the material strip 2704 and additional material 2702 may be achieved via heat welding, RF or sonic welding, heat pressing, adhesive bonding, stitching, and the like. As shown in FIG. 27A, in some embodiments, the triangular shaped distal end of the guide may likewise be bonded or coupled 2708 to hold the material together. As shown in FIG. 27B, in other embodiments the triangular shaped distal end may not be bonded or coupled together. As shown in FIG. 27C, in some embodiments a single bond or coupling 2710 may be used to couple the opposing ends of the material strip 2704 together.

referring now to FIGS. 27D and 27E, illustrated is a lace guide panel 2720 that may be formed with a triangular shaped lace guide. In forming the panel 2720, a material strip 2722 may be folded two or more times, typically using opposite folds, to form a triangular shaped distal end that functions to guide a tension member or lace. Opposing ends of the material strip 2722 are then coupled 2724 with the body of the panel 2720 to attach the material strip 2722 with the panel 2720. The opposing ends of the material strip 2722 may be coupled via heat welding, RF or sonic welding, adhesive bonding, and the like. In some embodiments, the triangular shaped distal end may similarly be coupled 2725 together and/or with the panel 2720. Coupling of the triangular shaped distal end in this manner may hold the material together and/or reduce a thickness or profile of the panel 2720. To further reduce the thickness of the panel 2720, material strip 2722 is often made of a single material layer, although multiple material layers may be used.

The triangular shaped distal end is coupled together 2726 so that the opposing sides of the distal end remain uncoupled and form channels 2728 through which the lace or tension member is inserted. When coupled with the panel 2720, the material strip 2722 may be positioned on one side of the panel 2720 as shown in image 1 of FIG. 27D, or the material strip 2722 may be positioned so as to extend from one side of the panel 2720 to the opposite side of the panel 2720 as shown in image 2 of FIG. 27D. The material strip 2722 may be positioned on opposite sides of the panel 2720 by inserting the opposing ends of the material strip 2722 within slots 2730 formed in the panel 2720. FIG. 27E illustrates that in some embodiments, the coupling of the opposing ends 2724 and/or the coupling of the triangular shaped distal end 2726 may be achieved via stitching.

Figure 27F:
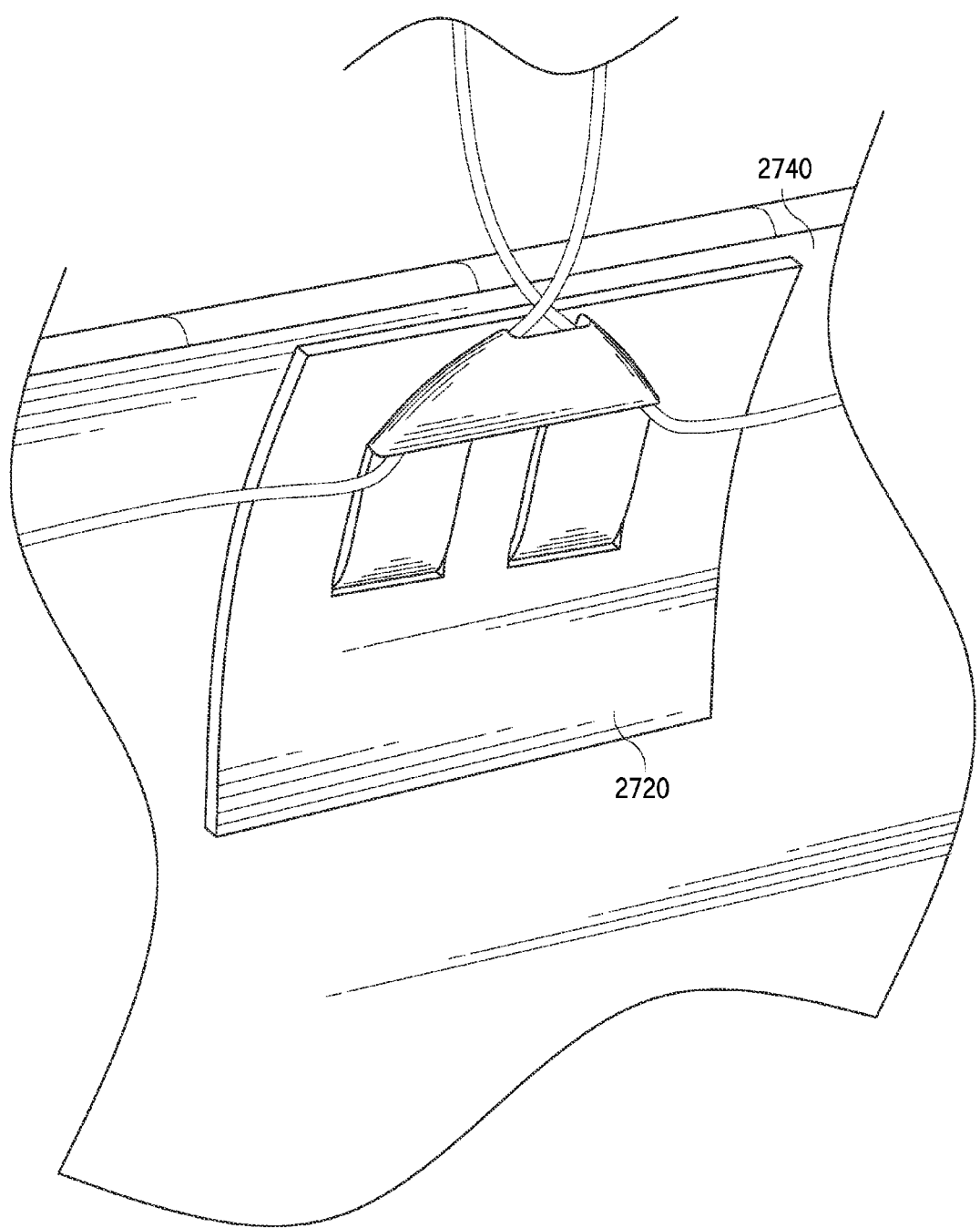
Figure 27G:
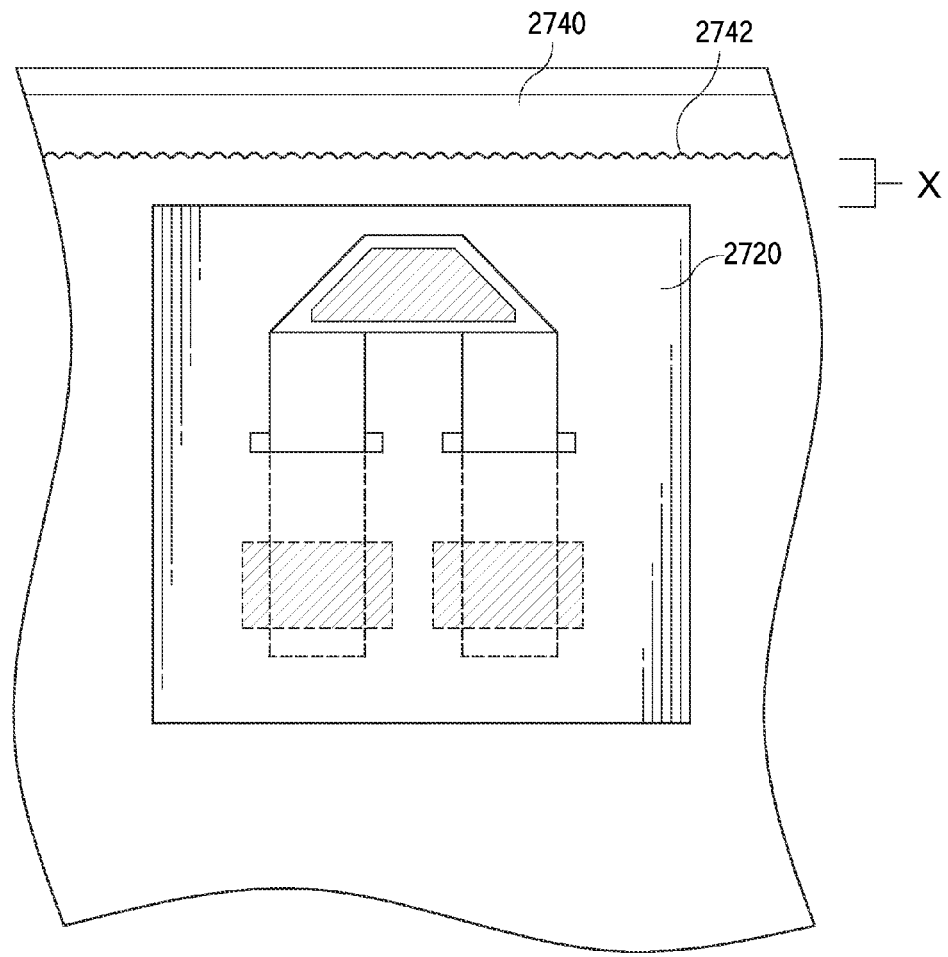

FIGS. 27F and 27G illustrate the panel 2720 positioned on an inner surface of an article, such as a shoe 2740. In such embodiments, the panel 2720 is typically positioned so that the material strip 2722 is facing inward and is accessible to thread the lace through the triangular shaped distal end. An edge of the panel 2720 is also typically recessed from an edge of the article. For example, in shoe construction, the upper typically includes stitching 2742 near the shoe's eyestay. To prevent the stitching from contacting and interfering with the panel 2720 of the triangular shaped distal end that functions as the lace guide, the edge of the panel 2720 may be offset from the edge of the stitching 2742 and/or edge of the eyestay by an amount X that may be selected based on need or use of the shoe, an aesthetic look, and the like.

Positioning the panel 2720 on the inner surface of the shoe 2740 as shown in FIGS. 27F and 27G allows the panel and material strip 2722 that functions as the lace guide to remain hidden from view, which provides a clean and/or aesthetically pleasing shoe appearance. As described above, the panel 2720 may aid in proper alignment relative to the shoe and/or coupling of the panel with the shoe. For example, the panel 2720 allows the spacing of adjacent panels to be easily determined and/or allows the spacing of the triangular shaped lace guide from the edge of the eyestay to be easily determined. A surface of the panel 2720 may include an adhesive (e.g., hot melt) that allows the panel 2720 to be quickly and conveniently heat pressed to the inner surface of the shoe. In other embodiments, the panel 2720 may be RF or sonically welding, adhesively bonded, stitched, and the like with the inner surface of the shoe. In some embodiments, the triangular shaped distal end may be positioned near or over an end of the panel 2720 as desired.

Figure 28A:
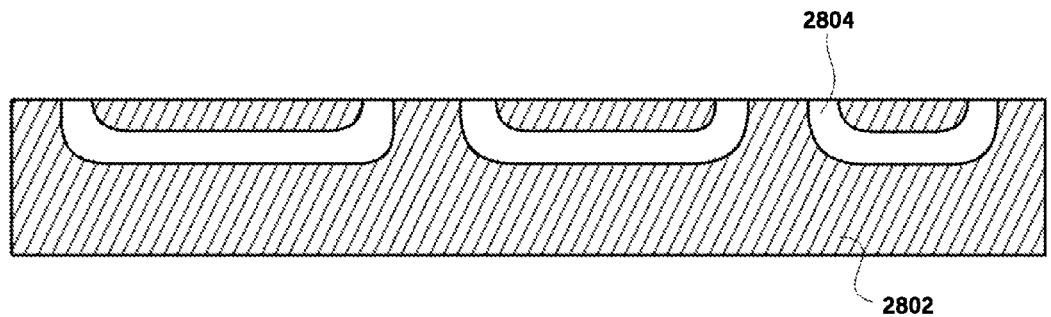
Figure 28B:
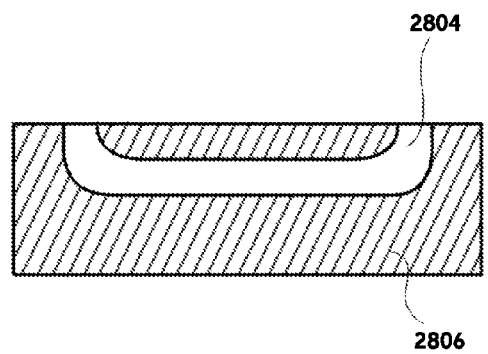
Figure 28C:
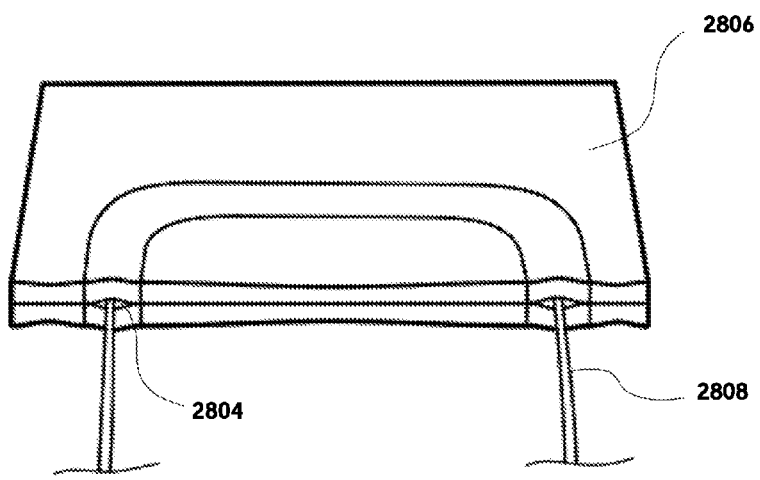
Figure 28D:
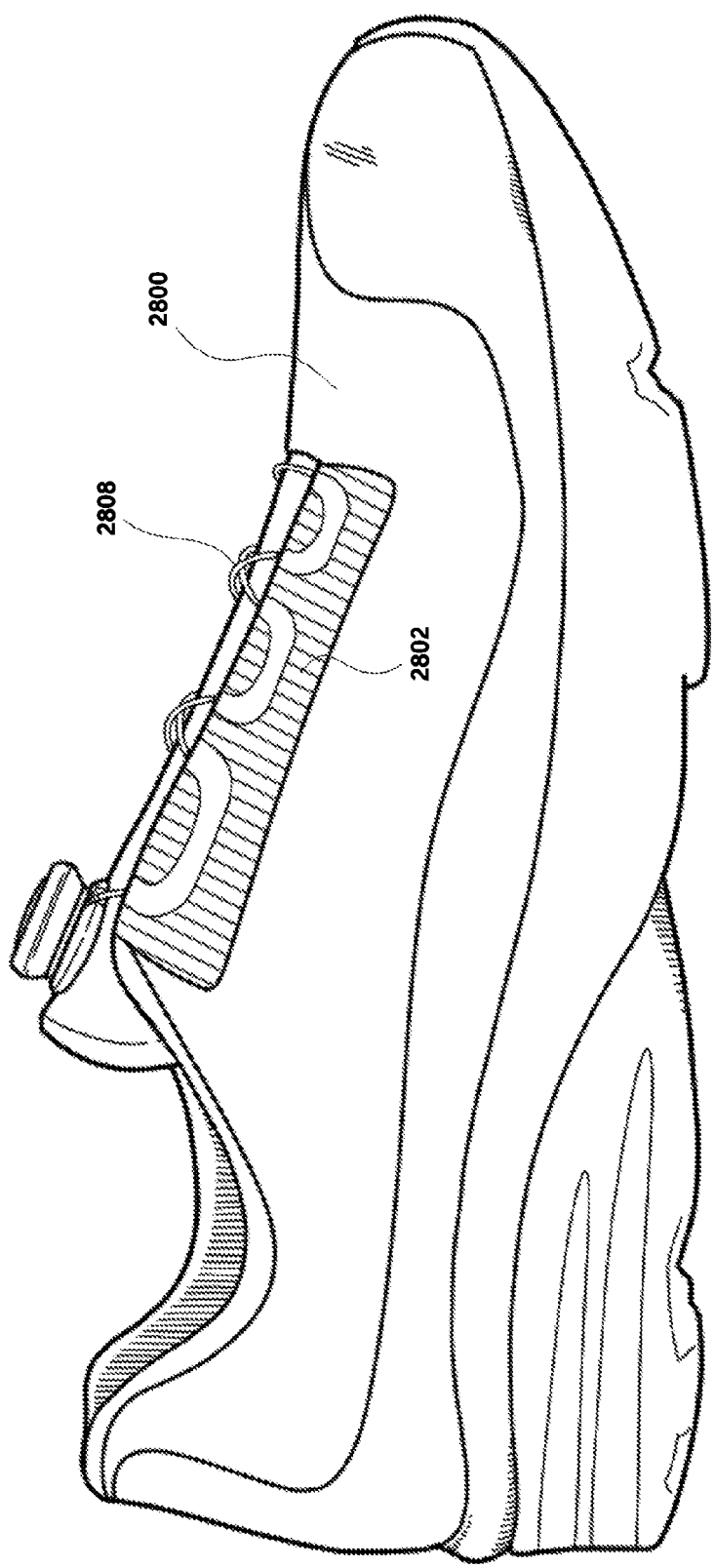

Referring now to FIGS. 28A-D, illustrated is another embodiment of lace guides that may be used to guide or direct a lace about an article. The lace guides of FIGS. 28A-D are formed via coupling of multiple layers of material. As shown in FIG. 28A, multiple material layers 2802 are coupled to form a plurality of lumens 2804. The material layers 2802 are coupled together using any of the processes described herein or otherwise known in the art so that a portion of the material layers 2802 remains uncoupled or unbounded to form the lumens 2804. As described herein above, a lace or tension member may be inserted through the uncoupled or unbounded lumens 2804 so that the lumens 2804 function to guide or direct the lace about a lace path. The size or other dimensions of the lumens 2804 may be uniform or varied as desired. FIG. 28B illustrates material layers being coupled or bonded together to form a panel 2806 having a single lumen 2804. FIG. 28C illustrates a lace 2808 inserted within the single lumen 2804 of panel 2806 and FIG. 28D illustrates the material layers 2802 coupled with a shoe 2800 to guide or direct a lace 2808 along a lace path of the shoe 2800. The material layers 2802 are typically positioned under one or more layers of the shoe's upper, or the material layers 2802 may be formed via one or more of the layers of the upper.

Figure 29A:
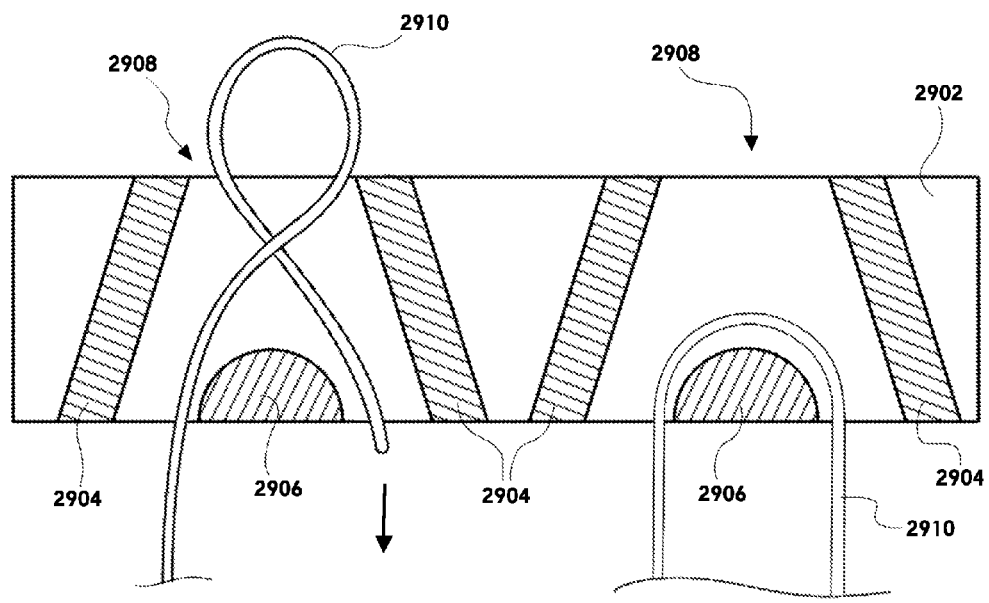
Figure 29B:
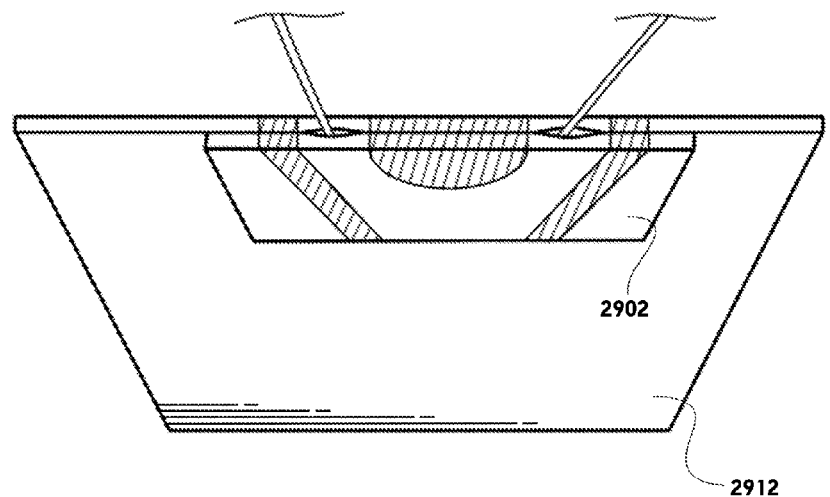

Referring now to FIGS. 29A and 29B, illustrated is an embodiment of forming lace guides of multiple material layers coupled or bonded together as previously described. The lace guides of FIGS. 29A and 29B, however, are formed to aid in insertion of lace 2910 through the lace guides. Specifically, the guides are formed of material layers 2902 that are coupled together so that a rear portion 2908 of the material layers 2902 remains unbounded or uncoupled. This may be achieved by bonding opposing sides of the material layers 2902 and by bonding a front portion 2906 of the material layers 2902. The opposing sides 2904 of the material layers 2902 are coupled so that the rear portion 2908 remains uncoupled and so that the lumen for the lace 2910 extends to the rear portion 2908. Because the rear portion 2908 of the material layers 2902 remains uncoupled, the lace 2910 may be inserted through the material layers 2902 and pulled distally of the rear portion 2908 and then reinserted through the material layers 2902 as shown in FIG. 29A. This configuration enables easy coupling of the lace 2910 with the lace guides formed by the material layers 2902. FIG. 29B illustrates the material layers 2902 coupled with an article 2912.

Figure 30A:
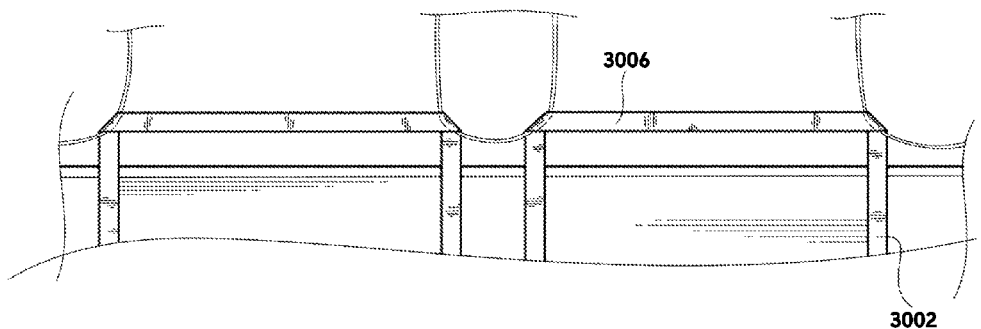
Figure 30B:
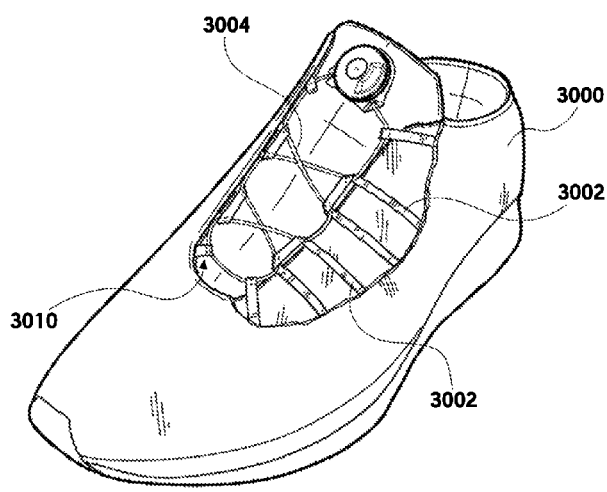
Figure 30C:
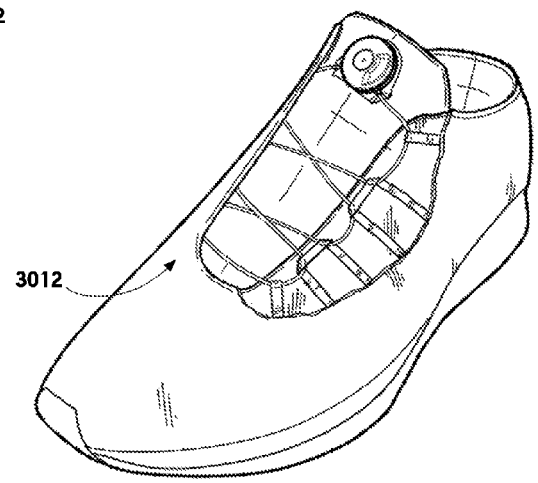

Referring now to FIGS. 30A-C, illustrates in an embodiment of forming lace guides under the upper of a shoe 3000, or under one or more upper material layers of the shoe. As shown in FIG. 30A, a material strap 3002 is positioned under one or more upper layers of the shoe 3000. The strap 3002 is folded multiple times to form a triangular distal end portion 3006 that functions to guide or direct lace 3004 about a lace path along the shoe 3000 as described herein. The triangular distal end portion 3006 may be configured to have an elongate portion or section as shown in FIG. 30A or may have a smaller section if desired. As shown in FIG. 30B, the opposing ends of the strap 3002 may extend downward along the medial and/or lateral sides of the shoe 3000 and terminate at or near the shoe's outsole. The triangular distal ends 3006 of the straps 3002 may be coupled with the shoe 3000 to extend beyond the shoe's eyestay 3010 as shown in FIG. 30B or to be disposed proximal to and under the eyestay 3012 as shown in FIG. 30C.

Figure 31A:
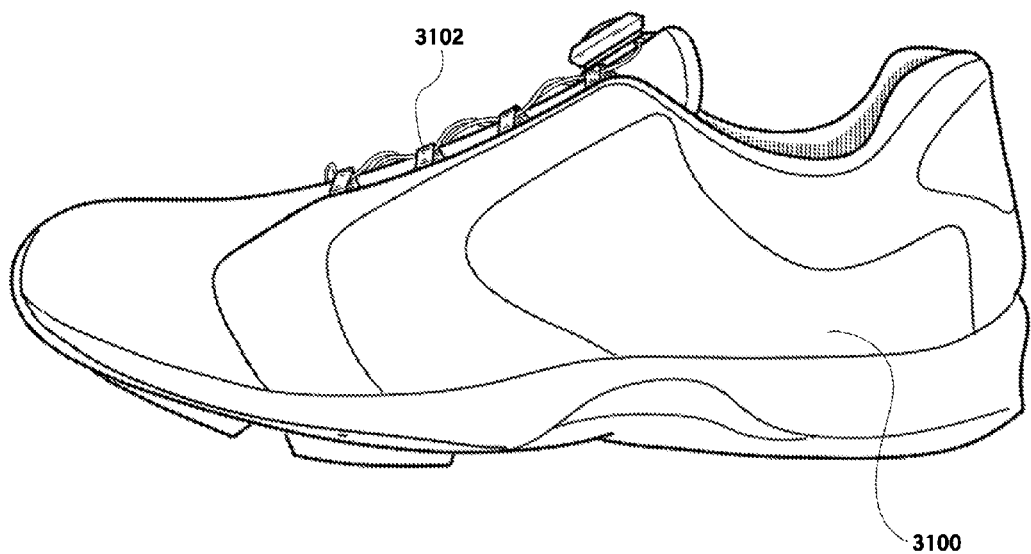
Figure 31B:
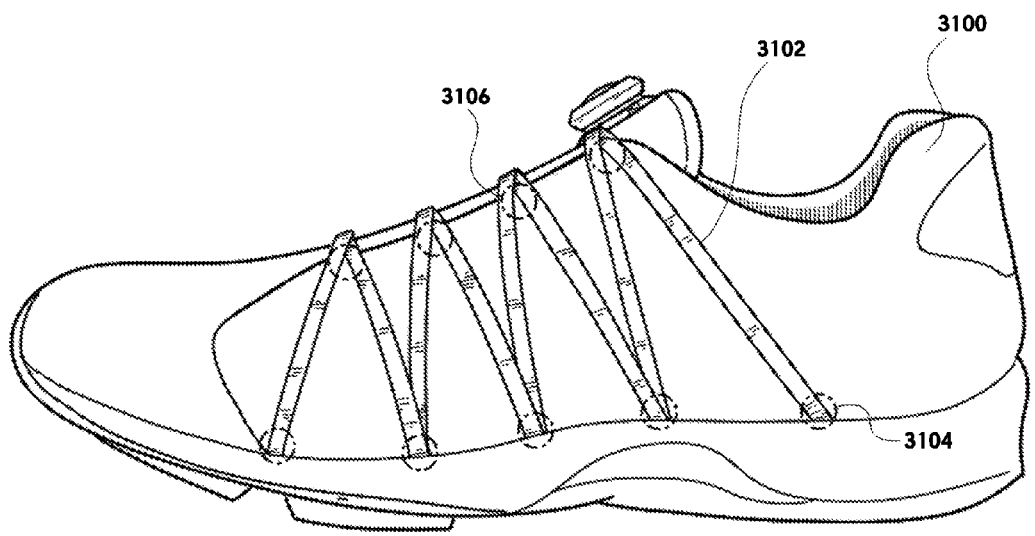

Referring now to FIGS. 31A and 31B, illustrated is another embodiment of forming alce guides about a shoe 3100 using a strap 3102. The strap 3102 is crisscrossed about a side of the shoe (e.g., medial and/or lateral) from near the outsole to near the eyestay to form a plurality of looped portions through which a lace or tension member may be inserted. The looped portions of the strap 3102 may extend beyond the eyestay as shown in FIG. 31A or be disposed under the eyestay as desired. The strap 3102 may be coupled near the outsole 3104 and/or near the eyestay 3106 to provide a desired pull on the shoe's material.

Figure 32A:
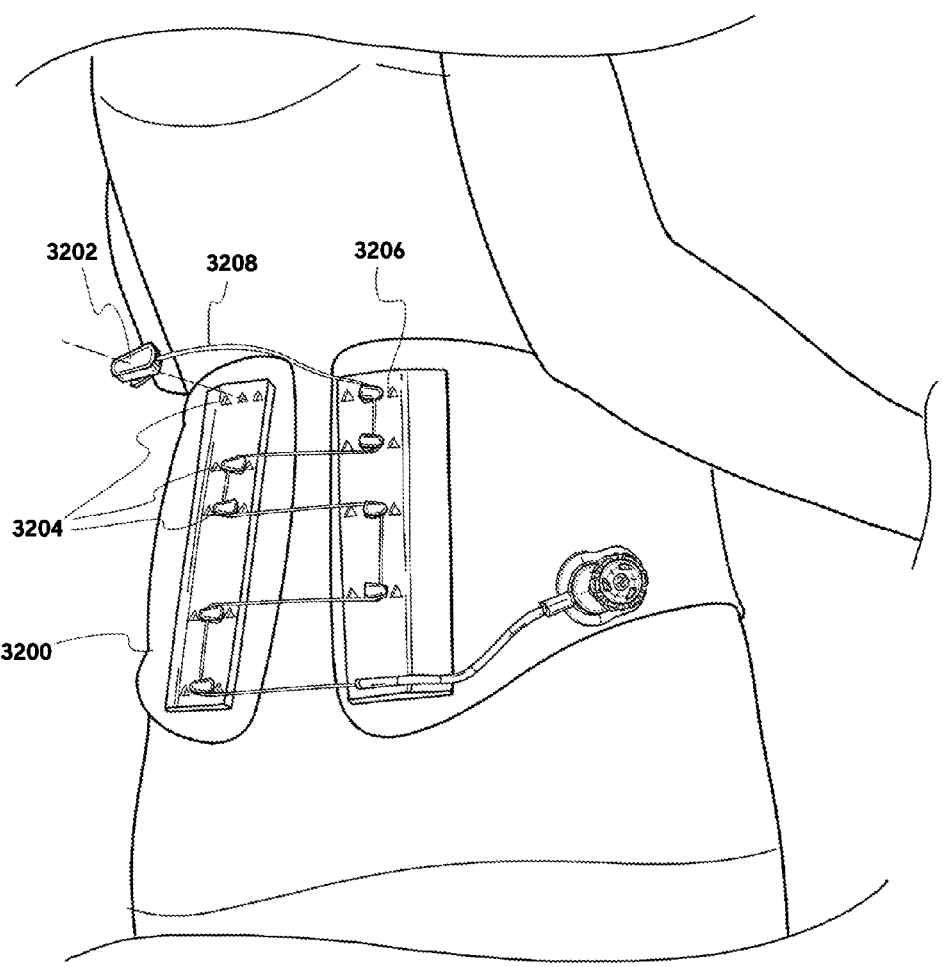
FIGS. 32A-D illustrate embodiments of customizable lace guide systems.
Figure 32B:
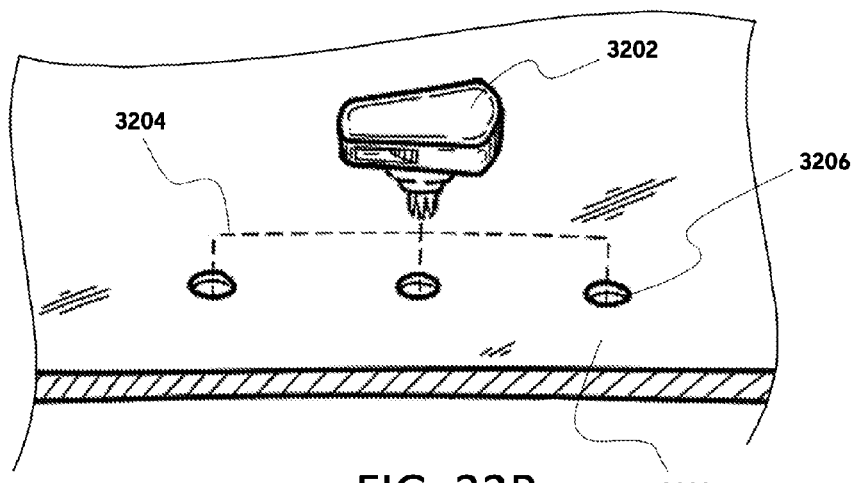

Referring now to FIGS. 32A-D, illustrated are embodiments of customizable lace guide systems. For example, FIGS. 32A and 32B illustrates a system for positioning one or more guides 3202 about an article, such as a brace, to create a customizable lace path. Customizable lace paths can provide varying levels of support, pressure, compression, and comfort to at least a portion of a user's body. An array 3204 of one or more positioning features, such as holes 3206 and/or snaps may be created or positioned on a brace 3200 to house and/or support the guides 3202. The guides 3202 can be configured to receive and reroute or direct a lace 3208 along a lace path about the brace 3200 as shown. The guides 3202 can also be arranged to provide an optimized radius for the lace 3208 that minimizes lace wear and/or maximizes lace life. For example, the optimized radius may keep the lace 3208 from being subject to excessive forces and thereby prolong the life of the lace 3208.

Arrays 3204 may be configured with any arrangement and/or any number of holes 3206 or snaps to enhance the customizability of the brace. As shown in FIGS. 32A and 32B, the guides 3202 may be inserted into the holes 3206 of the array 3204 to create customized lace guides and/or lace pattern. Any type of guide 3202 may be used in combination with the arrays 3204 using holes 3206, snaps, or other types of fastening features. Holes 3206 can be any size or shape, but generally have a smaller geometry than at least a portion of the guide 3202 in order to ensure that the guides 3202 remains secured in place about the brace 3200.

Figure 32C:
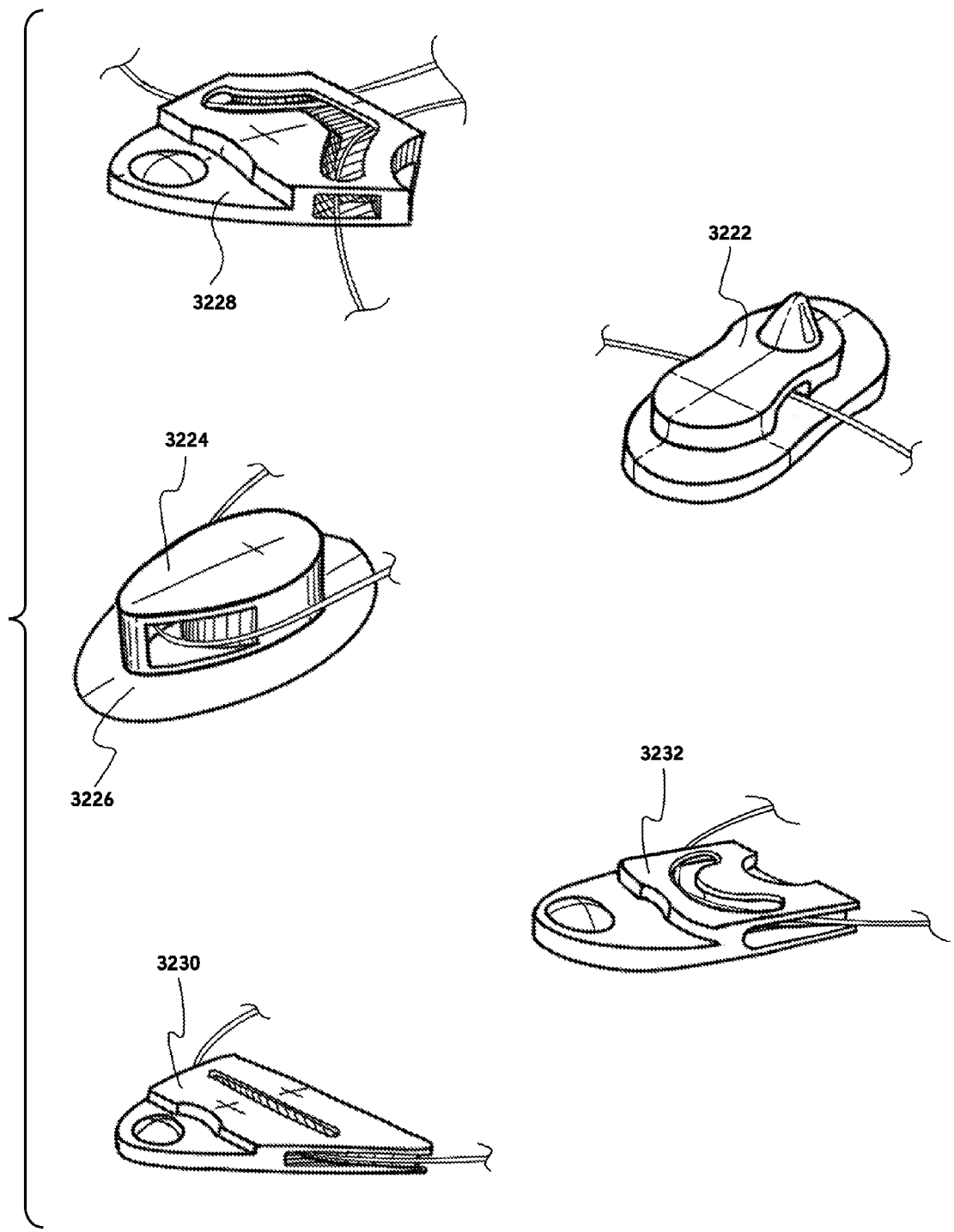
Figure 32D:
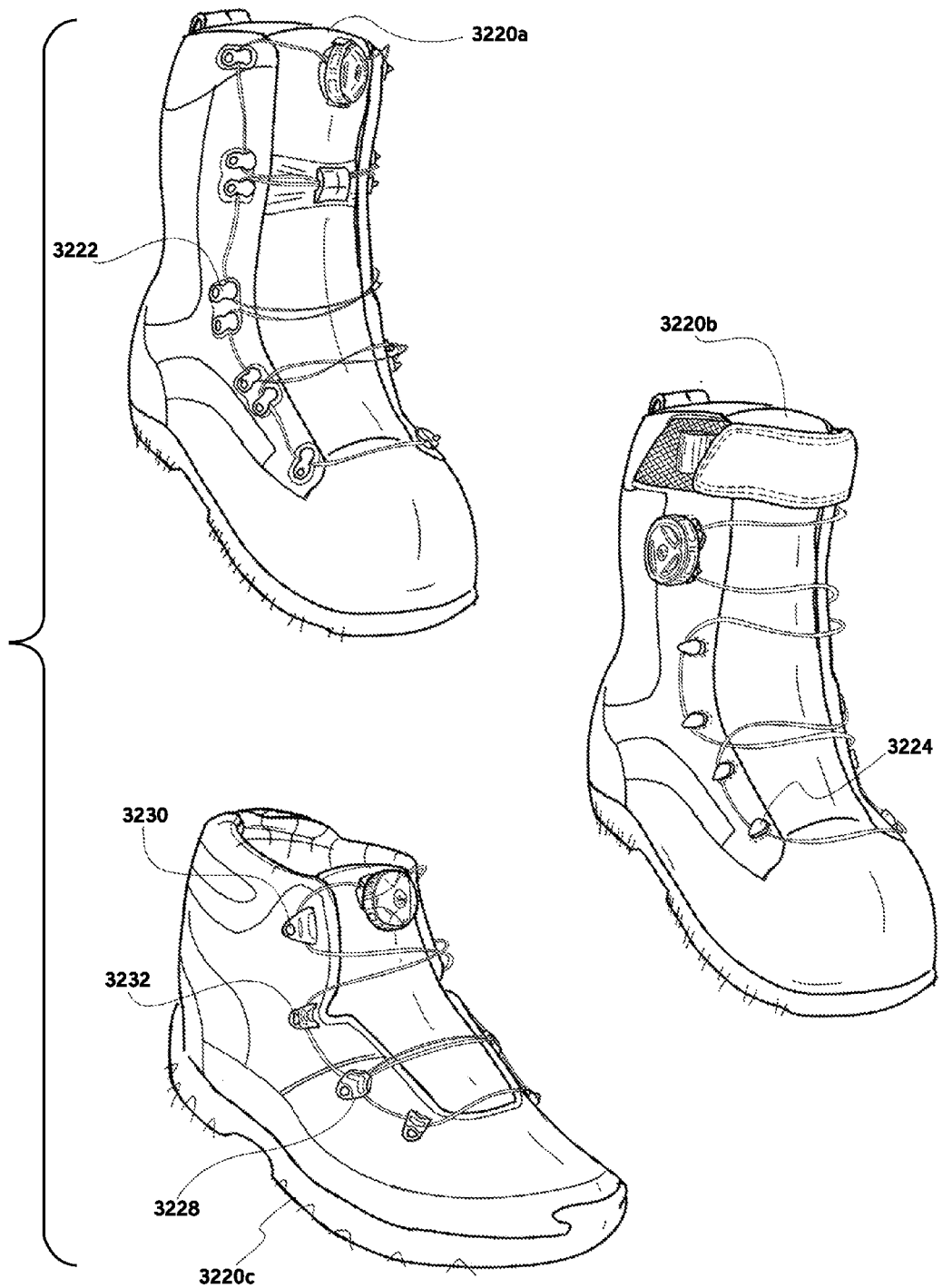

FIGS. 32C and 32D illustrate embodiments of guides attached to footwear in different patterns. For example, shoe 3220*a* illustrates a lace system made of guides 3222 that are riveted to the shoe 3220*a*. Shoe 3220*b* illustrates a lace system made up of guides 3224 that are attached to the shoe 3220*b* by securing a flange 3226 under the surface or eyelet of the shoe 3220*b*. Shoe 3220*c* illustrates a lace system made up of a combination of different guide types. For example, guides 3228, 3230, and/or 3232 can be riveted to shoe 3220*c* to create different lace guides and/or patterns. In one embodiment, guide 3228 can direct or route the lace in opposite directions or paths while guides 3230 and 3232 direct or route the lace about a single lace path. Guide 3230 may differ from guide 3232 in that guide 3230 provides a smaller and/or different radius of curvature. As shown in FIGS. 32C and 32D, guides 3222, 3224, 3228, 3230, and 3232 may be arranged in any pattern to customize a brace to meet a user's particular needs.

While the embodiments described herein generally describe customizing a brace by adjusting the position of one or more lace guides, it should be realized that a brace may be similarly customized by adjusting the position of a reel assembly. For example, the reel assembly itself may be positioned at a desired location by coupling the reel assembly with the brace body and/or a housing of the reel assembly may be coupled with the brace body and the reel assembly can be in turn coupled or attached to the housing. Adjusting the position of the reel assembly may be beneficial because greatest lace tension may be experienced near the reel assembly. As such, differential pressure, fit, and/or preference profile may be achieved by positioning the reel assembly in a desired location about the brace body.

In some embodiments, various portions of the footwear or brace may be relatively flexible or rigid to provide a desired function or effect. For example, in some embodiments, the eyestays of the footwear may be flexible to allow the eyestays to flex and/or conform to the user and/or the customized configuration of the footwear. The flexibility of the eyestays, or other components, may help the footwear remain closed, which may lower the possibility of contamination from dirt, debris, and the like. The positioning of the eyestays may be varied or customized as well to create various sized guides.

Figure 33A:
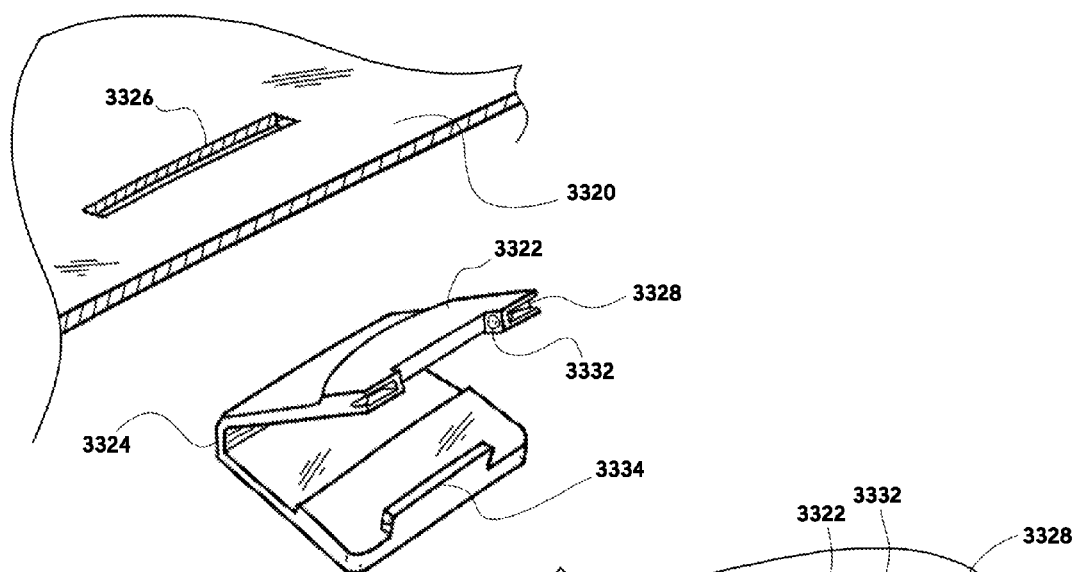
FIGS. 33A-C illustrate embodiments of hinged snap guides.
Figure 33B:
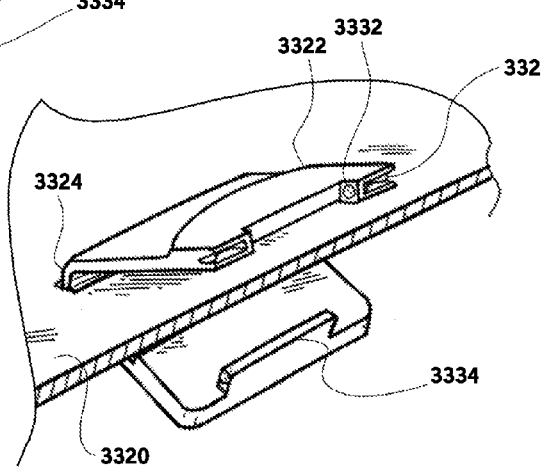
Figure 33C:
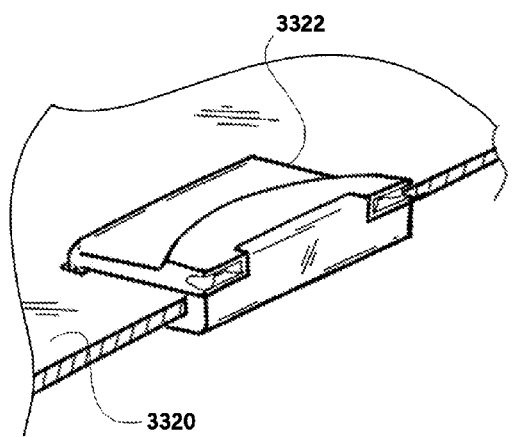

FIGS. 33A-C depict an embodiment of hinged snap guides. The guides of FIGS. 33A-C may be easily coupled with a brace 3320. The guide 3322 is shown as being relatively thin and rectangular shaped, although other guide shapes and dimensions may be utilized. The guide 3322 includes a hinge 3324 that serves to allow the guide 3322 to be opened and closed. A side opposite the hinge 3324 includes a fastening mechanism, such as a clasp having a first edge 3332 that couples with a second edge 3334 to secure the guide 3322 to a brace 3320. The first edge 3332 may include a channel 3328 that is configured to receive and reroute or direct a lace. When the snap guide 3322 is opened, the first edge 3332 can be inserted or removed through a hole or slot 3326 in the brace 3320 as shown in FIG. 33B. The slot 3326 may be sized slightly larger than the first edge 3332 of the snap guide 3322.

To secure the guide 3322 to the brace 3320, the guide 3322 may be inserted through the slot 3326 and the snap guide 3332 may be folded to engage and couple the first edge 3332 and the second edge 3334. When secured to the brace 3320, the two edges 3332 and 3334 may be positioned or extend beyond an edge of the brace 3320. In other embodiments, the two edges 3332 and 3334 may be inserted and brought into engagement through a second hole (not shown) in the brace 3320. In such embodiments, the edges 3332 and 3334 may not extend beyond an edge of the brace. In other embodiments, the brace 3320 may include a plurality of holes or slots 3326 that are spaced inwardly from the lateral edge of the brace and arranged in a ladder like pattern (not shown). In such embodiments, the snap guide 3332 may be inserted through any desired hold/slot 3326 and snapped together. In this manner, the snap guide 3332 could be moved inward from the edge of the brace 3320 by any desired amount.

Figure 34A:
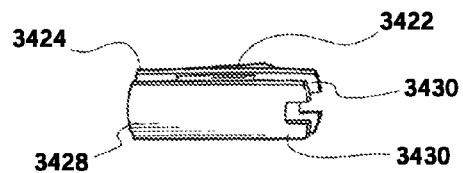
FIGS. 34A-C illustrate other embodiments of guides that can be snapped onto a brace or shoe to customize the article's lace guide configuration.
Figure 34B:
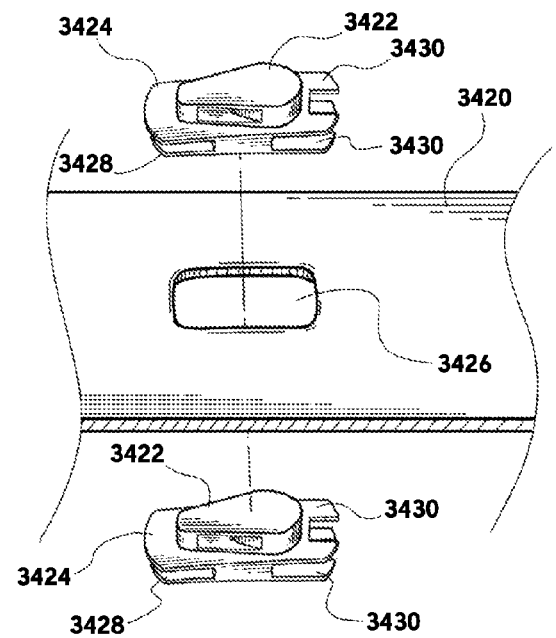
Figure 34C:
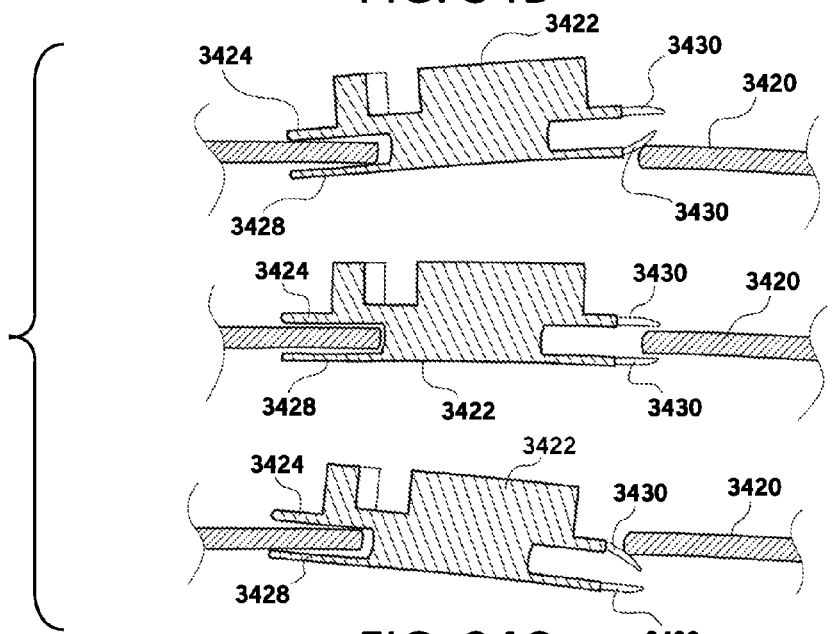

FIGS. 34A-C illustrate other embodiments of guides that can be snapped onto a brace to customize the brace's lace guide configuration. For example, FIGS. 34A-C illustrate a snap guide 3422 that is configured to be installed from either an outer surface or an inner surface of a brace 3420. As illustrated, an upper portion 3424 and a lower portion 3428 may each have one or more lateral ends 3430 that are flexible or bendable. The flexible or bendable lateral ends 3430 allow the snap guide 3422 to be inserted downward and within a hole 3426, or alternatively, to be inserted upward and within the hole 3426 by pressing the snap guide 3422 upward or downward through the hole 3426. This causes the lateral end 3430 of the upper or lower portion, 3424 or 3428, to flex or bend as illustrated in FIG. 34C. In one embodiment, the flexible lateral ends 3430 may be positioned on the same side of the snap guide 3422, or may be positioned on opposite sides thereof. In another embodiments, the entire perimeter of the upper and/or lower portions, 3424 and/or 3428, may be flexible or bendable.

FIGS. 35A-D illustrate alternative lace guides and mounting components that allow the lace guides to be easily attached and/or removed from a brace. In some embodiments, the mounting components may be integrally formed with or attached to the brace body. The mounting components can include one or more rigid and/or flexible members that allow the lace guides to be easily attached and/or removed from the brace.

Figure 35A:
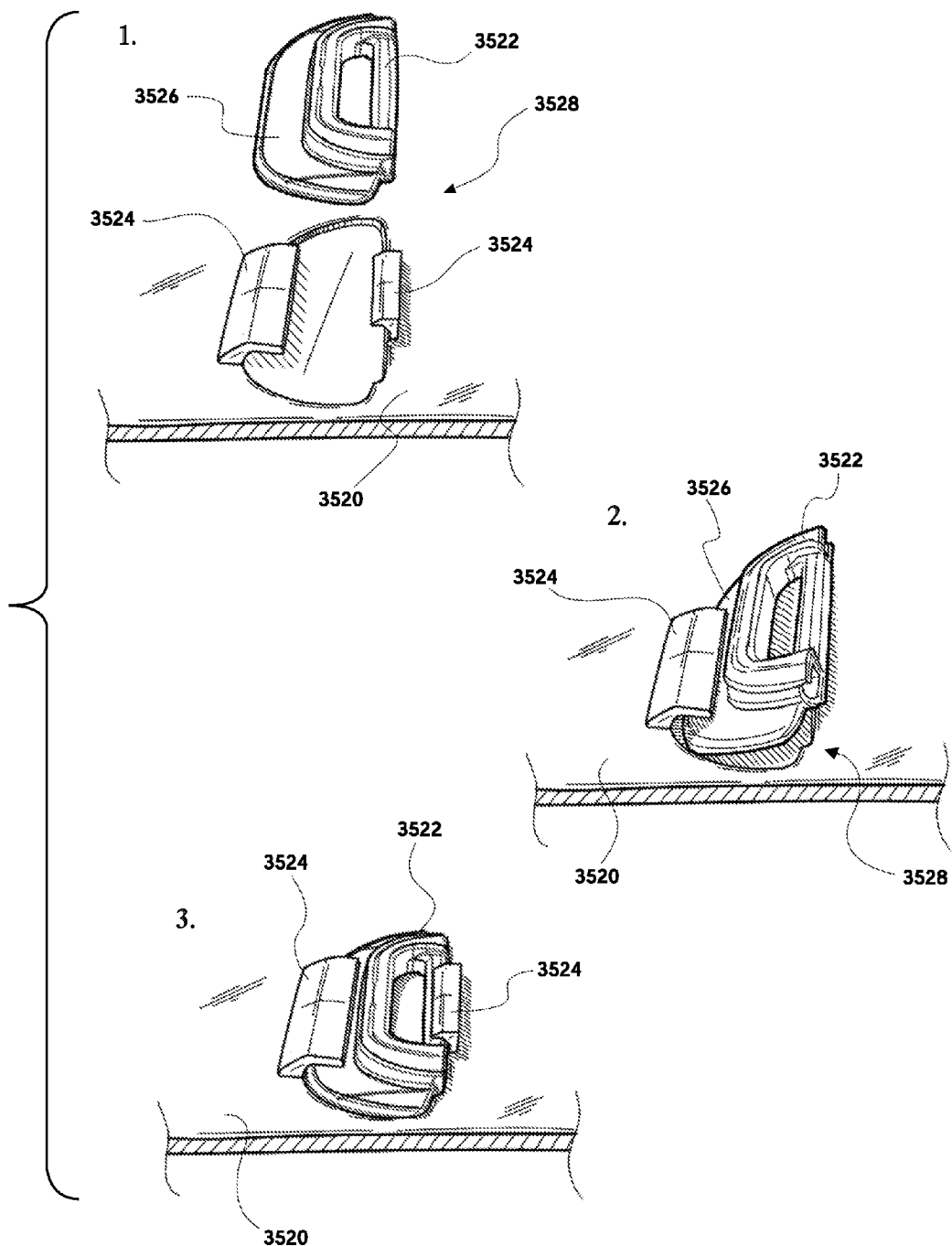
FIGS. 35A-D illustrate alternative lace guides and mounting components that allow the lace guides to be easily attached and/or removed from a brace or shoe.

FIG. 35A illustrates an embodiment of a lace guide 3522 and mounting component 3528. Mounting component 3528 may be positioned atop and secured to brace body 3520 via stitching, RF or ultrasonic welding, adhesive bonding, mechanically fastening, and the like. Alternatively, mounting component 3528 can be integrally formed with the brace body 3520 such as by insert molding and the like. The mounting component 3528 may include one or more arms 3524 that couple with a flange 3526 of guide 3522. The one or more arms 3524 can be snap fit with the flange 3526 of guide 3522 when guide 3522 is inserted into mounting component 3528. In some embodiments, the guide 3522 may be pushed against the arms 3524 to flex the arm 3524 outward and allow the flange 3526 to be inserted and snapped into the arms 3524. In other embodiments, the flange 3526 may be inserted within one of the arms 3524 while the opposite side of the guide 3522 is snapped into another arm 3524.

Figure 35B:
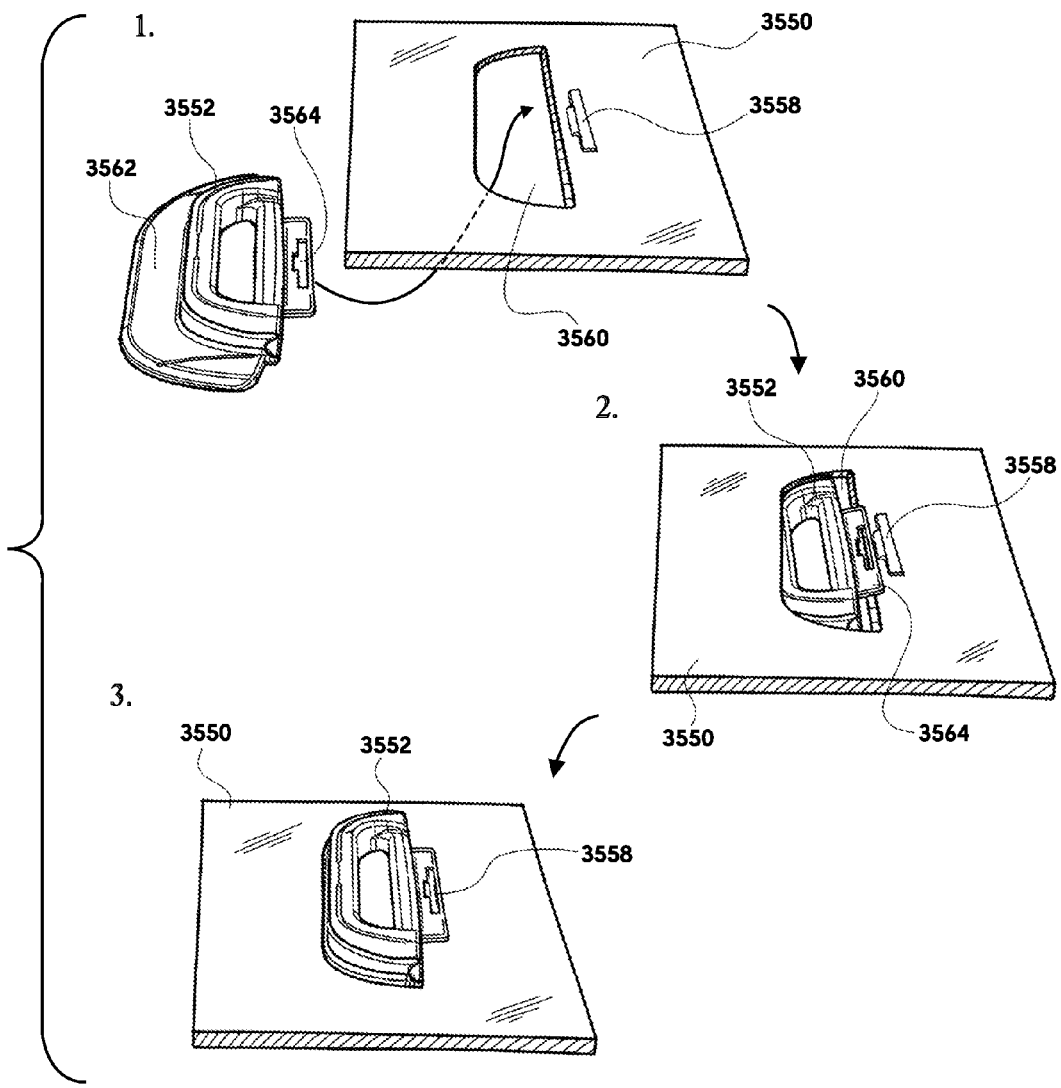
Figure 35C:
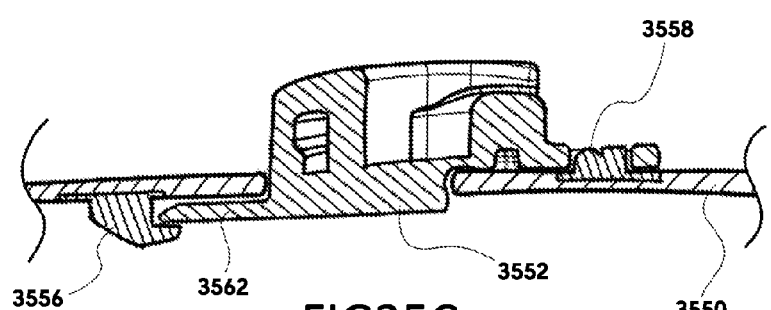

As shown in FIGS. 35B and 35C, in some embodiments a mounting component may include components that are positioned on both an inside and outside surface of a brace 3550. For example, the brace 3550 may include an arm 3556 that is positioned on an inside surface of the brace 3550 and a protrusion 3558 that is positioned on an outside surface of the brace 3550. One skilled in the art will recognize that other embodiments may reverse the position of the arms 3556 and the protrusion 3558 as desired. In such cases, the installation of the guide 3552 about the brace may also be reversed. The arm 3556 may receive a flange 3562 of the guide 3552 by snapping or inserting the flange 3562 into a channel of the arm 3556. In some embodiments, the flange 3562 may be inserted within the channel of arm 3556 after a main body of the guide 3552 is inserted through a hole 3560 in the brace 3550. An aperture 3564 of a second flange of guide 3552 may then be positioned over and coupled or engaged with the protrusion 3558. In this manner, the protrusion 3558 may secure the guide 3552 in place relative to the brace.

The snap in guide parts—or reel assembly or reel assembly housing parts—greatly increases the production efficiency of customizing braces. For example, a hole may be easily punched in a metal or rigid structure of the brace, the brace may include molded holes or slots, or other coupling structures could be easily formed in the brace. The snap in parts (e.g., guides, reel assembly, housings, and the like) may then be quickly and easily coupled with the formed or pre-existing holes or coupling structures, such as by snapping into engagement with these structures or features.

Figure 35D:
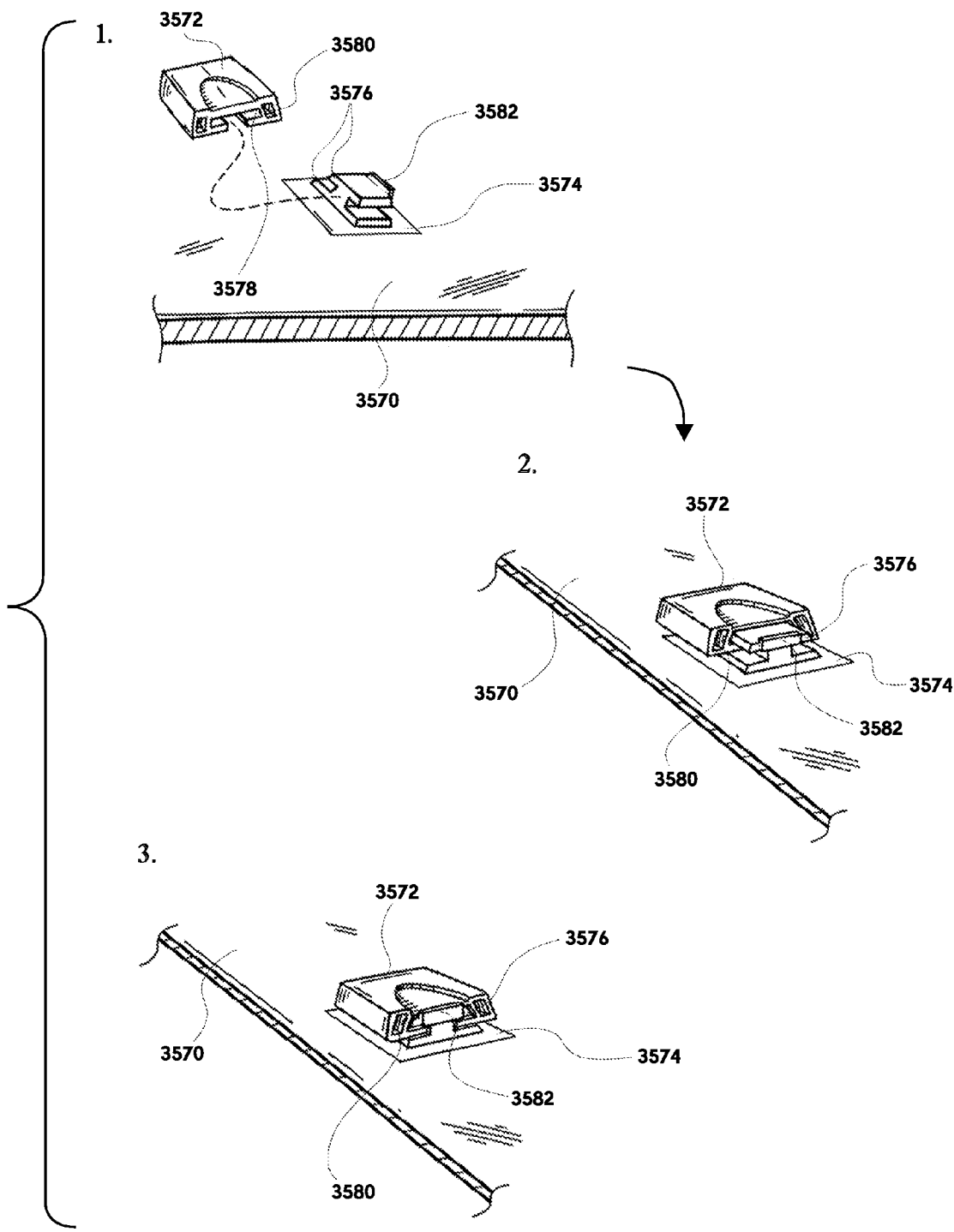

FIG. 35D shows a mounting component 3574 that is configured to slidably couple with a guide 3572. To slidably receive the guide 3572, mounting component 3574 includes one or more flanges 3576 that extend laterally from a top surface of the mounting component 3574. The flanges 3576 may be spaced apart to form a channel or channels within which a slot or slots 3578 of the guide 3572 may be slid or snapped. In some embodiments, a back wall of the slot 3578 may serve to stop the mounting component 3574 from sliding entirely through the slot 3578. In another embodiment, the flanges 3576 may include a lip or edge 3582 that contacts a front edge of the guide 3572 and secures the guide in position relative to mounting component 3574. In yet another embodiment, the slot 3578 may have a tapered configuration that prevents the flanges 3576 from passing entirely through the slot 3578 and that secures the components in place.

In some embodiments, the guide 3572 can be positioned onto the mounting component 3574 so that tension from the lace secures or maintains the guide 3572 in a coupled configuration with the mounting component 3574. Although not shown, in some embodiments the mounting component 3574 may include a flange or flanges and the guide 3572 may include a slot that slidingly engages with the mounting component 3574.

Figure 36:
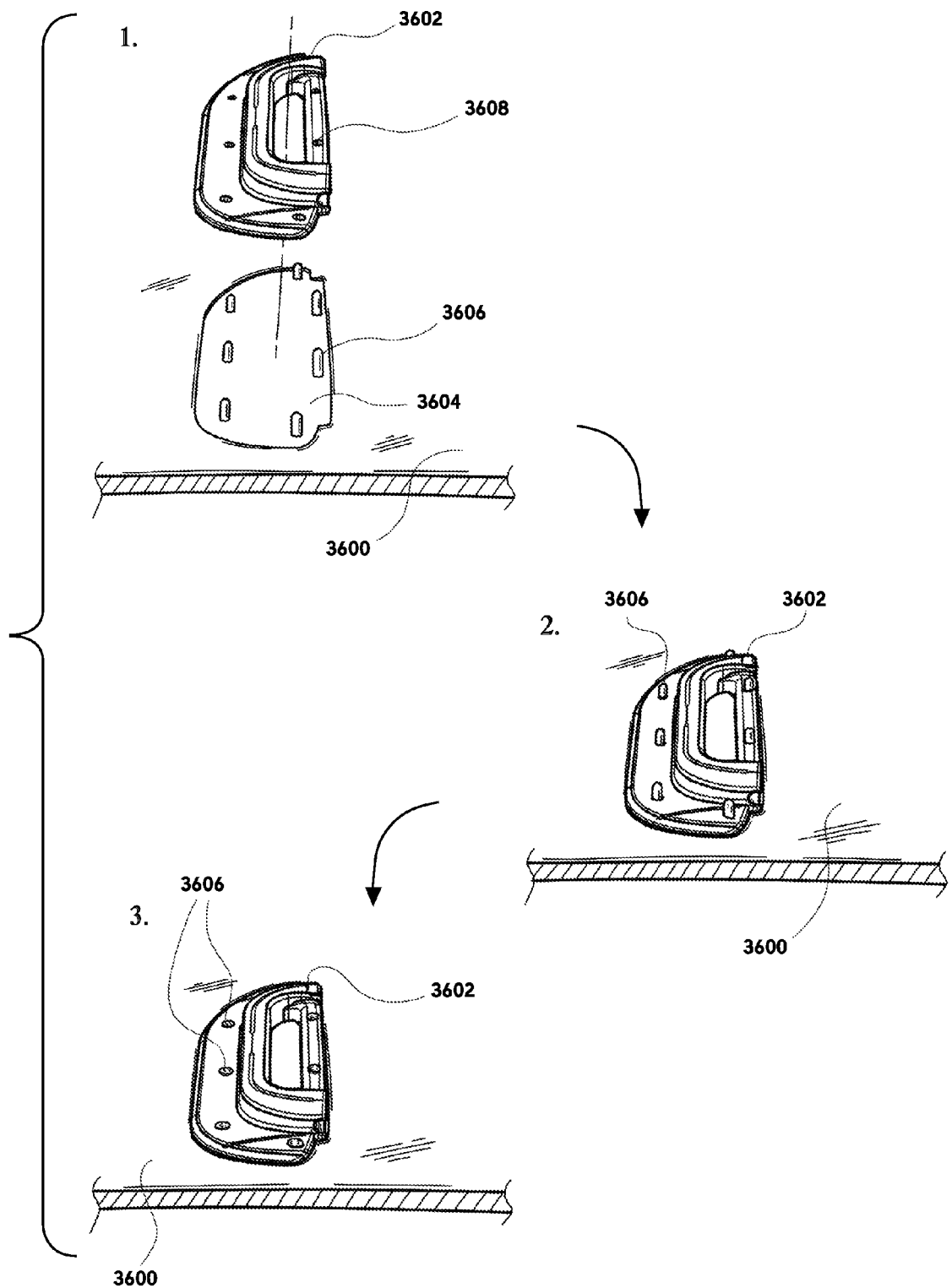
FIGS. 36-37B illustrate embodiments of mounting components that may be fastened to a brace or shoe using fastening means other than snaps.
Figure 37A:
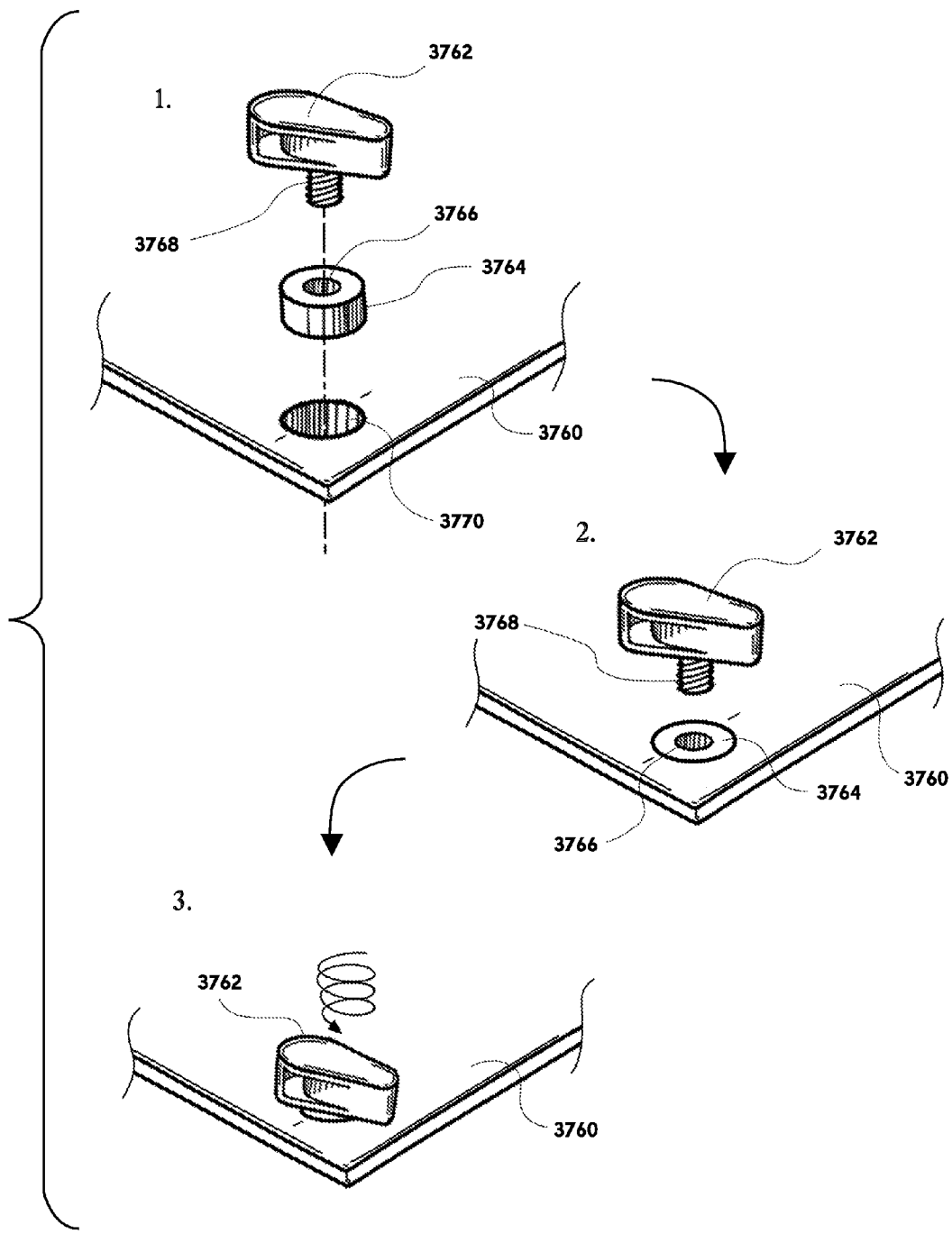
Figure 37B:
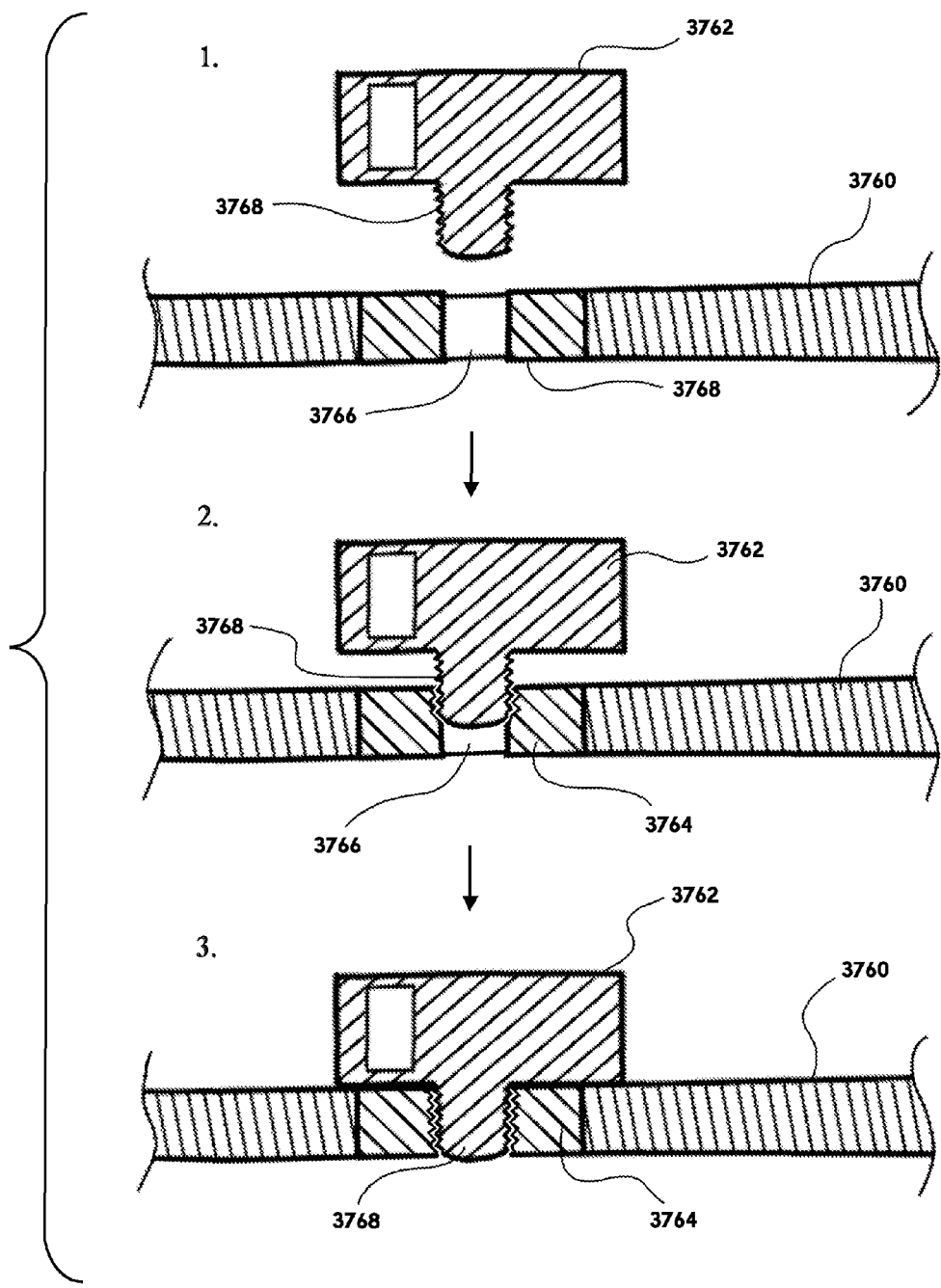

Referring now to FIGS. 36-37B, in some embodiments the mounting components may be fastened to a brace using fastening means other than snaps. For example, FIG. 36 illustrates a mounting component having pin formations that can be used to secure a guide onto a brace. For example, a guide 3602 may be mounted to a brace 3600 via heat staking, adhesive bonding, mechanically fastening, and the like. A mounting component 3604 includes a plurality of pins 3606 can be formed with or secured onto the brace 3600. Apertures 3608 in the guide 3602 may be aligned with the pins 3606 and the guide 3602 positioned atop the mounting structure 3604 with the pins 3606 inserted through one or more of the apertures 3608. Upon positioning the guide 3602 atop the mounting structure 3604, the pins 3606 can be melted using heat staking methods to affix the guide 3602 to the mounting structure 3604. Other staking methods, such as ultrasonic welding, adhesive bonding, mechanically fastening (e.g., using cotter pins), and the like, may alternatively be used to secure the guide 3602 to the pins 3606. The pins 3606 may be made of any meltable material, including thermoplastics. The pins 3606 may be arranged in any pattern to fully secure the guide 3602 and to withstand tensions created by a lacing system.

FIGS. 37A and 37B illustrate embodiments of guides attached to a brace via screw mechanisms. For example, FIG. 37A illustrates a screw boss 3764 that is made of a softer material (e.g., plastic) than a self-tapping threaded member 3768 of lace guide 3762. To install the guide 3762, the guide 3762 may be threaded into the screw boss 3764 after the screw boss 3764 is inserted and secured within an aperture 3770 of a brace or shoe 3760. As shown in FIG. 37B, the harder material self-tapping threaded member 3768 of guide 3762 (e.g., harder plastic) may tap the soft plastic of an inner aperture 3766 of the screw boss 3764 and thereby secure the guide 3762 to the brace 3760.

Figure 38A:
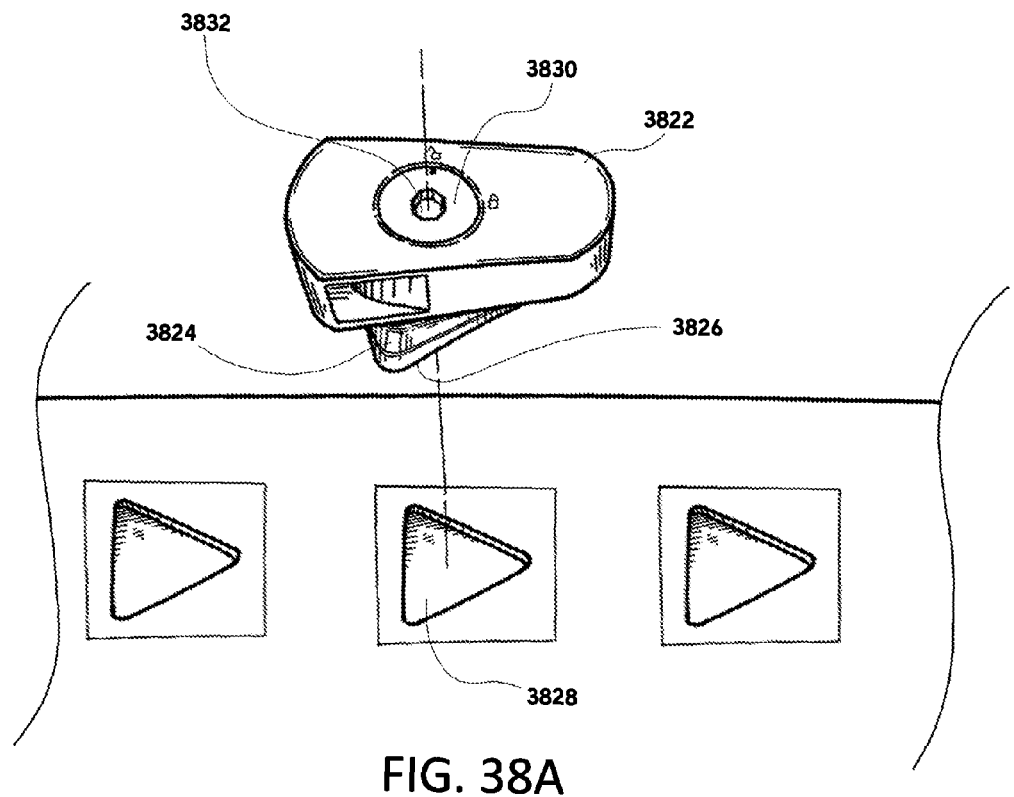
FIGS. 38A-C illustrate additional methods of securing a guide to a brace or shoe.
Figure 38B:
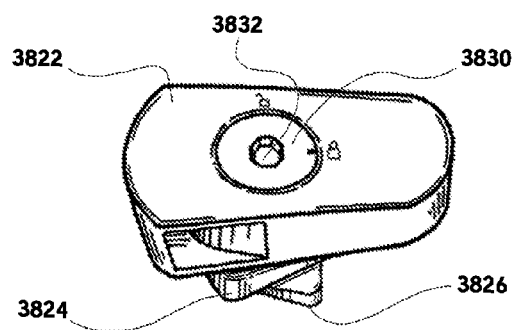
Figure 38C:

Referring now to FIGS. 38A-C, illustrated is an additional method of securing a guide to a brace. FIGS. 38A and 38B illustrate a guide 3822 that includes a geometrically shaped shaft 3824 (e.g., triangular shaft) having a rotatable bottom portion 3826. The geometrically shaped shaft 3824 may be inserted into a corresponding geometric aperture 3828 of a brace and the bottom portion 3826 may be rotated relative to the geometrically shaped shaft 3824 to lock or secure the guide 3822 in the geometric aperture 3828, and thereby prevent the guide 3822 from being removed from the brace or shoe. In some embodiments, the guide 3822 may include a mechanism 3830 that may be rotated to rotate the bottom portion 3826 of the geometrically shaped shaft 3824. The mechanism 3830 may be configured to receive a special tool, such as by including a unique geometric recess 3832, in order to apply torque to the mechanism 3830 and rotate the bottom portion 3826 of the shaft 3824. The specialized tool may discourage or prevent a user or wearer of the brace or shoe from adjusting or otherwise modifying the configuration of the lace guides. The mechanism 3830 may further include indicium that indicates to the user when the mechanism 3830 is rotated into a locked and unlocked position.

As the bottom portion 3826 is rotated, a surface of the bottom portion 3826 may rotate into engagement or contact with an inner surface of the brace or shoe to prevent removal of the guide 3822 from the geometric aperture 3828. For example, the triangular shaped bottom portion 3826 may rotate under a ledge or lip of the geometric aperture 3828 to lock the guide 3822 in position relative to the brace or shoe. The geometrically shaped shaft 3824 may prevent the guide 3822 from rotating within the geometric aperture 3828.

Figure 39A:
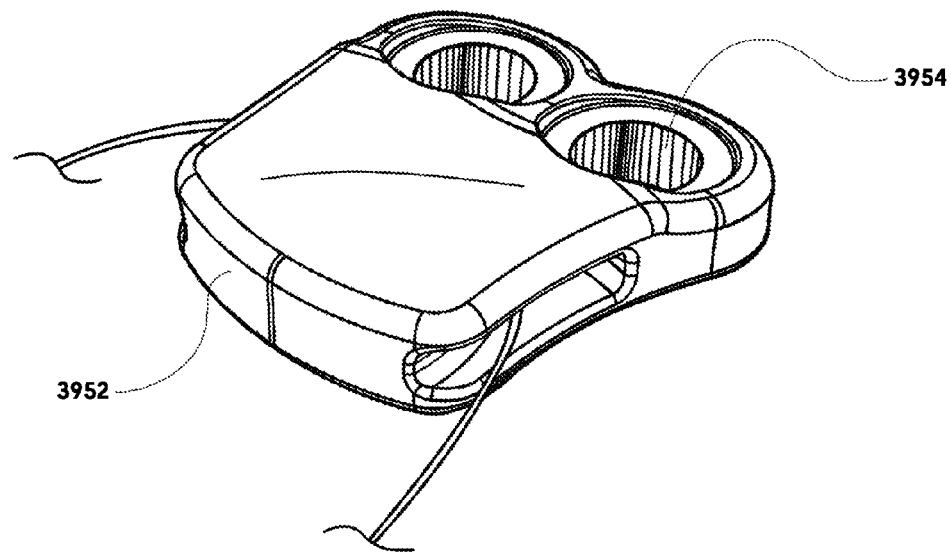
FIGS. 39A-C illustrate a guide that may be attached to a brace or shoe using two or more rivets.
Figure 39B:
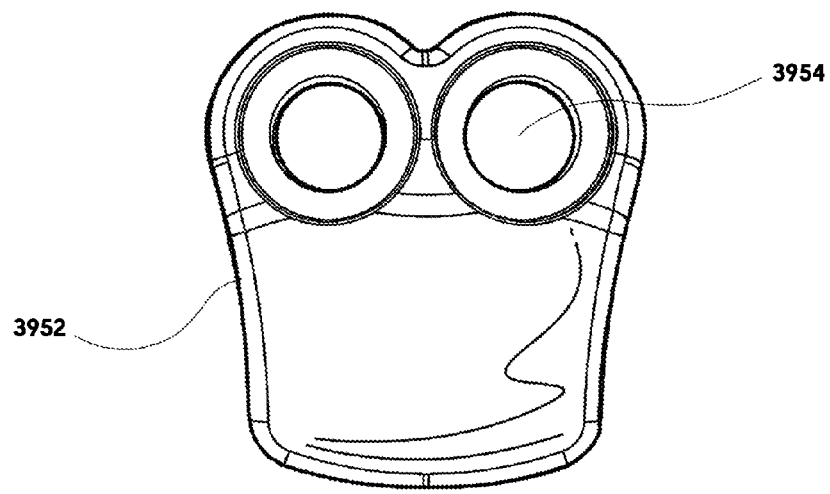
Figure 39C:
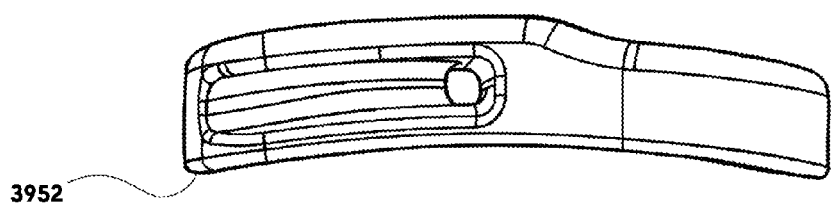

Referring now to FIGS. 39A-C, illustrated is a guide 3952 that may be attached to a brace or shoe using two or more rivets. The use of two or more rivets strongly secures the guide to the brace or shoe. Additionally, the use of multiple rivets increases the pivot control, and in some cases, completely secures the rotational position of the guide 3952 relative to the brace or shoe. The rivet holes 3954 may be positioned side by side as shown, or can have any other configuration desired. The holes 3954 may be of different sizes and or shapes to conform to the strength and design requirements of the particular application.

In other embodiments, the guide may be coupled with a brace or shoe by insertion of a shaft of the guide through an aperture of the brace or shoe and within an expandable plug of a fastening member positioned on an opposite side of the brace or shoe. The plug may include a plurality of axially extending members that are positioned around a central lumen and that deflect radially outward as the shaft is pressed within the central lumen. When the shaft is fully positioned within the plug, the axially extending members may press radially inwardly against the shaft to hold or secure the shaft and guide in position relative to the fastening member. In some embodiments, the plug may be inserted through an aperture of the brace or shoe and secured relative thereto by inserting the shaft within the central lumen of the plug. In another embodiment, the guide may have a post that extends from a bottom surface of the guide and that is postionable through an aperture in the brace or shoe. The post may be riveted so that the guide is fixedly coupled with brace or shoe.

Figure 40A:
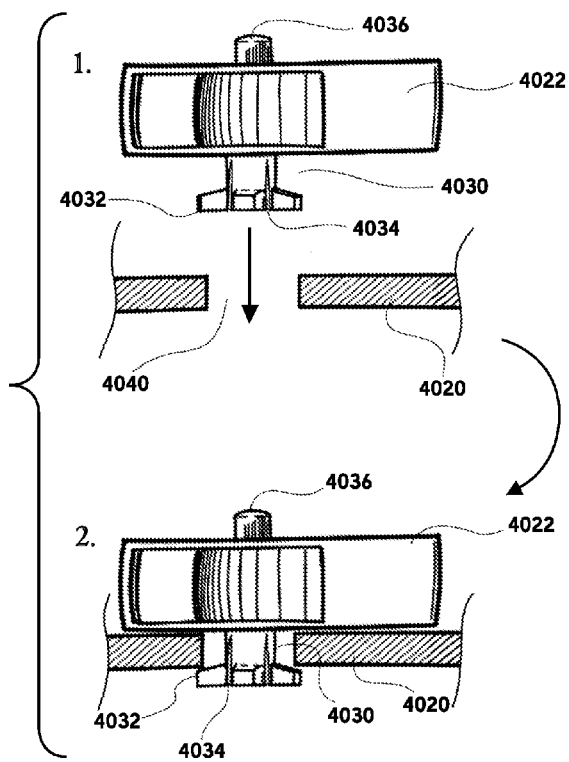
FIGS. 40A and 40B illustrate an embodiment of a single component guide that may be coupled to a brace or shoe by inserting the guides through an aperture of the article.
Figure 40B:
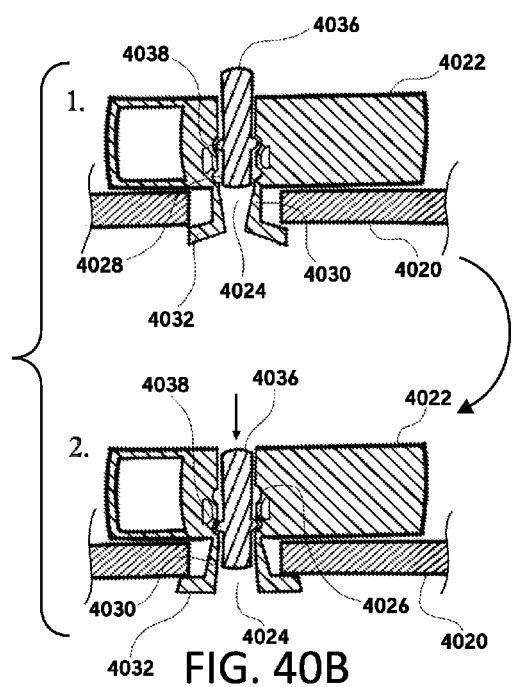

Referring now to FIGS. 40A and 40B, illustrated is an embodiment of a single component guide that may be coupled to a brace by inserting the guides through an aperture in the brace. Stated differently, the guide is a self-contained component that does not require additional components in order to couple the guides with a brace. The guide 4022 of FIGS. 40A and 40B is securable to a brace 4020 using a deflectable shaft 4032. The deflectable shaft 4032 includes a lumen 4024 and a plurality of deflectable legs 4030 that each have a radially outward extending bottom portion. The deflectable shaft 4032 includes a relief cut or slit 4034 between each leg 4030 that aids in deflection of the legs 4030. A peg 4036 is positioned with the lumen 4024 and is axially movable therein between a first or unlocked position and a second or locked position. The lumen 4024 includes a first recess 4026 and a second recess 4028 that engage with a rib 4038 of the peg 4036 to hold or maintain the peg in the first or second position. For example, in the first or unlocked position, the rib 4038 may be engaged with the first recess 4026 and an upper portion of the peg 4036 may extend axially above a top surface of the guide 4022. Further, in the first or unlocked position, the deflectable legs 4030 may be disposed radially inward to allow the deflectable shaft 4032 to be inserted through an aperture 4040 of the brace 4020.

In the second or locked position, the rib 4038 may be engaged with the second recess 4028 and the peg 4036 may be flush or disposed axially below the top surface of the guide 4022. Further, in the second or locked position, the deflectable legs 4030 may be forced radially outward by the peg 4036 so that the bottom portion of each leg 4030 contacts and engages with an inner surface of the brace 4020 to prevent removal of the guide 4022 from the aperture 4040. The peg 4036 may be moved from the first position to the second position upon application of downward force on the peg 4036. In this manner, the guide 4022 may be inserted through the aperture 4040 and the peg 4040 and pressed axially downward relative to the guide 4022 to lock the guide to the brace 4020. In another embodiment, the legs 4030 may be flexed radially outward upon rotation of a screw or peg 4036 within the lumen 4024 of the deflectable shaft 4032.

In other embodiments, the guide can be molded into a portion of a brace or shoe or other structure. For example, the guide can be molded into a structural component of a piece of apparel such as a shoe. The guide may be molded using direct injection methods into the upper of the shoe, or may be insert-molded into a component of the shoe.

In some embodiments, a quick release mechanism may be utilized to attach a reel assembly or lace guide to a brace or shoe. For example, a reel assembly or lace guide housing may allow for the reel assembly and/or lace guide to be removably coupled to the brace. A quick release mechanism that is configured to receive a reel assembly or lace guide can be positioned on a non-stitchable or other portion of the brace to allow a reel assembly and/or lace guide to be easily coupled to that portion of the brace. The quick release mechanism can be snapped, RF welded, riveted, or otherwise attached to such a portion of the brace. In other embodiments, the quick release mechanism may be molded, milled, or otherwise formed into the brace. The reel assembly or lace guide can then be snapped into the quick release mechanism to secure the reel assembly and/or lace guide in position on the brace. In some embodiments, the quick release mechanism may include an arm or other component that can be switched between a locked and unlocked position to couple the reel assembly and/or lace guide to the brace. When unlocked, the reel assembly and/or lace guide may be coupled with or removed from the quick release mechanism. When locked, the reel assembly and/or lace guide may be secured to the quick release mechanism. An example of such a quick release mechanism involves the use of a guide that includes a hinged rear surface and an open end. The open end allows the guide to be inserted over an edge of a brace or shoe while the hinged end allows the open end to open as the guide is inserted over the edge. The hinged end may also provide a spring or biasing force that causes the open end to bite down onto the surface or material of the brace/article. Upper and lower inner surfaces of the main body may include rearward facing teeth that bite into the material of the brace/article to help prevent unwanted removal of the guide.

Figure 42A:
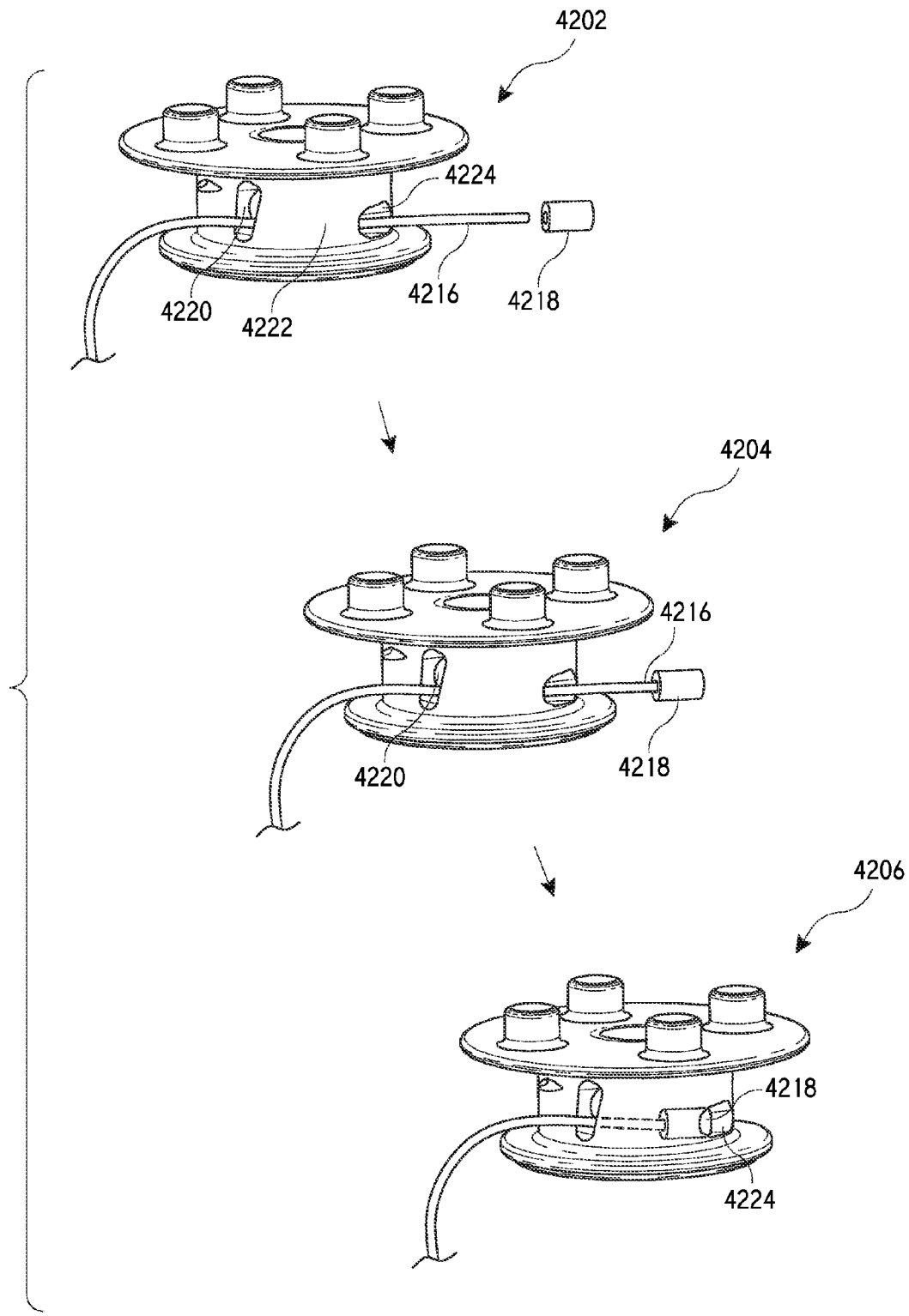
FIGS. 42A-D illustrate embodiments of quickly coupling a lace with a spool of a reel based mechanism.

Referring now to FIGS. 42A-D, illustrated are embodiments of quickly coupling a lace with a spool of a reel based mechanism. FIG. 42A illustrates a method of quickly coupling a lace 4216 with a spool 4222. At step 4202, the lace is inserted through an entry port 4220 of a lumen positioned on or within an annular channel of the spool 4222. The lace is inserted through the lumen until the lace 4216 exits an exit port 4224 of the lumen. A crimp or ferrule 4218 is then aligned and coupled with a distal end of the lace 4216 as shown in steps 4202 and 4204. In step 4206, the lace is pulled proximally so that the crimp or ferrule 4218 is inserted within the exit port 4224 of positioned within the lumen. The crimp or ferrule 4218 prevents the lace 4216 from being pulled fully through the lumen, thereby coupling the lace 4216 with the spool 4222.

Figure 42B:
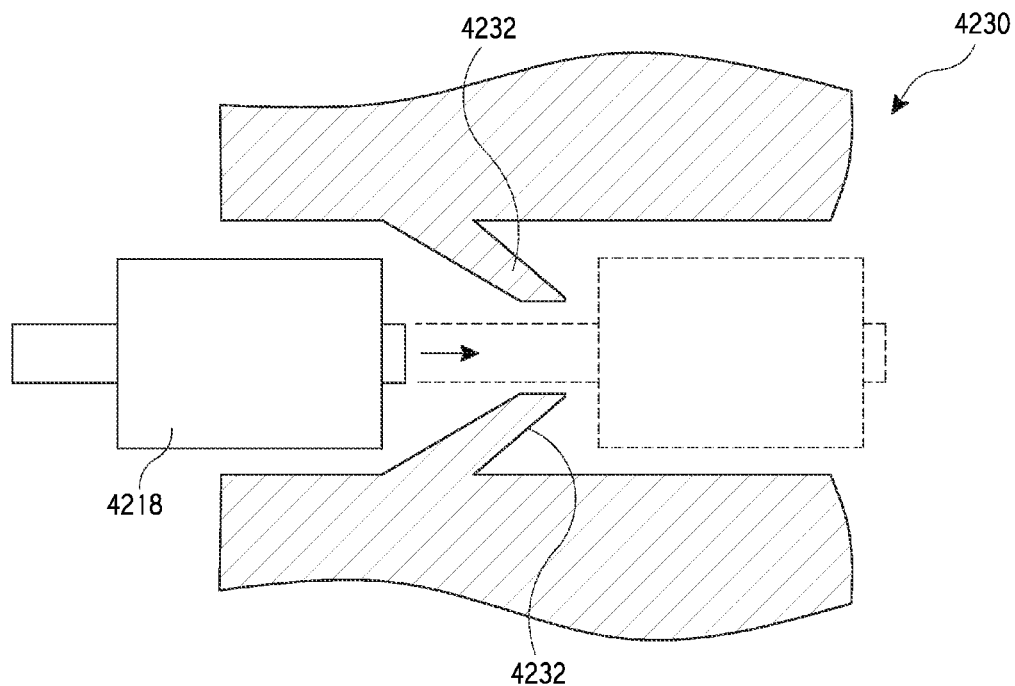
Figure 42C:
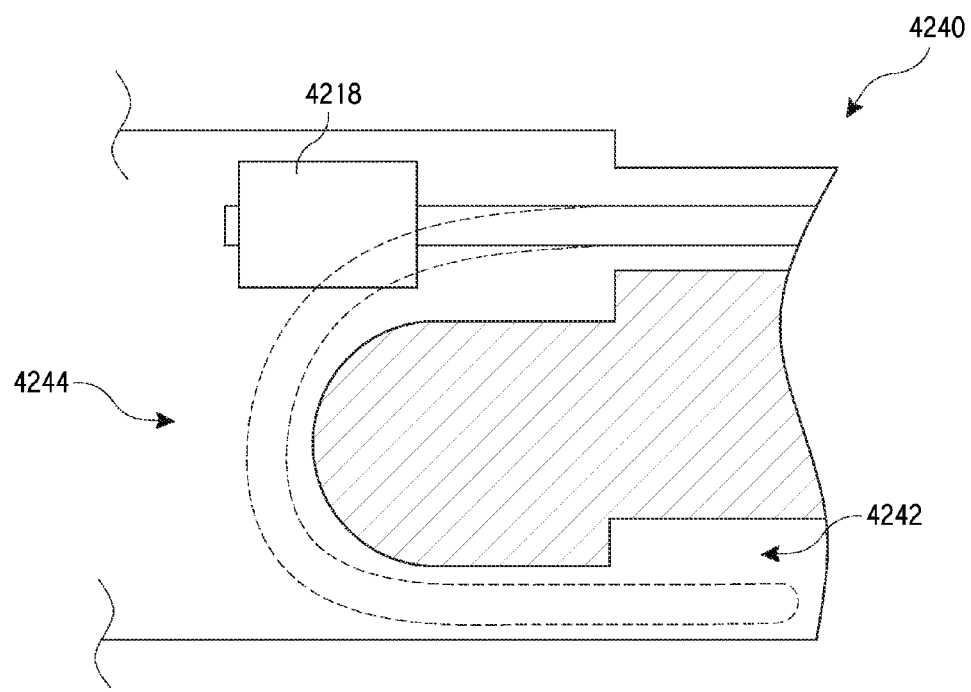

FIGS. 42B and 42C illustrate alternative methods of coupling the lace 4216 with a spool. As shown in FIG. 42B, a spool 4230 may include a one way fastening mechanism 4232, which may include a plurality of inward facing tabs, an inwardly facing annular ring, and the like. The one way fastening mechanism 4232 is configured to flex or bend as the crimp or ferrule 4218 is pressed distally through the one way fastening mechanism 4232, and is further configured to contact a proximal end of the crimp or ferrule 4218 and thereby prevent the crimp or ferrule 4218 from being pulled proximally through or past the one way fastening mechanism 4232. In this manner the lace 4216 may be coupled with the spool 4230. As shown in FIG. 42C, in another embodiment the spool 4240 may include a lumen 4244 having a labyrinth or maze configuration 4242. The crimp or ferrule 4218 may be inserted within and/or through the labyrinth or maze 4242 and frictional contact between the lace 4216 and/or ferrule 4218 and the walls of the lumen 4244 may prevent or hinder removal of the lace 4216 from the lumen 4244. The lumen may include cuts, inwardly extending tabs, and the like that further prevent or hinder removal of the lace 4216 from the lumen 4244.

Figure 42D:
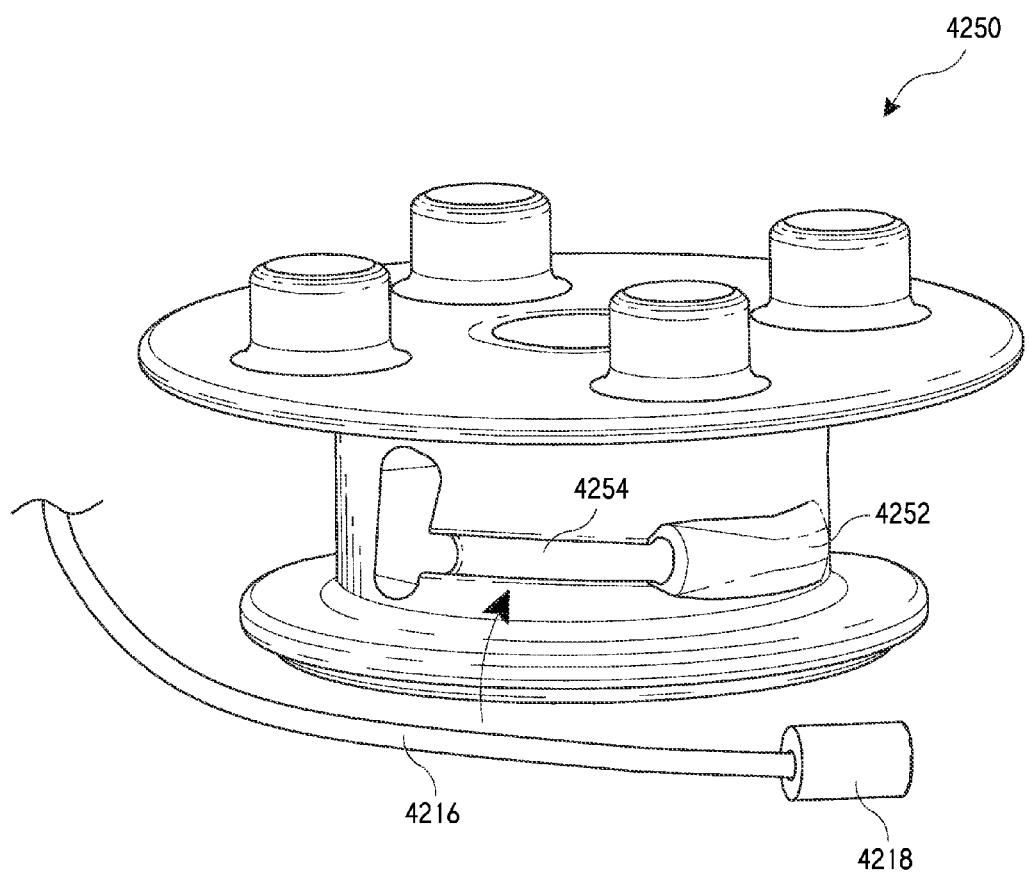

FIG. 42D illustrates another embodiment of a spool 4250 that is configured for easy coupling with a lace 4216. Specifically, an annular channel the spool, or another portion of the spool, includes an open channel 4254 having a garage or enlarged distal end 4252 within which the lace 4216 and ferrule 4218 may be positioned. The open channel 4254 is sized to receive the lace 4216, but is sized smaller than the ferrule 4218 to prevent the ferrule 4218 from being pulled through the channel 4254. The garage or enlarged distal end 4252 is configured to receive the ferrule 4218 and may be configured so that when the ferrule is coupled with the garage 4252, the ferrule is positioned radially inward of a wall of the annular channel about which the lace or tension member is wound. Contact between a proximal end of the ferrule 4218 and a distal end of the open channel 4254 prevents the ferrule 4218 and lace 4216 from being pulled through the channel 4254 and thereby removed from the spool 4250. The channel 4254 and garage 4252 are configured to allow the lace 4216 and ferrule 4218 to be radially inserted therein.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A shoe comprising:
   a sole;
   an upper attached to the sole, the upper having a pair of eyestays positioned on opposing sides of a tongue portion of the shoe;
   a tension member that is guided about a path along the tongue portion and between the pair of eyestays;
   a tightening mechanism that is operably coupled with the tension member, the tightening mechanism being operable to effect tensioning of the tension member; and
   a pair of elongate eyestay guides, each elongate eyestay guide being coupled with an eyestay of the pair of eyestays so that the pair of elongate eyestay guides are positioned on opposing sides of the tongue portion, wherein each elongate eyestay guide extends longitudinally along a length of the eyestay from a collar of the shoe to a toe portion of the shoe and each elongate eyestay guide includes a top edge that extends continuously along an edge of the eyestay from the collar to the toe portion of the shoe and a flange that extends laterally therefrom toward the sole of the shoe, the top edge being relatively straight along an entire length of the elongate eyestay guide and the flange extending longitudinally along the entire length of the elongate eyestay guide, and wherein each elongate eyestay guide includes a plurality of holes that extend entirely through the respective guide to allow the tension member to be looped around the top edge of the respective guide, the plurality of holes being longitudinally offset from one another with a first hole positioned near the collar of the shoe and a second hole positioned toward the toe box of the shoe;
   wherein the tension member is operably coupled with each elongate eyestay guide to guide the tension member about the path along the tongue portion and between the pair of eyestays, the tension member being operably coupled with each elongate eyestay guide by insertion of the tension member through the first hole and the second hole, whereby tensioning of the tension member causes the opposing sides of the tongue portion to more toward one another via the pair of elongate eyestay guides and thereby tightens the shoe; and
   wherein the top edge of each elongate eyestay guide extends inward toward the tongue portion of the shoe from an inward most edge of the upper.

2. The shoe of claim 1, wherein each elongate eyestay guide is made of a rigid thermoplastic material.

3. The shoe of claim 2, wherein each elongate eyestay guide is made of Nylon.

4. The shoe of claim 1, wherein the flange of each elongate eyestay guide is stitched to the upper of the shoe.

5. The shoe of claim 1, wherein the top edge of each elongate eyestay guide is rounded or curved along its longitudinal length.

6. The shoe of claim 1, wherein the top edge of each elongate eyestay guide has a lateral thickness that is greater than the flange.

7. The shoe of claim 1, wherein the tightening mechanism is a reel based tightening device.

8. A shoe comprising:
   a sole;
   an upper attached to the sole;
   a tension member;
   a tightening mechanism that is operably coupled with the tension member; and
   an elongate eyestay guide that is separate from the upper and that is attachable to a side of the upper so that the elongate eyestay extends longitudinally along a majority of a length of an eyestay of the upper between a collar and toe portion of the shoe, the elongate eyestay guide including a top end that is positioned along an edge of the eyestay and a flange that extends laterally therefrom toward a sole of the shoe, the flange extending longitudinally along an entire length of the elongate eyestay guide and the elongate eyestay guide including a first hole that is positioned near the collar of the shoe and a second hole that is longitudinally offset from the first hole and positioned toward the toe box of the shoe, the first hole and the second hole extending entirely through the elongate eyestay guide to allow the tension member to be looped around the top end of the elongate eyestay guide;
   wherein the tension member is operably coupleable with the elongate eyestay guide so that the tension member is guided about a path along the shoe, the tension member being coupleable with the elongate eyestay guide by insertion of the tension member through the first hole and the second hole;
   wherein the top end of the elongate eyestay guide is relatively straight along the entire length of the elongate eyestay guide; and
   wherein the top end of the elongate eyestay guide extends inward toward the tongue portion of the shoe from an inward most edge of the upper.

9. The shoe of claim 8, wherein the elongate eyestay guide is made of a rigid thermoplastic material.

10. The shoe of claim 9, wherein the elongate eyestay guide is made of Nylon.

11. The shoe of claim 8, wherein the flange of the elongate eyestay guide is stitched to the upper of the shoe.

12. The shoe of claim 8, wherein the top end of the elongate eyestay guide is rounded or curved along its longitudinal length.

13. The shoe of claim 8, wherein the top end of the elongate eyestay guide has a lateral thickness that is greater than the flange.

14. The shoe of claim 8, wherein the tightening mechanism is a reel based tightening device.

* * * * *